(12) United States Patent
Kim et al.

(10) Patent No.: US 8,031,321 B2
(45) Date of Patent: Oct. 4, 2011

(54) METHODS OF MANUFACTURING LIQUID CRYSTAL DISPLAY DEVICES

(75) Inventors: Bum Soo Kim, Paju-si (KR); Byoung Chul Choi, Gyeonggi-do (KR); Byoung-Mok Ha, Gyeonggi-Do (KR); Chang Bo Shim, Paju-si (KR); Chang-Soo Na, Gyeonggi-Do (KR); Cheol Joo Moon, Goyang-si (KR); Chong Chan Eun, Paju-si (KR); Gu-Yun Bok, Gyeonggi-Do (KR); Hae Joon Son, Paju-si (KR); Heung-Sun Kim, Gyeonggi-Do (KR); Hong Seok Lee, Paju-si (KR); Hyung Jin Park, Gyeonggi-Do (KR); Hyun-Ho Song, Gyeonggi-Do (KR); In Kyu Lee, Paju-si (KR); Jae Chuon Ryu, Gumi-si (KR); Jae Ho Shin, Paju-si (KR); Jae Min Jong, Paju-si (KR); Je Hyun Kim, Gyeongsangnam-Do (KR); Jeong-Ho Lee, Gyeonggi-Do (KR); Jeong-Joon Lee, Incheon (KR); Jong Won Kim, Paju-si (KR); Jun Beom Cho, Anseong-si (KR); Jun Young Yu, Paju-si (KR); Jung Seung Kim, Gyeonggi-do (KR); Jung-Deog Yoo, Gyeonggi-Do (KR); Jung-Sik Kim, Chungcheongnam-Do (KR); Se Joon Baek, Busan-si (KR); Seung-Bum Lee, Seoul (KR); Seung-Won Moon, Paju-si (KR); Sung-Mo Koo, Gyeonggi-Do (KR); Tae Man Kim, Paju-si (KR); Young Phil Bang, Seoul (KR); Myoung Su Yang, Gunpo-si (KR); Jae Kyun Lee, Gunpo-si (KR); Hyun-Seok Jang, Paju-si (KR); Jung Il Lee, Seoul (KR)

(73) Assignee: LG Display Co., Ltd., Seoul (KR)

(*) Notice: Subject to any disclaimer, the term of this patent is extended or adjusted under 35 U.S.C. 154(b) by 255 days.

(21) Appl. No.: 12/292,049

(22) Filed: Nov. 10, 2008

(65) Prior Publication Data
US 2009/0279045 A1    Nov. 12, 2009

Related U.S. Application Data

(63) Continuation of application No. 11/476,919, filed on Jun. 29, 2006, now Pat. No. 7,450,213.

(51) Int. Cl.
G02F 1/13      (2006.01)
G02F 1/1341    (2006.01)
G02F 1/1339    (2006.01)

(52) U.S. Cl. ......... 349/187; 349/189; 349/190; 349/192
(58) Field of Classification Search ........... 349/187–192
See application file for complete search history.

(56) References Cited

U.S. PATENT DOCUMENTS 4,610,510 A      9/1986 Funada et al.
7,450,213 B2 *  11/2008 Kim et al. ............ 349/187

* cited by examiner

Primary Examiner — Kevin S Wood
(74) Attorney, Agent, or Firm — McKenna Long & Aldridge LLP

(57) ABSTRACT

An LCD device and a method for manufacturing the same is disclosed, in which it is possible to correct a problem of insufficient or excessive supply of liquid crystal in an LCD device by controlling an amount of liquid crystal. The method includes preparing a liquid crystal cell comprised of a first substrate, a second substrate, a liquid crystal layer between the first and second substrates, and a first sealant formed in the periphery of the liquid crystal layer between the first and second substrates; measuring an amount of liquid crystal provided to the inside of liquid crystal cell; forming an inlet for liquid crystal in the first sealant; and regulating the amount of liquid crystal by supplying or discharging the liquid crystal through the inlet; and sealing the inlet.

1 Claim, 129 Drawing Sheets

Realated Art

Realated Art

Realated Art

Realated Art

Realated Art

Realated Art

Realated Art

Realated Art

Realated Art

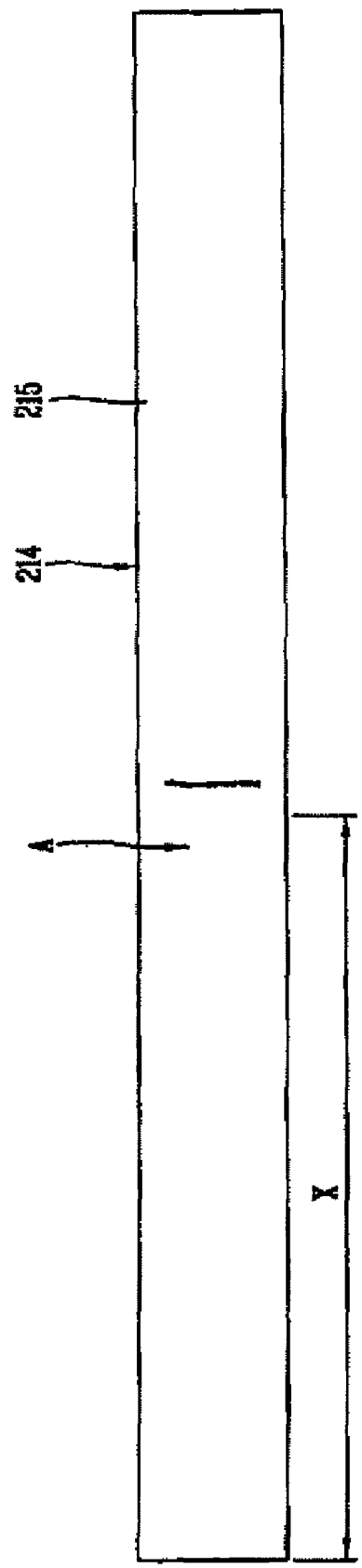

METHODS OF MANUFACTURING LIQUID CRYSTAL DISPLAY DEVICES

RELATED APPLICATION

This application is a continuation of application Ser. No. 11/476,919 filed on Jun. 29, 2006, now U.S. Pat. No. 7,450,213.

BACKGROUND OF THE INVENTION

1. Field of the Invention

The present invention relates to liquid crystal display devices and apparatus and methods of manufacturing the same, including orientating the alignment layer, dispensing liquid crystal and sealant, bonding, cutting, correcting dispensing errors, and inspecting the completed device.

2. Discussion of the Related Art

As the information age advances, the demand for various display devices has increased. To meet this demand, research regarding flat panel display devices is ongoing including liquid crystal display devices (LCD), plasma display panels (PDP), electro-luminescent displays (ELD), vacuum fluorescent displays (VFD), and the like. Some flat panel display devices are being applied to various appliances for display purposes.

In particular, the LCD has been used as a substitute for the cathode ray tube (CRT) in association with mobile image display devices because the LCD has the advantages of superior picture quality, lightness, thinness, and low power consumption. Thus, the LCD is currently most widely used. The LCD device is a device that displays information on a screen using refractivity anisotropy. Thus, various applications for LCDs are being developed in addition to mobile image display devices such as monitors of notebook computers, but also TV monitors to receive and display broadcast signals and desktop computer monitors.

Although the LCD has been developed so that it can be used as picture display devices in various fields, the task to enhance the quality of images in such LCDs is made difficult by attempting to improve the above-mentioned features and advantages.

Accordingly, successful application of such LCDs to diverse image display devices depends on whether or not the LCD can realize desired high picture quality including high resolution, high brightness, large display area, and the like, while maintaining the desired characteristics of lightness, thinness, and low power consumption.

The LCD device includes a lower substrate, an upper substrate, and a liquid crystal layer formed between the substrates, wherein the lower substrate is formed opposite the upper substrate at a predetermined interval. Alignment of the liquid crystal layer depends on whether a voltage is applied between the two substrates, and transmittance of light depends on the alignment of the liquid crystal layer, whereby an image is displayed. At this time, if the alignment of the liquid crystal layer is disordered, it is difficult to obtain a desired image. Accordingly, an alignment layer is formed to uniformly maintain an initial alignment of the liquid crystal layer.

With reference to FIG. 1, the liquid crystal display panel 10010 includes an image display part 10013 in which liquid crystal cells are arranged in a matrix form, a gate pad part 10014 connected with gate lines 10016 of the image display part 10013 and a data pad part 10015 connected with data lines 10017.

The gate pad part 10014 and the data pad part 10015 are formed at an edge region of a thin film transistor (TFT) array substrate which does not overlap with a color filter substrate 1002. The gate pad part 10014 supplies scan signals provided from a gate driver (not illustrated) to the gate lines 10016 of the image display part 10013, and the data pad part 10015 supplies image information provided from a data driver (not illustrated) to the data lines 10017 of the image display part 10013.

Although not illustrated, the color filter substrate 1002 includes a color filter including red, green and blue sub-color filters implementing colors, a black matrix for separating the sub-color filters and blocking light from transmitting through a liquid crystal layer, and a transparent common electrode for applying a voltage to the liquid crystal layer.

The array substrate 1001 includes a plurality of gate lines 10016 and a plurality of data lines 10017 arranged vertically and horizontally thereon and defining a plurality of pixel regions, the TFT, namely, a switching element, formed at each crossing of the gate lines 10016 and the data lines 10017, and a pixel electrode formed on each pixel region.

The array substrate 1001 and the color filter substrate 1002 are attached in a facing manner by a seal pattern 10040 formed at an edge of the image display part 10013 to form a liquid crystal display panel 10010, and attachment of the two substrates 1001 and 1002 is made through an attachment key (not illustrated) formed on the array substrate 1001 or the color filter substrate 1002.

In order to seek improvement of a yield, in the LCD device, the TFT array substrates are formed on a large-scale mother substrate, color filter substrates are formed on another separate mother substrate, which are then attached to simultaneously form the plurality of liquid crystal display panels. In this case, for the attached mother substrates, a cutting process is required to cut the attached mother substrates into a plurality of unit liquid crystal display panels.

In general, cutting of the mother substrates is performed such that a prearranged cut groove is formed on the mother substrates with a wheel with high hardness compared with glass and then cracking is made along the prearranged cutting groove.

FIG. 2 is a view illustrating the structure of a section of the unit liquid crystal display panel formed by attaching the first mother substrate on which the TFT array substrates are formed and the second mother substrate on which the color filter substrates are formed.

As illustrated, in the unit liquid crystal panels, the thin film transistor array substrates 1001 are protruded at one side compared to the color filter substrates 1002, because the gate pad part (not illustrated) and the data pad part (not illustrated) are formed at the edge portion of the thin film transistor array substrate 1001 which is not overlapped with the color filter substrate 1002.

Accordingly, the color filter substrates 1002 formed on the second mother substrate 10030 are formed to be separated as long as a first dummy region 10031 corresponding to the protruded portion of the thin film transistor array substrates 1001 formed on the first mother substrate 10020.

The unit liquid crystal panels are suitably disposed such that the first and the second mother substrates 10020 and 10030 can be utilized to their maximum, and though they differ depending on a model, the unit liquid crystal panels are usually formed to be separated along a second dummy region 10032.

After the first mother substrate 10020 with the thin film transistor array substrates 1001 formed thereon and the second mother substrate 10030 with the color filter substrates 1002 formed thereon are attached, the liquid crystal panels are cut. At this time, the first dummy region 10031 formed at the portion where the color filter substrates 1002 of the second mother substrate 10030 are separated and the second dummy region 10032 separating the unit liquid crystal panels are simultaneously removed.

Manufacturing an LCD device typically involves providing a first and second substrate having thin-film transistors, drive circuits, color filters and other electrical and optical features formed thereon. Then, an alignment film or alignment layer is provided on one of the two substrates, and the alignment layer is rubbed to achieve a surface texture that will impose an orientation on the liquid crystal. Liquid crystal and sealant are then deposited on the substrates in a manner discussed in detail below, after which the substrates are bonded together. After bonding, the bonded substrates are cut in to panels, the edges are smoothed through grinding or other technique, and the panels are inspected for quality. The details of the panels and the methods employed in their manufacture will be discussed in greater detail herein.

FIG. 3 is a cross-sectional view illustrating a related art liquid crystal display device, and FIG. 4 is a flow diagram illustrating a related art method for manufacturing a liquid crystal display device.

A related art LCD device denoted by reference numeral 1011 includes an upper substrate 1013, a lower substrate 1015, and a liquid crystal layer 1017 between the upper and lower substrates 1013 and 1015, as illustrated in FIG. 3.

The lower substrate 1015 is a substrate having an array of driving components formed thereon. Although not illustrated in FIG. 3, the lower substrate 1015 has a plurality of pixels formed thereon, each of which is formed with a driving component such as a thin film transistor. The upper substrate 1013 is a substrate for color filters, and has color filter layers for realizing actual color formed therein. In addition, each of the upper and lower substrates 1013 and 1015 is formed with a pixel electrode and a common electrode, and coated with an orientation film for orientation of liquid crystal molecules in the liquid crystal layer 1017.

The upper and lower substrates 1013 and 1015 are attached by means of a sealing material 1019. The liquid crystal layer 1017 is disposed between the upper and lower substrates 1013 and 1015 such that an amount of light transmitting through the liquid crystal layer is controlled by driving the liquid crystal molecules using the driving components arranged on the lower substrate 1015, displaying information.

The method for manufacturing the liquid crystal display device generally comprises a driving component array process (also known as a driving device array process) to form the driving components on the lower substrate 1015, a color filter process for forming the color filters on the upper substrate 1013, and a cell process. The method for manufacturing the liquid crystal display device will be described in detail with reference to FIG. 4.

First, in the driving component array process, a plurality of gate lines and data lines are arranged to define pixel regions on the lower substrate 1015, and each of the pixel regions is then formed with a thin film transistor, which is a driving component connected to the gate lines and the data lines (S101). In addition, a pixel electrode is also formed to connect with the thin film transistor by the driving component array process, such that, when a signal is applied to the pixel electrode via the thin film transistor, the pixel electrode drives the liquid crystal layer.

Subsequently, a common electrode, and color filter layers of R, G and B for exhibiting colors are formed on the upper substrate 1013 by the color filter process (S104).

After applying orientation films to the upper and lower substrates 1013 and 1015, the orientation films are rubbed to supply an orientation regulating force or surface securing force (that is, a pre-tilt angle and orientation) to the liquid crystal molecules in the liquid crystal layer formed between the upper and lower substrates 1013 and 1015 (S102, S105).

Next, after spacers for maintaining a constant cell gap are scattered on the lower substrate 1015, and a sealing material 1019 is applied to an outer periphery of the upper substrate 1013, the upper and lower substrates 1013 and 1015 are attached to each other by pressing them together (S103, S106, S107).

Each of the upper and lower substrates 1013 and 1015 is generally formed of a large size glass substrate. As a result, with the color filter layers and the TFT as the driving component formed in each panel region, a plurality of panel regions are formed on a single large size glass substrate. Thus, it is necessary to cut and process the glass substrate (S108). Thereafter, a liquid crystal is injected through a liquid crystal injection hole into each liquid crystal panel processed in the aforementioned manner to form the liquid crystal layer. After the liquid crystal layer is formed by injecting liquid crystals into each processed liquid crystal display panel through a liquid crystal injection port and the liquid crystal injection port is encapsulated, plugged, or sealed, and each liquid crystal display panel is tested and inspected (S109, S110), thus completing manufacturing of the LCD panels.

Inspection of the liquid crystal display panels can be typically divided into appearance inspection, electrical lighting inspection, and orientation abnormality inspection.

The lighting inspection is performed in such a way as to determine whether various electrical components are operating normally by applying a signal to a completed liquid crystal display panel, verifying the results. The appearance inspection is performed in such a way as to determine whether the liquid crystal display panel has an imperfection by inspecting the liquid crystal display panel with naked eyes of an operator. In addition, the orientation abnormality inspection is performed in such a way as to determine whether liquid crystals are gathering or pooling in a lower portion of the liquid crystal display panel that is sagging under its own weight due.

The orientation abnormality of liquid crystals is caused by an undesired increase in volume of the liquid crystal layer resulting from the temperature of the liquid crystal layer within the liquid crystal display panel being too high when manufacturing the liquid crystal display panel. This causes the cell gap of the liquid crystal display panel to exceed the height afforded by the spacer. Accordingly, liquid crystals move to the lower portion of the liquid crystal display panel as it sags, making the cell gap become non-uniform, and thereby deteriorating the quality of the liquid crystal display device.

The orientation abnormality inspection is typically performed by observing an image at the lower portion of the liquid crystal display panel with the naked eyes of the operator while light is transmitted through the liquid crystal display panel. That is, if any abnormality is detected in the image during an observation of the lower portion of the liquid crystal display panel, it is determined that there is orientation abnormality in the liquid crystal display panel.

That is, the orientation abnormality inspection is performed in a state in which the completed liquid crystal display panel is maintained at high temperatures. To this end, the orientation abnormality inspection is performed after each liquid crystal display panel is heated in a heating chamber. Heating of the liquid crystal display panels is typically performed in cassettes for inspection efficiency. In other words, after a plurality of liquid crystal display panels are received in a cassette, they are heated to a high temperature in a heating chamber. The heated liquid crystal display panels are conveyed to an inspection apparatus by means of an additional conveying means, and then subjected to the inspection.

However, such a related art inspecting apparatus for detecting orientation abnormality of the LCD panels has a problem in that, because the inspection apparatus is located a predetermined distance away from the heating chamber, the liquid crystal display panels are exposed to surrounding air and are cooled during conveyance to the inspection apparatus after being transferred from the cassette of the heating chamber, thereby making it impossible to perform a precise inspection.

In addition, the related art orientation abnormality inspecting apparatus has a problem in that, because the interior of the heating chamber is exposed to surrounding air while the liquid crystal display panels are transferred from the cassette of the heating chamber, the surrounding air is induced into the heating chamber, causing a non-uniform temperature of the heating chamber.

Furthermore, because the related art orientation abnormality inspecting apparatus requires expensive mechanisms, including a robot for conveying the liquid crystal display panels from the heating chamber to the inspector, manufacturing costs are invariably increased, and a lot of time is required to convey the liquid crystal display panels.

The Alignment Layer in the Related Art

FIG. 5 is an exploded perspective view illustrating the structure of a LCD device.

As illustrated in FIG. 5, the LCD device includes a color filter substrate 1025, namely, a first substrate, an array substrate 10210, namely, a second substrate, and a liquid crystal layer 10240 formed between the color filter substrate 1025 and the array substrate 10210.

The color filter substrate 1025 includes a color filter (C) comprising sub-color filters 1027 for implementing red (R), green (G) and blue (B) color, a black matrix 1026 for discriminating the sub-color filters 1027 and blocking light transmitting through the liquid crystal layer 10240, and a transparent common electrode 1028 for applying a voltage to the liquid crystal layer 10240.

The array substrate 10210 includes gate lines 10216 and data lines 10217 that are arranged on the substrate 10210 and define pixel regions (P). A thin film transistor (TFT) switching element is formed at respective crossings of the gate lines 10216 and the data lines 10217, and a pixel electrode 10218 is formed at each pixel region (P).

The pixel region (P) is a sub-pixel corresponding to one sub-color filter 1027 of the color filter substrate 1025, and a color image is obtained by combining the red, green and blue types of sub-color filters 1027. Namely, the three red, green and blue sub-pixels form one pixel, and TFTs are connected to the blue, green and blue sub-pixels.

Because the LCD device is a transmissive type display device for displaying images by adjusting an amount of light transmitted through a liquid crystal layer according to an alignment direction of liquid crystal molecules, an alignment process must be performed for the LCD device to provide each liquid crystal molecule with a uniform direction.

When the orientation of the liquid crystal layer is not uniform, it is difficult to obtain the desired image. Accordingly, an orientation or alignment film for uniformly maintaining initial orientation state of the liquid crystal layer is formed on the upper and lower substrates. An alignment film (not illustrated) for aligning liquid crystal molecules of the liquid crystal layer 10240 is formed on the color filter substrate 1025 and the array substrate 10210.

In general, many methods are known to produce an alignment layer. The orientation direction of the orientation film may be established using a rubbing alignment method or a light irradiating method, also known as a photo-alignment method. An alignment method using a rubbing operation is currently used most frequently. The rubbing alignment method first forms an alignment layer on a substrate and then rubs the alignment layer by use of a rubbing cloth to form uniform microgrooves on a surface of the alignment layer. The alignment layer having the microgrooves on its surface provides each liquid crystal molecule with an alignment controlling force, thereby constantly aligning the liquid crystal molecules over the entire surface of the alignment layer in a desired direction.

In the rubbing method, a thin orientation film is deposited on a substrate, and a rubbing roll onto which a rubbing cloth is wound is rolled on the orientation film, thereby orienting the orientation film in a designated direction.

In the light irradiating method, a thin orientation film is deposited on a substrate, and ultraviolet rays, such as polarized rays or non-polarized rays, are irradiated onto the orientation film. A reaction resulting from the irradiation orients the orientation film in a designated direction.

When using either the rubbing or the light irradiating method, a thin orientation film or alignment layer having a small thickness is uniformly deposited on a substrate. A related art roll printing method is used to deposit the orientation film.

FIG. 6 illustrates a method for forming or coating an alignment film using a related art roll printing method and device.

As illustrated, generally, an alignment film is formed using a printing method using a plurality of rolls. Namely, an alignment solution 10224 supplied between a cylindrical anilox roll 10222 and a cylindrical doctor roll 10223 is uniformly coated entirely on the anilox roll 10222 as the anilox roll 10222 and the doctor roll 10223 are rotated. In this case, the alignment solution 10224 is supplied by a dispenser 1021 in an injector type.

The anilox roll 10222 is rotated in contact with a printing roll 10224 having a rubber plate or printing mask 10225 attached on a certain region of its surface, thereby transferring the alignment solution 10229 on the anilox roll 10222 to the rubber plate 10225. The rubber plate 10225 corresponds to a substrate 10226 on which the alignment solution or orientation material 10229 is to be coated, and has a master pattern to allow the alignment film to be selectively printed on the substrate 10226.

As a printing table or substrate stage 10227 with the substrate 10226 loaded thereon is moved in contact with the printing roll 10224, the alignment solution 10229 which has been transferred to the rubber plate 10225 is re-transferred onto the substrate 10226 to thereby form an alignment film.

Next, with the alignment film formed on the substrate, the alignment film is rubbed to arrange or orient liquid crystals in a certain direction to form valleys in a certain direction.

The related art roll printing method for realizing uniform coating of the alignment material using the doctor roll 10223 has several problems First, as the size of the substrate increases, the size of the anilox roll 10222 increases along with the size of the doctor roll 10223 rotating in engagement with the anilox roll 10222. In this case, a problem occurs in that the alignment material is not uniformly coated on a center portion of the anilox roll 10222.

Referring to FIG. 8, if the sizes of the doctor roll 10316 and the anilox roll 10318 increase, pressure between the doctor roll 10316 and the anilox roll 10318 decreases in a center portion (portion B) of the rolls 10316 and 10318 more seriously than the pressure between the end portions (portions A) of the rolls 10316 and 10318. Accordingly, the alignment material is not uniformly coated on the center portion (portion B) of the anilox roll 10318.

Second, if coating is repeated, a predetermined portion of the doctor roll 10223 is abraded. In this case, the alignment material is not uniformly coated on the abraded portion. For this reason, a problem occurs in that a spot is generated on a predetermined portion of the substrate.

In other words, since the doctor roll 10223 is made of a rubber based material, it is abraded by the alignment material if coating is repeated, whereby the alignment material is not uniformly coated on the doctor roll 10223.

In addition, the roll printing unit is fixed and the substrate stage 10227 moves, thus allowing the orientation material 10229 to be deposited on the substrate 10226.

FIG. 7 is a perspective view illustrating a rubbing process.

As illustrated, the alignment film 10221 is rubbed to form recesses 10236 on the surface thereof. The rubbing process rubs the surface of the alignment film 10221 in a certain direction using a roller 10230 with a rubbing cloth 10235 wound thereon.

After the surface of the alignment film 10221 is rubbed, it has fine recesses 10236.

For the rubbing cloth 10235, a soft cloth is used. The rubbing equipment, including the roller 10230, is relatively simple. The basic part for setting conditions for the rubbing process is setting a rubbing condition with a suitable strength and applying a uniform rubbing strength on a large area.

There are problems that arise in the related art rubbing process. The rubbing process may include a rubbing cloth that is wound on a rubbing roll and then is placed in contact with the rubbing roll while the rubbing roll is rotated and moved in one direction. Meanwhile, the LCD device is being employed in electric devices such as TV sets as well as portable electric devices recently and accordingly, the size of the LCD device is greatly increasing (furthermore, the mother substrate for fabricating LCD panels is much greater in size) that results in an increase of the width and weight of the rubbing roll used to perform the alignment process for a large LCD device.

In the meantime, the alignment controlling force or a surface fixing force of the alignment layer that is rubbed by the rubbing roll is determined by the microgrooves formed in the alignment layer, and the depth of the microgroove is different based upon a pressure of the rubbing roll applied to the alignment layer. However, as the width and weight of the rubbing roll increases, it is difficult to uniformly maintain the pressure applied to the mother substrate, that results in the fabrication of a defective LCD device by defectively rubbing the alignment layer.

If the rubbing is not uniformly performed, an alignment degree of liquid crystal molecules is not spatially uniform, causing a defect that optical characteristics are different at a certain portion.

And because the physical units such as the rolls are used in the rubbing process, management of the rolls is important with respect to stability of processes. Accordingly, it is important to secure a sufficient number of rubbing rolls to obtain a margin in operating rolls. However, there is no means for keeping and storing the rubbing rolls, and the rubbing rolls are kept standing vertically, limiting the operation of rolls. In addition, as the size of the mother substrate for fabricating a liquid crystal display panel increases, the corresponding rubbing roll lengthens, so there is a limitation on keeping rubbing rolls in a standing state in a clean room having a limited amount of space.

Furthermore, since the rubbing rolls are kept in a fixed state, the eccentricity of the rubbing roll deviates and changes. The eccentricity of the rubbing roll is a critical factor for coordinating and managing a rubbing process along with the condition of a rubbing cloth.

Moreover, since the rubbing rolls are kept in an open, exposed state, the rubbing cloth is inevitably contaminated by external particles, thereby causing damage to the surface of the liquid crystal display panel.

With respect to FIG. 6, when forming an orientation layer on a large sized substrate, the movement of the substrate stage unit 10227 during forming the orientation layer is increased, thereby increasing the space occupied by the roll printing device, and lowering space utilization.

Providing Liquid Crystal in the Related Art

Related art methods of dropping or dispensing liquid crystal are described as follows. As illustrated in FIG. 9, the conventional liquid crystal display device comprises a lower substrate 1041 and an upper substrate 1043, which are opposite to each other. Although not illustrated in the drawings, TFTs and pixel electrodes are formed on the lower substrate 1041, and a light shielding film, color filter layers, and common electrodes are formed on the upper substrate 1043.

A liquid crystal layer 1045 is formed between the lower substrate 1041 and the upper substrate 1043. The liquid crystal layer 1045 is oriented in a designated direction by an orientation film (not illustrated) formed on the lower surface thereof.

A sealant layer 1047 is formed between the lower substrate 1041 and the upper substrate 1043. The sealant layer 1047 serves to seal the liquid crystal layer 1045 and to bond the lower substrate 1041 and the upper substrate 1043 to each other.

By way of another example, FIG. 10 illustrates an exploded perspective view of an LCD device according to the related art.

As illustrated in FIG. 10, an LCD device according to the related art includes a lower substrate 10510, an upper substrate 10520, and a liquid crystal layer (not illustrated) formed between the lower and upper substrates 10510 and 10520.

The lower substrate 10510 includes gate and data lines 10512 and 10514 crossing each other to define a unit pixel region. Then, a thin film transistor TFT is formed adjacent to a crossing portion of the gate and data lines 10512 and 10514, wherein the thin film transistors TFT functions as a switch. Also, a pixel electrode 10516 is formed in the pixel region, wherein the pixel electrode 10516 is connected with the thin film transistor TFT.

The upper substrate 10520 includes a black matrix layer 10522 for preventing light leakage from other portions except the pixel region, a color filter layer 10524 of red, green and blue patterns for representing colors in the portion corresponding to the pixel region, and a common electrode 10526 formed on the color filter layer 10524.

The above-configured liquid crystal display device is fabricated by preparing the lower and upper substrates and forming a liquid crystal layer between the prepared substrates. In this case, the liquid crystal layer is formed between both of the substrate by a vacuum injection method or a liquid crystal dropping method.

The vacuum injection method is carried out by forming a sealant having one inlet on one of the two prepared substrates, bonding the two substrates together and injecting liquid crystals into a space between the two substrates via the inlet.

By way of example, the injecting of the liquid crystal may be achieved by the following processes. That is, as illustrated in FIG. 11, a nitrogen gas (N2 gas) is supplied into a vacuum chamber in a state where an injection hole 10616 of a liquid crystal panel 1061 is in contact with the liquid crystal, and thus a degree of vacuum of the chamber 10610 is lowered. Then, the liquid crystal 10614 is injected into the panel 1061 by the difference between the internal pressure of the liquid crystal panel 1061 and the pressure of the vacuum chamber 10610. After the panel 1061 is completely filled with the liquid crystal, the injection hole 10616 is encapsulated by an encapsulating material, thereby forming a liquid crystal layer (This type of injection method is called a vacuum injection method of liquid crystal).

However, disadvantageously, it takes a long time to inject liquid crystal into a panel through the injection hole 16. That is, only a very small amount of liquid crystal is injected into the liquid crystal panel per unit time because this is only a very small gap of just a few micrometers (μm) between the driving device array substrate and the color filter substrate of the liquid crystal panel. For example, when a liquid crystal panel of approximately 15 inches is fabricated, it takes approximately 8 hours to complete the injection of liquid crystal. Such injection of liquid crystal over a long period of time delays the fabrication process of the liquid crystal panel, and thus deteriorates fabrication efficiency. Particularly, the vacuum injection method is inadequate for a large-sized liquid crystal panel because the time it takes to inject liquid crystal increases as liquid crystal panels become larger.

As a size of a substrate increases, it takes so much time in injecting liquid crystals by the vacuum injection method as to reduce manufacturing productivity. In addition, because the sealant layer is hardened under the condition that the liquid crystal layer is formed between the lower and upper substrates, the liquid crystal drop method causes domain defects due to a scattering of the orientation of the liquid crystal layer from high temperatures during hardening the sealant layer.

That is, in the liquid injection method, since the liquid crystal is injected into a space between the lower and upper substrates after the sealant layer is hardened, the liquid crystal layer is not exposed to high temperatures generated during hardening the sealant layer. However, in the liquid drop method, since the sealant layer is hardened after the liquid crystal layer is formed between the lower and upper substrates, the liquid crystal layer is exposed to high temperatures generated during hardening the sealant layer, and thus the orientation of the liquid crystal layer is scattered.

Thus, the liquid crystal dropping method is more suitable for large-scale substrates. The liquid crystal dropping method is carried out by forming a sealant having no inlet on one of the two prepared substrates, dropping liquid crystals on the substrate and bonding the two substrates together. However, in the liquid crystal dropping method it is difficult to calculating the proper quantity of liquid crystals.

In particular, the liquid crystal dropping method differs from the vacuum injection method in dropping a prescribed quantity of liquid crystals after calculating a liquid crystal quantity by considering a cell size, a cell height and the like. It is substantially difficult to calculate a precise quantity of liquid crystals due to various factors.

If the liquid crystal quantity calculated is too small, a filling-failure area of liquid crystals is generated within a liquid crystal display panel. If the liquid crystal quantity calculated too large, an over-filling area is generated within a liquid crystal display panel, lowering the quality of the display.

Many efforts have been made to minimize the generation of the insufficient or excessive filling of liquid crystals in various ways. Once the insufficient or excessive filling of liquid crystals takes place, there is no way in the related art to correct the insufficient or excessive filling of liquid crystals. If the filling error is serious, the corresponding panel must be discarded, which is not economical.

Providing Sealant in the Related Art

In the liquid crystal injection method, a sealant is dispensed in a pattern having an inlet on any one of lower and upper substrates, and the lower and upper substrates are bonded to each other. Then, liquid crystal is injected to a space between the lower and upper substrates through the inlet of the sealant.

In the liquid crystal dispensing method, a sealant is dispensed in a pattern having no inlet on the lower substrate, and liquid crystal is dispensed on the lower substrate. Then, the lower and upper substrates are bonded to each other.

The method for dispensing the sealant of the pattern having no inlet by the liquid crystal dispensing method is classified into a screen printing method and a dispensing method using a dispenser. If applying the screen printing method, the screen may come into contact with a substrate, whereby it may damage an alignment layer of the substrate. In this respect, the dispensing method is used generally.

Hereinafter, a related art dispensing method will be explained with reference to the accompanying drawings.

FIG. 12 is a schematic view of a sealant dispensing method using a dispenser according to the related art.

First, as illustrated in FIG. 12, the related art dispenser is provided with a syringe 10710 and a nozzle 10720.

The syringe 10710 has a sealant 10715 therein. The nozzle 10720 is connected to a lower end of the syringe 10710 to supply the sealant 10715 to a substrate 1071.

The dispenser moves along a direction (as indicated by the arrow in the figure) from a starting point (s) of the substrate 1071, and then returns to the starting point (s) of the substrate 1071, forming a closed sealant path. As the dispenser moves along the substrate, the sealant 10715 is discharged to the substrate 1071 through the nozzle 10720. Accordingly, the sealant 10715 of the pattern having no inlet is dispensed to the substrate 1071.

However, the related art sealant dispensing method has the following disadvantages.

First, because the sealant 10715 has a particular viscosity, the sealant 10715 may coagulate in the end of the nozzle 10720 of the dispenser. Thereafter, when the sealant material is supplied to the starting point (s) of the substrate 1071 through the nozzle 10730, the coagulated sealant is discharged to the starting point (s) of the substrate 1071. In addition, because the dispenser moves along the arrow direction from the starting point (s) of the substrate 1071, and then turns back to the starting point (s) of the substrate 1071, the coagulated sealant 10715 may be excessively dispensed to the starting point (s) of the substrate 1071. In this case, when bonding the two substrates to each other, the sealant 10715 spreads to the inside of the substrate 1071 in which the liquid crystal is formed. Thus, the liquid crystal dispensed on the substrate 1071 may be contaminated due to the spread of sealant.

Second, to prevent the sealant 10715 from being coagulated at the starting point (s), the dispenser may be stopped before the starting point (s). In this case, the sealant 10715 can be disconnected. That is, the liquid crystal flows to the outside through the disconnected portion of the sealant.

Another example of a related art dispensing device is illustrated in FIG. 13. FIG. 13 is a schematic view illustrating a sealant forming method using a dispenser according to the related art.

The dispenser is provided with a syringe 10810, a nozzle 10820, and a dispensing tube 10830. The syringe 10810 has a sealant 10815 therein. The nozzle 10820 is connected to a lower end of the syringe 10810 to supply the sealant 10815 to a substrate 1081. The dispensing tube 10830 is connected to an upper end of the syringe 10810 to discharge the sealant 10815 through the nozzle 10820 by applying a pressure to the syringe 10810.

A sealant forming method using the above dispenser will now be explained.

The dispenser moves along an arrow direction from a starting point(s) of the substrate 1081, and then turns back to the starting point(s) of the substrate 1081. During the movement of the dispenser, a predetermined pressure is applied to the syringe 10810 through the dispensing tube 10830 so that the sealant 10815 is discharged to the substrate 1081 through the nozzle 10820. Accordingly, the sealant 10815 is dispensed to the substrate 1081.

After completion of dispensing the sealant 10815, the dispensing tube 10830 is closed to stop the discharge of the sealant 10815. Thereafter, the dispenser is moved to a predetermined position and dispenses another sealant material according to the above-mentioned method to form a plurality of sealant patterns on the substrate 1081.

However, the dispenser and sealant dispensing method according to the related art has the following disadvantages.

After completion of dispensing one sealant material, the dispensing tube 10830 is closed to stop the discharge of the sealant 10815 from the nozzle 10820. At this time, the sealant may coagulate in the nozzle 10820. Thereafter, when another sealant material is supplied to the substrate 1081 through the nozzle 10820, the coagulated sealant is discharged to the starting point of the substrate 1081, thereby making it difficult to uniformly dispense sealant materials. Because of this problem, it has been necessary to start dispensing the sealant in a dummy region away from the panel area. This way any dried or coagulated sealant is dispensed away from the panel's sealant area. Sealant dispensing patterns include ribbon patterns or other starting paths in the dummy region. The problem with these solutions is that they require the dispensing of sealant across the scribing or cutting path on the substrate. Scribing or cutting through the hardened sealant can damage or wear out the scribing or cutting tool.

Fabrication in the Related Art

A related art LCD device denoted by reference numeral 1011 includes an upper substrate 1013, a lower substrate 1015, and a liquid crystal layer 1017 between the upper and lower substrates 1013 and 1015, as illustrated in FIG. 3.

The lower substrate 1015 is a substrate having an array of driving components formed thereon. Although not illustrated in FIG. 3, the lower substrate 1015 has a plurality of pixels formed thereon, each of which is formed with a driving component such as a thin film transistor. The upper substrate 1013 is a substrate for color filters, and has color filter layers for realizing actual color formed therein. In addition, each of the upper and lower substrates 1013 and 1015 is formed with a pixel electrode and a common electrode, and coated with an orientation film for orientation of liquid crystal molecules in the liquid crystal layer 1017.

The upper and lower substrates 1013 and 1015 are attached by means of a sealing material 1019. The liquid crystal layer 1017 is disposed between the upper and lower substrates 1013 and 1015 such that an amount of light transmitting through the liquid crystal layer is controlled by driving the liquid crystal molecules using the driving components arranged on the lower substrate 1015, displaying information.

The method for manufacturing the liquid crystal display device generally comprises a driving component array process to form the driving components on the lower substrate 1015, a color filter process for forming the color filters on the upper substrate 1013, and a cell process. The method for manufacturing the liquid crystal display device will be described in detail with reference to FIG. 4.

The steps in FIG. 4 are each performed on respective processing lines. Accordingly, the substrates 1013 and 1015 that have undergone one process are transferred to a subsequent processing line by a conveyor or an auto guide vehicle. However, when an LCD device having a large area is being fabricated, a large substrate has to be transferred in a factory. Since conveyors are not well suited for transferring the large substrate, the auto guide vehicle is mainly used to transfer the large substrate to a processing line.

When using the auto guide vehicle, a plurality of substrates is received in a cassette thereby to be transferred. Unloading the substrate from a processing line, receiving the substrate in a cassette, and loading the received cassette onto a next processing line are performed by a robot.

FIG. 14 illustrates a cassette for an LCD device according to the related art in which substrates are received for transfer by an auto guide vehicle. As illustrated, the cassette 10940 of the related art for receiving an LCD device comprises a main body 10941, a supporting bar 10942 formed in the body to receive a substrate 10910, and a pad 10944 formed at the supporting bar 10942 to fix the substrate 10910 by contacting the substrate 10910. The supporting bars 10942 are formed in the body 10941 as a multiple layers thereby to receive a plurality of liquid crystal panels 1093.

FIG. 15 is a plan view illustrating the interior of the cassette 10940 of FIG. 14 in accordance with the related art, in which the substrate 10910 is received on one layer in the cassette 10940. As illustrated, a plurality of LCD panels 1093 are formed on the substrate 10910, and the LCD panels 1093 are separated from each other with a certain distance by a dummy region. A plurality of supporting bars 10942 for supporting the substrate 10910 are formed in the body 10941 (the same number of supporting bars 10942 are formed at upper and lower portions of the body 10941). That is, the substrate 10910 is received in the cassette 10940 by the plural supporting bars 10942. The supporting bar 10942 is provided with a plurality of pads 10944. The pads 10944 are formed of a material such as rubber able to absorb an impact and having an excellent coefficient of friction for fixing the substrate 10910 and to prevent impact damage to the substrate 10910. The pad 10944 contacts the dummy region 1094 of the substrate 10910.

When the substrate 10910 is received in the cassette 10940, the cassette 10940 is transferred to a next processing line by an auto guide vehicle and then unloaded from the cassette 10940 by a robot or other means thereby to undergo a corresponding process.

However, the cassette of the related for an LCD device has the following problems.

As techniques for fabricating LCD device develop and the number of electronic devices employing LCD devices increases, LCD devices having various sizes are being fabricated. Methods for fabricating LCD devices having various sizes in one fabrication line are widely used. Accordingly, the size of an LCD panel formed on a substrate to be transferred from one processing line to another processing line is not always the same, but varies according to a model of a LCD device being fabricated.

FIG. 16 is a view illustrating a cassette 10940 in which a substrate 10910 has been received on which LCD panels 10930 are formed each having a wider area than that of the LCD panels of FIG. 15. Since the LCD Panels illustrated in FIGS. 15 and 16 have different sizes from each other, a position on the substrate 10910 where the LCD panel 1093 is formed in FIG. 16 is different from a position of the LCD panel 1093 on the substrate 10910 in FIG. 15. A pad 10944 is positioned at a dummy region 1094 of the substrate 10910 in FIG. 15. However, in FIG. 16, the pad 10944 is positioned differently relative to the LCD panels 1093.

When the substrate 10910 is received in the cassette 10940 of FIG. 15, a dummy region of the substrate 10910 contacts the pad 1094. As a result, even when the substrate 10910 pressed, a defect is not generated. However, when the pad 1094 is positioned within the LCD panel 1093 as illustrated in FIG. 16, if the substrate 10910 is pressed, the pad 10944 presses on an area of the LCD panel 1093 for displaying an image and a defect in the LCD device may result. The above problem occurs primarily at the time of transferring attached LCD panels that have been received in the cassette 10940 to another processing line. As the LCD panel 1093 is pressed against a pad, a stain is generated on the LCD device.

As noted earlier, in the liquid crystal dispensing method, one substrate is prepared on which a liquid crystal material has been dispensed. Another substrate is prepared on which a sealant pattern is formed such that the sealant pattern extends completely along the peripheral edge of the substrate without forming an injection port. Thereafter, the latter substrate is arranged on the former substrate under a vacuum condition such that they are aligned with each other. The aligned substrates are then bonded to each other. Such a liquid crystal dispensing method is disclosed in Japanese Patent Application Nos. Heisei 11-089612 and Heisei 11-172903.

For this reason, active research has recently been undertaken to provide various equipment for use in the liquid crystal dispensing method.

For example, the applicant proposed a substrate bonding apparatus for an LCD panel through Korean Patent Application No. 2002-71366 (Filing date: Nov. 16, 2002).

Where it is desired to bond an upper substrate (or a lower substrate) to a lower substrate (or an upper substrate) coated with a sealant along the peripheral edge of the lower substrate and with a liquid crystal material dispensed thereon, using the substrate bonding apparatus proposed by the applicant. The upper substrate is first attached to an upper electrostatic chuck (ESC) and is then lowered such that the upper substrate is near the lower substrate. The upper ESC is then turned off, thereby releasing the upper substrate which is, in turn, laid on the lower substrate. In this state, the substrate bonding apparatus performs a venting process to bond the upper and lower substrates to each other.

An example of the venting process is illustrated in FIG. 17A. As illustrated in FIG. 17A, during the venting process, a vacuum is formed in a space defined between an upper substrate 110110 and a lower substrate 110120, and sealed by a sealant 110111 formed on the lower substrate 110120, thereby generating a pressure difference between the space and the atmosphere. By virtue of the pressure difference, the upper substrate 110110 and lower substrate 110120 are bonded to each other.

However, as illustrated in FIG. 17B, the above-mentioned conventional substrate bonding apparatus has a problem in that venting is non-uniformly carried out in the venting process, thereby causing the bonding quality of the substrates to be poor. That is, when venting is non-uniformly carried out in the venting process, a gap is formed between the upper substrate 110110 and the sealant 110111. In this case, an air bubble may be introduced into the liquid crystal space, thereby causing the bonding quality of the substrates to be poor.

Cutting Substrates in the Related Art

As described above, after the panels are bonded together, they must be cut. The cutting process of the liquid crystal display panel will be described as follows.

FIG. 18 is an exemplary view illustrating a cutting process of the liquid crystal display panel.

As illustrated, a cutting device of the liquid crystal display panel includes a table 11142 on which the first and second mother substrates 11120 and 11130 for which previous processes have been terminated, are loaded, and a cutting wheel 11155 for processing the first and second mother substrates 11120 and 11130 to form prearranged cut lines 11151.

In the cutting device of the liquid crystal display panel, when the first and second mother substrates 11120 and 11130 including a plurality of liquid crystal display panels and attached in a facing manner are loaded on the table 11142, the cutting wheel 11155 positioned at an upper side of the first and second mother substrates 11120 and 11130 is lowered and rotated in a state that certain pressure has been applied to the second mother substrate 11130, to thereby form prearranged cut lines 11151 in a groove form on the surface of the second mother substrate 11130.

The prearranged cut lines are also formed on the first mother substrate 11120. Namely, the first mother substrate 11120 is processed with the cutting wheel 11155 to form prearranged cut lines at the same positions as the prearranged cut lines 11151 of the second mother substrate 11130. Accordingly, in the liquid crystal panel cutting process, since the first and second mother substrates 11120 and 11130 are processed to form the prearranged cut lines 11151, after the second mother substrate 11130 is processed with the cutting wheel 11155, the liquid crystal panel is reversed to make the first mother substrate 11120 to face upward and then the first mother substrate 11120 is processed with the cutting wheel 11155.

Thereafter, pressure is applied to the prearranged cut lines 11151 formed on the first and second mother substrates 11120 and 11130 to separate the first and second mother substrates 11120 and 11130. And then, the first and second mother substrates 11120 and 11130 are separated such that the first and second mother substrates 11120 and 11130 are broken with a breaking bar so that cracking can be made along the prearranged cut lines 11151.

In cutting the liquid crystal display panel, a scribing process and a breaking process are performed several times through a plurality of passes.

Thus, much time is required for the scribing process and the breaking process causing the problem of a reduction in productivity.

In particular, according to the cutting method of the liquid crystal display panel, since the mother substrates are struck with the breaking bar to make cracks along the prearranged cut lines formed on the mother substrates, a plurality of glass chips are generated, and if the striking is not performed inaccurately or if cracking is not incompletely made, the liquid crystal display panel would be damaged or torn off when it is extracted.

Typically, the scribing process is implemented by forming scribing lines by use of a cutting wheel, while the breaking process is implemented by cutting the substrate along the scribing lines by use of a steam-cutting device.

FIG. 19A illustrates a substrate 11240 processed by the cutting wheel and a pressing bar of the related art. As illustrated in FIG. 19A, a scribing line 11232 is formed on the substrate 11240 including a plurality of LCD panels using the cutting wheel. The substrate 11240 is cut along the scribing line 11232 by pressure of the pressing bar.

A related art cutting process for manufacturing the liquid crystal display panel will be described hereinafter with reference to FIG. 3.

FIG. 19B-19I illustrate a cutting process of the liquid crystal display panel of the related art.

As illustrated, a cutting device of the liquid crystal display panel includes a table 911242 on which the bonded first and second mother substrates 911220 and 911230 are loaded, and a cutting wheel 911255 for processing the first and second mother substrates 911220 and 911230 to form prearranged cut lines 911251.

When using the cutting device of the related art, after the bonded first and second mother substrates 911220 and 911230 having a plurality of liquid crystal display panels are loaded on the table 911242, the cutting wheel 911255 positioned at an upper side of the first and second mother substrates 911220 and 911230 is lowered and rotated to apply a certain pressure against the second mother substrate 911230 to form prearranged cut lines 911251 or grooves on the surface of the second mother substrate 911230.

The prearranged cut lines are also formed on the first mother substrate 911220. The first mother substrate 911220 is processed with the cutting wheel 911255 to form prearranged cut lines at the same positions as the prearranged cut lines 911251 of the second mother substrate 911230. Accordingly, in the liquid crystal panel cutting process of the related art, since the first and second mother substrates 911220 and 911230 are to be processed to form corresponding prearranged cut lines, after the second mother substrate 911230 is processed with the cutting wheel 911255, the liquid crystal panel is reversed to have the first mother substrate 911220 face upward and the first mother substrate 911220 is processed with the cutting wheel 911255.

Thereafter, pressure is applied to the prearranged cut lines 911251 formed on the first and second mother substrates 911220 and 911230 to separate the first and second mother substrates 911220 and 911230 along the prearranged cut lines 911251. The first and second mother substrates 911220 and 911230 are separated by striking the first and second mother substrates 911220 and 911230 with a breaking bar to make and propagate a crack along the prearranged cut lines 911251.

In cutting the liquid crystal display panel, a scribing process and a breaking process are performed several times through a plurality of reversals and positionings of the substrates 911220 and 911230. The significant amount of time used for the scribing process and the breaking process reduces productivity of the overall manufacturing process.

In addition since the mother substrates are struck with the breaking bar to make cracks along the prearranged cut lines formed on the mother substrates, a plurality of glass chips are generated. Further, if the striking is performed inaccurately or if crack propagation is incomplete, the liquid crystal display panel may be damaged or torn off when it is extracted.

However, several problems may occur when cutting the substrate using the cutting wheel and the pressing bar as follows.

In order to separate the LCD panel from the substrate that is completely cut by the pressing bar, the cut dummy substrate is lowered below the cut line by gravity. Accordingly, a separate space is required below the cut line. Additionally dust may be generated when the dummy substrate is lowered. Further, if a substrate is not cut into using the pressing bar, the uncut substrate is transferred to later processes resulting in stopping of the later process.

For example, a substrate defect may occur. The cutting method using the cutting wheel involves the application of a mechanical force to a substrate with the cutting wheel. When processing a substrate by pressing the cutting wheel on the mother substrate, the depths of the scribing lines may vary according to a pressure generated between the cutting wheel and the substrate. The varied depths of the scribing lines may result in portions of the substrate not being separated when applying the pressure to separate the unit LCD panels and portions of the substrate may be destroyed or taken away.

Secondly, foreign materials may be generated. When processing the substrate with the cutting wheel, foreign materials such as glass chips may be generated. The generated foreign materials may cause defects in processes in processing lines in a factory.

Examination and Inspection in the Related Art

The LCD panel is typically tested (inspected) by a visual inspection and an electrical lighting test. The lighting test is performed by applying a signal to a completely fabricated LCD panel to detect (test) whether various electric devices are operating normally, while the visual inspection is performed by an operator conducting a naked eye inspection of the LCD panel to determine whether the LCD panel has been defectively fabricated.

A typical apparatus for visually inspecting an LCD panel includes a test board having a lamp therein for outputting light. An LCD panel is transferred to the visual inspection apparatus to be placed on the test board and a polarizer is positioned on the LCD panel. A signal is applied to the LCD panel and the LCD panel is illuminated by light transmitted from the lamp provided in the test board. The operator observes light transmitted through the LCD panel to detect defects in the LCD panel.

FIGS. 20 and 21 illustrate a related art visual inspection apparatus for testing an LCD panel appearance, wherein FIG. 20 is a side sectional view of the visual inspection apparatus and FIG. 21 is a plane view thereof.

As illustrated in FIGS. 20 and 21, a related art apparatus for visually inspecting an LCD panel 11320 includes a test board 11322 including a lamp installed therein for transmitting light to the LCD panel 1131 placed thereon; a camera 11324 positioned at an upper portion of the test board 11322 for capturing alignment marks (not illustrated) formed at an outer periphery of the LCD panel 1131 to thus determine whether the LCD panel 1131 has been aligned on the test board 11322; a jig 11332 disposed at a lower portion of the test board 11322 supporting a polarizer 11330 and having holes 11327; and a plurality of jig pins 11326 formed at the test board 11322 to be inserted into the holes 11327 of the jig 11332 to thus fix the jig 11332 to the test board 11322, thereby fixing the polarizer 11330 onto the LCD panel 1131.

The test board 11322 is inclined by about 60° relative to the ground and has a lamp therein. When an operator puts the LCD panel 1131 on the test board 11322, the camera 11324 captures the alignment marks formed on the LCD panel 1131 to provide information regarding the state of alignment of the LCD panel 1131. With the LCD panel 1131 aligned on the test board 11322, the operator inserts the jig pins 11326 formed at the test board 11322 into the holes 11327 formed in the jig 11332 to position the polarizer 11330 on the LCD panel 1131. With the polarizer fixed, a signal is applied to the LCD panel 1131 and a transmissivity of light transmitted through the LCD panel is changed according to a signal applied to the LCD panel 1131. The operator observes the light transmitted through the polarizer 11330 to evaluate the quality of the LCD panel.

The jig 11332 supports the polarizer 11330. The operator manipulates the jig 11332 rather than the polarizer 11330 to position the polarizer 11330 on the test board 11322. The jig pins 11326 are inserted into the holes 11327 formed in the jig 11332 to fix the jig 11332, and thus the polarizer 11330, onto the test board 11322.

However, the above described visual inspection apparatus for the LCD panel may generate problems as follows.

In order to fix the polarizer 11330 by inserting the jig 11332 into the jig pins 11326, the operator must manually hold the jig 11332 while inserting the jig pins 11326 of the test board 11322 into the holes 11327 of the jig 11332. However, with a the large-sized LCD panel 1131, the corresponding large size of the polarizer 11330 makes it physically difficult or impossible for the operator to manually insert the jig pins 11326 into the holes 11327 of the jig 11332. In addition, while attaching or detaching the polarizer 11330, the polarizer 11330 may strike the camera 11324, resulting in damage to the camera 11324 or to the polarizer 11330.

SUMMARY OF THE INVENTION

Accordingly, the present invention is directed to apparatuses and methods that substantially obviate one or more of the problems due to limitations and disadvantages of the related art.

Exemplary features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Therefore, one aspect of the present invention involves the recognition by the present inventors of the drawbacks in the related art as explained above. In order to address such problems, the present invention provides a roll stocker capable of coping with mother substrates of various models and keeping the sufficient number of rubbing rolls in storage by multistage to obtain a margin in operating rolls and a method for fabricating a liquid crystal display (LCD) device.

One feature of the present invention is to provide a roll stocker formed by two stages including: an upper stage installed at an upper side of a lower stage used as a support; a plurality of roll keeping units positioned at the upper and lower stages and keeping rubbing rolls; and a moving unit installed between the upper and lower stages and moving the roll keeping units of the upper stage.

Another feature of the present invention is to provide a method for fabricating an LCD device including: providing mother substrates each having a plurality of array substrates or a plurality of color filter substrates formed thereon; performing an array process on the array substrates and performing a color filter process on the color filter substrates; forming an alignment film on a surface of the mother substrate; performing rubbing on the mother substrate with the alignment film formed thereon using a rubbing equipment; taking out a required rubbing roll from a roll stocker, which includes an upper stage installed at an upper side of a lower stage used as a support, a plurality of roll keeping units positioned at the upper and lower stages and keeping rubbing rolls and a moving unit installed between the upper and lower stages and moving the roll keeping unit of the upper stage, in order to replace an existing rubbing roll, as necessary, and continuously performing a rubbing process; attaching the pair of rubbing process-finished mother substrates; and cutting the attached mother substrates into a plurality of unit liquid crystal display panels.

Another aspect of the present invention involves the recognition by the present inventors of the drawbacks in the related art as explained above. In order to address such problems, the present invention provides a roll stocker capable of coping with a variety of models of mother substrates and keeping the sufficient number of rubbing rolls in storage within a minimum space to obtain a margin in operating rolls and a method for fabricating a liquid crystal display (LCD) device.

A further aspect of the present invention provides a roll stocker capable of preventing deviation of eccentricity of rubbing rolls kept in storage by rotating the plurality of rubbing rolls at one time, and a method for fabricating an LCD device.

Still another aspect of the present invention provides a roll stocker capable of preventing contamination of a rubbing cloth by keeping rubbing rolls in storage in a closed state, and a method for fabricating an LCD device.

One feature of the present invention is to provide a roll stocker including: a plurality of roll fixing units for fixing a plurality of rubbing rolls; shaft connection parts having a plurality of radially extended end portions connected with each roll fixing unit; and a rotational shaft for fixing the center of the shaft connection parts and rotating the shaft connection parts.

Another feature of the present invention is to provide a method for fabricating an LCD device including: providing mother substrates each having a plurality of array substrates or a plurality of color filter substrates formed thereon; performing an array process on the array substrates and performing a color filter process on the color filter substrates; forming an alignment film on a surface of the mother substrate; performing rubbing on the mother substrate with the alignment film formed thereon; taking out a required rubbing roll from a roll stocker, which includes a plurality of roll fixing units for fixing a plurality of rubbing rolls, a shaft connection part having a plurality of radially extended end portions connected with each roll fixing unit, and a rotational shaft for fixing the center of the shaft connection part to rotating the shaft connection part, as necessary, and continuously performing a rubbing process; attaching the pair of rubbing process-finished mother substrates; and cutting the attached mother substrates into a plurality of unit liquid crystal display panels.

The present invention is also directed to a roll printing device for depositing or forming an orientation film of a liquid crystal display device, a roll printing method, and a method for manufacturing a liquid crystal display device using the same that substantially obviates one or more of the problems due to limitations and disadvantages of the related art.

An advantage of the present invention is to provide a roll printing device, which reduces a space occupied thereby when the roll printing device is applied to a large-sized substrate, thus increasing space utilization.

Another advantage of the present invention is to provide a roll printing method, which reduces a space occupied by a roll printing device when the roll printing method is applied to a large-sized substrate, thus increasing space utilization.

Another advantage of the present invention is to provide a method for manufacturing a liquid crystal display device using the roll printing method.

To achieve these and other advantages and in accordance with the purpose of the present invention, as embodied and broadly described, roll printing device includes: a dispenser; an anilox roll to receive a designated material dispensed by the dispenser; a printing roll engaged with the anilox roll to rotate therewith to receive the designated material supplied from the anilox roll; and a substrate stage fixed below the printing roll to mount a substrate thereon, wherein the printing roll is movable on the substrate stage to deposit the designated material on the substrate.

In another aspect of the present invention, a roll printing method includes dispensing a designated material on a rotating anilox roll using a dispenser; supplying the designated material from the anilox roll to a printing roll engaged with the anilox roll and to rotate therewith; and moving the printing roll to deposit the designated material on a substrate mounted on a substrate stage.

In yet another aspect of the present invention, a method for manufacturing a liquid crystal display device includes preparing a lower substrate and an upper substrate; depositing an orientation film on at least one of the lower and upper substrates; and forming a liquid crystal layer between the two substrates, wherein the depositing of the orientation film is performed using the above roll printing method.

An advantage of the present invention is to provide a roll printing device in which an alignment material is uniformly coated.

Another advantage of the present invention is to provide a roll printing method in which an alignment material is uniformly coated.

Another advantage of the present invention is to provide a method of fabricating an LCD using the roll printing method.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a roll printing device according to the present invention includes a dispenser, an anilox roll receiving a predetermined material dispensed from the dispenser, a doctor roll rotating in engagement with the anilox roll to uniformly coat the predetermined material on the anilox roll, a doctor blade in contact with the anilox roll to uniformly coat the predetermined material on the anilox roll, and a printing roll supplied with the predetermined material from the anilox roll.

In another aspect of the present invention, a roll printing method includes dispensing a predetermined material from a dispenser to an anilox roll, uniformly coating the predetermined material on the anilox roll, supplying the predetermined material from the anilox roll to a printing roll rotating in engagement with the anilox roll, and coating the predetermined material from the printing roll on a substrate mounted on a substrate stage, wherein the uniformly coating of the predetermined material is performed by the doctor roll rotating in engagement with the anilox roll and the doctor blade in contact with the anilox roll.

In another aspect of the present invention, a method of fabricating an LCD device includes preparing lower and upper substrates, coating an alignment layer on at least one of the lower and upper substrates, and forming a liquid crystal layer between the lower and upper substrates, wherein the coating of the alignment layer includes: dispensing an alignment material from a dispenser to an anilox roll; uniformly coating the alignment material on the anilox roll; supplying the alignment material from the anilox roll to a printing roll rotating in engagement with the anilox roll; and coating the alignment material from the printing roll on a substrate mounted on a substrate stage, wherein the uniformly coating of the alignment material on the anilox roll is performed by a doctor roll rotating in engagement with the anilox roll and a doctor blade in contact with the anilox roll.

An advantage of the present invention is to provide a rubbing apparatus for rubbing an alignment layer with a uniform intensity at any time by preventing a rubbing roll from sagging due to gravity by dispersing a load of a rubbing apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a rubbing apparatus including a frame, a rubbing table to which a substrate having an alignment layer is loaded, a rubbing roll installed at an upper portion of the rubbing table inside the frame, and a head installed at an upper portion of the frame that supports the rubbing roll.

An advantage of the present invention is to provide a rubbing system for an alignment layer of a liquid crystal display (LCD) device capable of applying a uniform alignment controlling force onto an alignment layer by uniformly maintaining a gap between the alignment layer and a rubbing roll by simultaneously lifting and lowering a rubbing table and the rubbing roll, and a method thereof.

Another advantage of the present invention is to provide a rubbing system for an alignment layer of a liquid crystal display (LCD) device capable of enhancing rubbing efficiency by selectively driving a rubbing table or a rubbing roll according to an alignment controlling force applied to an alignment layer, and a method thereof.

Yet another advantage of the present invention is to provide a method for fabricating a liquid crystal display (LCD) device using the rubbing system.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, there is provided a rubbing system for an alignment of a liquid crystal display device, comprising: a rubbing table on which a substrate having an alignment layer thereon is positioned; a rubbing roll on which a rubbing material is wound, positioned on the rubbing table thus to be substantially in contact with the alignment layer, for rubbing the alignment layer by rotation of the rubbing roll; and a controlling unit for controlling the alignment layer to be rubbed by contacting the rubbing roll onto the alignment layer by simultaneously lifting and lowering a rubbing table and the rubbing roll according to an alignment controlling force to be applied to the alignment layer.

Determining a rubbing intensity applied to the alignment layer on the basis of the information inputted by the input unit; and a rubbing table driving unit and a rubbing roll driving unit for respectively lifting and lowering the rubbing table and the rubbing roll according to a signal inputted from the driving controlling unit. The information may comprise LC panel area, alignment layer material, and a display mode.

The rubbing intensity may be determined according to an alignment controlling force to be applied to the alignment layer, and may correspond to a gap between the alignment layer and the rubbing roll.

In another aspect of the present invention, there is provided a rubbing system for an alignment of a liquid crystal display device, comprising: a rubbing table on which a substrate having an alignment layer thereon is positioned; and a rubbing roll positioned on the rubbing table thus to be in substantially contact with the alignment layer for rubbing the alignment layer by rotation of the rubbing roll, wherein the alignment and the rubbing roll substantially contact each other in accordance with that both the rubbing table and the rubbing roll are driven.

In another aspect of the present invention, there is provided a rubbing system for an alignment of a liquid crystal display device, comprising: a rubbing table on which a substrate having an alignment layer thereon is positioned; and a rubbing roll on which a rubbing material is wound, positioned on the rubbing table thus to be substantially in contact with the alignment layer, for rubbing the alignment layer by rotation of the rubbing roll, wherein the alignment and the rubbing roll substantially contact each other in accordance with that either the rubbing table or the rubbing roll is driven.

In another aspect of the present invention, there is provided a rubbing system for an alignment of a liquid crystal display device, comprising: a rubbing table on which a substrate having an alignment layer thereon is positioned; and a rubbing roll on which a rubbing material is wound, positioned on the rubbing table thus to be substantially in contact with the rotation of the rubbing roll.

In another aspect of the present invention, there is also provided a method for rubbing an alignment layer of a liquid crystal display device, comprising: transferring a substrate on which an alignment layer is formed onto a rubbing table; inputting information relevant to the alignment layer; calculating a rubbing intensity applied to the alignment layer according to the alignment layer information; driving the rubbing table and a rubbing roll according to the calculated rubbing intensity, and thus contacting the rubbing roll with the alignment layer; and rubbing the alignment layer by rotating the rubbing roll.

The step of contacting the rubbing roll onto the alignment layer may comprise driving the rubbing roll thereby approaching the rubbing table; and driving the rubbing table thereby contacting the rubbing roll with the alignment layer.

In another aspect of the present invention, there is provided, a method for fabricating a liquid crystal display device, comprising: providing a first substrate on which a driving device array is formed and a second substrate on which a color filter layer is formed; forming a first alignment layer and a second alignment layer on the first substrate and the second substrate, respectively; positioning the first substrate and the second substrate on a rubbing table; inputting information relevant to the first alignment layer or information relevant to the second alignment layer; calculating a rubbing intensity applied to the first alignment layer or the second alignment layer according to the inputted alignment layer information; lifting and lowering at least one of the rubbing table and a rubbing roll according to the calculated rubbing intensity thereby contacting the rubbing roll with the first alignment layer or the second alignment layer; rotating the rubbing roll thereby rubbing the first alignment layer or the second alignment layer; and attaching the first substrate and the second substrate to each other.

An advantage of the present invention is to provide an inspection apparatus for liquid crystal display panels, which can perform inspection for orientation abnormality of liquid crystal display panels while maintaining a heating chamber at a uniform temperature and preventing a temperature of the liquid crystal display panels heated to a high temperature by the heating chamber from being lowered, enabling inspection of the orientation abnormality to be always precisely performed, and which comprises a conveyer for supplying a cassette to the heating chamber such that the conveyer is disposed at the same angle as that of the cassette mounted at a predetermined angle in the heating chamber, thereby reducing manufacturing costs of the heating chamber and a space of the heating chamber.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an inspection apparatus for liquid crystal display panels, comprising: a heating chamber to heat a plurality of LCD panels received in a cassette; an inspection unit positioned near the heating chamber to receive the LCD panels heated by the heating chamber and to inspect abnormality of each LCD panel; a panel transferring part to withdraw each of the LCD panels from the cassette and supply each of the LCD panels to the inspection unit, and to withdraw each of the LCD panels from the inspection unit and supply each of the LCD panels to the cassette while moving between the cassette and the inspection unit.

The inspection apparatus may further include a conveying part to convey the cassette to/from the heating chamber.

The conveying part may be positioned on a slant to convey the cassette to/from the heating chamber.

The panel transferring part may include a hand member constructed to selectively clamp each LCD panel and having an upper end exposed to an upper outside of the heating chamber, a forward and backward shifting member to move the hand member in forward and backward directions of the heating chamber, and a lifting member having one end secured to the forward and backward shifting member and the other end to lift or lower the hand member in upward and downward directions.

At this time, the forward and backward shifting member may include a first rail installed on an upper surface of the heating chamber in the forward and backward directions, and a first activating member having one end installed to move in the forward and backward directions while being supported by the first rail, and the other end secured to the lifting member.

The lifting member may include a second rail installed in the upward and downward directions in the heating chamber, and a second activating member having one end installed to move in the upward and downward directions while being supported by the second rail, and the other end secured to the hand member.

A first object of the present invention is to provide a method for manufacturing a liquid crystal display device, which prevents orientation of a liquid crystal layer from being scattered when a sealant is hardened using a liquid crystal drop method.

A second object of the present invention is to provide an apparatus for manufacturing a liquid crystal display device, which prevents orientation of a liquid crystal layer from being scattered when a sealant is hardened using the liquid crystal drop method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing a liquid crystal display device includes preparing a lower substrate and an upper substrate; depositing a sealant on one of the two substrates; dropping a liquid crystal on one of the two substrates; bonding the two substrates to each other; bonding the two substrates to each other by hardening the sealant; and thermally quenching the two bonded substrates.

Since the thermal quenching of the two bonded substrates is performed after the hardening of the sealant in a liquid crystal drop method, orientation of a liquid crystal layer, which is scattered by the hardening of the sealant, is returned to its original state.

That is, the orientation of the liquid crystal layer, which is scattered due to heat of a high temperature, is returned to its original state by thermal quenching the liquid crystal layer.

Preferably, in the thermal quenching of the two bonded substrates, the temperature of the two bonded substrates is lowered to less than a $T_{NI}$ (Nematic Isotropic Transition Temperature) of the liquid crystal within 30 seconds.

Here, the $T_{NI}$ of the liquid crystal refers to a clearing point of the liquid crystal, i.e., a temperature at which the transition of the liquid crystal from the mesophase, between the liquid phase and the solid phase, to the liquid phase occurs so that the liquid crystal becomes transparent. Accordingly, the two bonded substrates are cooled to a temperature of less than the $T_{NI}$ of the liquid crystal at which the transition of the liquid crystal from the mesophase, between the liquid phase and the solid phase, to the liquid phase occurs, within 30 seconds, thereby returning the scattered orientation of the liquid crystal layer to its original state.

The $T_{NI}$ of a liquid crystal, which is generally applied to the liquid crystal display device, is in the range of 60~90° C.

A cooling apparatus having a condition for performing the thermal quenching of the two bonded substrates is used.

After the hardening of the sealant is completed, the bonded substrates reach a temperature of approximately 120° C., and while the bonded substrates are transferred to the cooling apparatus, the bonded substrates reach a temperature of approximately 110° C. and are put into the cooling apparatus.

Accordingly, in order to lower the temperature of the liquid crystal from approximately 110° C. to the $T_{NI}$ (approximately 60~90° C.) within 30 seconds, the temperature in the cooling apparatus is quickly lowered to −2° C.~−5° C.

In order to quickly lower the temperature in the cooling apparatus to −2° C.~−5° C., cold air of a temperature of less than −10° C. is supplied to the cooling apparatus.

The method may further comprise removing dew generated in the cooling apparatus when the two bonded substrates are thermally quenched under the above condition of the cooling apparatus.

When the temperature in the cooling apparatus is quickly lowered to −2° C.~−5° C., dew is formed in the cooling apparatus due to a difference of temperatures between the inside and the outside of the cooling apparatus.

Accordingly, the method may further comprise removing dew generated in the cooling apparatus. In the removing of the dew, heat is applied locally to parts of the cooling apparatus in which the dew is formed. Further, the local application of the heat is performed using hot wires installed in the parts of the cooling apparatus in which the dew is formed.

As an experimental result, dew is formed in a substrate inlet, a substrate outlet, and checking doors of the cooling apparatus. Accordingly, the hot wires are installed in the substrate inlet, the substrate outlet, and the checking doors of the cooling apparatus, thus preventing formation of dew in the cooling apparatus during the thermal quenching of the two bonded substrates.

In another aspect of the present invention, a cooling apparatus of bonded substrates includes a substrate stage for mounting the bonded substrates thereon; cooling coils for producing cold air; and a fan for circulating the cold air, wherein hot wires are installed in parts of the cooling apparatus in which dew is formed.

The hot wires are installed in the substrate inlet, the substrate outlet, and the checking doors of the cooling apparatus. The checking doors are at least one selected from the group consisting of a cooling coil checking door, fan checking doors, and substrate stage checking doors.

The cooling apparatus may further comprise an air filter for removing foreign substances from the cold air. In this case, a hot wire is installed in an air filter checking door.

An object of the present invention is to provide a method for manufacturing an LCD device, in which it is possible to correct a problem of insufficient or excessive supply of liquid crystal in an LCD device by controlling an amount of liquid crystal dispensed.

Another object of the present invention is to provide an LCD device, in which it is possible to correct a problem of insufficient or excessive supply of liquid crystal in an LCD device by controlling an amount of liquid crystal dispensed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing an LCD device comprises preparing a liquid crystal cell comprised of a first substrate, a second substrate, a liquid crystal layer between the first and second substrates, and a first sealant formed in the periphery of the liquid crystal layer between the first and second substrates; measuring an amount of liquid crystal provided to the inside of liquid crystal cell; forming an inlet for liquid crystal in the first sealant; regulating the amount of liquid crystal by supplying or discharging the liquid crystal through the inlet; and sealing the inlet.

Even though the liquid crystal is provided insufficiently or excessively to the LCD panel, the inlet is formed in the sealant. Thus, it is possible to regulate the amount of liquid crystal by supplying or discharging the liquid crystal through the inlet of the sealant.

At this time, the process for forming the inlet for liquid crystal in the first sealant comprises removing a predetermined portion of the first sealant by applying laser. The process of removing the predetermined portion of the first sealant by laser comprises completely removing the predetermined portion of the first sealant. Alternatively, the process of removing the predetermined portion of the first sealant by laser comprises partially removing the predetermined portion of the first sealant.

In addition, the process of regulating the amount of liquid crystal comprises discharging a small amount of liquid crystal to the outside of liquid crystal cell through the inlet when the liquid crystal is provided excessively. In addition, the process of discharging the excessive liquid crystal comprises applying a pressure to the liquid crystal cell.

Meanwhile, the process of regulating the amount of liquid crystal comprises supplying a small amount of liquid crystal to the inside of liquid crystal cell through the inlet when the liquid crystal is provided insufficiently.

Also, the process of sealing the inlet comprises providing a second sealant to the inlet of the first sealant, and curing the second sealant. At this time, the first and second sealants are formed of the same material.

In another aspect of the present invention, an LCD device comprises first and second substrates; a liquid crystal layer formed between the first and second substrates; a first sealant, having an inlet for liquid crystal, formed in the periphery of the liquid crystal layer between the first and second substrates; and a second sealant for sealing the inlet of the first sealant.

At this time, the inlet for liquid crystal is formed by completely removing a predetermined portion of the first sealant. Also, the inlet for liquid crystal is formed by partially removing a predetermined portion of the first sealant, so as to leave some of the first sealant.

An object of the present invention is to provide a method of fabricating a liquid crystal display device, by which insufficient or excessive filling of liquid crystals can be cured by adjusting a liquid crystal quantity in a liquid crystal display device having the insufficient or excessive filling of liquid crystals generated thereon.

Another object of the present invention is to provide a liquid crystal display device, in which insufficient or excessive filling of liquid crystals can be cured by adjusting a liquid crystal quantity in the liquid crystal display device having the insufficient or excessive filling of liquid crystals generated thereon.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of fabricating a liquid crystal display device according to the present invention includes the steps of preparing a liquid crystal cell including a first substrate, a second substrate and a liquid crystal layer between the first and second substrates, checking a liquid crystal quantity within the liquid crystal cell, forming a hole in the liquid crystal cell, adjusting the liquid crystal quantity through the hole, and blocking the hole.

For example, a shield layer is formed on the first substrate to prevent light leakage in the liquid crystal cell preparing step and wherein the hole is formed in an area where the shield layer of the first substrate is formed. More For example, the hole is formed in an area where a most outer shield layer of the first substrate is formed.

For example, a gate pad part and a data pad part are formed on the second substrate in the liquid crystal cell preparing step and the hole is formed at least one side of the liquid crystal cell where the gate and data pad parts are not formed.

For example, a plurality of holes are formed in the hole forming step.

For example, the hole is formed in the liquid crystal cell using a drill equipment, an ultrasonic equipment or a laser equipment.

For example, a prescribed quantity of excessive filling liquid crystals is externally discharged in the liquid crystal quantity adjusting step. More For example, the prescribed quantity of the excessive filling liquid crystals is externally discharged by pressurizing the liquid crystal cell.

For example, a prescribed quantity of insufficient filling liquid crystals is injected in the liquid crystal cell in the liquid crystal quantity adjusting step.

For example, the hole blocking step includes the steps of injecting a filler in the hole and hardening the filler. More For example, the filler is formed of an opaque material.

For example, the liquid crystal quantity is checked by an unaided-eye examination.

For example, the liquid crystal cell preparing step includes the steps of preparing the first and second substrates, forming a sealant on one of the first and second substrates, dropping a prescribed quantity of liquid crystals on one of the first and second substrates, and bonding the first and second substrates together.

In another aspect of the present invention, a liquid crystal display device includes a first substrate, a second substrate, a liquid crystal layer between the first and second substrates, a liquid crystal quantity adjusting hole provided to at least one of the first and second substrates, and a filer blocking the hole.

An advantage of the present invention is to provide a liquid crystal dispensing apparatus for directly dispensing liquid crystal onto a glass substrate of a large area including at least one liquid crystal panel.

Another advantage of the present invention is to provide a system and method of testing a liquid crystal display device, which allow a rapid and accurate test by testing inferiority of a liquid crystal panel on the basis of a dispensed amount measured by a liquid crystal dispensing apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a system of testing a liquid crystal display device including: a dispensing amount checking unit to measure a dispensed amount of liquid crystal dispensed onto a substrate to judge whether the dispensing is defective; and a testing unit to execute a test only for a liquid crystal panel judged to have a defective dispensing of liquid crystal.

In another aspect of the present invention, a method of testing a liquid crystal display device includes checking a liquid crystal filling state of a liquid crystal panel for a defective liquid crystal filling state, and executing a test of a liquid crystal panel having a defective liquid crystal filling state.

Therefore, an advantage of the present invention is to provide a method of fabricating a liquid crystal display (LCD)

device capable of improving processing efficiency of the LCD device by dropping liquid crystal directly onto a large-sized glass substrate including at least one panel region, and uniformly distributing the dropped liquid crystal over the entire panel region by a bonding pressure of a liquid crystal panel to thereby form a liquid crystal layer quickly.

Another advantage of the present invention is to provide a method of fabricating an LCD device capable of preventing gravity inferiority of liquid crystal by forming a protruding portion of the seal pattern extending to a dummy region from one side of a seal pattern, dropping an amount of liquid crystal on a glass substrate, discharging or injecting liquid crystal through the protruding portion that has been cut or thinned in a cutting process, and encapsulating the cut protruding portion.

To achieve these and other advantages and in accordance with the purpose of the present invention, as embodied and broadly described herein, there is provided a method of fabricating a liquid crystal display device, comprising preparing a first substrate; preparing a second substrate, the first substrate and the second substrate including a plurality of predefined unit panel regions; forming a seal pattern within each of the predefined unit panel regions on one of the first and second substrates, the seal pattern having an active pattern and a dummy pattern, wherein the dummy pattern protrudes from the active region; dispensing liquid crystal in the predefined unit panel regions on one of the first and second substrates; bonding the first and second substrates together using the seal pattern; cutting the bonded first and second substrates into unit panels corresponding the predefined unit panel regions; and adjusting the amount of liquid crystal in at least one unit panel.

The separating of the plurality of liquid crystal panels by cutting the first and second substrates includes forming an aperture by cutting part of the dummy pattern of the seal pattern. In the adjusting of the amount of liquid crystal, surplus liquid crystal filled in the liquid crystal panel is removed through the aperture by pressurizing the liquid crystal panel. Also, in the adjusting of the amount of liquid crystal, a predetermined amount of liquid crystal is injected into the panel through the aperture.

Further, the method of fabricating a liquid crystal display device according to this invention may includes preparing a first substrate; preparing a second substrate, the first substrate and the second substrate including a plurality of unit panel regions; forming a seal pattern substantially along an outer edge of the unit panel regions, the seal pattern having a protruding portion extending to one side of the seal pattern; dispensing liquid crystal more than a predetermined reference amount to the panel regions; bonding the first and second substrates by the seal pattern; hardening the seal pattern; separating the bonded first and second substrates into a plurality of liquid crystal-panels by cutting the first and second substrates outside edges of the seal pattern except the protruding portion of the seal pattern and cutting the protruding portion; discharging a portion of liquid crystal from the liquid crystal panel through the cut protruding portion; and encapsulating the cut protruding portion using an encapsulating material.

In another aspect of the present invention, a method of fabricating a liquid crystal display panel includes preparing a first substrate; preparing a second substrate, the first substrate and the second substrate including a plurality of unit panel regions; forming a seal pattern substantially along an outer edge of the unit panel regions, the seal pattern having a protruding portion extending to one side of the seal pattern; dispensing liquid crystal more than a predetermined reference amount to the panel regions; bonding the first and second substrates by the seal pattern; hardening the seal pattern; separating the bonded first and second substrates into a plurality of panels by cutting the first and second substrates outside edges of the seal pattern, wherein the protruding portion is cut such that part of the protruding portion of the seal pattern remains; forming an aperture by bursting the remaining part of protruding portion of the seal pattern by pressurizing the liquid crystal panel; discharging a portion of the liquid crystal from the liquid crystal panel through the aperture; and encapsulating the aperture by using an encapsulating material.

In another aspect of the present invention, a method of fabricating a liquid crystal display device includes preparing a first substrate; preparing a second substrate, the first substrate and the second substrate including a plurality of unit panel regions; forming a seal pattern substantially along an outer edge of the unit panel regions, the seal pattern having a protruding portion extending to one side of the seal pattern; dispensing liquid crystal more than a predetermined reference amount to the panel regions; bonding the first and second substrates by the seal pattern; hardening the seal pattern; separating the bonded first and second substrates into a plurality of panels by cutting the first and second substrates outside edges of the seal pattern, wherein the protruding portion is cut such that part of the protruding portion of the seal pattern remains; forming an aperture by bursting the remaining part of protruding portion of the seal pattern by pressurizing the liquid crystal panel; discharging a portion of the liquid crystal from the liquid crystal panel through the aperture; and encapsulating the aperture by using an encapsulating material.

In another aspect of the present invention, a liquid crystal display device includes a first substrate having a plurality of thin film transistors thereon; a second substrate separated from the first substrate by a cell gap and bonded to the first substrate by a seal pattern; liquid crystal in the cell gap; wherein the seal pattern includes a first portion and a second portion, wherein the second portion protrudes from the first portion and includes two substantially parallel parts extending laterally from the first portion having an encapsulation material therebetween.

An advantage of the present invention is to provide a method for manufacturing an LCD device to prevent a sealant from being coagulated or disconnected at a predetermined portion.

Another advantage of the present invention is to provide an LCD device to prevent a sealant from being coagulated or disconnected at a predetermined portion.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a method for manufacturing an LCD device comprises preparing first and second substrates; dispensing a sealant on one of the first and second substrates using a dispenser; dispensing liquid crystal on one of the first and second substrates; and bonding the first and second substrates to each other, wherein dispensing the sealant includes sequential steps of dispensing a first dummy sealant in the periphery of a main sealant pattern, dispensing the main sealant pattern after forming the first dummy sealant, and dispensing a second dummy sealant pattern in the periphery of the main sealant pattern after forming the main sealant pattern.

Before dispensing the main sealant pattern, the first dummy sealant is formed in the periphery of the main sealant pattern. After dispensing the main sealant pattern, the second dummy sealant is formed in the periphery of the main sealant pattern. That is, the starting and ending points of the sealant dispensing are formed in the periphery of the main sealant pattern, whereby it is possible to prevent the main sealant pattern from being coagulated or disconnected.

At this time, the first and second dummy sealants extended from the main sealant pattern and the extended direction of the first dummy sealant is different from the extended direction of the second dummy sealant. Also, the process of dispensing the sealant comprises dispensing the first dummy sealant adjacent to one corner of the main sealant pattern in the periphery of the main sealant pattern wherein the main sealant pattern is substantially rectangular; dispensing the main sealant pattern after forming the first dummy sealant; and dispensing the second dummy sealant adjacent to one corner of the main sealant pattern in the periphery of the main sealant pattern after forming the main sealant pattern. Also, wherein the first and second dummy sealants extend from the main sealant pattern and the first dummy sealant extends in a direction substantially perpendicular direction of the second dummy sealant.

In addition, the method includes an additional process for curing the sealant after bonding the two substrates to each other.

In another aspect of the present invention, an LCD device comprises first and second substrates facing each other; a liquid crystal layer formed between the first and second substrates; and a sealant surrounding the liquid crystal layer between the first and second substrates, wherein the sealant includes a main sealant pattern, and first and second dummy sealant patterns extended from the main sealant pattern and formed in the periphery of the main sealant pattern.

The direction of the first dummy sealant pattern is different from the direction of the second dummy sealant pattern.

Also, the main sealant pattern is formed in a substantially rectangular shape, and the first and second dummy sealants are extended from one corner of the rectangular main sealant pattern. Also, the first and second dummy sealants are vertically formed adjacent to one corner of the rectangular main sealant pattern.

An advantage of the present invention is to provide a sealant forming apparatus and method that can prevent a sealant from coagulating in a nozzle.

Another advantage of the present invention is to provide a method for manufacturing an LCD device in which a sealant can be uniformly dispensed in the LCD device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a sealant forming apparatus includes a dispenser including a syringe, and a nozzle connected to a lower end of the syringe to discharge a sealant therethrough; a dispensing tube connected to the syringe to apply a pressure to the syringe; and an instantaneous suction tube connected to the syringe to extract the sealant remaining in the nozzle after discharging the sealant.

That is, a process for extracting the sealant remaining in the nozzle is additionally performed after dispensing the sealant, so that it is possible to minimize or prevent the sealant from coagulating in the nozzle.

The sealant dispensing apparatus includes an atmospheric tube connected to the syringe to apply an atmospheric pressure to the dispenser between discharging the sealant and extracting the sealant.

The sealant forming device includes an additional suction tube connected to the syringe to prevent the sealant from moving down to the nozzle after extracting the sealant.

The dispensing tube includes a dispensing valve for controlling the turn-on/off state of the dispensing tube and a dispensing regulator for controlling the pressure applied to the syringe, and the instantaneous suction tube includes an instantaneous suction valve for controlling the turn-on/off state of the instantaneous suction tube and an instantaneous suction regulator for controlling the vacuum applied to the syringe.

The atmospheric tube includes an atmospheric valve for controlling the turn-on/off state of the atmospheric tube.

The additional suction tube includes an additional suction valve for controlling the turn-on/off state of the additional suction tube and an additional suction regulator for controlling the vacuum applied to the syringe.

In another aspect of the present invention, a sealant forming method includes discharging a sealant through a nozzle of a dispenser to dispense the sealant on a substrate; and extracting the sealant remaining in the nozzle after dispensing the sealant by using a vacuum pressure.

The sealant forming method further includes applying an atmospheric pressure to the dispenser between discharging the sealant and extracting the sealant.

The sealant forming method further includes performing an additional suction process to prevent the sealant from moving down to an end of the nozzle after extracting the sealant.

The sealant forming method further includes measuring an amount of the sealant in the syringe to determine a level of pressure or vacuum applied to the syringe.

In another aspect of the present invention, a method for manufacturing an LCD device includes preparing first and second substrates; dispensing a sealant on at least one of the first and second substrates, wherein dispensing the sealant includes: discharging the sealant through a nozzle of a dispenser to dispense the sealant on the substrate; applying an atmospheric pressure to the dispenser after dispensing the sealant; extracting the sealant remaining in the nozzle after applying the atmospheric pressure; performing an additional suction process to prevent the sealant from moving down to an end of the nozzle after extracting the sealant; and forming a liquid crystal layer between the first and second substrates.

An advantage of the present invention is to provide a substrate bonding apparatus for an LCD panel which subdivides venting holes, thereby achieving an enhancement in uniformity of venting.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a substrate bonding apparatus for a liquid crystal display panel for bonding a first substrate and a second substrate using a venting process includes: a lower chucking plate which chucks the second substrate; and an upper chucking plate which includes a plurality of blocks each including a main venting hole, wherein the upper chucking plate chucks the first substrate in accordance with a chucking operation of the blocks, and subsequently releases the chucked first substrate such that the first substrate falls down toward the second substrate.

The present invention is also directed to a cassette for containing liquid crystal display device that substantially obviates one or more of the problems due to limitations and disadvantages of the related art.

An advantage of the present invention is to provide a cassette for a liquid crystal display (LCD) device capable of containing an LCD device having LC panels of different sizes using a rotatable supporting bar for supporting a substrate and arranging pads on each surface of the supporting bar with a different gap therebetween.

To achieve these and other advantages and in accordance with the purpose of the present invention, as embodied and broadly described, a cassette for a liquid crystal display (LCD) device, includes: a body for receiving a substrate on which a plurality of LC panels are formed; a plurality of supporting bars rotatably installed in the body and having a predetermined shape on which a substrate is positioned; a plurality of pads formed on each surface of the supporting bar with a different gap therebetween and contacting a dummy region of the substrate; a rotation shaft connected to the supporting bars thereby rotating the supporting bars; and a supporting bar controlling member coupled to the rotation shaft thereby rotating the rotation shaft.

In another aspect of the present invention, a method of fabricating a liquid crystal display (LCD) device, the method includes: holding a first substrate of the LCD device and a second substrate of the LCD device in a cassette; removing the first substrate and the second substrate from the cassette; performing a switching device array process on the first substrate; performing a color filter substrate process on the second substrate; bonding the first and second substrate together; cutting the attached substrates into a plurality of unit LCD panels, wherein the cassette includes a body for receiving a substrate on which a plurality of LC panels divided from each other by a dummy region is formed; a plurality of supporting bars rotatably installed in the body and having a predetermined shape to support a substrate; and a plurality of pads formed on each surface of the supporting bar with a different gap therebetween to contact a dummy region of the substrate.

Therefore, one aspect of the present invention involves the recognition by the present inventors of the drawbacks in the related art as explained above. In order to address such problems, the present invention provides a method for cutting a liquid crystal display panel capable of shortening time required for cutting a liquid crystal display panel, and a method for fabricating a liquid crystal display panel using the same.

Another aspect of the present invention provides a method for cutting a liquid crystal display panel capable of preventing dropping of a dummy glass when unit liquid crystal display panels are extracted from a large-scale mother substrate on which prearranged cut lines have been formed, and a method for fabricating a liquid crystal display panel using the same.

One feature of the present invention is to provide an apparatus for transferring a liquid crystal display panel including: a body for adsorbing a liquid crystal display panel and transferring it; and a plate attached on an edge of the body, fixing and separating a dummy glass of a mother substrate from the liquid crystal display panel, and moving up and down separately from the body.

Another feature of the present invention is to provide a method for cutting a liquid crystal display panel including: forming prearranged cut lines on a pair of attached mother substrates on which a plurality of panel regions have been disposed; and separating the liquid crystal display panel from a dummy glass around the liquid crystal display panel through a transfer unit which includes a body for adsorbing a liquid crystal display panel and transferring it, and a plate attached on an edge of the body, fixing and separating a dummy glass of a mother substrate from the liquid crystal display panel, and moving up and down separately from the body.

Still another feature of the present invention is to provide a method for fabricating a liquid crystal display panel including: providing mother substrates divided into a plurality of panel regions; performing an array process on the mother substrate for an array substrate and performing a color filter process on the mother substrate for a color filter substrate; forming an alignment film on the surface of the mother substrates; performing rubbing on the alignment film-formed mother substrates; attaching the pair of rubbing-finished mother substrates; attaching the pair of rubbing-finished mother substrates; forming prearranged cut lines on the pair of attached mother substrates; and separating the liquid crystal display panel from a dummy glass around the liquid crystal display panel through a transfer unit which includes a body for adsorbing a liquid crystal display panel and transferring it, and a plate attached on an edge of the body, fixing and separating a dummy glass of a mother substrate from the liquid crystal display panel, and moving up and down separately from the body.

Therefore, one aspect of the present invention involves the recognition by the present inventors of the drawbacks in the related art as explained above. In order to address such problems, the present invention provides a method for cutting a liquid crystal display panel capable of shortening time required for cutting a liquid crystal display panel, and a method for fabricating a liquid crystal display panel using the same.

Another aspect of the present invention provides a method for cutting a liquid crystal display panel capable of preventing generation of glass chips in cutting a liquid crystal display panel along prearranged cut lines formed on a large-scale mother substrate, and a method for fabricating a liquid crystal display panel using the same.

Still another aspect of the present invention provides a method for cutting a liquid crystal display panel capable of stabilizing performing of cracking by shortening a standby time during which a mother substrate waits at a striking unit, and a method for fabricating a liquid crystal display panel using the same.

One feature of the present invention is to provide a method for cutting a liquid crystal display panel including: transferring a pair of attached mother substrates having a plurality of panel regions arranged thereon to a first scribing part; forming first prearranged cut lines for sectioning the panel regions in a first direction on front and rear surfaces of the mother substrates through a first scribing unit having a plurality pairs of first heads; forming second prearranged cut lines for sectioning the panel regions in a second direction on the front and rear surfaces of the mother substrates through a second scribing unit having a plurality pairs of second heads; and transferring the mother substrates with the first and second prearranged first and second cut lines formed thereon to a breaking part and separating them into a plurality of unit liquid crystal display panels.

Another feature of the present invention is to provide method for fabricating a liquid crystal display panel including: providing mother substrates divided into a plurality of panel regions; performing an array process on the mother substrate for an array substrate and performing a color filter process on the mother substrate for a color filter substrate; forming an alignment film on the surface of the mother substrates; performing rubbing on the alignment film-formed mother substrates; attaching the pair of rubbing-finished mother substrates; forming first prearranged cut lines for sectioning the panel regions in a first direction on front and rear surfaces of the attached mother substrates by using a first scribe unit having a plurality pairs of first heads; forming second prearranged cut lines for sectioning the panel regions in a second direction on the front and rear surfaces of the mother substrates through a second scribing unit having a plurality pairs of second heads; and separating the mother substrates with the first and second prearranged first and second cut lines formed thereon into a plurality of unit liquid crystal display panels.

The present invention is also directed to an apparatus and method for cutting liquid crystal display device and method for fabricating liquid crystal display device using the same that substantially obviates one or more of the problems due to limitations and disadvantages of the related art.

An advantage of the present invention is to provide an apparatus and method for cutting a substrate using a laser capable of preventing a generation of a defective substrate by cutting the substrate with a laser.

Another advantage of the present invention is to provide an apparatus and method for cutting a substrate using a laser which is capable of preventing a substrate from being destroyed or cut randomly cut into by cutting the substrate by irradiating a laser beam after forming a preliminary scribing line having a certain distance from an end portion of the substrate.

Another advantage of the present invention is to provide a method for fabricating a liquid crystal display device using the substrate cutting apparatus using the laser.

To achieve these and other advantages and in accordance with the purpose of the present invention, as embodied and broadly described herein, a substrate cutting apparatus includes a cutting unit to form a preliminary scribing line extending a predetermined distance from an end portion of a substrate; and a laser cutter to irradiate a laser beam unto a substrate to expand the substrate and to contract the expanded substrate so as to cut the substrate.

In another aspect of the present invention, a substrate cutting method includes forming a preliminary scribing line having a certain distance from an end portion of a substrate toward the center of the substrate, and separating the substrate by irradiating a laser beam onto the substrate.

In another aspect of the present invention, a method for fabricating a liquid crystal display device includes: providing a first and a second substrate; providing thin-film transistor driving circuits on the first substrate; providing a color filter layer on the second substrate; loading one of the first and second substrates; forming a preliminary scribing line extending a certain distance from an end portion of the loaded substrate toward the center of the substrate; cutting the substrate by irradiating a laser beam onto the substrate; and bonding the cut substrate to a second cut substrate to form a liquid crystal display panel.

The present invention is also directed to a method for cutting liquid crystal display panel and method for fabricating liquid crystal display panel using the same that substantially obviates one or more of the problems due to limitations and disadvantages of the related art.

Therefore, one aspect of the present invention involves the recognition by the present inventors of the drawbacks in the related art as explained above.

An advantage of the present invention is to provide a method for cutting a liquid crystal display panel capable of shortening time required for cutting a liquid crystal display panel, and a method for fabricating a liquid crystal display panel using the same.

Another advantage of the present invention is to provide a method for cutting a liquid crystal display panel capable of extracting a liquid crystal display panel from a large-scale mother substrate without damage, and a method for fabricating a liquid crystal display panel using the same.

To achieve these and other advantages and in accordance with the purpose of the present invention, as embodied and broadly described, an apparatus for transferring a liquid crystal display panel including: a body having a plurality of suction members; and a steam generator installed at an edge of the body to spray steam toward a mother substrate.

In another aspect of the present invention, a method for cutting a liquid crystal display panel includes: transferring a pair of mother substrates on which a plurality of panel regions has been disposed to a scribing unit; forming first and second prearranged cut lines on front and rear surfaces of the mother substrates using a scribing unit; transferring the mother substrates with the first and second prearranged cut lines formed thereon to a breaking component; and moving a transfer unit which includes a body having a plurality of suction members and a steam generator installed at an edge of the body to an upper side of the mother substrates, and separating liquid crystal display panels formed at the panel regions from a dummy glass therearound while spraying steam onto the surface of the mother substrates through the steam generator of the transfer unit.

In another aspect of the present invention, a method for fabricating a liquid crystal display panel includes: providing mother substrates divided into a plurality of panel regions; performing an array process on the mother substrate for an array substrate and performing a color filter process on the mother substrate for a color filter substrate; forming an alignment film on the surface of the mother substrates; performing rubbing on the alignment film-formed mother substrates; attaching the pair of rubbing-finished mother substrates; forming first and second prearranged cut lines on front and rear surfaces of the attached mother substrates; and moving a transfer unit which includes a body having a plurality of adsorption members and a steam generator installed at an edge of the body onto the mother substrates, and separating liquid crystal display panels formed at the panel regions from a dummy glass therearound while spraying steam onto the surface of the mother substrates through the steam generator of the transfer unit.

The present invention is also directed to an apparatus for transferring liquid crystal display panel that substantially obviates one or more of the problems due to limitations and disadvantages of the related art.

An advantage of the present invention is to provide an apparatus for transferring a liquid crystal display (LCD) panel that is capable of completely separating an LCD panel from a substrate by applying pressure onto the substrate that has been processed by a cutting wheel and a steam-cutting device and for transferring the substrate to a later process.

Another advantage of the present invention is to provide an apparatus for transferring a liquid crystal display (LCD) panel that is capable of quickly transferring LCD panels of a variety of models.

To achieve these and other advantages and in accordance with the purpose of the present invention, as embodied and broadly described herein a liquid crystal display (LCD) panel includes: a first main body to affix a liquid crystal display (LCD) panel formed on a substrate; and at least one second main body extendable from the first main body to adjust an area to affix the LCD panel; a third main body extendable from the second main body.

In another aspect of the present invention, a liquid crystal display panel transferring apparatus includes: a main body having a variable area to affix a liquid crystal display (LCD) panel formed on a substrate; and at least one pin formed at an edge of the main body to apply an impact onto the substrate at an outer periphery of the LCD panel to thereby separate the LCD panel from the substrate.

In another aspect of the present invention, a method for fabricating a liquid crystal display device includes: bonding first and second substrates to form a plurality of liquid crystal display (LCD) panels; forming a scribing line on the substrate having the plurality of LCD panels; controlling a main body of an LCD panel transferring apparatus according to a size of the LCD panel; affixing the LCD panel using suction holes formed at the main body; and applying an impact onto outer portions of the LCD panel by use of pins formed at outer peripheries of the main body, to thus cut the substrate.

The present invention is also directed to an apparatus for testing liquid crystal display panel that substantially obviates one or more of the problems due to limitations and disadvantages of the related art.

An advantage of the present invention is to provide an apparatus for testing a liquid crystal display panel that is capable of easily attaching and detaching a polarizer by inserting a polarizer jig into a groove formed in a polarizer fixing unit to fix the polarizer.

Another advantage of the present invention is to provide an apparatus for testing a liquid crystal display panel in which a polarizer fixing unit is rotatably constructed to be then perpendicularly inserted into a polarizer, and then the polarizer fixing unit is rotated to position the polarizer on an LCD panel, thereby preventing the polarizer from colliding with other components.

To achieve these and other advantages and in accordance with the purpose of the present invention, as embodied and broadly described, an apparatus for testing a liquid crystal display (LCD) panel includes: a test board to transmit light to an LCD panel which is placed thereon; a polarizer fixing unit rotatably formed at the test board and having a groove into which a polarizer is insertable; and a stop formed at the test board to fix the polarizer fixing unit at a predetermined position.

In another aspect of the present invention, an apparatus for testing a liquid crystal display (LCD) panel includes: a test board to transmit light to an LCD panel which is placed thereon; a jig to support a polarizer; and a polarizer fixing unit formed at the test board and having a groove into which the jig is insertable to thus fix the polarizer.

In another aspect of the present invention, a method of fabricating a liquid crystal display (LCD) panel, the method includes: preparing a first and a second substrate; performing a switching device array process on the first substrate; performing a color filter substrate process on the second substrate; bonding the first and second substrate together; forming a liquid crystal layer between the substrates; cutting the attached substrates into a plurality of unit LCD panels; performing a visual inspection of a unit LCD panel of the plurality of unit LCD panels using a visual inspection apparatus including: a test board to transmit light to a unit LCD panel disposed thereon; a polarizer fixing unit rotatably formed at the test board and having a groove into which a polarizer is insertable; and a stop formed at the test board to fix the polarizer fixing unit at a predetermined position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 110 is a view illustrating an expansion of a substrate by irradiating a laser beam;

FIG. 111 is a plan view illustrating a cutting process of a liquid crystal display panel in accordance with an embodiment of the present invention;

FIGS. 112A to 112E illustrate a process of sequentially extracting a unit liquid crystal display panel from a mother substrate by using the trans-hand;

FIG. 113 is a flow chart illustrating the sequence of processes of a method for cutting a liquid crystal display panel in FIGS. 24 and 25 in accordance with a first embodiment of the present invention;

FIG. 114 is a flow chart illustrating the sequence of processes of a method for cutting a liquid crystal display panel in FIGS. 24 and 25 in accordance with a second embodiment of the present invention;

FIG. 115 is a view illustrating a structure of an apparatus for transferring an LCD panel in accordance with an embodiment of the present invention;

FIG. 116 is a view illustrating an extraction of an LCD panel from a substrate by use of an apparatus for transferring an LCD panel;

FIG. 117 is a view illustrating a structure of an apparatus for transferring an LCD panel in accordance with another embodiment of the present invention;

FIGS. 118A and 118B are views illustrating an extraction of an LCD panel from a substrate by use of an apparatus for transferring an LCD panel, wherein FIG. 118A is a view illustrating a transferring of an LCD panel with a smaller area, and FIG. 118B is a view illustrating a transferring an LCD panel with a greater area;

FIGS. 119A and 119B are views illustrating an apparatus for testing an appearance of an LCD panel according to an embodiment of the present invention; and FIGS. 120A and 120B are views illustrating an operation of the apparatus for testing an appearance of an LCD panel according to an embodiment of the present invention.

DETAILED DESCRIPTION OF THE ILLUSTRATED EMBODIMENTS

Reference will now be made in detail to various and alternate embodiments of the present invention, as well as aspects thereof. Examples of embodiments and aspects thereof are illustrated in the accompanying drawings.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The roll stocker and a method for fabricating an LCD device in accordance with the illustrated embodiments of the present invention will be described with reference to the accompanying drawings.

Figure 22:
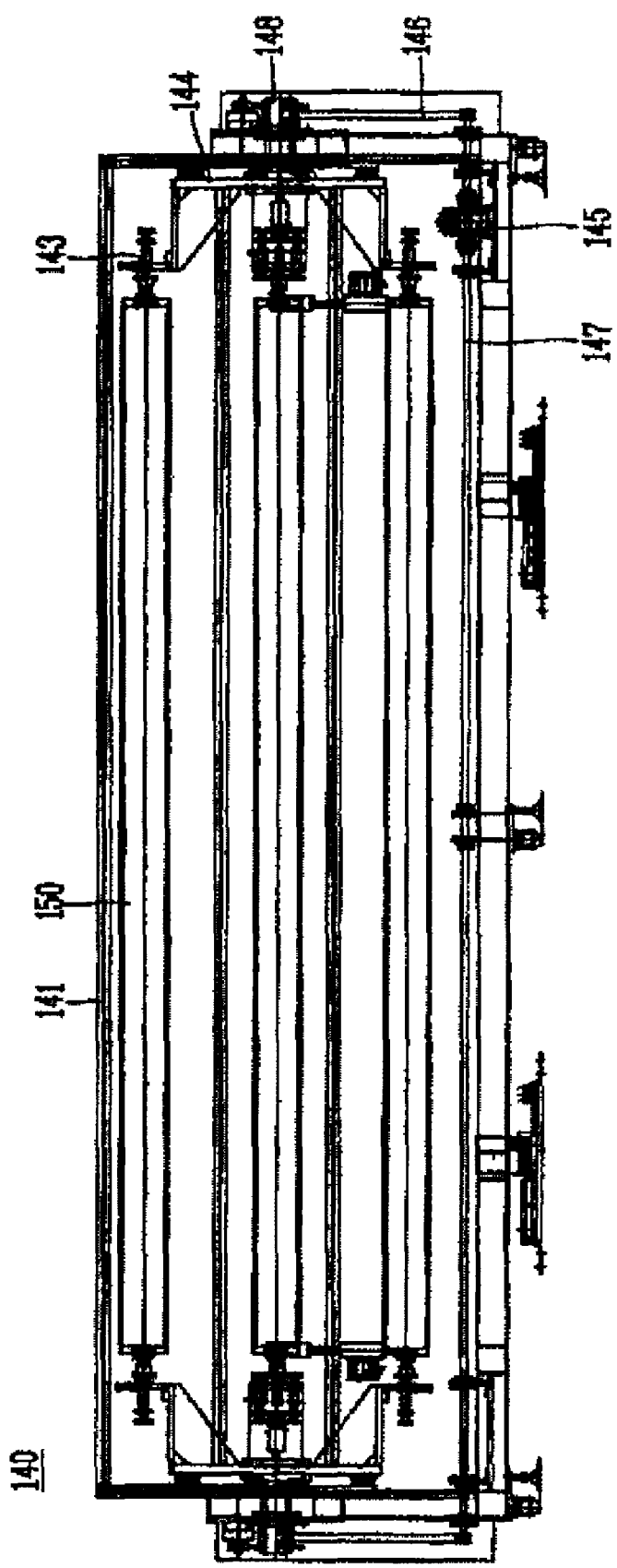
FIG. 22 is an exemplary view illustrating a roll stocker in accordance with the present invention.
Figure 23:
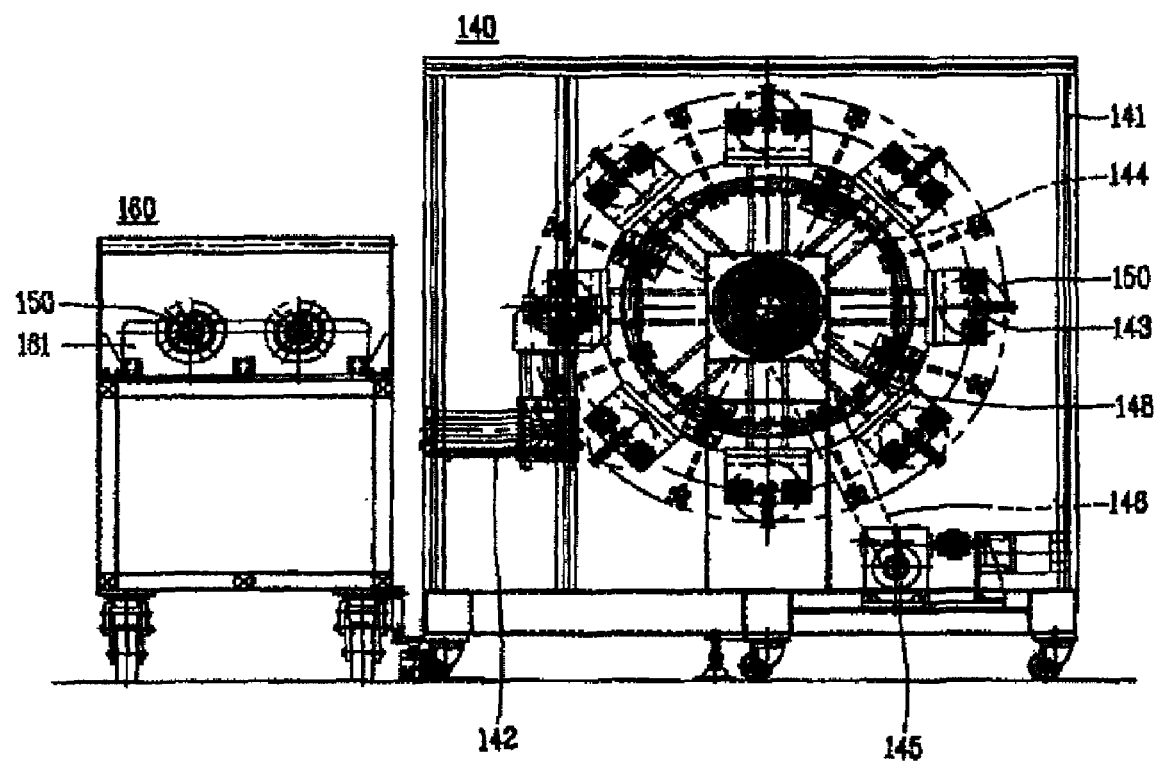
FIG. 23 illustrates the roll stocker in FIG. 22 viewed from the side.

FIGS. 22 and 23 are exemplary views illustrating a roll stocker in accordance with the present invention. Specifically, FIG. 22 is a front view of the roll stocker for keeping rubbing rolls, and FIG. 23 is a side view of the roll stocker in FIG. 22.

As illustrated, a roll stocker 200140 is a turn type roll stocker that is rotatable to keep the sufficient number of rubbing rolls 200150 in the same space.

That is, a plurality of rubbing rolls 200150 are kept in the roll stocker 200140 with both ends thereof inserted in the pair of left and right roll fixing units 200143, and in this case, each end of the plurality of pairs of roll fixing units 200143 are connected with each radially extending end of shaft connection part 200144. The center of the shaft connection part 200144 is fixed at a rotational shaft 200148, so that when the rotational shaft 200148 is rotated, the plurality of rubbing rolls 200150 kept in the plurality of pairs of roll fixing units 200143 can be rotated all at once.

Illustrated on the drawing is that eight rubbing rolls 200150 are fixed to be kept in storage in the eight pairs of roll fixing units 200143 connected with the end of the shaft connection parts 200144, but the present invention is not limited thereto and can be applied to a case where the plurality of rubbing rolls 200150 are fixed to be kept in storage in the plurality of pairs of the roll fixing units 200143 connected at the end of the shaft connection parts 200144 separated at the same angles.

The roll stocker 200140 includes an outer frame 200141 so as to be closed from outside to prevent contamination of the rubbing rolls 200150 due to external particles.

The rubbing rolls 200150 are kept with both ends thereof inserted in the pair of roll fixing units 200143 in a horizontal direction in the roll stocker 200140, and a motor 200145 for rotating the rotational shaft 200148 is installed at a lower side of the roll stocker 200140 to prevent sagging of the rubbing rolls 200150 kept in storage in the horizontal direction. Namely, the rubbing rolls 200150 are stored horizontally with their end portions inserted in the pair of roll fixing units 200143, and by periodically rotating the rotational shaft 200148, sagging of the rubbing rolls 200150 can be prevented, thereby preventing any deviation in the eccentricity of the rubbing rolls 200150.

Because the roll stocker 200140 stores the plurality of rubbing rolls 200150 in the plurality pairs of roll fixing units 200143, and because the plurality pairs of the roll fixing units 200143 are connected with the pair of rotational shafts 200148 through the shaft connection parts 200144, the plurality of rubbing rolls 200150 kept in storage can be entirely rotated at one time according to a rotation of the rotational shaft 200148. Compared with the driving method in which the rubbing rolls are separately rotated, the number of driving units such as a driving motor can be reduced, which is advantageous in terms of cost and simplifies the fabrication of the roll stocker.

The power of the motor 200145 is transferred through a shaft 200147 and a driving transmission unit. The shaft 200147 is a bar-type mechanical component that transfers power to a portion at some distance away based on either rotational movement or linear reciprocal movement. Power transferred from the shaft 200147 is transferred to the rotational shaft 200148 installed at the side frame 200141 of the roll stocker 200140 through a belt 200146. Thereafter, the shaft connection parts 200144 with the center fixed at the rotational shaft 200148 are rotated according to driving of the motor 200145, and accordingly, the roll fixing units 200143 connected with the end portion of the shaft connection parts 200144 and the rubbing rolls 200150 are rotated overall.

In this case, in this embodiment of the present invention, periodical rotating of the roll stocker 200140 is required to not only prevent sagging of the rubbing rolls 200150 but also take the rubbing roll 200150 out of the roll stocker 200140. Thus, in order to keep the rubbing rolls 200150 in the roll stocker 200140 or take the rubbing roll out of the roll stocker 200140, the roll stocker 200140 includes a roll entrance 200142 for allowing the rubbing rolls 200150 to be received and taken out. When the rubbing roll 200150 is placed at the roll entrance 200142, the rotational shaft 200148 and the plurality pairs of roll fixing units 200143 are rotated so that a pair of left and right empty roll fixing units 200143 can be directed to the roll entrance 200142 automatically or manually. Thereafter, the pair of roll fixing units 200143 are pulled in both outward directions, the rubbing roll 200150 is positioned there between, the pair of roll fixing units 200143 return to their original positions, thereby fixing both ends of the rubbing roll 200150 so as to be kept in storage.

Meanwhile, in order to take a required rubbing roll 200150, among the rubbing rolls 200150 in storage, out of the roll stocker 200140, first, the rotational shaft 200148 and the plurality of pairs of roll fixing units 200143 are rotated so that the required rubbing roll 200150 can be positioned toward the roll entrance 200142. Thereafter, the pair of roll fixing units 200143 positioned at both ends of the rubbing roll 200150 and fixing the rubbing rolls 200150 are pulled in both outward directions, and then, the required rubbing roll 200150 is taken out through the roll entrance 200142.

As stated above, as the size of the rubbing roll 200150 increases, the importance of management of the rubbing roll 200150 increases, and a sufficient number of rubbing rolls 200150 should be kept in storage to maintain stability and predictability in the manufacturing process. In addition, when a mother substrate for fabricating a liquid crystal display panel of a different model is introduced to the rubbing line, a different type rubbing roll should be used that corresponds to the model of the liquid crystal display panel, and accordingly, the sufficient number of rubbing rolls 200150 must be secured according to the various models. In this case, the sufficient number of rubbing rolls 200150 of various types is kept in the turn type roll stocker 200140 to obtain a margin in operating rolls and thus contribute to process stability.

For reference, reference numeral 200160 denotes a roll moving unit for transferring the rubbing roll 200150 between the roll stocker 200140 and a certain rubbing line, and a roll keeping unit 200161 for keeping the rubbing rolls 200150 in storage is installed in the roll moving unit 200160.

A method for fabricating an LCD device using the roll stocker constructed as described above will be explained in detail with reference to the accompanying drawings.

Figure 24:
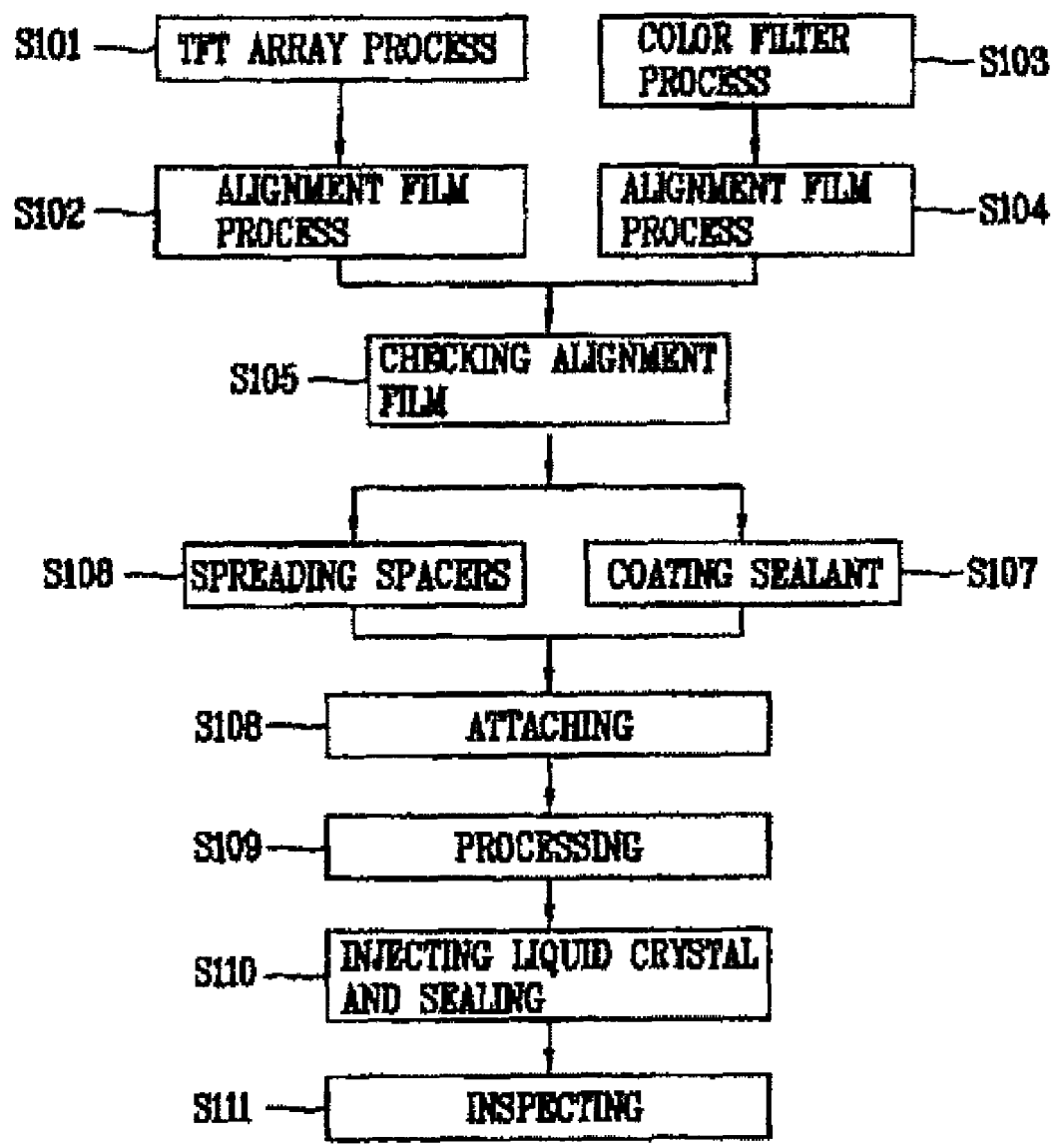
FIG. 24 is a flow chart illustrating the processes of one method for fabricating a liquid crystal display panel in accordance with the present invention.
Figure 25:
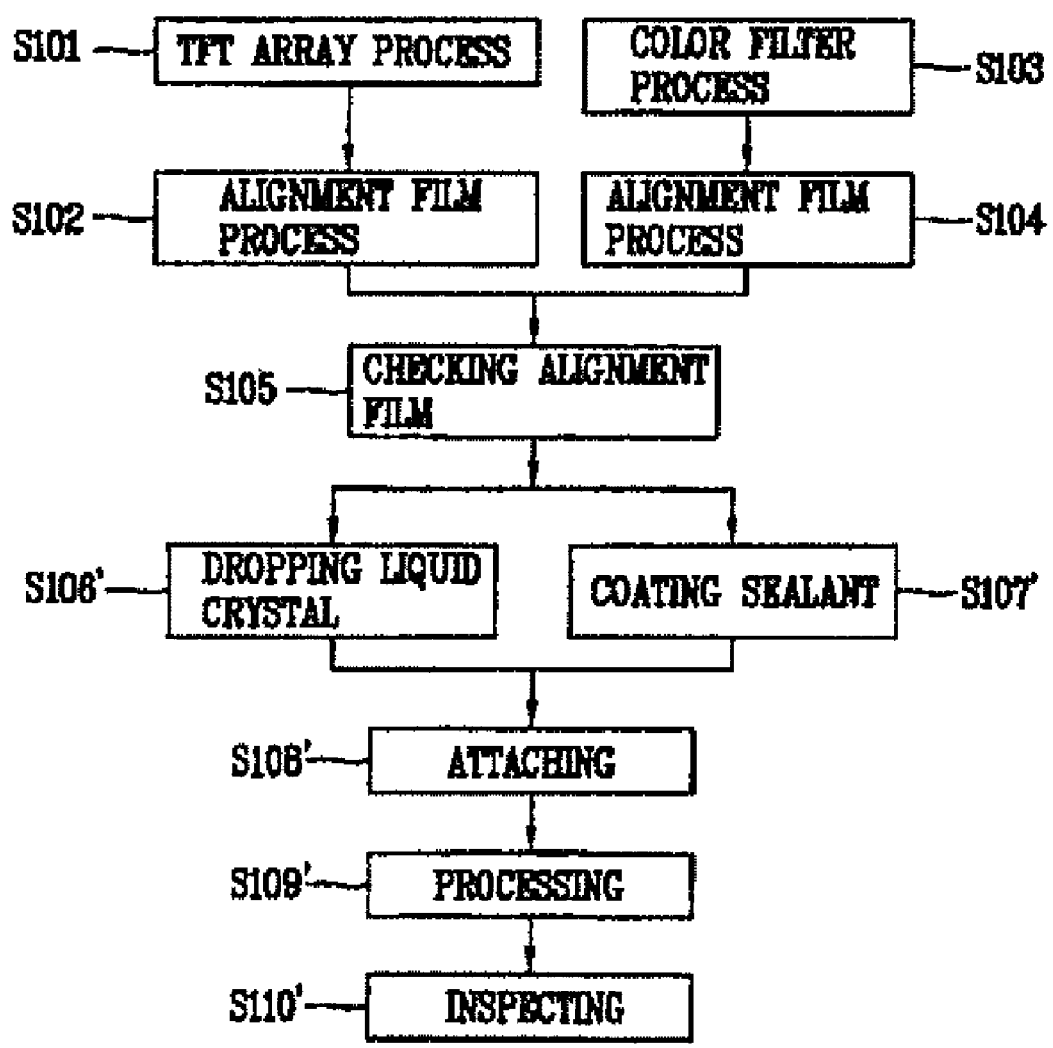
FIG. 25 is a flow chart illustrating the processes of another method for fabricating a liquid crystal display panel in accordance with the present invention.

FIG. 24 is a flow chart illustrating the processes of one method for fabricating a liquid crystal display panel in accordance with the present invention. FIG. 25 is a flow chart illustrating the processes of another method for fabricating a liquid crystal display panel in accordance with the present invention.

Specifically, FIG. 24 illustrates a method for fabricating an LCD in which a liquid crystal layer is formed by a liquid crystal injection method and FIG. 25 illustrates a method for fabricating an LCD in which a liquid crystal layer is formed by a liquid crystal dropping method.

The process for fabricating the liquid crystal display panel can be divided into a driving device array process for forming a driving device on the lower array substrates, a color filter process for forming a color filter on the upper color filter substrate, and a cell process for attaching the array substrate and the color filter substrate.

To begin with, a plurality of gate lines and a plurality of data lines arranged to define pixel regions on the lower substrate are formed and a TFT, a switching device, is formed to be connected with the gate lines and the data lines at each of the pixel regions through the array process (step 200S101). In addition, a pixel electrode which is connected with the TFT and drives the liquid crystal layer as a signal is applied thereto through the TFT is formed through the array process.

A color filter layer comprising red, green and blue sub-color filters implementing color and a common electrode are formed on the upper substrate through the color filter process (step 200S103).

Subsequently, after an alignment film is printed on the upper and lower substrates, it is aligned to provide an anchoring force or a surface fixing force (namely, a pretilt angle and an alignment direction) to liquid crystal molecules of a liquid crystal layer formed between the upper and lower substrates (step 200S102 and 200S104).

If the model of the liquid crystal display panel is changed so the current rubbing roll needs to be replaced by a different type of rubbing roll or if the current rubbing roll has been abraded so it needs to be replaced with a new rubbing roll, one of rubbing rolls kept in the roll stocker can be taken out for replacement and the rubbing process is continued. This will be described in detail as follows.

Figure 26:
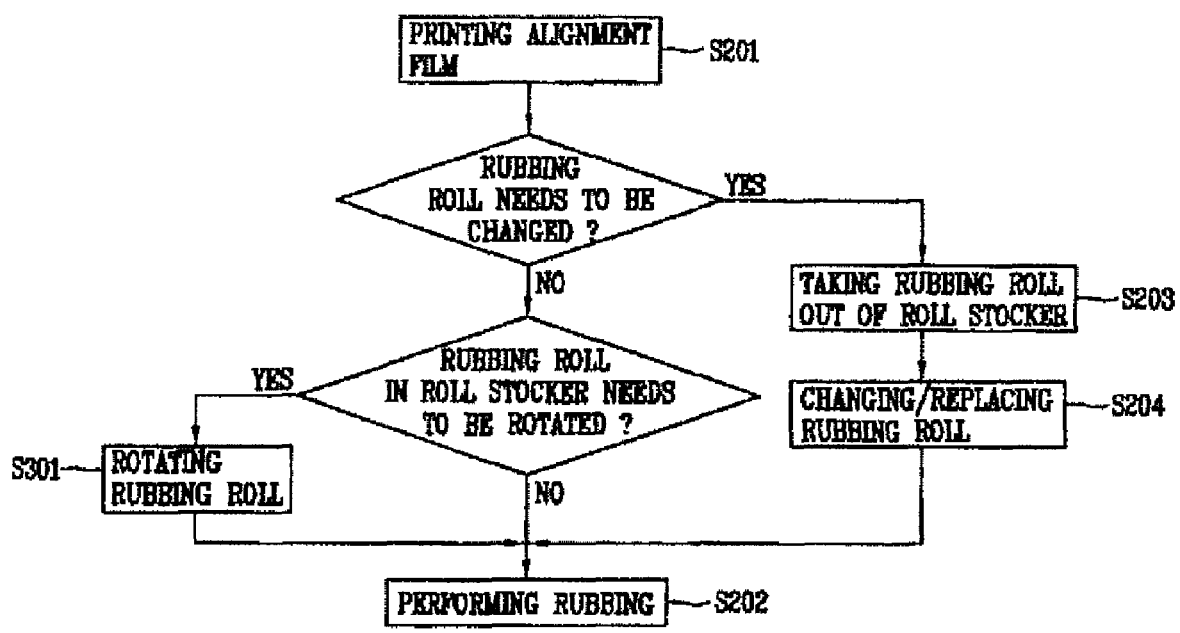
FIG. 26 is a flow chart illustrating the processes of a method for forming an alignment film in the method for fabricating the liquid crystal display panel in FIGS. 24 and 25 in accordance with the present invention.

FIG. 26 is a flow chart illustrating the processes of a method for forming an alignment film in the method for fabricating the liquid crystal display panel in FIGS. 24 and 25 in accordance with the present invention.

The liquid crystal display panel uses electro-optic effects of liquid crystal, and since the electric optical effect is determined by anisotropy of the liquid crystal itself and a state of arrangement of liquid crystal molecules, controlling of the arrangement of liquid crystal molecules has much influence on stabilization of a display quality of the liquid crystal display panel.

Accordingly, the alignment film forming process for effectively aligning liquid crystal molecules is of much importance with respect to characteristics of picture quality in the liquid crystal cell process.

First, an alignment film is printed on each of the upper and lower substrates which have been fabricated through the above-stated array process and the color filter process, and then rubbed to provide the anchoring force or the surface fixing force (namely, the pretilt angle and the alignment direction) to the liquid crystal molecules of the liquid crystal layer formed between the upper and lower substrates (steps 200S201 and 200S202).

In this case, the rubbing process refers to a process for arranging a fired alignment film in a certain direction so that liquid crystals can be arranged in a certain direction by a rubbing cloth.

When the surface of the alignment film is rubbed, the surface of the alignment film has fine recesses.

As the rubbing cloth, a soft cloth is used, and the basic part of setting conditions for the rubbing process is setting a rubbing condition with a suitable strength and applying a uniform rubbing strength on a large area.

The rubbing cloth is formed such that the weft and the warp thread cross finely, and the surface of the rubbing cloth can be damaged by a pattern formed on the substrate or debris while the surfaces of the plurality of substrates are being rubbed.

Thus, when the alignment film is not uniformly rubbed, an alignment degree of liquid crystal molecules is not uniform spatially, resulting in a defective alignment film with optical characteristics partially different.

A method for inspecting the rubbing deficiency includes a first inspecting process in which whether the coated alignment film has a blur, a strip or a pin hole on its surface or not, and a second inspecting process in which uniformity of the surface of the rubbed alignment film is checked and whether the surface of the rubbed alignment film has a scratch or not.

While the rubbing process is being performed, if the rubbing roll has been abraded so as to be replaced with a new one or if the model of the liquid crystal display panel is changed so a different type of rubbing roll is required, a required rubbing roll is taken from the roll stocker to replace the current rubbing roll, and then, the rubbing process is continued (steps 200S203 and 200S204).

As described above, in order to take a certain rubbing roll out of the roll stocker, the rotational shaft and the plurality of pairs of roll fixing units are rotated so that the required rubbing roll can be positioned toward the roll entrance. Thereafter, the pair of roll fixing units positioned at both ends of the rubbing roll is pulled in both outward directions, and then, the required rubbing roll is taken out through the roll entrance. For reference, when a certain rubbing roll is laid at the roll entrance to keep it in storage in the roll stocker, the rotational shaft and the plurality pairs of roll fixing units are rotated so that a pair of left and right empty roll fixing units can be directed to the roll entrance. Then, the pair of roll fixing units are pulled in both outward directions, and when the rubbing roll is positioned there between, the pair of roll fixing units which has been pulled return to their origination positions to fix both ends of the rubbing roll so as to be kept in storage.

When the rubbing roll in the roll stocker needs to be rotated in order to prevent sagging of the rubbing roll kept in the roll stocker, the motor provided at the roll stocker is driven. The driving power of the motor is transferred along the belt to rotate the shaft, and in this case, because the shaft connection part whose center is fixed at the rotational shaft is connected with the rotational shaft, when the rotational shaft is rotated, the shaft connection part is also rotated, and accordingly, the roll fixing unit connected with the end of the shaft connection part and the rubbing roll are also rotated (step 200S301).

After the rubbing process is finished, the upper and lower substrates are subjected to an inspection process through an alignment film inspecting device as to whether their alignment films are defective or not as illustrated in FIGS. 24 and 25 (step 200S105).

As the alignment film inspecting device, a steam inspecting device can be used, which will be described in detail as follows.

In this embodiment of the present invention, the steam inspecting device includes a steam generator. The side of the mother substrate where the alignment film is formed is exposed to the steam generator so as to be steamed up, and then, non-uniformity such as a color change, a light and shade difference or formed waterdrops are observed through an observation equipment to thereby inspect uniformity of the alignment film. In this manner, the steam inspecting device in this embodiment performs the inspecting, so the inspecting process is simple and the process yield can be improved because the substrate is not damaged.

The inspecting of the alignment film using the steam inspecting device is performed in the following order.

First, the alignment film-formed substrate is positioned on the steam generator. In this case, the mother substrate is installed to be slanted at a certain angle, e.g., at about 40°~50°, toward the steam generator to facilitate steaming up and its observation.

The steam generator heats distilled water at a certain temperature, e.g., at about 80° C.~100° C. to generate steam to make the alignment film fog up. Then, the steamed mother substrate is observed from the opposite side with the naked eyes or using the observation equipment, for example, a camera unit or the like, to observe non-uniformity such as a color change, a light and shade difference or formation of waterdrops, to thus check uniformity of the alignment film.

Through the inspecting, a fine defect or contamination by an impurity of the alignment film can be also checked. The above descriptions take the example of the case where the inspecting is performed after the rubbing process, but the inspecting can be performed before the rubbing process.

After the inspecting of the alignment film is finished, as illustrated in FIG. 24, spacers for uniformly maintaining a cell gap are formed on the lower substrate and a sealant is coated on an outer edge of the upper substrate. And then, the lower and upper substrates are attached by applying a pressure thereto (steps 200S106~200S108). In this case, the spacers can be ball spacers according to a spreading method, or can be columnar spacers formed through patterning.

The lower and upper substrates are formed as large-scale glass substrates. In other words, a plurality of panel regions are formed on the large-scale glass substrates, and the TFT, the switching device, and the color filter layer are formed at each panel region. Thus, in order to obtain a unit liquid crystal display panel, the glass substrates are to be cut and processed (step 200S109). Thereafter, liquid crystal is injected through a liquid crystal injection opening of each unit liquid crystal display panel, the liquid crystal injection opening is sealed to form a liquid crystal layer, and then, each unit liquid crystal display panel is inspected, thereby finishing fabrication of each of the unit liquid crystal display panels (steps 200S110 and 200S111).

The liquid crystal is injected using a vacuum injection method using a pressure difference. That is, according to the vacuum injection method, the liquid crystal injection opening of the unit liquid crystal display panel separated from the large-scale mother substrates is put in a container filled with liquid crystal in a chamber with a certain degree of vacuum, and then, the degree of vacuum is changed to allow liquid crystal to be injected into the liquid crystal display panel according to a pressure difference between the interior and the exterior of the liquid crystal display panel. When the liquid crystal is filled inside the liquid crystal display panel, the liquid crystal injection opening is sealed to form the liquid crystal layer of the liquid crystal display panel. Thus, in order to form the liquid crystal layer at the liquid crystal display panel through the vacuum injection method, a portion of a seal pattern needs to be opened to serve as the liquid crystal injection opening.

However, the vacuum injection method has the following problem.

That is, first, it takes much time to fill the liquid crystal in the liquid crystal display panel. In general, since the attached liquid crystal display panel has an area of hundreds of $cm^2$ and a gap of merely about a few μm, the amount of injected liquid crystal per unit hour is inevitably small when the vacuum injection method using the pressure difference is employed. For example, about 8 hours are required for filling liquid crystal for fabricating an about 15-inch liquid crystal display panel. That is, since that much time is required for fabrication of the liquid crystal display panel, the productivity is degraded. In addition, as the liquid crystal display panel is increased in size, time taken for filling liquid crystal would be more lengthened and a defective filling of liquid crystal would also occur, resulting in that it cannot cope with the enlargement of the liquid crystal display panel.

Second, a large amount of liquid crystal is used. In general, the amount of liquid crystal actually injected into the liquid crystal display panel is quite small compared with the amount of liquid crystal filled in the container, and when liquid crystal is exposed in the air or exposed to a specific gas, it is reacted to the gas and degraded. Thus, although the liquid crystal filled in the container is filled in the plurality of unit liquid crystal display panels, a large amount of liquid crystal remaining after finishing the filling is discarded, and accordingly, the unit cost of the liquid crystal panel is increased only to weaken price competitiveness of the product.

In order to solve the problem of the vacuum injection method, recently, the dropping method is increasingly employed.

As illustrated in FIG. 25, in case of using the dropping method, after the alignment film is inspected (step 200S105), a certain seal pattern is formed with a sealant on the color filter substrate and, at the same time, a liquid crystal layer is formed on the array substrate (steps 200S106' and 200S107').

According to the dropping method, after liquid crystal is dropped and dispensed on the large-scale first mother substrate where a plurality of array substrates are disposed or on an image display region of the second mother substrate where the plurality of color filter substrates are disposed, the first and second mother substrates are attached by applying a certain pressure thereto to thereby make the liquid crystal uniformly distributed to the entire image display region and thus form a liquid crystal layer.

Thus, in the case where the liquid crystal layer is formed in the liquid crystal display panel through the dropping method, the seal pattern must be formed as a closed pattern surrounding the outer edge of the pixel part region in order to prevent a leakage of liquid crystal to outside of the image display region.

The dropping method allows dropping of liquid crystal within a relatively short time compared with the vacuum injection method and can quickly form the liquid crystal even when the liquid crystal display panel is large.

In addition, since only the required amount of liquid crystal is dropped on the substrate, there is no increase in the unit cost of the liquid crystal display panel from discarding of the high-priced liquid crystal as in the vacuum injection method. Thus, the price competitiveness of the product can be enhanced.

Thereafter, in a state that the upper and lower substrates on which liquid crystal has been dropped and the sealant has been coated are aligned, a pressure is applied thereto to make the lower and upper substrate attached by the sealant and simultaneously the dropped liquid crystal spread uniformly on the entire portion of the panel (step 200S108').

Through the process, the plurality of liquid crystal display panels with the liquid crystal layer formed thereon are formed on the large-scale glass substrates (upper and lower substrates). The glass substrates are processed and cut to be separated into the plurality of liquid crystal display panels, which are then inspected to thereby finish fabrication of the liquid crystal display panel (steps 200S109' and 200S110').

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

Roll Stocker and Rubbing Process

Figure 27:
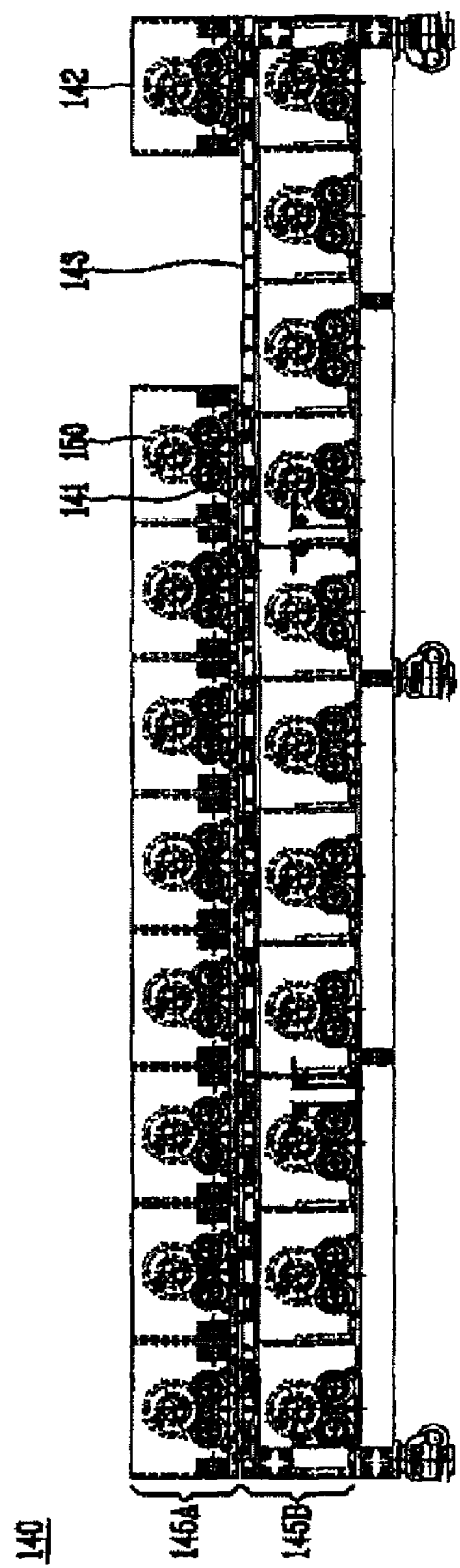
FIG. 27 is an exemplary view illustrating a roll stoker in accordance with the present invention.
Figure 28:
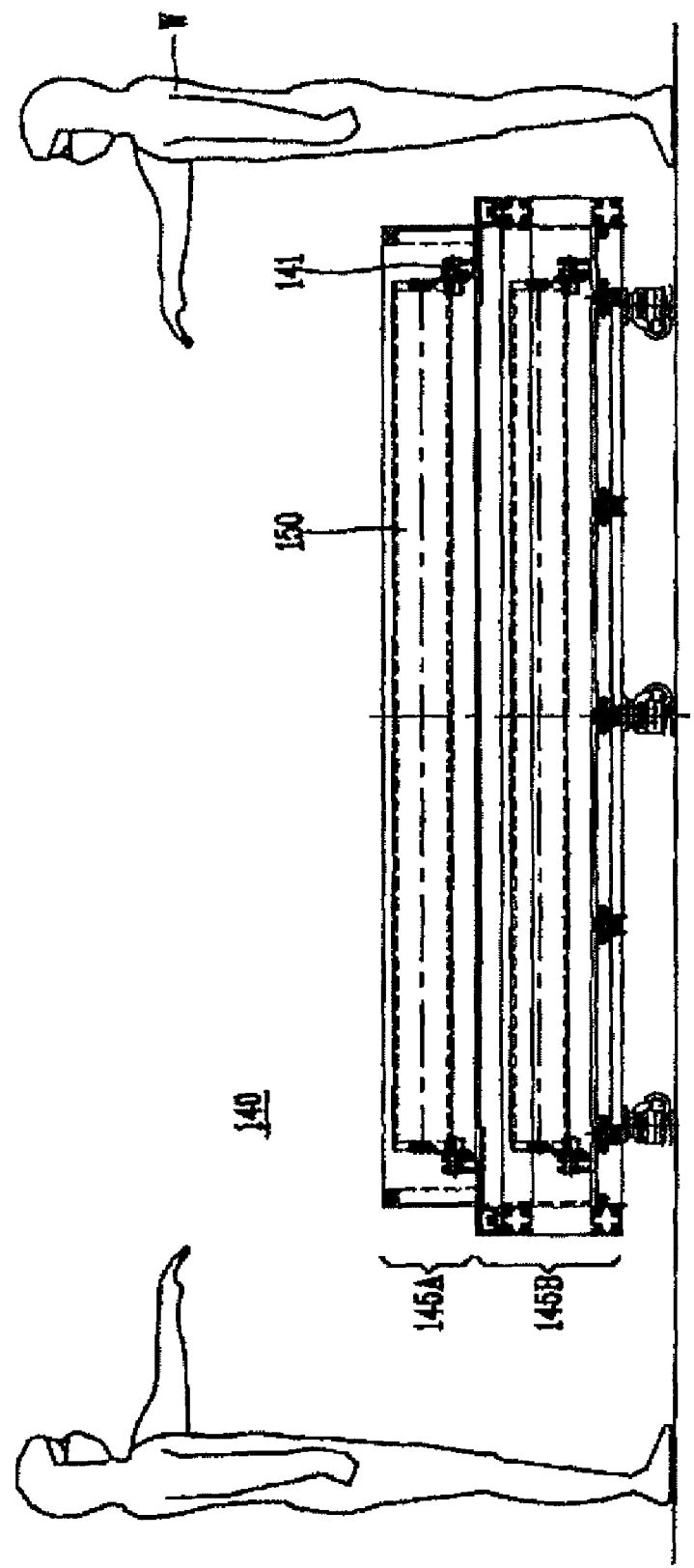
FIG. 28 illustrates the roll stocker in FIG. 27 viewed from the side.

FIGS. 27 and 28 are exemplary views illustrating a roll stocker in accordance with the present invention. Specifically, FIG. 27 is a front view of the roll stocker for keeping rubbing rolls, and FIG. 28 is a side view of the roll stocker in FIG. 27.

As illustrated, in the present invention, a roller stocker 210140 is constructed of two stages including an upper stage 210145A and a lower stage 210145B, each having a plurality of roll keeping units 210142 for keeping the sufficient number of rubbing rolls 210150 in the same space. The present invention is not limited thereto and the roll stocker 210140 can be constructed by multi-stage of three or more stages.

The rubbing rolls 210150 are kept in roll keeping units 210142 of the upper stage 210145A and the lower stage 210145b in a horizontal direction, and a rotatable roller 210141 is installed at a lower portion of the roll keeping units 210142 to prevent the robbing rolls 210140 kept in the roll keeping units 210142 from sagging. Namely, the rubbing roll 210150 is kept such that both end portions thereof are laid on the upper surface of the pair of rollers 210141, and in this case, the pair of rollers 210141 are periodically rotated to prevent the central portion of the rubbing roll 210150 from sagging.

As the size of the rubbing roll 210150 increases, the importance of management of the rubbing roll 210150 increases, and a sufficient number of rubbing rolls 210150 should be secured to maintain stability and continuity in the manufacturing process. In addition, when a mother substrate for fabricating a liquid crystal display panel of a different model is introduced to the rubbing line, a different type rubbing roll 210150 should be used that corresponds to the model of the liquid crystal display panel. Accordingly, accordingly, a sufficient number of rubbing rolls 210150 must be secured according to the various models. In this case, the sufficient number of rubbing rolls 210150 of various types is kept in the multi-stage roll keeping units 210142 to obtain a margin in operating rolls and thus contribute to process stability.

In this embodiment of the present invention, since the roll stockers 210140 are constructed such that the upper stage 210145A is installed using the roll keeping units of the lower stage 210145B as a support, a clean room of a given size can be more effectively used. In addition, the roll stocker 210140 is relatively light and thus it can be easily moved in spite of the increase in the size of the rubbing rolls 210150.

An operator (W) of the roll stocker 210140 removes the rubbing roll 210150 required for a rubbing operation in a vertical direction from the roll keeping unit 210142. Namely, for example, two operators (W) may approach the roll keeping unit 210142 that keeps the rubbing roll 210150, hold both end portions of the rubbing roll 210150 and then lift them in the vertical direction to thereby take out the rubbing roll 210150.

In this case, when a required rubbing roll 210150 is positioned at the lower stage 210145B of the roll stocker 210140, in order to take it out, a roll keeping unit 210142 of the upper stage 210145A positioned at the upper side of the required rubbing roll 210150 must be moved. In this case, the roll stocker 210140 is formed such that a moving unit such as a rail 210143 is installed at an upper side of the roll keeping unit 210142 of the lower stage 210145B and the upper stage 210145A has an empty space where the roll keeping unit 210142 is not positioned, whereby the roll keeping unit 210142 of the upper stage 210145A can be moved in a horizontal direction. Accordingly, the roll keeping unit 210142 of the upper stage 210145A can be moved to an empty space in the horizontal direction and the required rubbing roll 210150 of the lower stage 210145B can be taken out upwardly.

A method for fabricating an LCD device using the roll stocker constructed as described above will be described.

FIG. 24 is a flow chart illustrating the processes of one method for fabricating a liquid crystal display panel in accordance with the present invention, and FIG. 25 is a flow chart illustrating the processes of another method for fabricating a liquid crystal display panel in accordance with the present invention.

Specifically, FIG. 24 illustrates a method for fabricating an LCD in which a liquid crystal layer is formed by a liquid crystal injection method, and FIG. 25 illustrates a method for fabricating an LCD in which a liquid crystal layer is formed by a liquid crystal dropping method.

The process for fabricating the liquid crystal display panel can be divided into a driving device array process for forming a driving device on the lower array substrates, a color filter process for forming a color filter on the upper color filter substrate, and a cell process for attaching the array substrate and the color filter substrate.

To begin with, a plurality of gate lines and a plurality of data lines arranged to define pixel regions on the lower substrate are formed and a TFT is formed connected to the gate lines and the data lines at each of the pixel regions through the array process (step 200S101). In addition, a pixel electrode connected with the TFT and drives the liquid crystal layer as a signal is applied thereto through the TFT is formed through the array process.

A color filter layer comprising red, green and blue sub-color filters implementing color and a common electrode are formed on the upper substrate through the color filter process (step 200S103).

Subsequently, after an alignment film is printed on the upper and lower substrates, it is aligned to provide an anchoring force or a surface fixing force (namely, a pretilt angle and an alignment direction) to liquid crystal molecules of a liquid crystal layer formed between the upper and lower substrates (step 200S102 and 200S104). In this case, for the alignment processing method, a rubbing method or photo alignment method can be used.

If the model of the liquid crystal display panel is changed so the current rubbing roll needs to be replaced by a different type of rubbing roll or if the current rubbing roll has been abraded so it needs to be replaced with a new rubbing roll, one of rubbing rolls kept in the roll stoker can be taken out for replacement and the rubbing process is continued. This will be described in detail as follows.

Figure 29:
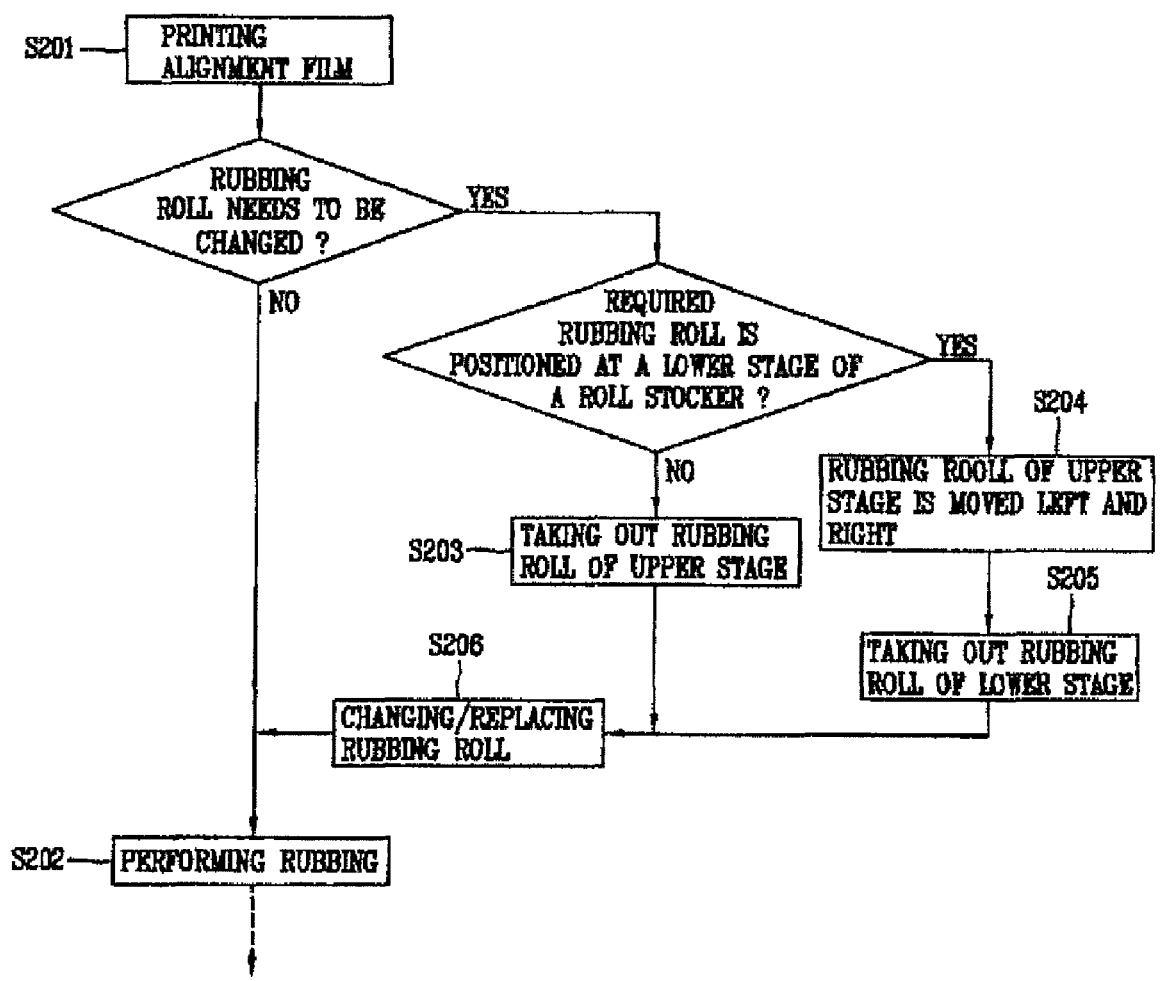
FIG. 29 is a flow chart illustrating the processes of a method for forming an alignment film in the method for fabricating the liquid crystal display panel in FIGS. 24 and 25 in accordance with the present invention.

FIG. 29 is a flow chart illustrating the processes of a method for forming an alignment film in the method for fabricating the liquid crystal display panel in FIGS. 24 and 25 in accordance with the present invention.

The liquid crystal display panel uses electro-optic effects of liquid crystal, and since the electric optical effect is determined by anisotropy of the liquid crystal itself and a state of arrangement of liquid crystal molecules, controlling of the arrangement of liquid crystal molecules has much influence on stabilization of a display quality of the liquid crystal display panel.

Accordingly, the alignment film forming process for effectively aligning liquid crystal molecules is of much importance with respect to characteristics of picture quality in the liquid crystal cell process.

First, an alignment film is printed on each of the upper and lower substrates which have been fabricated through the above-stated array process and the color filter process, and then rubbed to provide the anchoring force or the surface fixing force (namely, the pretilt angle and the alignment direction) to the liquid crystal molecules of the liquid crystal layer formed between the upper and lower substrates (steps 210S201 and 210S202).

In this case, the rubbing process refers to a process for arranging the alignment film in a certain direction so that the liquid crystals can be arranged in a certain direction by a rubbing cloth.

After the surface of the alignment film is rubbed, the surface of the alignment film has fine recesses.

As the rubbing cloth, a soft cloth is used, and the basic part of setting conditions for the rubbing process is setting a rubbing condition with a suitable strength and applying a uniform rubbing strength on a large area.

The rubbing cloth is formed such that the weft and the warp thread cross finely, and the surface of the rubbing cloth can be damaged by a pattern formed on the substrate or debris while the surfaces of the plurality of substrates are being rubbed.

Thus, when the alignment film is not uniformly rubbed because of a defective rubbing cloth surface, an alignment degree of liquid crystal molecules is not uniformed spatially, resulting in a defective alignment film with optical characteristics partially different.

While the rubbing process is being performed, if the rubbing roll has been abraded so as to be replaced with a new one or if the model of the liquid crystal display panel is changed so a different type of rubbing roll is required, a required rubbing roll is taken from the roll stocker to replace the current rubbing roll, and then, the rubbing process is continued (step 210S206).

In taking out the rubbing roll from the roll stocker, as mentioned above, if the required rubbing roll is positioned at the upper stage of the roll stocker, the operator can approach the roll keeping unit in which the required rubbing roll is kept, hold both end portions of the rubbing roll, and lift them up to thereby take out the rubbing roll (step 210S203).

Meanwhile, if the required rubbing roll is positioned at the lower stage of the roll stocker, the operator can move a roll keeping unit positioned above the required rubbing roll to an empty space in a horizontal direction and lift up the required rubbing roll from the lower stage to thereby take it out (steps 210S204 and 210S205).

After the rubbing process is finished through the above-described method, as illustrated in FIGS. 24 and 25, the upper and lower substrates are checked by an alignment film inspecting device as to whether their alignment films are defective or not (step 200S105).

For the alignment film inspecting device, a steam inspecting device can be used, which will be described in detail as follows.

In this embodiment of the present invention, the steam inspecting device includes a steam generator. The side of the mother substrate where the alignment film is formed is exposed to the steam generator so as to steam up, and then any non-uniformity such as a color change, a light and shade difference, or formed waterdrops are observed through observation equipment to thereby inspect uniformity of the alignment film. In this manner, the steam inspecting device in this embodiment performs the inspecting, so the inspecting process is simple and the process yield can be improved because the substrate is not damaged.

The inspecting of the alignment film using the steam inspecting device is performed in the following order.

First, the alignment film-formed substrate is positioned on the steam generator. In this case, the mother substrate is installed to be slanted at a certain angle, e.g., at about 40°~50°, toward the steam generator to facilitate steaming up and its observation.

And the steam generator heats distilled water at a certain temperature, e.g., at about 80° C.~100° C. to generate steam to make the alignment film of the substrate be steamed up.

And then, the steamed mother substrate is observed from the opposite side with the naked eyes or using the observation equipment, for example, a camera unit or the like, to observe non-uniformity such as a color change, a light and shade difference or formation of waterdrops, to thus check uniformity of the alignment film.

Through the inspecting, a fine defect or contamination by an impurity of the alignment film can be also checked. The above descriptions take the example of the case where the inspecting is performed after the rubbing process, but the inspecting can be performed before the rubbing process.

After inspecting on the alignment film is finished, as illustrated in FIG. 24, spacers for uniformly maintaining a cell gap are formed on the lower substrate and a sealant is coated on an outer edge of the upper substrate. And then, the lower and upper substrates are attached by applying a pressure thereto (steps 200S106~200S108). In this case, the spacers can be ball spacers according to a spreading method, or can be columnar spacers formed through patterning.

The lower and upper substrates are formed on large-scale glass substrates. In other words, a plurality of panel regions are formed on the large-scale glass substrates, and the TFT, the switching device, and the color filter layer are formed at each panel region. Thus, in order to obtain a unit liquid crystal display panel, the glass substrates are to be cut and processed (step 200S109). Thereafter, liquid crystal is injected through a liquid crystal injection opening of each unit liquid crystal display panel, the liquid crystal injection opening is sealed to form a liquid crystal layer, and then, each unit liquid crystal display panel is inspected, thereby finishing fabrication of each of the unit liquid crystal display panels (steps 200S110 and 200S111).

The liquid crystal is injected in a vacuum injection method using a pressure difference. That is, in the vacuum injection method, the liquid crystal injection opening of the unit liquid crystal display panel separated from the large-scale mother substrates is put in a container filled with liquid crystal. The container is in a low-pressure or vacuum chamber, and then, the degree of vacuum is changed to allow liquid crystal to be injected into the liquid crystal display panel based on the pressure difference between the interior and the exterior of the liquid crystal display panel. When the liquid crystal is filled inside the liquid crystal display panel, the liquid crystal injection opening is sealed to form the liquid crystal layer of the liquid crystal display panel. Thus, in order to form the liquid crystal layer at the liquid crystal display panel through the vacuum injection method, a portion of a seal pattern needs to be opened to serve as the liquid crystal injection opening.

However, the vacuum injection method has the following problem. First, it takes a long time to fill the liquid crystal in the liquid crystal display panel. In general, since the attached liquid crystal display panel has an area of hundreds of cm$^2$ and a gap of merely about a few μm, the amount of injected liquid crystal per unit hour is inevitably small when the vacuum injection method using the pressure difference is employed. For example, about 8 hours are required for filling liquid crystal for fabricating an about 15-inch liquid crystal display panel. That is, since that much time is required for fabrication of the liquid crystal display panel, the productivity is degraded. In addition, as the liquid crystal display panel is increased in size, time taken for filling liquid crystal would be more lengthened and a defective filling of liquid crystal would also occur, resulting in that it cannot cope with the enlargement of the liquid crystal display panel.

Second, a large amount of liquid crystal is used. In general, the amount of liquid crystal actually injected into the liquid crystal display panel is quite small compared to the amount of liquid crystal in the container. Furthermore, when liquid crystal is exposed to the air or exposed to a specific gas, it reacts to the gas and degrades. Thus, although the liquid crystal filled in the container fills the plurality of unit liquid crystal display panels, a large amount of liquid crystal remaining after finishing the filling is discarded, and accordingly, the unit cost of the liquid crystal panel is increased only to weaken price competitiveness of the product.

In order to solve the problem of the vacuum injection method, the dropping method is increasingly employed.

As illustrated in FIG. 25, in the dropping method, after the alignment film is inspected (step 200S105), a certain seal pattern is formed with a sealant on the color filter substrate and, at the same time, a liquid crystal layer is formed on the array substrate (steps 200S106' and 200S107').

According to the dropping method, after liquid crystal is dropped and dispensed on the large-scale first mother substrate where a plurality of array substrates are disposed or on an image display region of the second mother substrate where the plurality of color filter substrates are disposed, the first and second mother substrates are attached by applying a certain pressure thereto to thereby make the liquid crystal uniformly distributed to the entire image display region and thus form a liquid crystal layer.

Thus, when the liquid crystal layer is formed in the liquid crystal display panel through the dropping method, the seal pattern must be formed as a closed pattern surrounding the outer edge of the pixel part region in order to prevent a leakage of liquid crystal to outside of the image display region.

The dropping method allows dropping of liquid crystal within a relatively short time compared with the vacuum injection method and can quickly form the liquid crystal even when the liquid crystal display panel is large.

In addition, since only the required amount of liquid crystal is dropped on the substrate, the unit cost of the liquid crystal display panel according to discarding of the high-priced liquid crystal as in the vacuum injection method does not increase, and thus, the price competitiveness of the product can be enhanced.

Thereafter, in a state that the upper and lower substrates on which liquid crystal has been dropped and the sealant has been coated are aligned, a pressure is applied thereto to make the lower and upper substrate attached by the sealant and simultaneously the dropped liquid crystal spread uniformly on the entire portion of the panel (step 200S108').

Through the process, the plurality of liquid crystal display panels with the liquid crystal layer formed thereon are formed on the large-scale glass substrates (upper and lower substrates). The glass substrates are processed and cut to be separated into the plurality of liquid crystal display panels, which are then inspected to thereby finish fabrication of the liquid crystal display panel (steps 200S109' and 200S110').

Rolling printing device and roll printing method will be described hereinafter.

Figure 30:
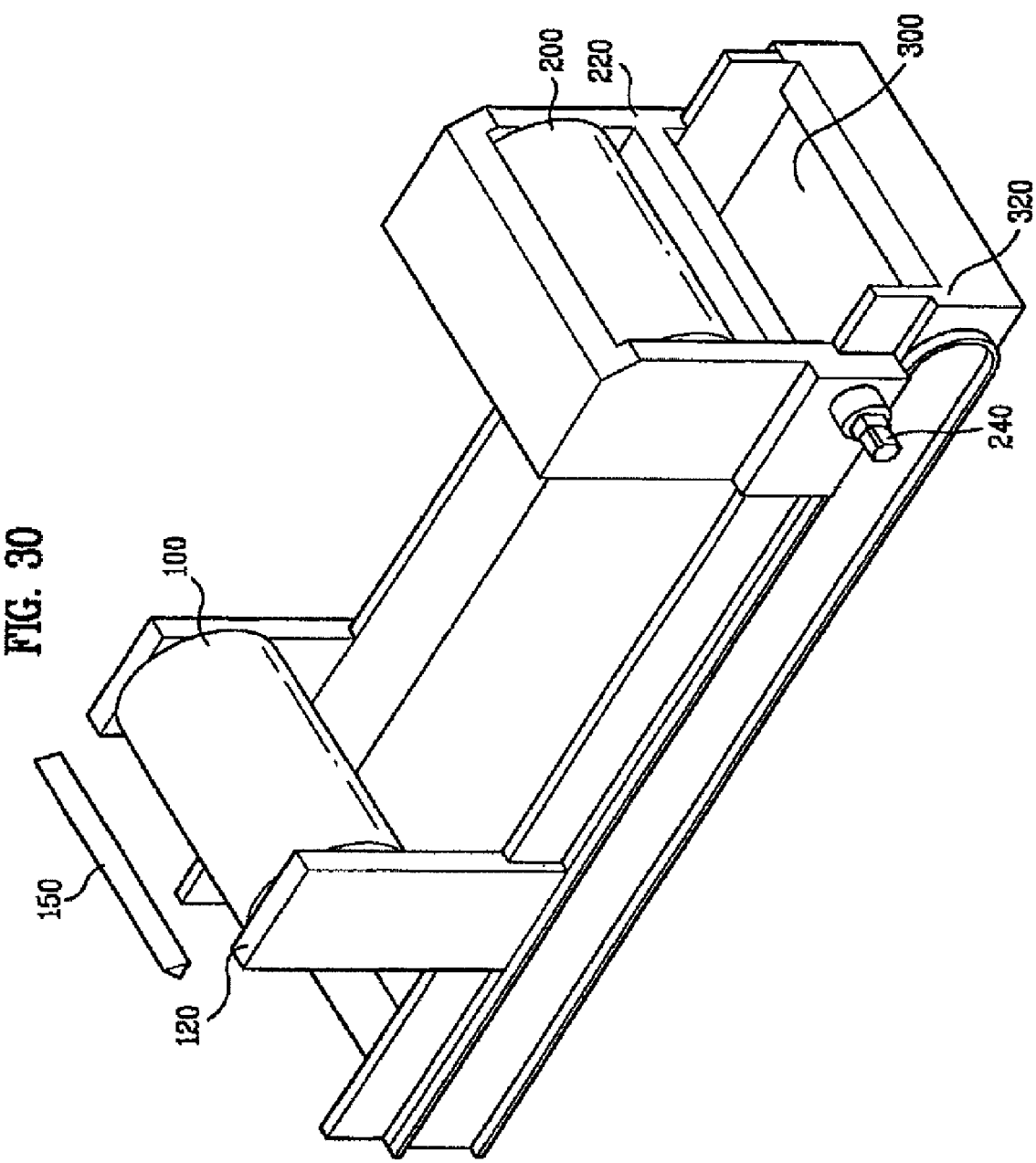
FIG. 30 is a schematic perspective view of a roll printing device in accordance with a first embodiment of the present invention.

FIG. 30 is a schematic perspective view of a roll printing device in accordance with a first embodiment of the present invention.

The roll printing device illustrated in FIG. 30 includes a dispenser, an anilox roll 220100, a printing roll 220200, and a substrate stage 220300.

The dispenser serves to dispense a designated material to the anilox roll 220100.

The anilox roll 220100 serves to transfer the designated material, dispensed by the dispenser, onto the printing roll 220200. The anilox roll 220100 is supported by an anilox roll frame 220120.

The printing roll 220200 serves to receive the designated material supplied to the anilox roll 220100, and then to move on the substrate stage 220300 to deposit the designated material on a substrate mounted on the substrate stage 220300. The printing roll 220200 is supported by a printing roll frame 220220.

A motor 220240 is connected to the printing roll frame 220220 supporting the printing roll 220200. The printing roll 220200 moves by the operation of the motor 220240.

As illustrated in FIG. 30, the printing roll 220200 is separated from the anilox roll 220100 and moves across the substrate stage 220300 to engage the printing roll 220200. When the anilox roll 220100 engages the printing roll 220200, the printing roll 220200 can be rotated to receive the designated material from the anilox roll 220100. After receiving the designated material from the anilox roll 220100, the printing roll is moved across the substrate stage 220300, separating from the anilox roll 220100 and depositing the designated material on the substrate mounted on the substrate stage 220300.

The substrate stage 220300 serves to mount the substrate thereon. The substrate stage 220300 is supported by a substrate stage frame 220320 which is maintained in a fixed position.

The roll printing device may further include a doctor roll engaging the anilox roll 220100 and rotating therewith to order to uniformly spread the designated material from the anilox roll to the printing roll 220200. Alternatively, a doctor blade contacting the anilox roll 220100 may be used to uniformly spread the designated material.

Hereinafter, a roll printing method using the roll printing device of the first embodiment will be described.

First, the dispenser dispenses the designated material to the rotating anilox roll 220100.

Thereafter, the anilox roll 220100 supplies the designated material to the printing roll 220200, engaged with the anilox roll and rotated therewith.

The dispensing of the designated material to the anilox roll 220100 and the supply of the designated material from the anilox roll 220100 to the printing roll 220200 may be simultaneously performed.

By using a doctor roll engaged with the anilox roll 220100 and rotated therewith, or by using a doctor blade contacting the anilox roll 220100, the designated material supplied from the anilox roll 220100 to the printing roll 220200 can be uniformly spread onto the printing roll 220200.

Thereafter, the printing roll 220200 moves along the substrate stage depositing the designated material on the substrate mounted on the substrate stage 220300.

By moving the printing roll 220200 rather than the substrate stage 220300, the space occupied by the roll printing device is not increased when the size of the substrate is increased.

Figure 31:
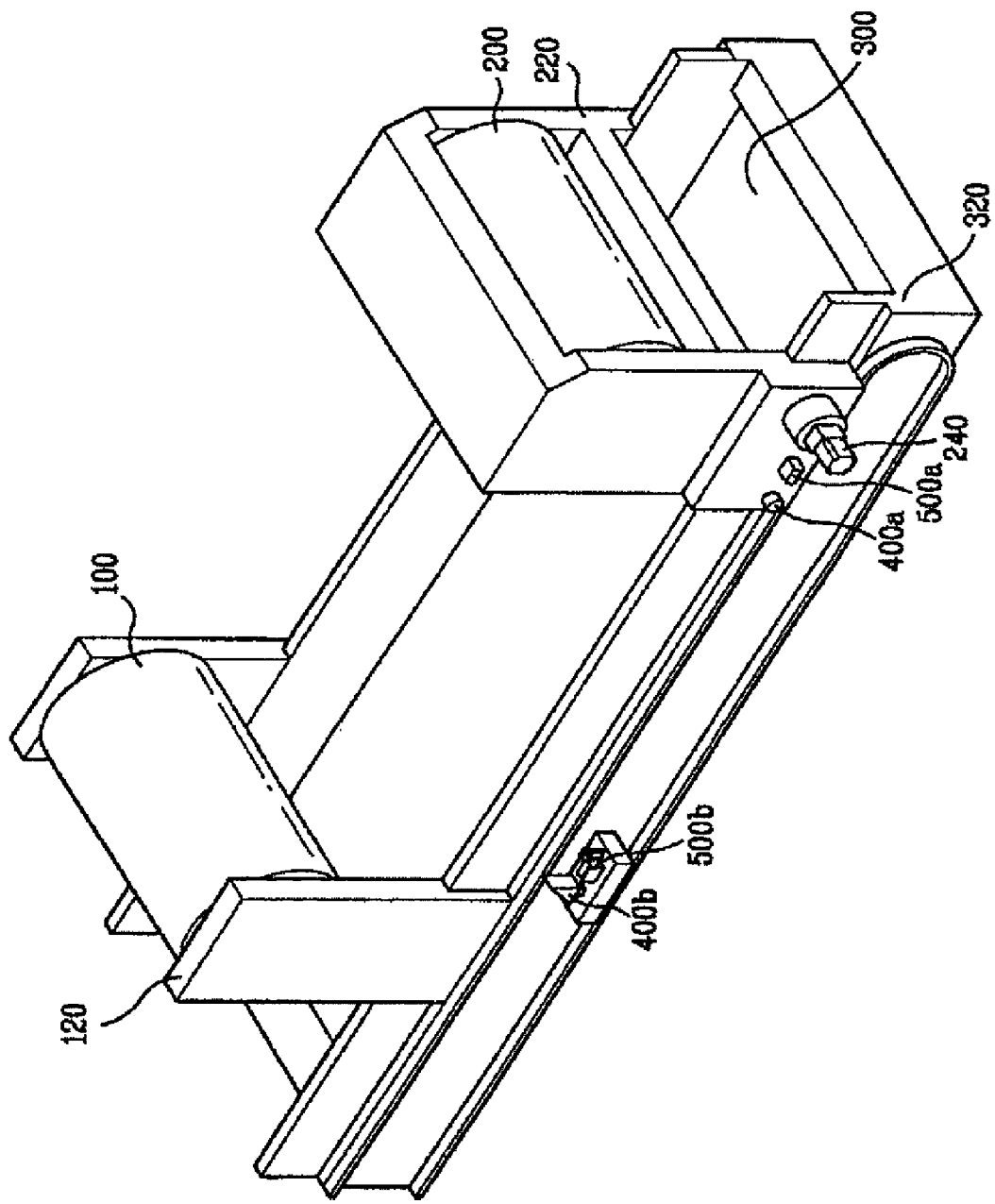
FIG. 31 is a schematic perspective view of a roll printing device in accordance with a second embodiment of the present invention.
Figure 32A:
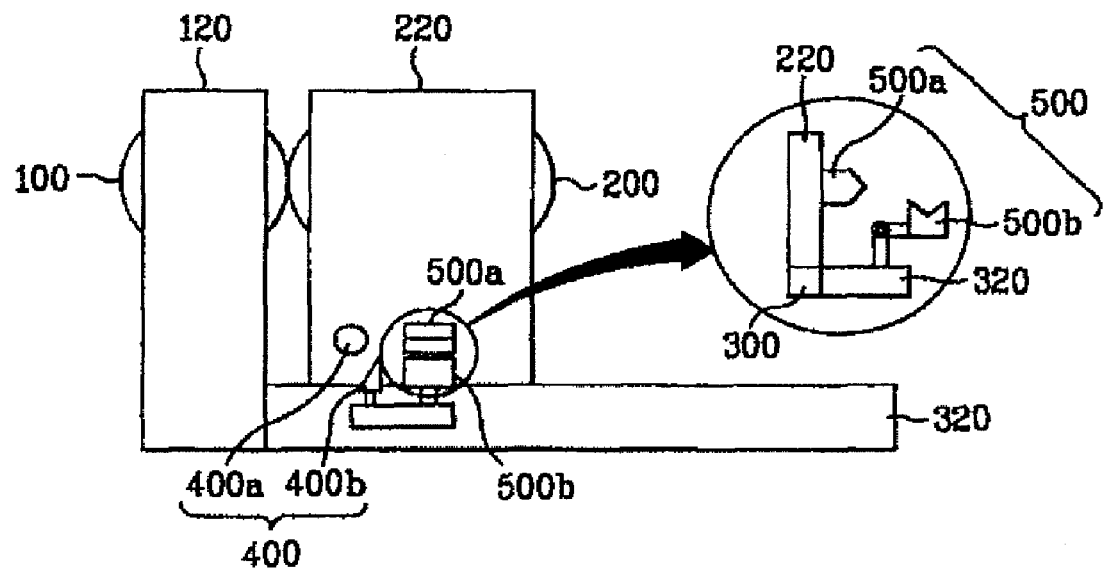
FIG. 32A is a schematic sectional view illustrating the roll printing device in accordance with the second embodiment, with vibration dampeners disconnected from the roll printing device.
Figure 32B:
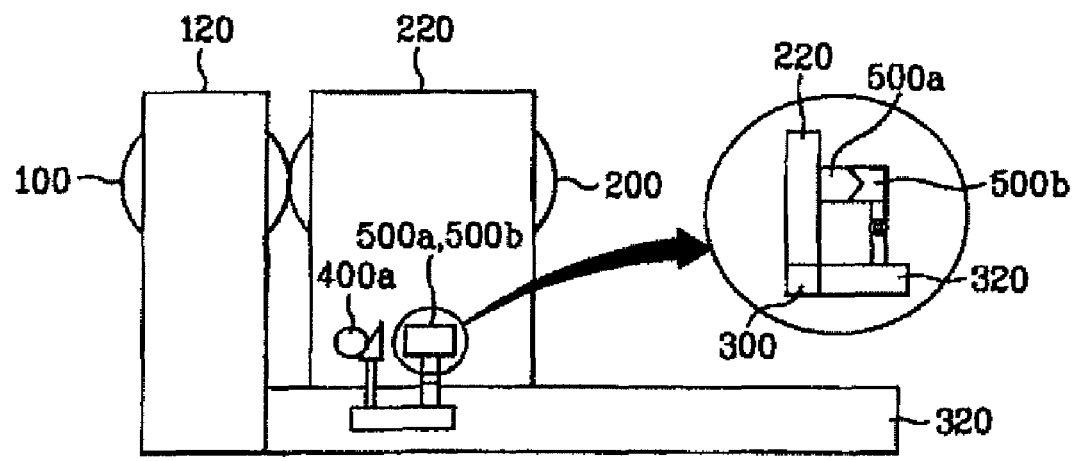
FIG. 32B is a schematic sectional view of the roll printing device in accordance with the second embodiment, illustrating the vibration dampeners connected to the roll printing device.

FIG. 31 is a schematic perspective view of a roll printing device in accordance with a second embodiment of the present invention; FIG. 32A is a schematic sectional view of the roll printing device in accordance with the second embodiment, illustrating vibration dampeners disconnected from the roll printing device; and FIG. 32B is a schematic sectional view of the roll printing device in accordance with the second embodiment illustrating the vibration dampeners connected to the roll printing device.

The roll printing device of the second embodiment is the same as the roll printing device of the first embodiment except that the roll printing device of the second embodiment further includes a vibration dampener for preventing or reducing the generation of vibration when an anilox roll and a printing roll are engaged with each other and rotated. Accordingly, parts included in the second embodiment that are substantially the same as those in the first embodiment, are denoted by the same reference numerals even though they are depicted in different drawings.

As illustrated in FIG. 31, the roll printing device in accordance with the second embodiment includes a dispenser, an anilox roll 220100, a printing roll 220200, a substrate stage 220300, and a vibration dampener.

The dispenser, the anilox roll 220100, the printing roll 220200, and the substrate stage 220300 of this embodiment are the same as those of the first embodiment, and a detailed description thereof will be thus omitted.

The vibration dampener includes a horizontal vibration dampener 220400 and a vertical vibration dampener 220500.

The horizontal vibration dampener 220400 includes a first structure 220400*a* formed on the printing roll frame 220220 supporting the printing roll 220200, and a second structure 220400*b* formed on the substrate stage frame 220320 supporting the substrate stage 220300. When the first structure 220400*a* and the second structure 220400*b* are engaged, horizontal vibration of the printing roll 220200 is prevented or reduced.

The first structure 220400*a* has a shape having a curved surface and the second structure 220400*b* has a shape including an inclined surface. For example, the first structure may have a spherical shape while the second structure 220400*b* may have a triangular shape.

In FIG. 31, the first structure 220400*a* is illustrated as formed on an outer surface of the printing roll frame 220220, and the second structure 220400*b* is formed on an outer surface of the substrate stage frame 220320. However, the first structure 220400*a* may be formed on the inner surface of the printing roll frame 220220, and the second structure 220400*b* may be formed on the inner surface of the substrate stage frame 220320.

The vertical vibration dampener 220500 includes a third structure 220500*a* formed on the printing roll frame 220220 supporting the printing roll 220200, and a fourth structure 220500*b* formed on the substrate stage frame 220320 supporting the substrate stage 220300. When the third structure 220500*a* and the fourth structure 220500*b* are connected, vertical vibration of the printing roll 220200 is prevented or reduced. The third structure 220500*a* has a projection or a recess shape, and the fourth structure 220500*b* has a recess or a projection shape. More particularly, the shapes of the third structure 220500*a* and the fourth structure 220500*b* are complementary. When the third structure 220500*a* has a projection shape, the fourth structure 220500*b* has a recess shape, and when the third structure 220500*a* has a recess shape, the fourth structure 220500*b* has a projection shape. For the purposes of illustration, in FIG. 31 the third structure 220500*a* is illustrated as a projection having a triangular shape while the fourth structure 220500*b* is illustrated as a recess having a triangular shape. The third structure 220500*a* and the fourth structure 220500*b* may have other complementary or engaging shapes.

In FIG. 31, the third structure 220500*a* is illustrated as formed on the outer surface of the printing roll frame 220220, and the fourth structure 220500*b* is illustrated as formed on the outer surface of the substrate stage frame 220320. However, the third structure 220500*a* may be formed on the inner surface of the printing roll frame 220220, and the fourth structure 220500*b* may be formed on the inner surface of the substrate stage frame 220320.

Hereinafter, with reference to FIGS. 32A and 32B, a method for reducing horizontal vibration of the printing roll 220200 through the engagement of the first structure 220400*a* and the second structure 220400*b* and a method for reducing vertical vibration of the printing roll 220200 through the connection of the third structure 220500*a* and the third structure 220500*b* will be described.

First, the method for reducing horizontal vibration of the printing roll 220200 is described.

As illustrated in FIG. 32A, the first structure 220400*a* having the shape of a spherical bearing is formed on the printing roll frame 220220, and the second structure 220400*b* having a triangular shape is formed on the substrate stage frame 220320.

As illustrated in FIG. 32B, the second structure 220400*b* moves upward and the inclined surface of the second structure 220400*b* contacts the curved surface of first structure 220400*a*, thereby preventing or reducing horizontal vibration of the printing roll 220200.

The engagement of the first and second structures 220400*a* and 220400*b* of the horizontal vibration dampener is performed when the printing roll 220200 and the anilox roll 220100 are engaged with each other and rotated therewith while a designated material is supplied from the anilox roll 220100 to the printing roll 220200. After supply of the designated material to the printing roll 220200 is completed, the second structure 220400*b* moves downwardly and separates from the first structure 220400*a* to allow the printing roll 220200 to be separated from the anilox roll 220100 as illustrated in FIG. 32A. The anilox roll 220100 moves on the substrate stage 220300, depositing the designated material on a substrate mounted on the substrate stage 220300.

Next, the method for reducing vertical vibration of the printing roll 220200 is described.

As illustrated in FIG. 32B, the third structure 220500*a* having a projection shape is formed on the printing roll frame 220220, and the fourth structure 220500*b* having a recess shape is formed on the substrate stage frame 220320.

As illustrated in FIG. 32B, the fourth structure 220500*b* is rotated to contact the third structure 220500*a*, thereby preventing or reducing vertical vibration of the printing roll 220200. If the third structure 220500*a* and the fourth structure 220500*b* have complementary shapes, the third structure 220500*a* and the fourth structure 220500*b* may fit together to engage each other when contacting each other.

The connection of the third and fourth structures 220500*a* and 220500*b* of the vertical vibration dampener is performed when the printing roll 220200 and the anilox roll 220100 are engaged with each other and rotated therewith so that the designated material is supplied from the anilox roll 220100 to the printing roll 220200. Thereafter, the fourth structure 220500*b* is rotated and separated from the third structure 220500*a* to allow the printing roll 220200 to separate from the anilox roll 220100. The printing roll 220200 moves on the substrate stage 220300 depositing the designated material on the substrate mounted on the substrate stage 220300.

Hereinafter, a roll printing method using the roll printing device of the second embodiment will be described.

First, the printing roll 220200 is fixed to prevent or reduce vibration.

The fixation of the printing roll 220200 is performed by at least one of the method for reducing horizontal vibration of the printing roll 220200 and the method for reducing vertical vibration of the printing roll 220200.

That is, the printing roll 220200 is fixed using at least one of the method for reducing horizontal vibration of the printing roll 220200 by engaging the first structure 220400*a* having the curved surface formed on the printing roll frame 220220 with the second structure 220400*b* having the inclined surface formed on the substrate stage frame 220320 and the method for reducing vertical vibration of the printing roll 220200 by connecting the third structure 220500*a* having the projection or recess shape formed on the printing roll frame 220220 and the fourth structure 220500*b* having the recess or projection shape formed on the substrate stage frame 220320.

Once the printing roll is fixed, the dispenser supplies the designated material to the rotating anilox roll 220100.

The anilox roll 220100 supplies the designated material to the printing roll 220200, which is engaged with the anilox roll 220100 and rotated therewith.

The dispensing of the designated material to the anilox roll 220100 and the supply of the designated material from the anilox roll 220100 to the printing roll 220200 may be performed simultaneously.

By using the doctor roll engaged with the anilox roll 220100 and rotated therewith, or the doctor blade contacting the anilox roll 220100, the designated material is uniformly supplied to the printing roll 220200 from the anilox roll 220100.

Thereafter, the fixation of the printing roll 220200 is released.

The release of the fixation of the printing roll 220200 is performed by releasing the connection performed by the method for reducing horizontal vibration of the printing roll 220200 or the method for reducing vertical vibration of the printing roll 220200.

That is, when the fixation of the printing roll 220200 is performed by the horizontal vibration reducing method, the fixation of the printing roll 220200 may be released by releasing the engagement of the first structure 220400*a* having the curved surface formed on the printing roll frame 220220 and the second structure 220400*b* having the inclined surface formed on the substrate stage frame 220320.

When the fixation of the printing roll 220200 is performed by the vertical vibration reducing method, the fixation of the printing roll 220200 may be released by releasing the connection of the third structure 220500*a* having the projection or recess shape formed on the printing roll frame 220220 and the fourth structure 220500*b* having the recess or projection shape formed on the substrate stage frame 220320.

Thereafter, the printing roll 220200 moves on the substrate stage depositing the designated material on the printing roll 220200 onto the substrate mounted on the substrate stage 220300.

By moving the printing roll 220200 rather than the substrate stage 220300, the space occupied by the roll printing device does not increase when the size of the substrate is increased. Further, by employing the horizontal and vertical vibration dampeners 220400 and 220500 while the printing roll 220200 and the anilox roll 220100 are engaged, vibration of the printing roll 220200 can be eliminated or reduced.

A method for manufacturing liquid crystal display device will be described hereinafter.

First, a lower substrate and an upper substrate are prepared.

The elements for the lower substrate and the upper substrate are appropriately formed and arranged according to the driving mode of the liquid crystal display device.

In particular, when the liquid crystal display device is a Twisted Nematic (TN) mode device, gate lines and data lines that cross substantially perpendicularly to define pixel regions on the lower substrate; TFTs (thin film transistors) are formed at the crossings of the gate lines and the data lines to serve as switching elements; and pixel electrodes are formed in the pixel regions and connected to a TFT to serve as electrodes to form an electric field. A light shielding layer to prevent light leakage, color filter layers to form colors; and common electrodes to serve as electrodes to form the electric field are formed on the upper substrate of the TN mode device.

When the liquid crystal display device is an In Plane Switching (IPS) mode device, gate lines and data lines are formed that cross substantially perpendicularly intersect to define pixel regions on the lower substrate; TFTs are formed at the crossings of the gate lines and the data lines to server switching elements; and pixel electrodes and common electrodes are formed in the pixel regions to serve as pairs of electrodes to form an electric field therebetween. A light shielding layer to prevent light leakage and color filter layers to form colors are formed on the upper substrate of the IPS mode device.

Thereafter, an orientation film is deposited on at least one of the lower and upper substrates.

Depositing the orientation film employs the above-described roll printing method, which uses an orientation material as the designated material.

After the deposition of the orientation film, the orientation film is given a uniform orientation direction using a rubbing method or a light irradiating method.

Thereafter, a liquid crystal layer is formed between the lower and upper substrates.

The formation of the liquid crystal layer may be achieved by an injection method or a liquid crystal dispensing or dropping method.

In the injection method, a sealant is deposited or formed on one of the lower and upper substrates to form a sealant layer having an injection port; the two substrates are bonded to each other; and liquid crystal is injected into a space between the bonded substrates through the injection port.

In the liquid crystal dispensing method, a sealant is deposited or formed on one of the upper and lower substrates; liquid crystal, is dropped on one of the upper and lower substrates; and the two substrates are bonded to each other.

As described above, the embodiments of the present invention provide advantages as follows.

First, by moving the printing roll rather than the substrate stage 220300, the space occupied by the roll printing device does not increase when the size of the substrate is increased.

Secondly, by using the horizontal and vertical vibration dampeners, it is possible to prevent or reduce vibration of the printing roll when the printing roll is engaged with an anilox roll and rotated therewith, facilitating uniform printing of a designated material onto the printing roll.

Figure 33:
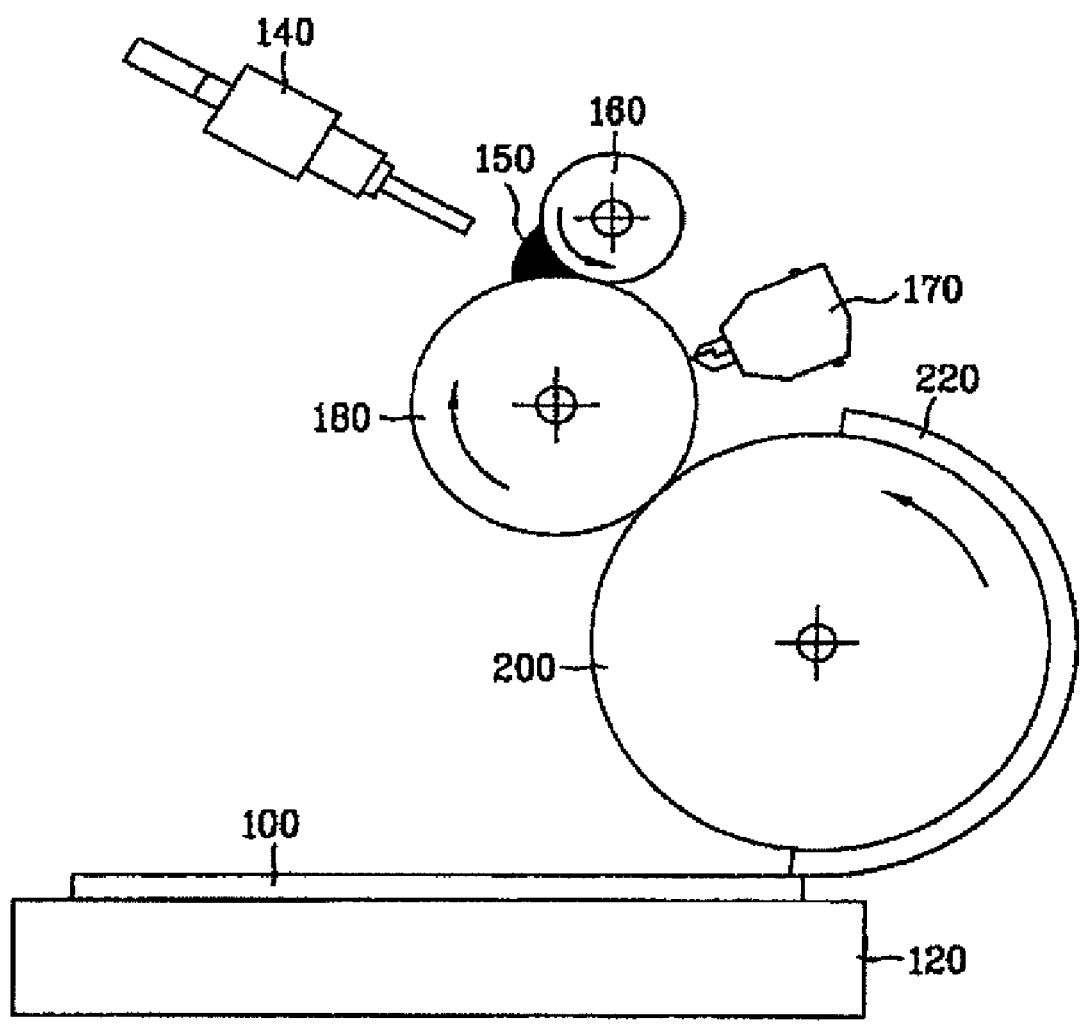
FIG. 33 is a sectional view illustrating a roll printing device according to a first embodiment of the present invention.

FIG. 33 is a sectional view illustrating a roll printing device according to a first embodiment of the present invention.

As illustrated in FIG. 33, the roll printing device according to the first embodiment of the present invention includes a dispenser 230140, a doctor roll 230160, a doctor blade 230170, an anilox roll 230180, a printing roll 230200, and a substrate stage 230120.

The dispenser 230140 serves to dispense a predetermined material to the anilox roll 230180, and is arranged to dispense the predetermined material between the anilox roll 230180 and the doctor roll 230160.

The anilox roll 230180 receives the predetermined material dispensed from the dispenser 230140 and moves the received material to the printing roll 230200. The predetermined material is uniformly coated on the anilox roll 230180 by the doctor roll 230160 and the doctor blade 230170 and then moves to the printing roll 230200.

The printing roll 230200 serves to coat the predetermined material on a substrate 230100 mounted on the substrate stage 230120 after receiving the predetermined material from the anilox roll 230180. The printing roll 230200 is attached with a printing mask 230220 suitable for a coating pattern of the predetermined material.

The substrate stage 230120 serves to receive the substrate 230100 below the printing roll 230200.

The doctor roll 230160 uniformly coats the predetermined material on the anilox roll 230180 while rotating in engagement with the anilox roll 230180.

The doctor blade 230170 is in contact with the anilox roll 230180 to uniformly coat the predetermined material on the anilox roll 230180 in the same manner as the doctor roll 230160.

If both the doctor blade 230170 and the doctor roll 230160 are used, it is possible to minimize uneven coating generated if the doctor roll 230160 is only used as in the related art.

In other words, even though a problem occurs in that pressure in the center portion between the doctor roll 230160 and the anilox roll 230180 decreases and thus it fails to uniformly coat the predetermined material on the center portion of the anilox roll 230180 as the size of the substrate increases, such a problem can be solved by the doctor blade 230170. Also, even though a problem occurs in that a predetermined portion of the doctor roll 230160 is abraded by its repeated use, such a problem can be solved by the doctor blade 230170.

The doctor blade 230170 may only be used to solve the problems of the doctor roll 230160. However, in such case, since a contact area between the doctor blade 230170 and the anilox roll 230180 is smaller than a contact area between the doctor roll 230160 and the anilox roll 230180, it is necessary to rotate the anilox roll 230180 several times for uniform coating of the predetermined material, whereby the process time increases. Also, a problem occurs in that bubbles are generated in the predetermined material if the doctor blade 230170 is only used.

Accordingly, in the present invention, both the doctor roll 230160 and the doctor blade 230170 are used to solve the problems occurring as the doctor roll 230160 or the doctor blade 230170 is only used. As a result, it is possible to uniformly coat the predetermined material on the anilox roll 230180.

A roll printing method using the roll printing device according to the first embodiment of the present invention will now be described.

First, the dispenser 230140 dispenses the predetermined material between the doctor roll 230160 and the anilox roll 230180, which are rotating.

Then, the dispensed material is uniformly coated on the anilox roll 230180. Such uniform coating is performed by the doctor roll 230160 and the doctor blade 230170, wherein the doctor roll 230160 is rotating in engagement with the anilox roll 230180 and the doctor blade 230170 is in contact with the anilox roll 230180.

Afterwards, the anilox roll 230180 supplies the material to the printing roll 230200 rotating in engagement with the anilox roll 230180.

The printing roll 230200 coats the material on the substrate 230100 mounted on the substrate stage 230120. Such coating may be performed by either moving the substrate stage 230120 in a predetermined direction or moving the printing roll 230200 on the substrate stage 230120. If the size of the substrate 230100 increases, it is preferable to move the printing roll 230200 because the space occupied by the substrate stage is decreased.

Figure 34:
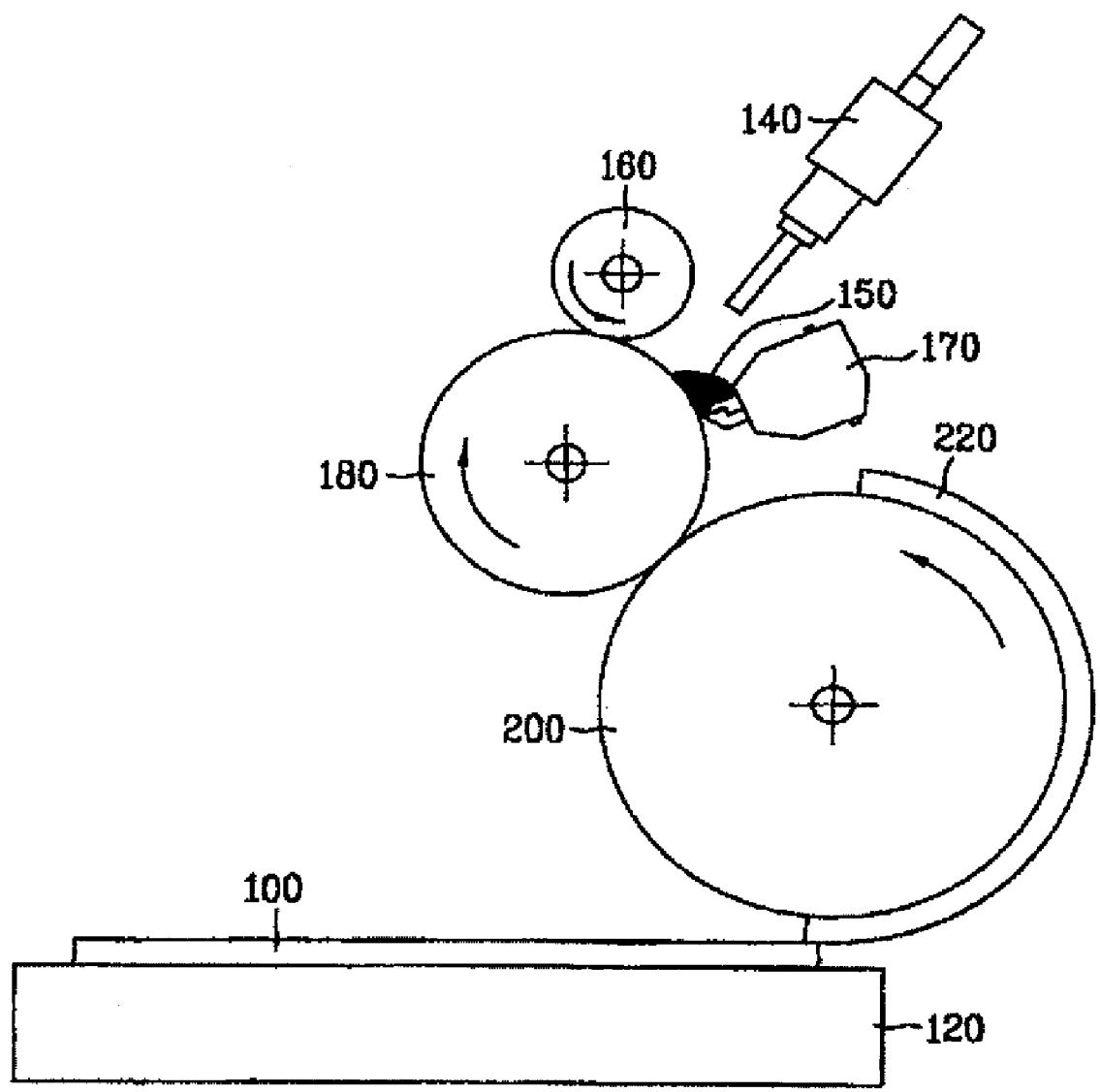
FIG. 34 is a sectional view illustrating a roll printing device according to a second embodiment of the present invention.

FIG. 34 is a sectional view illustrating a roll printing device according to a another embodiment of the present invention.

The roll printing device according to the second embodiment of the present invention is different from the roll printing device according to the first embodiment of the present invention in that the dispenser 230140 is arranged to dispense a predetermined material 230150 not between the anilox roll 230180 and the doctor roll 230160 but between the anilox roll 230180 and the doctor blade 230170.

Likewise, the roll printing method according to the second embodiment of the present invention is different from the roll printing method according to the first embodiment of the present invention in that the dispenser 230140 is arranged to dispense a predetermined material 230150 not between the anilox roll 230180 and the doctor roll 230160 but between the anilox roll 230180 and the doctor blade 230170.

Accordingly, the same reference numbers has been used throughout the drawings to refer to the same or like parts, and their detailed description will be omitted.

Figure 35:
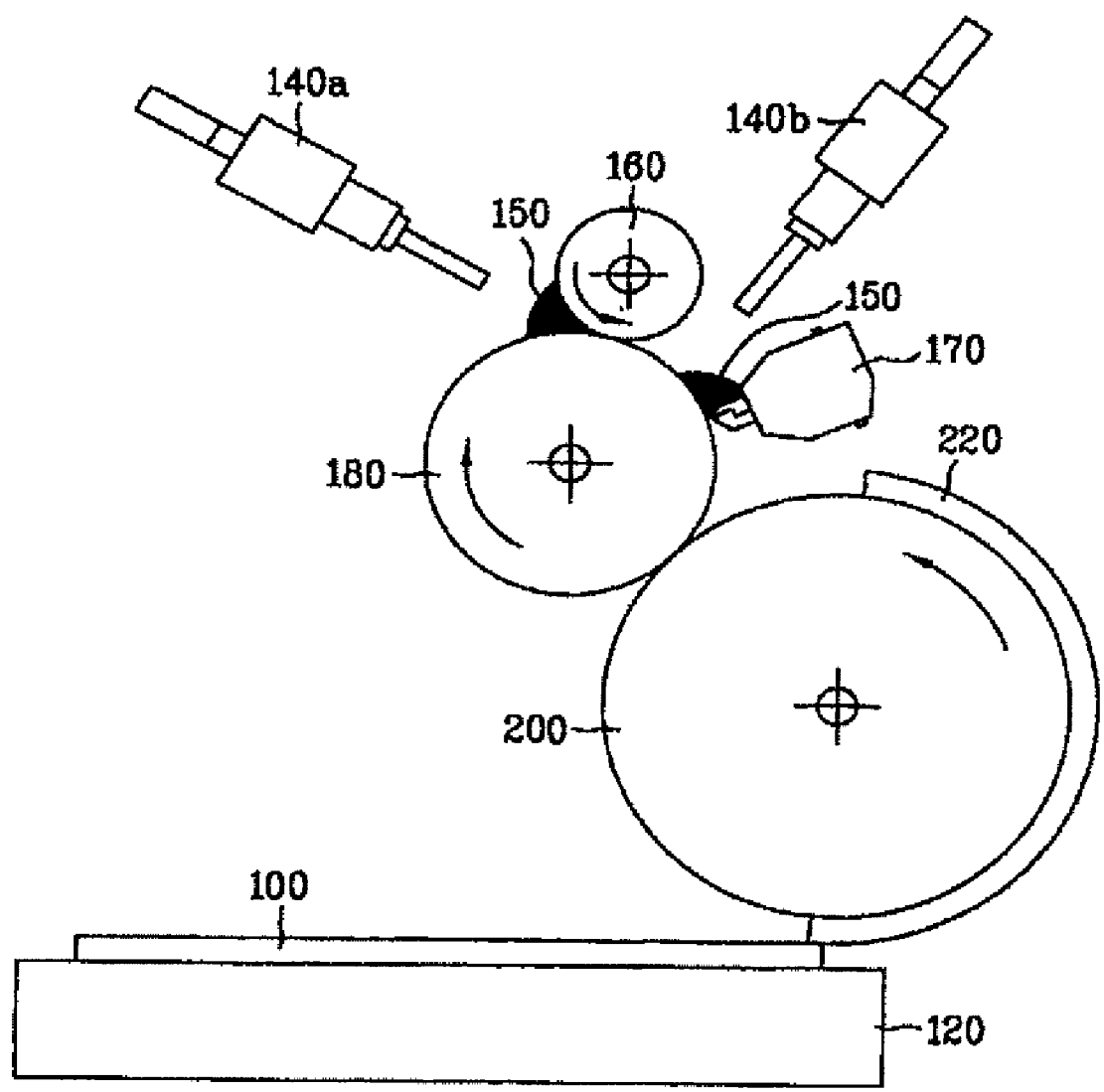
FIG. 35 is a sectional view illustrating a roll printing device according to a third embodiment of the present invention.

FIG. 35 is a sectional view illustrating a roll printing device according to another embodiment of the present invention.

The roll printing device according to the third embodiment of the present invention is different from the roll printing device according to the first embodiment of the present invention in that a first dispenser 230140a is arranged to dispense a predetermined material 230150 between the anilox roll 230180 and the doctor roll 230160 and a second dispenser 230140b is arranged to dispense the predetermined material 230150 between the anilox roll 230180 and the doctor blade 230170.

Likewise, the roll printing method according to the third embodiment of the present invention is different from the roll printing method according to the first embodiment of the present invention in that a process of dispensing a predetermined material from a dispenser includes dispensing the predetermined material 230150 between the anilox roll 230180 and the doctor roll 230160 and dispensing the predetermined material 230150 between the anilox roll 230180 and the doctor blade 230170.

Accordingly, the same reference numbers has been used throughout the drawings to refer to the same or like parts, and their detailed description will be omitted.

A method of fabricating an LCD device will be described hereinafter.

First, lower and upper substrates are prepared depending on a driving mode of the LCD device.

In a case of a twisted nematic (TN) mode LCD device, the lower substrate includes gate and data lines crossing each other to define a pixel region, a thin film transistor formed at a crossing portion of the gate and data lines and serving as a switching device, and a pixel electrode formed in the pixel region, serving as one electrode for an electric field. The upper substrate includes a light-shielding layer shielding light leakage, a color filter layer for displaying color, and a common electrode serving as one electrode for an electric field.

In a case of an in-plane switching (IPS) mode LCD device, the lower substrate includes gate and data lines crossing each other to define a pixel region, a thin film transistor formed at a crossing portion of the gate and data lines and serving as a switching device, and a pair of pixel and common electrodes formed substantially in parallel in the pixel region, serving as a pair of electrodes for an electric field to form a transverse electric field. The upper substrate includes a light-shielding layer shielding light leakage, and a color filter layer for displaying color.

Afterwards, an alignment layer is coated on at least one of the lower and upper substrates using the aforementioned roll printing method. In this case, an alignment material is used as a predetermined material.

Then, an alignment direction of the alignment layer is uniformly aligned using a rubbing alignment method or a photo-alignment method.

A liquid crystal layer is formed between the substrates by a vacuum injection method or a liquid crystal dropping method.

The vacuum injection method includes forming a sealant having an injection hole on any one of the substrates, bonding the substrates to each other, and injecting a liquid crystal into the bonded substrates through the injection hole of the sealant.

The liquid crystal dropping method includes forming a sealant on any one of the substrates, dropping a liquid crystal onto any one of the substrates, and bonding the substrates to each other.

As described above, the roll printing device, the roll printing method, and the method of fabricating the LCD device using the same according to the present invention have the following advantages.

First, the problems of the doctor roll can be solved by the doctor blade.

In other words, even though the problem occurs in that the pressure in the center portion between the doctor roll and the anilox roll decreases and thus it fails to uniformly coat the predetermined material on the center portion of the anilox roll as the size of the substrate increases, such a problem can be solved by the doctor blade. Also, even though the problem occurs in that the predetermined portion of the doctor roll is abraded by its repeated use, such a problem can be solved by the doctor blade.

In addition, the problems of the doctor blade can be solved by the doctor roll.

In other words, since the contact area between the doctor blade and the anilox roll is smaller than that between the doctor roll and the anilox roll, it is necessary to rotate the anilox roll several times for uniform coating of the predetermined material, whereby the process time increases. In this case, it is possible to reduce the process time by using both the doctor blade and the doctor roll. Also, the problem occurs in that bubbles are generated in the predetermined material if only the doctor blade is used. Since the bubbles are removed by rotation of the doctor roll, it is possible to uniformly coat the predetermined material on the anilox roll.

A liquid crystal display (LCD) device displays information on a screen using a refractive index anisotropy of a liquid crystal, wherein a signal applied to a liquid crystal layer changes an arrangement direction of the liquid crystals to control a transmissivity of light passing through the liquid crystal layer, thereby displaying images.

As noted earlier, the alignment layer of the LCD panel, which is formed of polyimide or polyamide, may be coated using a spin coating or a screen printing. The coated alignment layer is then dried for a certain time and thereafter its alignment direction is determined by a rubbing process.

Figure 36:
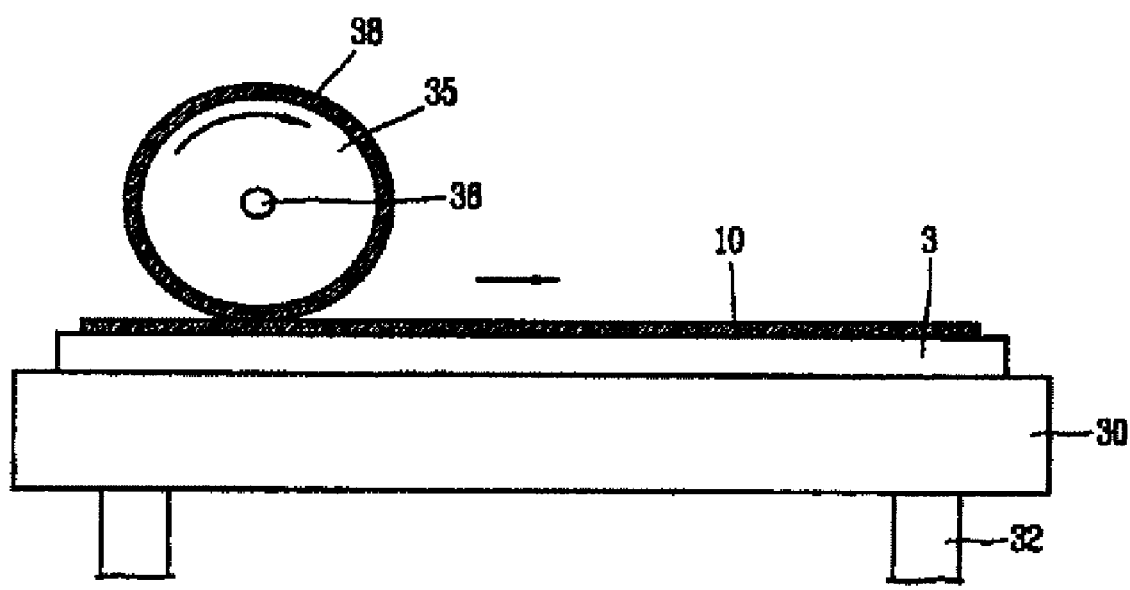
FIG. 36 is a conceptual view illustrating a rubbing process.

The rubbing process is performed by use of a rubbing roll wound with a rubbing cloth. FIG. 36 is a conceptual view illustrating the rubbing of the alignment layer.

As illustrated in FIG. 36, the rubbing can be performed such that a substrate 2403 having an alignment layer 24010 is put on a rubbing table 24030 that is supported by a plurality of legs 24032, and then a rubbing roll 24035 is rotated in contact with the alignment layer 24010 to form microgrooves on the alignment layer 24010, thereby providing an alignment controlling force or surface fixing force to the alignment layer 24010.

A rubbing cloth 24038 is wound on the surface of the rubbing roll 24035 to form the microgrooves on the alignment layer 24010 by rubbing against the alignment layer 24010. At this time, the rubbing roll 24035 is rotated around a rotational shaft 24036 and moved along the alignment layer 24010 in a certain direction.

A rubbing apparatus for performing the rubbing according to the present invention will now be explained with reference to the attached drawings.

Figure 37:
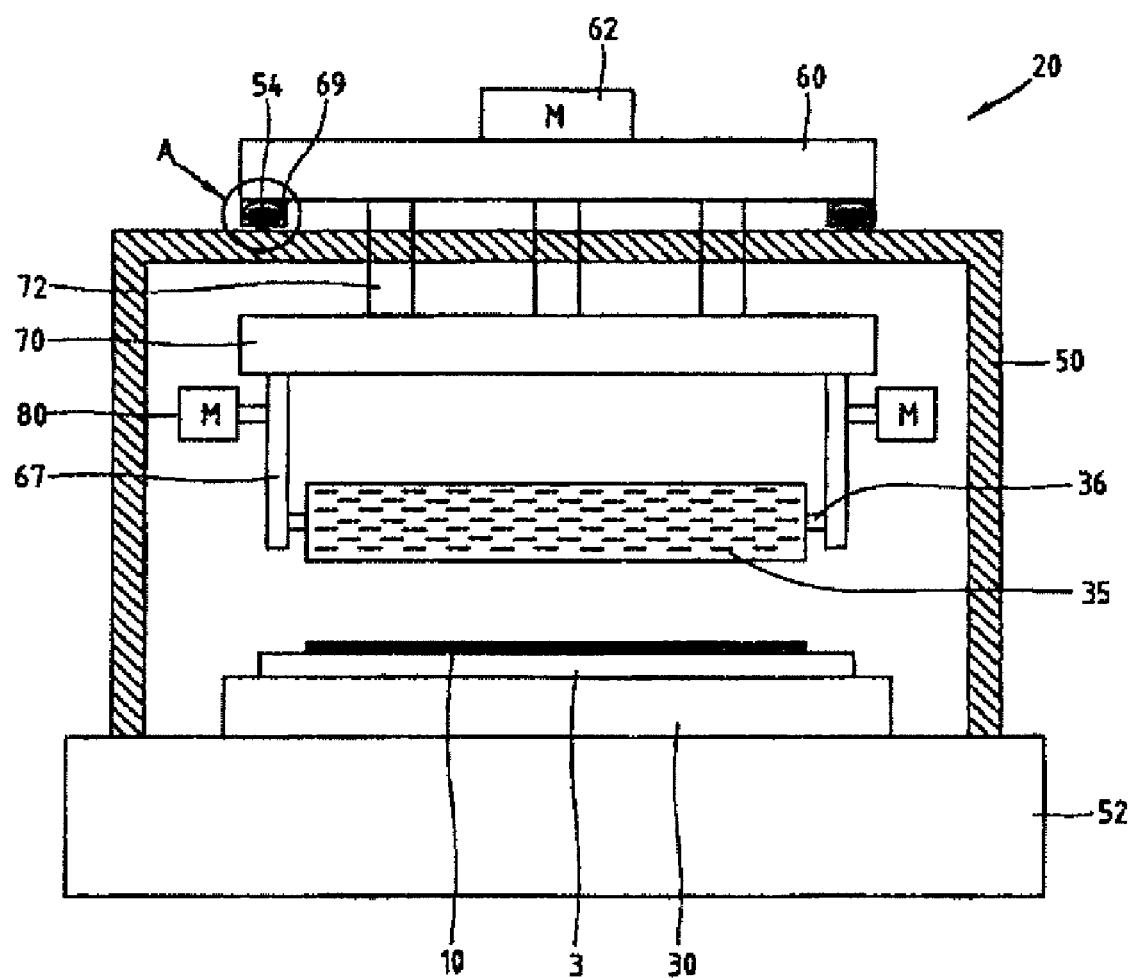
FIG. 37 is a view illustrating a structure of a rubbing apparatus according to the present invention.

FIG. 37 is a view illustrating a rubbing apparatus 24020 according to the present invention. As illustrated in FIG. 37, a rubbing apparatus 24020 includes a base 24052, a frame 24050 installed on the base 24052, a head 24060 disposed at an upper portion of the frame 24050 for rotation, a supporting member 24070 installed within the frame 24050 and connected to the head 24060 through shafts 24072, an ascending and descending unit 24067 connected to the supporting member 24070 to raise and lower the rubbing roll 24035, an R-guide 24054 disposed at an upper portion of the frame 24050, a Linear Motion (LM) block 24069 having a guide groove into which the R-guide 24054 is inserted, and a rubbing table 24030 disposed inside the frame 24050 on the base 24052.

Figure 38A:
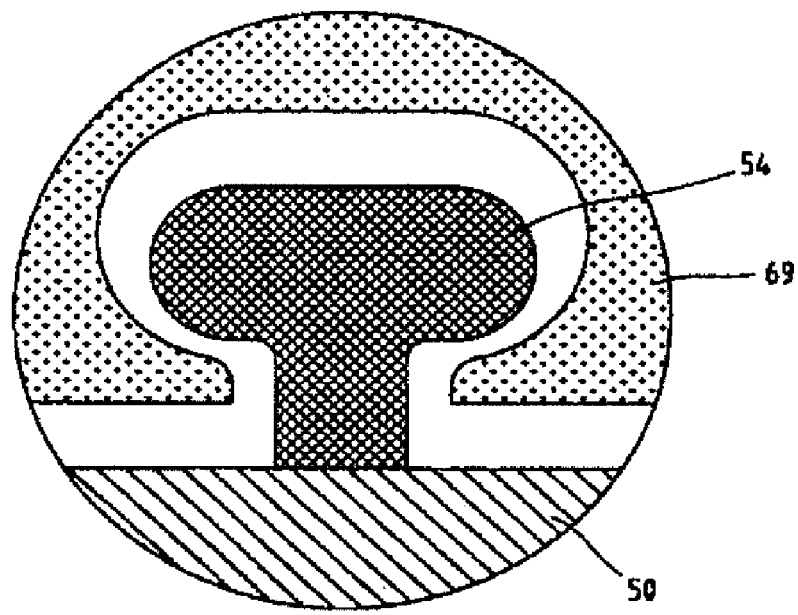
FIG. 38A is an enlarged view of a region A of FIG. 37, which illustrates an R-guide and an linear motion block of the rubbing apparatus according to the present invention.

A motor 24062 is disposed on the head 24060. The head 24060 is rotated by the motor 24062. Here, the R-guide 24054 is coupled to the guide groove formed in the LM block 24069 to thus guide the head 24060 to be rotated. FIG. 38*a* illustrates a state where the R-guide 24054 is coupled to the LM block 24069. Although not illustrated, a ball or roller is inserted into the LM block 24069 to thus prevent a generation of friction when the R-guide 24054 is inserted into the LM block 24069 and then moved.

Figure 38B:
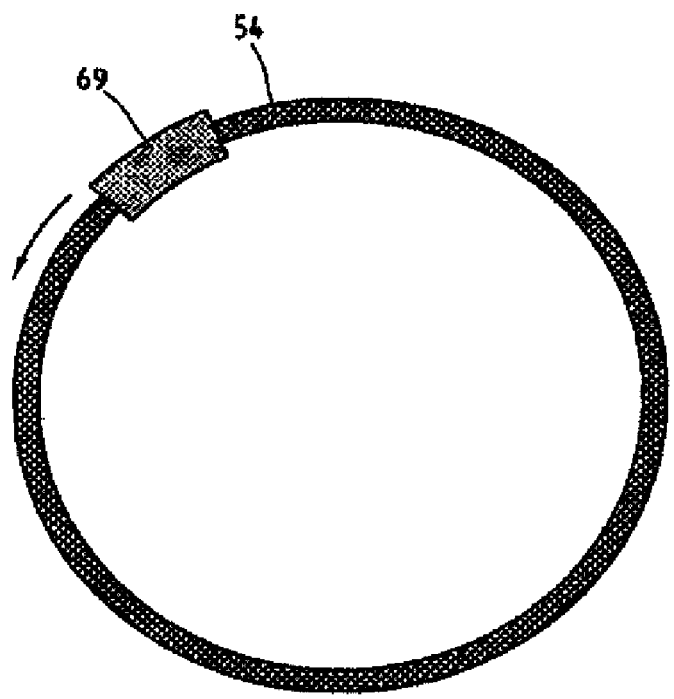
FIG. 38B is a plane view illustrating the R-guide and the linear motion block in the rubbing apparatus according to the present invention.

FIG. 38*b* is a plane view illustrating a state where the R-guide 24054 disposed at the upper portion of the frame 24050 is coupled to the LM block 24069. As illustrated in FIG. 38*b*, the R-guide 24054 is disposed at the upper portion of the frame 24050 in a circular shape. The LM block 24069 rotates at the upper portion of the frame 24050 along the R-guide 24054. The LM block 24069 is installed at both ends of the head 24060, and accordingly the rotational motion of the LM block 24069 corresponds to that of the head 24060.

The head 24060, on the other hand, is connected to the supporting member 24070 via the shafts 24072. Here, a space in which the shafts 24072 are inserted and moved are formed at the upper portion of the frame 24050. Because the head 24060 is rotated, the shafts 24072 also drive the rotational motion. Accordingly, the space for the rotational motion of the shafts 24072 is formed in the upper portion of the frame 24050.

The supporting member 24070 supports the rubbing roll 24035. The supporting member 24070 is provided with the ascending and descending units 24067 to raise and lower the rubbing roll 24035. Although not illustrated in detail, the ascending and descending unit 24067 is provided with a linear motion motor, a linear motor, a rack and pinion, or the like. As the motor 24080 is driven, the ascending and descending units 24067 raise and lower the rubbing roll 24035.

The rotation of the head 24060 rotates the supporting member 24070 connected to the head 24060. Also, the rotation of the supporting member rotates the rubbing roll 24035. The rubbing roll 24035 is rotated for the following reason. In general, the alignment layers are formed in a direction diagonal to the substrate (but also may be formed in another direction), and the alignment direction depends on mode and/or size of LCD device. Hence, in order to implement different alignment directions, namely, in order to implement different rubbing directions, the rubbing roll 24035 may be rotated by a certain angle for its rubbing operation.

The rubbing apparatus according to the present invention having such configuration can be characterized by disposing the head 24060 at the upper portion of the frame 24050 and can be understood as follows.

Recently, the increases in the area of LCD panels increases the area of the alignment layer formed on the LCD panel that accordingly leads to an increase of the size and weight of the head 24060 as well as the size and weight of the rubbing roll 24035 which rubs the alignment layer 24010. Thus, due to the increase of the weight of the rubbing roll 24035 and that of the head 24060, the rubbing apparatus 24020 is affected by gravity. Here, the affect of gravity is due to the entire weight of the rubbing apparatus 24020 including the head 24060 as well as the weight of the rubbing roll 24035.

The rubbing roll 24035 sags due to gravity. When lowering the rubbing roll 24035 to contact the alignment layer 24010, it is impossible to uniformly maintain the interval between the rubbing roll 24035 and the alignment layer 24010. Hence, during the rubbing process the distance between the rubbing roll 24035 and the alignment layer 24010 is not uniform, and the alignment layer 24010 is defectively rubbed.

As illustrated in the present invention, when the head 24060 is disposed at the upper portion of the frame 24050, the weight of the head 24060 is applied to the frame 24050, which relatively decreases the weight applied to the rubbing roll 24035. Accordingly, the interval between the alignment layer 24010 and the rubbing roll 24035 may be maintained more uniformly. In addition, as the head 24060 is disposed at the upper portion of the rubbing roll 24035, the rubbing apparatus may stably be installed to thus minimize the affect of gravity.

Furthermore, the R-guide 24054 and the LM block 24069 guide the heavy head 24060 to be rotated on the frame 24050, and accordingly it is possible to adjust the rotation of the head 24060 more smoothly and accurately. That is, it is possible to prevent an unstable rotation of the head due to the weight thereof during the rotation of the head 24060.

Thus, when the substrate 2403 having the alignment layer 24010 is loaded on the rubbing table 24030 installed on the base 24052, the head 24060 is rotated by a desired angle along the R-guide based upon the driving mode and/or size of a fabricated LCD device, namely, based upon a direction of the rubbing executed on the alignment layer 24010. The head 24060 that has been rotated by the desired angle is then fixed by a fixing unit (not illustrated) formed at the frame 24050. In this way, as the head 24060 is rotated, the rubbing roll 24035 is rotated and then fixed. In this state, the motor 24080 of the ascending and descending unit 24067 is driven and thereby the ascending and descending unit 24067 is operated to raise and lower the roll 24035. Because the ascending and descending unit 24067 is provided with a linear motion motor, a linear motor or a rack and pinion, the problem in which the rubbing roll 24035 at the side of the ascending and descending unit 24067 is downwardly moved by gravity due to the heavy weight of the rubbing roll 24035 can be prevented. Therefore, when the rubbing roll 24035 is in contact with the alignment layer 24010, it is possible to always maintain a constant distance therebetween that results in enabling a rubbing of the alignment layer with a uniform force at any time. Thus, when of the rubbing roll 24035 contacts the alignment layer 24010, as the shaft 24036 of the rubbing roll 24035 is rotated by a motor (not illustrated), the rubbing roll 24035 is rotated. Simultaneously, the rubbing table 24030 (or the rubbing roll 24035) is moved along a desired rubbing direction so as to form microgrooves on the alignment layer 24010.

Thus, in the present invention, because the head 24060 of the rubbing apparatus 24020 is disposed at the upper portion of the frame 24050, most loads are applied to the frame 24050 and thereby a load which is actually applied to the rubbing roll 24035 can be decreased. Hence, it is possible to improve stability of the rubbing apparatus 24020 and also to prevent a sagging or downward movement of the rubbing roll 24035 due to gravity, thereby enabling the rubbing of the alignment layer 24010 with a uniform force at any time.

As described above, in the present invention, the head of the rubbing apparatus is installed at the upper portion of the frame and thus the weight of the rubbing apparatus is partially supported by the frame. Hence, the affect of the weight of the head may be minimized to thus allow the rubbing apparatus to be stably installed. Also, by maintaining a uniform distance between the rubbing roll and the alignment layer, the alignment layer may be rubbed by a uniform force. In addition, in the present invention, the R-guide is used to guide the head to be rotated, that results in an accurate, smooth rotation of the rubbing roll.

On the other hand, in the aforementioned explanation, the specific structure of the rubbing apparatus according to the present invention has been illustrated, which does not, however, limit the scope of the present invention but is for a convenient explanation. For example, in the aforementioned explanation, the R-guide and the LM block were used to guide the head to be rotated, but the structure is not limited on a use of a guide having the specific structure. Various types of guides can be adapted if they can stably rotate the head. In addition, the ascending and descending unit connected to the supporting member does not have to be limited to the motor having the specific structure. Rather, if it can raise and lower the rubbing roll without deforming the rubbing roll, any structure can be adapted.

The rubbing process is performed by a rubbing roll on which a rubbing material is wound, and a rubbing system for an alignment of an LCD device will be explained with reference to FIGS. 36 and 39.

Figure 39:
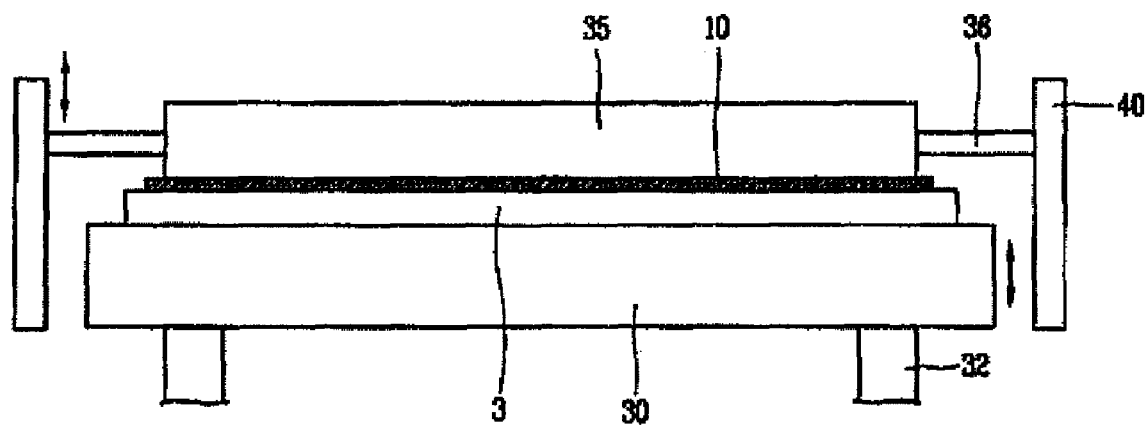
FIG. 39 illustrates a structure of a rubbing system for an alignment layer of an LCD device according to the present invention.

As illustrated in FIGS. 36 and 39, the rubbing system for an alignment layer of an LCD device comprises a rubbing table 24030 on which a substrate 2403 having an alignment layer 24010 thereon is positioned and supported by a plurality of legs 24032; and a rubbing roll 24035 positioned on the rubbing table 24030, substantially contacting the alignment layer 24010 on the substrate 2403 by being lowered, and forming microstructures on the alignment layer 24010 by rotation of the rubbing roll, for providing an alignment controlling force or a surface fixing force to the alignment layer 24010.

A rubbing material 24038 contacting the alignment layer 24010 and forming microstructures on the alignment layer 24010 may be wound on the rubbing roll 24035. The rubbing roll 24035 may be rotated centering around a rotation shaft 24036, and is moved on the alignment layer 24010 in an appropriate direction.

Figure 40:
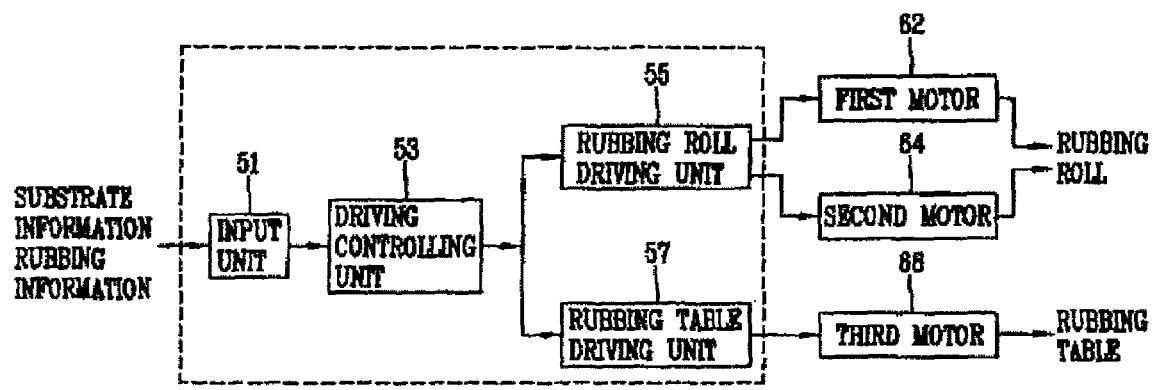
FIG. 40 is a block diagram illustrating a structure of a controlling unit of the rubbing system for an alignment layer of an LCD device according to the present invention.

Although not illustrated in FIG. 36 but illustrated in FIG. 40, the rubbing table 24030 is provided with a motor for contacting the alignment layer 24010 formed on the substrate 2403 to the rubbing roll 24035 by lifting or lowering the rubbing table 24030. The motor is installed substantially at the leg 24032 of the rubbing table 24030, so that the rubbing table 24030 is lifted and lowered by lifting and lowering the leg 24032. However, the motor can be installed at another position. The rotation shaft 24036 of the rubbing roll 24035 is connected to a motor (not illustrated). As the motor is rotated, the rubbing roll 24035 is rotated. As illustrated in FIG. 39, a guide bar 24040 is substantially at both side surfaces of rotation shafts 24036. As the rotation shaft 24036 moves along the guide bar 24040 thus to lower the rubbing roll 24035, the alignment layer 24010 formed on the substrate 2403 substantially contacts the rubbing roll 24035.

As aforementioned, the alignment layer 24010 on the substrate 2403 positioned on the rubbing table 24030 substantially contacts the rubbing material 24038 of the rubbing roll 24035 by lifting and lowering the rubbing table 24030 and the rubbing roll 24035. A gap between the alignment layer 24010 and the rubbing roll 24035 may be controlled by lifting and lowering both the rubbing table 24030 and the rubbing roll 24035, thereby performing a substantially uniform and evenly distributed rubbing for the alignment layer 24010. The rubbing method has the following advantages.

First, the weight of the rubbing system is decreased. In the past, to move only the rubbing table required a bulky and heavy driving device. Accordingly, in the past, the entire size and weight of the rubbing table were increased. On the contrary, in the present invention, both the rubbing table 24030 and the rubbing roll 24035 are moved, a driving device installed at the rubbing table 24030 has a relatively small size (herein, a driving device installed at the rubbing roll 24035 is much smaller than the driving device of the rubbing table 24030) and thus the entire size and weight of the rubbing system are decreased.

Second, a gap between the alignment layer 24010 and the rubbing roll 24035 can be controlled to be substantially uniform. Since the gap between the alignment layer 24010 and the rubbing roll 24035 determines a pressure of the rubbing roll 24035 applied to the alignment layer 24010, the gap is a factor for determining a size of each microstructure formed on the alignment layer 24010. However, if the substrate 2403 becomes large, a width of the rubbing roll 24035 is increased and thus the heavy rubbing roll 24035 may be minutely bent by the force of gravity. Because of this, if the rubbing roll 24035 is in contact with the alignment layer 24010 by being moved up and down, the gap between the alignment layer 24010 and the rubbing roll 24035 may not be uniform. On the contrary, if both the rubbing table 24030 and the rubbing roll 24035 are moved, as in the present invention, the motion of the rubbing roll 24035 becomes relatively small. Accordingly, the gap between the alignment layer 24010 and the rubbing roll 24035 becomes substantially uniform at the time of rubbing thereby forming microstructures having a uniform size on the alignment layer 24010.

The rubbing table 24030 and the rubbing roll 24035 of the rubbing system are driven by a controlling unit. A structure of the controlling unit will be explained with reference to FIG. 40.

As illustrated in FIG. 40, the controlling unit 24050 may comprise an input unit 24051 for inputting information such as liquid crystal panel size, alignment layer type, a display mode of a liquid crystal panel, and other relevant data from outside (for example, a driving device array processing line or a color filter processing line); a driving controlling unit 24053 for outputting a signal for driving the rubbing table 24030 or the rubbing roll 24035 based on each information inputted by the input unit 24051; a rubbing roll driving unit 24055 for driving a first motor 24062 and a second motor 24064 according to a signal outputted from the driving controlling unit 24053; and a rubbing table driving unit 24057 for driving a third motor 24066 according to a signal outputted from the driving controlling unit 24053.

The driving controlling unit 24053 determines an alignment controlling force or a surface fixing force to be applied to the alignment layer 24010 on the basis of inputted information. The alignment controlling force varies according to the gap between the rubbing roll 24035 and the alignment layer 24010, that is, a rubbing intensity of the rubbing roll 24035. Therefore, the driving controlling unit 24053 calculates the gap between the rubbing roll 24035 and the alignment layer 24010, that is, the rubbing intensity according to the alignment controlling force. The alignment controlling force (or the rubbing intensity calculated based on the alignment controlling force) can be determined by the driving controlling unit 24053, or can be determined by an external unit and then inputted to the controlling unit 24050 by the input unit 24051.

The controlling unit 24050 judges a condition for moving the rubbing table 24030 and the rubbing roll 24035 up and down on the basis of inputted information, thereby moving the rubbing table 24030 and the rubbing roll 24035 up and down. The first motor 24062 driven by the rubbing roll driving unit 24055 rotates the rubbing roll 24035, and the second motor 24064 lifts and lowers the rubbing roll 24035 along the guide bar 24040.

The rubbing method for an alignment layer using the rubbing system will be explained in more detail.

Figure 41:
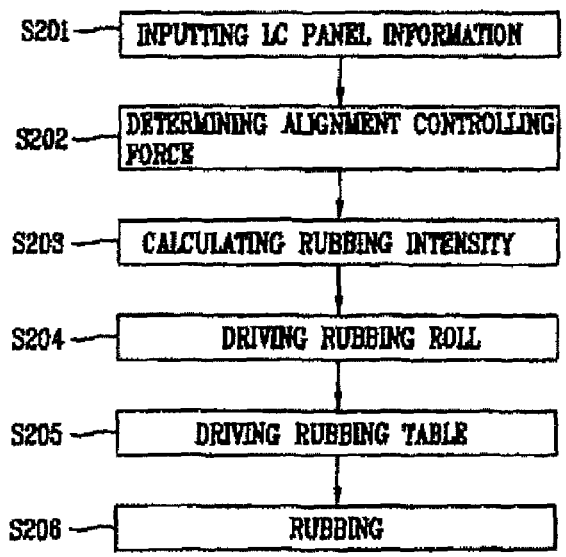
FIG. 41 is a flowchart illustrating a method for rubbing an alignment layer of an LCD device according to the present invention.

FIG. 41 is a flowchart illustrating a method for rubbing an alignment layer of an LCD device according to the present invention. As illustrated, a first substrate on which a thin film transistor and a pixel is formed by a driving device array process and a second substrate on which a color filter is formed by a color filter process are transferred to the rubbing system, and each kind of information relevant to the substrates is inputted (240S201). Herein, the substrate information may comprise liquid crystal panel area to be fabricated, a display mode, alignment layer material, and other parameters. The substrate information determines an alignment controlling force applied to the alignment layer, that is, a size of a microstructure. The driving controlling unit 24053 determines the alignment controlling force of the alignment layer on the basis of the substrate information, thereby calculating the gap between the alignment layer 24010 and the rubbing roll 24035, that is, the rubbing intensity of the rubbing roll 24035 applied to the alignment layer 24010 (240S202, 240S203).

Then, the driving controlling unit 24053 drives the rubbing roll 24035 and the rubbing table 24030 according to the rubbing intensity (240S204, 240S205). Herein, the rubbing roll 24035 and the rubbing table 24030 can be simultaneously driven, or the rubbing table 24030 can be driven after the rubbing roll 24035 is driven first.

The rubbing roll 24035 weighs less than the rubbing table 24030. Driving the rubbing roll 24035 rather than driving the rubbing table 24030 contributes to a fast driving speed and a small load applied to a driving motor, thereby reducing power consumption and noise. Since both side surfaces of the rubbing roll 24035 may be bent by gravity, it may not be easy to uniformly control the gap between the rubbing table 24030 and the rubbing roll 24035 by moving the rubbing roll 24035. Therefore, it may be desirable to move the rubbing table 24030 in order to control the gap between the rubbing table 24030 and the rubbing roll 24035. Thus, driving and moving are functions of convenience and practicality.

When the rubbing roll 24035 substantially contacts the alignment layer 24010 in consideration of each aforenoted advantage of the rubbing table 24030 and the rubbing roll 24035, the rubbing roll 24035 may be moved near the rubbing table 24030 by a certain distance thereby narrowing the gap therebetween. Then, the gap between the rubbing table 24030 and the rubbing roll 24035 may be controlled by driving the rubbing table 24030.

As the rubbing table 24030 and the rubbing roll 24035 are sequentially driven, the alignment layer 24010 and the rubbing roll 24035 quickly contact each other and the gap therebetween is uniformly controlled. When the alignment layer 24010 and the rubbing roll 24035 come in contact with each other, the alignment layer 24010 is rubbed by driving the rubbing roll 24035 (240S206). Although not illustrated, a substrate having undergone a rubbing treatment may be transferred to another processing line thus to be attached to another substrate. A liquid crystal layer is formed between the two substrates, thereby completing an LCD device.

As aforementioned, in the present invention, the gap between the alignment layer 24010 and the rubbing roll 24035 (that is, a function of the rubbing intensity) may be set according to predetermined information of a liquid crystal panel. Then, the rubbing roll 24035 may be moved to have a preset gap from the alignment layer 24010 by sequentially moving the rubbing roll 24035 and the rubbing table 24030. Then, the alignment layer 24010 is rubbed by rotating the rubbing roll 24035. When the substrate is positioned on the rubbing table 24030, both the rubbing table 24030 and the rubbing roll 24035 are driven thereby to control the gap between the alignment layer 24010 and the rubbing roll 24035. Accordingly, the gap between the alignment layer 24010 and the rubbing roll 24035 can be quickly and efficiently controlled, and a uniform gap therebetween can be maintained.

The rubbing table 24030 and the rubbing roll 24035 may be separately driven as opposed to simultaneously driven. If only the rubbing table 24030 is driven, the gap between the alignment layer 24010 and the rubbing table 24030 can be uniformly controlled, and thus microstructures having a uniform size can be formed on the entire alignment layer 24010. It may be desirable to drive only the rubbing table 24030 when a large pressure between the rubbing roll 24030 and the alignment layer 24010 is needed, that is, when a microstructure of a large size is to be formed.

When the rubbing roll 24035 is driven, the gap between the rubbing roll 24035 and the alignment layer 24010 can be quickly controlled and a size of a driving motor can be decreased since the rubbing roll 24035 is relatively lighter in weight and is more easily driven than the rubbing table 24030. Therefore, fabrication cost is reduced and noise is not generated.

The rubbing system according to the present invention can perform rubbing for the alignment layer 24010 by selectively driving the rubbing table 24030 or the rubbing roll 24035.

Figure 42:
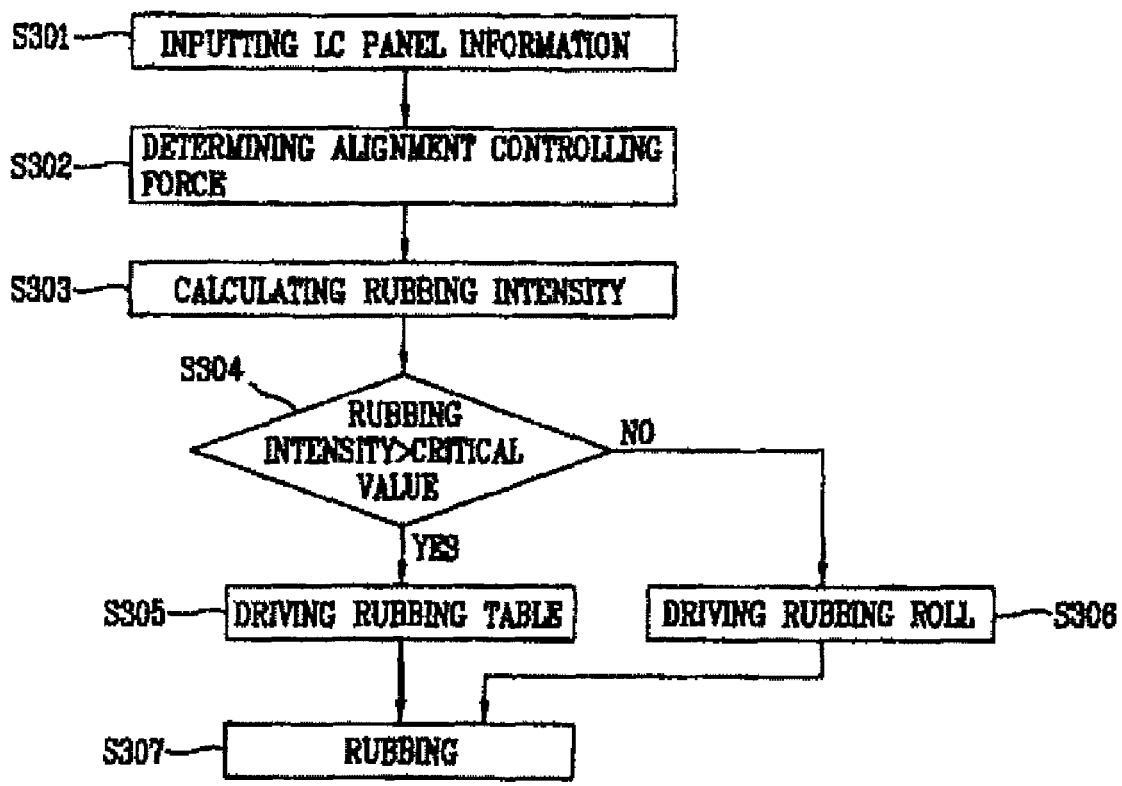
FIG. 42 is a flowchart illustrating a method for rubbing an alignment layer of an LCD device by selectively driving a rubbing table or a rubbing roll according to the present invention.

As illustrated in FIG. 42, a first substrate on which a thin film transistor and a pixel is formed by a driving device array process and a second substrate on which a color filter is formed by a color filter process are transferred onto the rubbing table 24030 of the rubbing system, and each kind of information relevant to the corresponding substrate is inputted (240S301). Herein, the substrate information may comprise liquid crystal panel area to be fabricated, a display mode, an alignment layer material, and other relevant parameters. The substrate information determines an alignment controlling force applied to the alignment layer, that is, a size of a microstructure.

The driving controlling unit 24053 determines the alignment controlling force of the alignment layer on the basis of the substrate information, thereby calculating the gap between the alignment layer 24010 and the rubbing roll

24035, that is, the rubbing intensity of the rubbing roll 24035 applied to the alignment layer 24010 (240S302, 240S303).

A rubbing intensity critical value may be stored in the driving controlling unit 24053. Such value is a critical value of the rubbing roll 24035 to be applied to the alignment layer 24010, by which the rubbing table 24030 or the rubbing roll 24035 is selected for driving. That is, the rubbing table 24030 is driven or the rubbing roll 24035 is driven according to whether the calculated rubbing intensity is larger than a critical value, thereby substantially contacting the rubbing roll 24035 with the alignment layer 24010.

As illustrated in FIG. 42, if the calculated rubbing intensity is smaller than the critical value, the driving controlling unit 24053 applies a signal to the rubbing roll driving unit 24055 thus to drive the second motor 24064. As a result, the rubbing roll 24035 is lowered to substantially contact the rubbing roll 24035 onto the alignment layer 24010 (240S306). On the contrary, if the calculated rubbing intensity is larger than the critical value, the driving controlling unit 24053 applies a signal to the rubbing table driving unit 24057 thus to drive the third motor 24066. As a result, the rubbing table 24030 is lifted to substantially contact the rubbing roll 24035 onto the alignment layer 24010 (240S305). When the rubbing roll 24035 and the alignment layer 24010 substantially contact each other, the first motor 24062 is driven to rotate the rubbing roll 24035 thereby to provide an alignment controlling force to the alignment layer 24010 (240S307).

The rubbing intensity is a function of several conditions and varies accordingly, especially, according to a display mode of the LCD device. For instance, regarding a twisted nematic (TN) mode, liquid crystal molecules arranged with a certain angle from a substrate are aligned in a substantially perpendicular direction to the substrate by an electric field applied to a liquid crystal layer. Therefore, a relatively small alignment controlling force may be effective. Accordingly, a small rubbing intensity may be preferred by increasing the gap between the alignment layer 24010 and the rubbing roll 24035.

In an In Plane Switching (IPS) mode device, liquid crystal molecules are rotated in a substantially horizontal direction to the surface of the substrate by an electric field applied to a liquid crystal layer. Therefore, a relatively large alignment controlling force may be effective. Accordingly, a large rubbing intensity may be preferred by decreasing the gap between the alignment layer 24010 and the rubbing roll 24035.

In a TN mode, a preset alignment controlling force, that is, a rubbing intensity may be smaller than a critical value. Therefore, the rubbing roll 24035 is lowered to substantially contact the alignment layer 24010 and then the rubbing roll 24035 is driven. In an IPS mode, the preset alignment controlling force, that is, the rubbing intensity may be larger than the critical value. Therefore, the rubbing table 24030 may be lifted thereby to substantially contact the alignment layer 24010 with the rubbing roll 24035, and then the rubbing roll 24035 is driven. Then, a substrate having undergone a rubbing treatment may be transferred to another processing line thus to be attached to another substrate. A liquid crystal layer is formed between the two substrates, thereby completing an LCD device.

In the present invention, since the gap between the alignment layer 24010 and the rubbing roll 24035 may be controlled by simultaneously moving both the rubbing table 24030 and the rubbing roll 24035, a rubbing process having a uniform alignment controlling force can be performed. It is also possible to control the gap between the alignment layer 24010 and the rubbing roll 24035 by selectively driving the rubbing table 24030 or the rubbing roll 24035 and thus to provide a uniform alignment controlling force. The conditions for moving the rubbing table 24030 and the rubbing roll 24035 illustrated in the present invention are mere examples. That is, moving the rubbing table 24030 and the rubbing roll 24035 can be performed by and under various conditions. Also, the rubbing table 24030 and the rubbing roll 24035 can be selectively driven according to various conditions in addition to the TN mode or the IPS mode.

As aforementioned, in the present invention, the alignment layer and the rubbing roll substantially contact each other by moving both the rubbing table and the rubbing roll or by selectively moving the rubbing table or the rubbing roll according to rubbing conditions. Therefore, the gap between the alignment layer and the rubbing roll can be quickly and efficiently controlled, and a uniform alignment controlling force can be provided to the entire alignment layer.

While the present invention has discussed the imprinting of microstructures onto an alignment layer, it is to be understood that the invention encompasses other than alignment layers. Thus, the present invention may include any material upon which microstructures, and any other structures or apertures, are suitably imprinted. The invention also further encompasses the imprinting of color filters and size and shape of sub-color filters to be imprinted upon.

Fabrication and Inspection Apparatus

Figure 43:
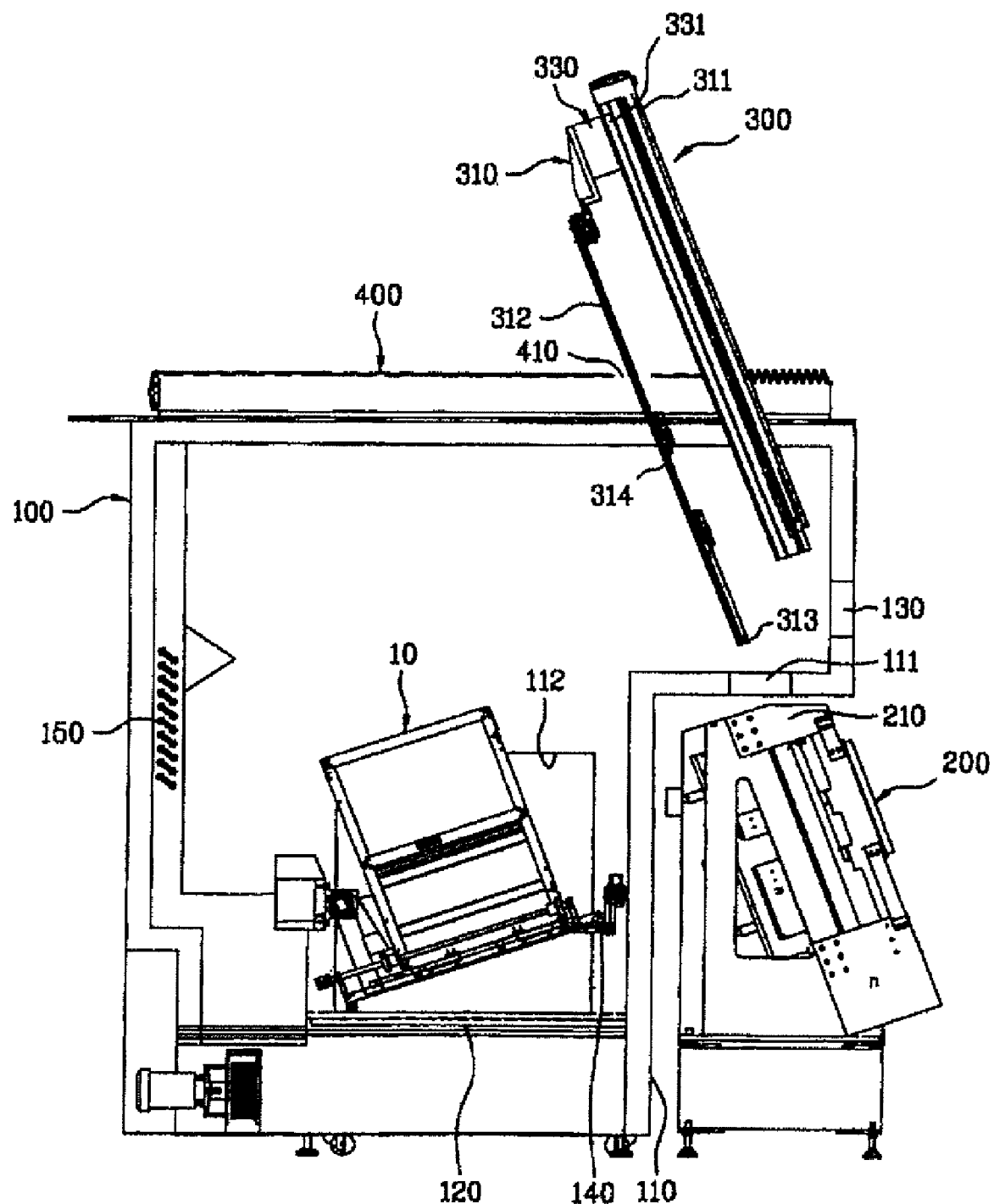
FIG. 43 is a side view schematically illustrating the internal structure of an inspection apparatus for liquid crystal display panels in accordance with one embodiment of the present invention.
Figure 44:
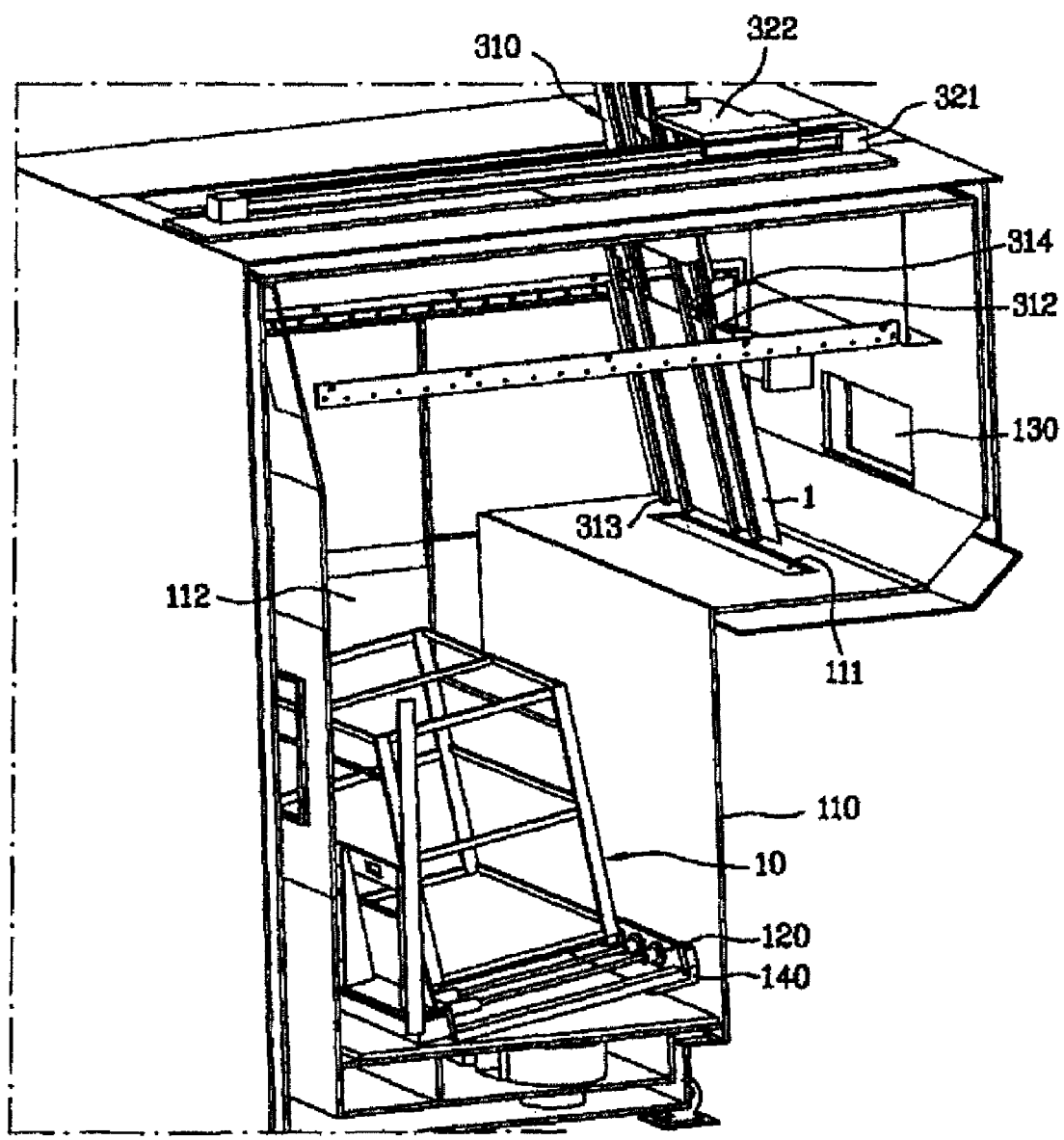
FIG. 44 is a perspective view illustrating main components of the internal structure of the inspection apparatus for the liquid crystal display panels in accordance with the embodiment of the present invention.

FIG. 43 is a side view schematically illustrating the internal structure of an inspection apparatus for liquid crystal display panels in accordance with one embodiment of the present invention. FIG. 44 is a perspective view illustrating main components of the internal structure of the inspection apparatus for liquid crystal display panels in accordance with the embodiment of the present invention.

Referring to FIG. 43, the inspection apparatus for liquid crystal display panels according to the embodiment generally comprises a heating chamber 260100, an inspection unit 260200, and a panel transferring part 260300.

Each of the components will be described in detail below.

Referring to FIGS. 43 and 44, the heating chamber 260100 receives a cassette 26010 having a plurality of liquid crystal display panels (not illustrated) stacked therein. The heating chamber 260100 has a substantially box-shaped internal structure, and is adapted to receive the cassette 26010 at a rear side therein. The heating chamber 260100 heats the LCD panels to a preset temperature.

The heating chamber 260100 illustrated in FIG. 43 has a recess 260110 formed at a lower portion of a front side thereof such that the inspection unit 260200 is placed in the recess 260110. It is understood that other embodiments of the invention are contemplated and covered in which the heating chamber does not have such a recess.

Returning to FIG. 43, the recess 260110 is formed at an upper surface thereof with a panel entrance 260111 through which each LCD panel enters the heating chamber 260100. Here, the panel entrance 260111 has such a size as to allow the LCD panel to smoothly pass therethrough.

In most cases, the panel entrance 260111 is provided with a door (not illustrated) to selectively open and close the panel entrance 260111. The door is provided for the purpose of maintaining the heating chamber 260100 in a closed state, excluding when opening the heating chamber.

The heating chamber 260100 is further formed at a rear lateral side with a cassette entrance 260112 through which the cassette 26010 is conveyed to and from the heating chamber 260100. The heating chamber 260100 is further provided on a bottom surface of the rear lateral side with a conveying part 260120 which conveys the cassette 26010 to and from the heating chamber 260100 through the cassette entrance 260112. Of course, the cassette entrance 260112 may be provided with a door (not illustrated) to selectively open and close the cassette entrance 260112. At this point, the door may be adapted to close the cassette entrance 260112 excluding a part where the conveying part 260120 is installed.

Although it may have various structures, the conveying part 260120 will be described as a conveyor in this embodiment.

The heating chamber 260100 may be formed at an upper surface of a front side with a window 260130 through which an operator can observe activity within the heating chamber 260100.

The heating chamber 260100 is provided with a heater 260150 to heat the LCD panels received in the cassette 26010. The heater 260150 may be installed in an internal space of the heating chamber 260100. However, it should be noted that the present invention is not limited to this structure, and that the heater 260150 may be installed in a wall of the heating chamber 260100.

Of course, although not illustrated in the drawings, the heater 260150 may be installed independently of the heating chamber 260100 such that hot air flows from the separate heater 260150 into the heating chamber 260100 through a duct and the like.

The inspection unit 260200 is a component to receive each LCD panel heated by the heating chamber 260100, and to inspect orientation abnormality of the LCD panel. The inspection unit 260200 is positioned in the recess 260110 of the heating chamber 260100. The inspection unit 260200 has an inlet port 260210 formed to face the panel entrance 260111 of the heating chamber 260100 such that the LCD panel withdrawn from the heating chamber 260100 is directly input to the inspection unit 260200.

Figure 45:
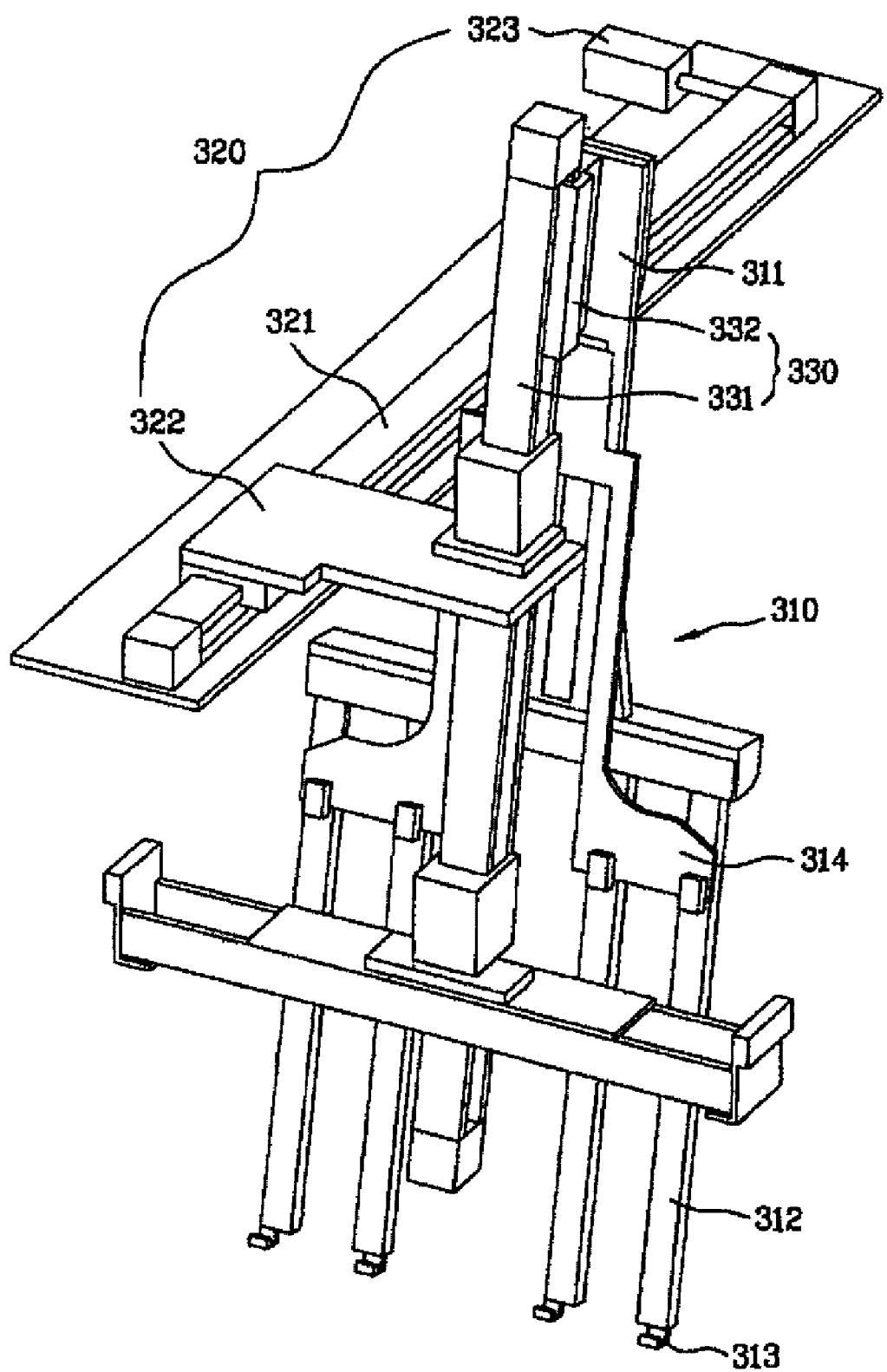
FIG. 45 is a perspective view illustrating a panel transferring part of the inspection apparatus for the liquid crystal display panels in accordance with the embodiment of the present invention.
Figure 46:
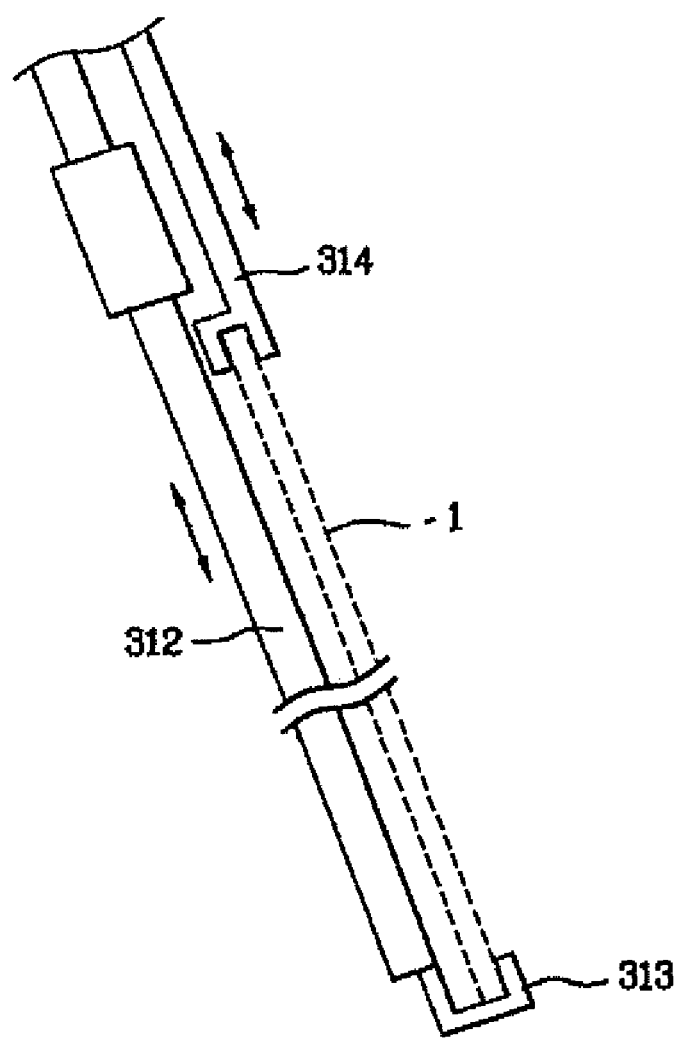
FIG. 46 is a side view illustrating main components of the inspection apparatus for the liquid crystal display panels in accordance with the embodiment of the present invention in which the liquid crystal display panel is clamped by a clamping part and a lifting member of the inspection apparatus.

FIG. 45 is a perspective view illustrating a panel transferring part of the inspection apparatus for the liquid crystal display panels according to the embodiment, and FIG. 46 is a side view illustrating the transferring part of the inspection apparatus, which clamps the LCD panels.

The panel transferring part 260300 is a component to withdraw each LCD panel from the cassette 26010 in the heating chamber 260100 and supply the LCD panel to the inspection unit 260200 through the panel entrance 260111.

That is, as illustrated in FIG. 45, the panel transferring part 260300 comprises a hand member 260310, a forward and backward shifting member 260320, and a lifting member 260330.

The hand member 260310 comprises a body 260311, and a plurality of fingers 260312. The body 260311 has an upper end exposed to an upper outside of the heating chamber 260100. Here, a distal end of each finger 260312 is formed with a clamping portion 260313 to selectively clamp each LCD panel 2601. The clamping portion 260313 may be formed of Teflon resin or other similar resin materials in order to resist scratches from being created on the surface of the LCD panel 2601.

In particular, as illustrated in FIG. 46, the clamping portion 260313 has multiple bent structures, one of which is illustrated in FIG. 46) which is bent forward or backward, and then bent upward so as to clamp a lower portion of each LCD panel 2601. Although not illustrated in the drawings, the clamping portion 260313 may have a separate step formed on an inner surface thereof (which contacts the LCD panel) to prevent the LCD panel 2601 clamped by the clamping portion 260313 from moving.

In addition, the hand member 260310 may be provided with a lifting clamp 260314 which clamps an upper portion of the LCD panel 2601, as illustrated in FIGS. 45 and 46. The lifting clamp 260314 is configured to clamp an upper periphery of the LCD panel 2601 while selectively raising or lowering along the hand member 260310, and serves to prevent movement of the LCD panel during conveyance of the LCD panel 2601. At this point, although not illustrated in the drawings, the lifting clamp 260314 may be configured to be lifted or lowered by a driving mechanism such as a step motor, an actuator, and the like.

The forward and backward shifting member 260320 is configured to shift the body 260311 of the hand member 260310 in forward and backward directions of the heating chamber 260100, and comprises a first rail 260321 and a first activating member 260322.

The first rail 260321 is installed along a hypothetical axis in the forward and backward directions on an upper surface of the heating chamber 260100, and the first activating member 260322 has one end installed to move in the forward and backward directions while being supported by the first rail 260321, and the other end secured to a second rail 260331 of a lifting member 260330 as described below. Here, a step motor 260323 is used to provide movement of the first activating member 260322. Of course, an actuator may be used instead of the step motor.

The lifting member 260330 is configured to move the body 260311 of the hand member 260310 in upward and downward directions of the heating chamber 260100, and comprises the second rail 260331 and a second activating member 260332.

The second rail 260331 is installed in the upward and downward directions in the heating chamber 260100, and coupled to the first activating member 260322 which constitutes the forward and backward shifting member 260320. That is, the second rail 260331 moves along with the first activating member 260322 in the forward and backward directions of the heating chamber 260100.

In addition, the second activating member 260332 has one end installed to move in the upward and downward directions while being supported by the second rail 260331, and the other end secured to an upper end of the body 260311 of the hand member 260310. Here, a step motor (not illustrated) is used for a component for movement of the second activating member 260332. Of course, an actuator may be used instead of the step motor.

It is desirable that the inspection unit 260200 and the hand member 260310 constituting the inspection apparatus for the LCD panels according to the embodiment of the present invention be installed slanted or tilted at a predetermined angle such that the cassette 26010 faces the front side of the heating chamber 260100 as the front side of the cassette 26010 is lowered towards the heating chamber 260100 while being conveyed thereinto. This is because inspection is performed by the inspection unit 260200 with each LCD panel slanted at a predetermined angle θ therein. In other words, this structure is provided to supply the LCD panel to the inspection unit 260200 at the angle θ which is required for the inspection.

The cassette 26010 may be configured to be slanted by itself. Alternatively, as illustrated in the drawings, the cassette 26010 may be selectively slanted by means of an additional lift 260140 which is configured to lift a front side of the conveying part 260120 (right side in the drawing). In addition, although not illustrated in the drawings, the cassette 26010 may be selectively slanted by means of the lift 260140 which is configured to directly lift the front side of the cassette 26010 instead of the conveying part 260120.

In this case, not only are the costs of manufacturing the lift are increased, but also a space required by the heating chamber 260100 is also increased due to the space needed to install the lift, thus increasing installation costs.

According to present invention, the conveying part 260120 may be slanted by itself to allow the cassette 26010 to be slanted at the predetermined angle θ. Such a slant of the conveying part 260120 is not accomplished only within the heating chamber 260100. If the cassette 26010 having the completed LCD panels 2601 received therein is not slanted, but supplied to the heating chamber 260100 in a horizontal state with respect to the ground, it is necessary to slant the cassette 26010 at the predetermined angel θ before being mounted in the heating chamber 260100, which requires additional lifting. Accordingly, it is most preferable that the cassette 26010 be conveyed in a slanted state at the predetermined angle θ from an initial conveying stage of the cassette 26010.

Figure 47:
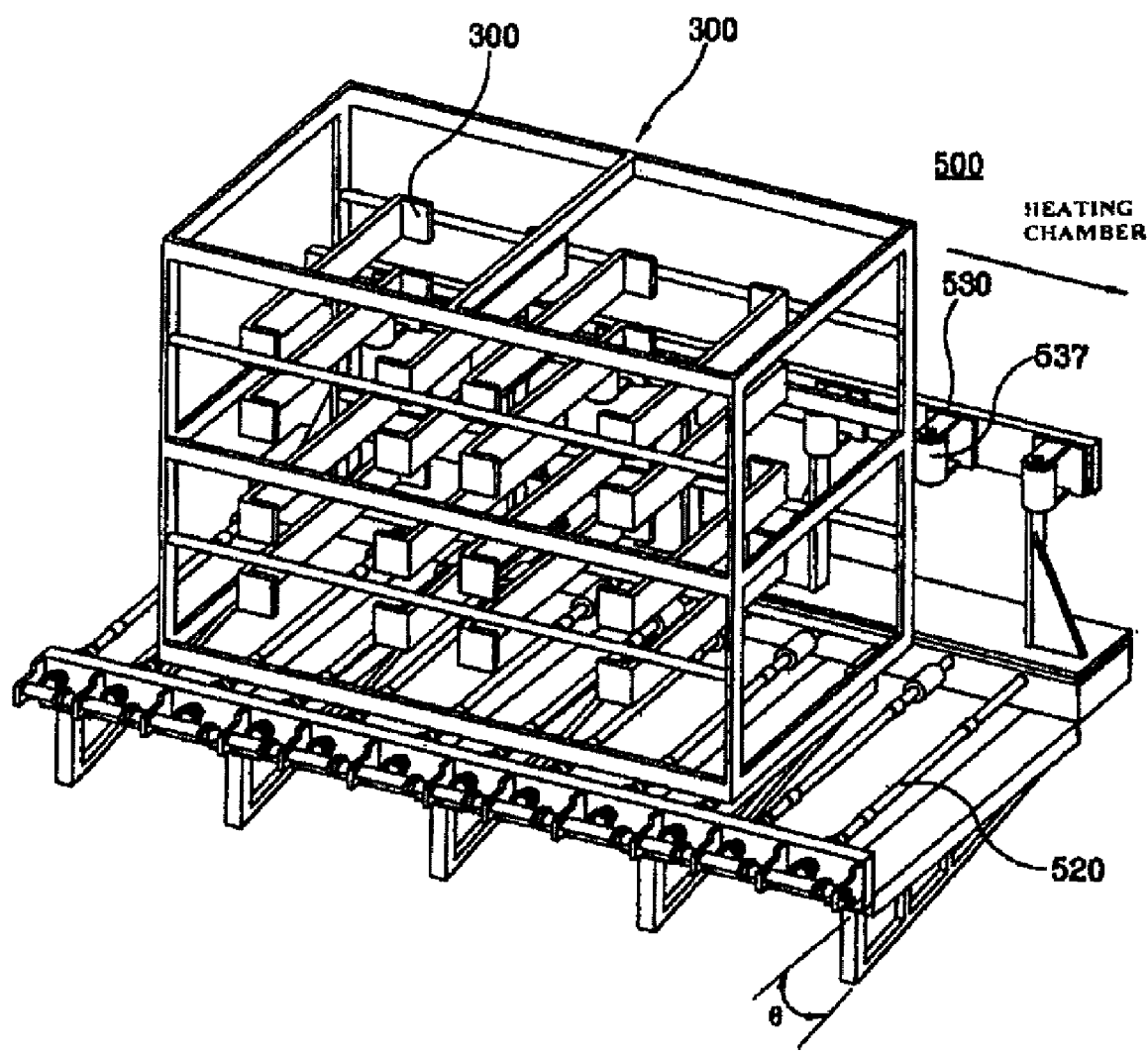
FIG. 47 is a structural view illustrating another conveying part (conveyer) of an inspection apparatus for the liquid crystal display panels in accordance with the embodiment of the present invention.

FIG. 47 is a structural view illustrating another conveying part (conveyer) of the inspection apparatus for the liquid crystal display panels in accordance with the embodiment of the present invention. Specifically, FIG. 47 illustrates a conveyor 260500 which conveys the cassette 26010 having the LCD panels (temporarily stored after completing the manufacturing processes) received therein to the heating chamber 260100.

As illustrated in FIG. 47, the conveyer 260500 comprises a plurality of rollers 260520 to convey the cassette 26010 having the LCD panels 2601 received therein while rotating, a side support 260530 to support the cassette 26010 and which is installed at a side to which the cassette 26010 on the rollers 260520 is slanted, and a guide roller 260532 rotatably provided to the side support 260530 so as to contact the side of the cassette 26010.

The side support 260530 is installed at one side below the conveyor 260500 having the rollers 260520, and slants the rollers 260520 at a predetermined angle θ. In this manner, the rollers 260520 are slanted thereby, and thus, the cassette 26010 on the rollers 260520 is also slanted. In addition, due to the slant of the cassette 26010, the LCD panels 2601 secured to a panel securing part 260511 formed in the cassette 26010 are also slanted at the predetermined angle θ.

Although the guide roller 260532 is rotatable, the guide roller 260532 is not rotated by an external driving means such as a motor, but by application of external force thereto. Accordingly, a rotation speed of the guide roller 260532 is the same as a moving speed of the cassette 26010, thereby preventing the slanted cassette 26010 from being impacted by friction with the side support 260530 while moving on the conveyor.

Such a conveyor constructed as described above extends from a previous processing apparatus or a physical distribution apparatus to the heating chamber 260100 so that the cassette 26010 having the LCD panels 2601 received therein is conveyed in a slanted state to the heating chamber 260100, and mounted therein.

In addition, according to the embodiment, the inspection apparatus for the LCD panels may further comprise a closing part 260400, as illustrated in FIG. 43.

The closing part 260400 is configured to ensure a space through which the hand member 260310 moves, while closing the opening on the upper surface of the heating chamber 260100. That is, the closing part 260400 enables the interior of the heating chamber 260100 to be in a closed state, thereby preventing the temperature of the heating chamber from varying due to exposure to the surrounding air.

The closing part 260400 has a foldable curtain shape. In addition, the closing part 260400 has both ends secured to an upper front side and an upper rear side of the heating chamber 260100, respectively, and an inner surface surrounding a peripheral surface of the body 260311 constituting the hand member 260310.

When respective fingers 260312 of the hand member 260310 are configured to be exposed to the outside of the heating chamber 260100, the closing part 260400 may be formed with an additional entrance 260410 which enables the respective fingers 260312 to pass therethrough.

A method for inspecting orientation abnormality of LCD panels using the inspection apparatus according to the embodiment will be described below.

FIGS. 48A to 48F are diagrams schematically illustrating a series of procedures to inspect the liquid crystal panels using the inspection apparatus according to the embodiment of the present invention.

Figure 48A:
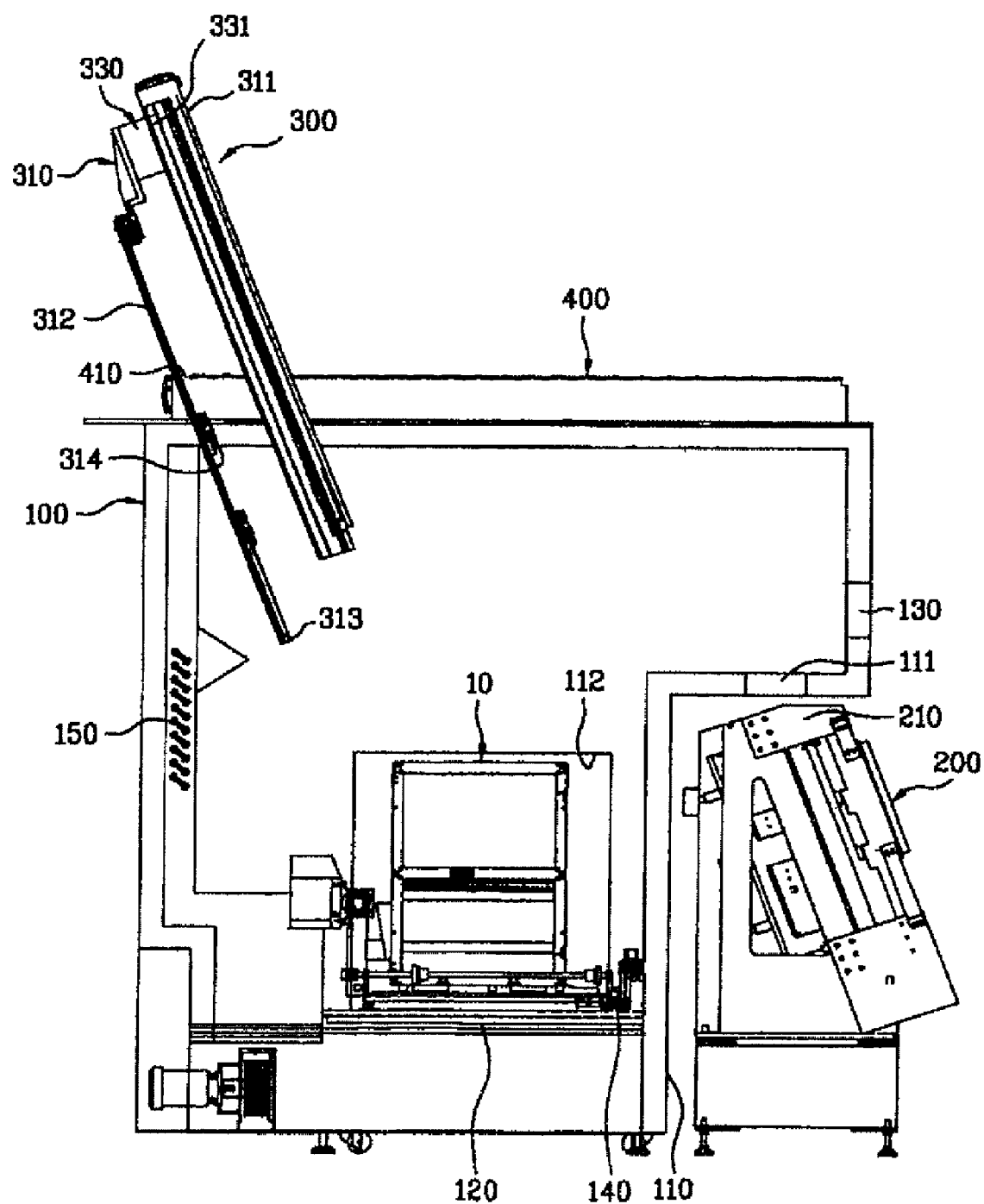
FIGS. 48A to 48F are diagrams schematically illustrating a series of procedures to inspect liquid crystal display panels using the inspection apparatus in accordance with the embodiment of the present invention.

First, as illustrated in FIG. 48A, the cassette 26010 having plural LCD panels 2601 stacked therein is conveyed into the heating chamber 260100 via the conveying part 260120. At this time, the door (not illustrated) of the heating chamber 260100 is operated to open the cassette entrance 260112.

After the cassette 26010 is mounted in the heating chamber 260100 as described above, the cassette entrance 260112 is closed via operation of the door.

Figure 48B:
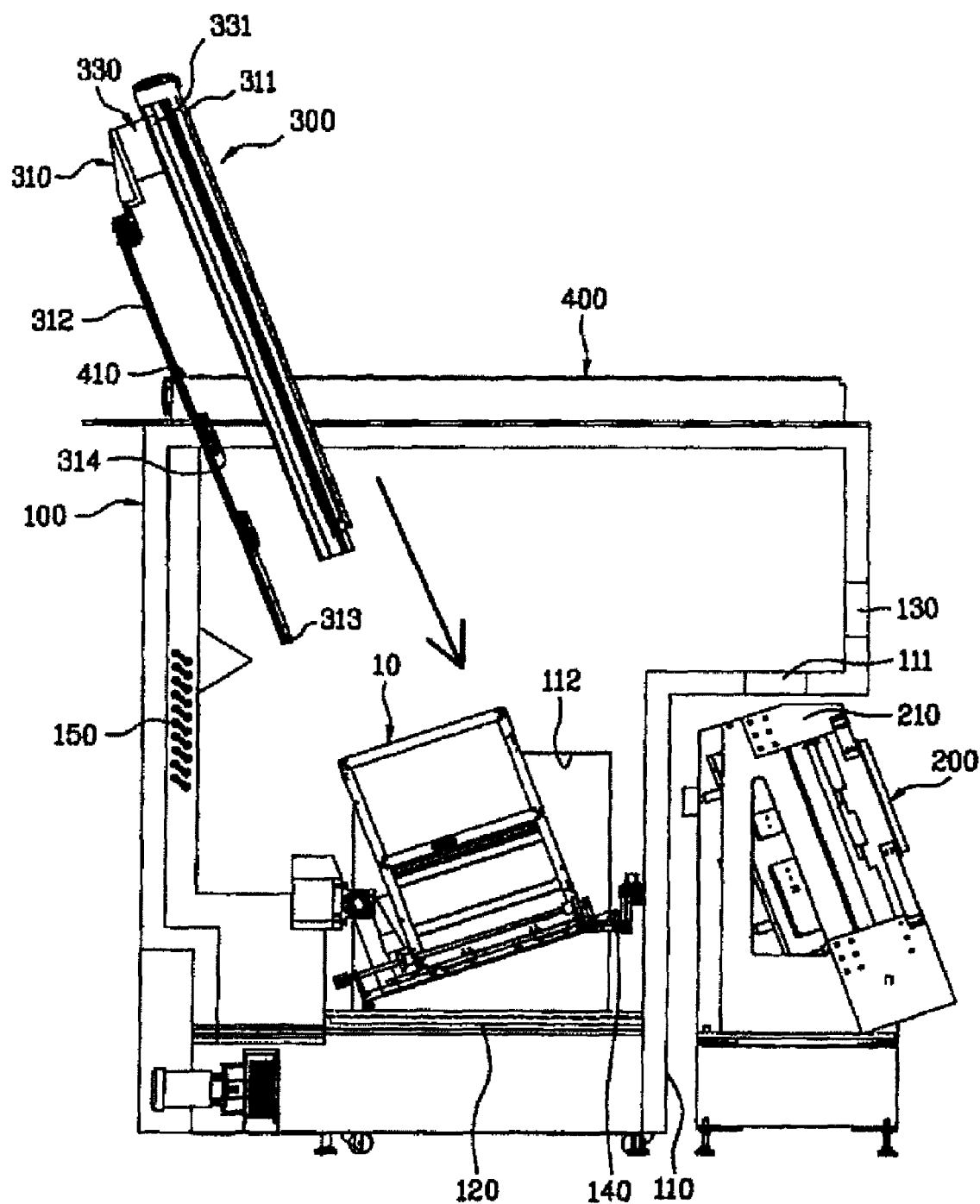

As illustrated in FIG. 48B, the front side of the cassette 26010 is slanted more than the rear side thereof by operation of the lift 260140. At this time, a slanted angle of the cassette 26010 is the same as that of the panel transferring part 260300 and/or that of the inspection unit 260200.

If the conveying part 260120 is embodied as a conveyor 260500 inclined at a predetermined angle θ as illustrated in FIG. 47, the step as illustrated in FIG. 48B is not required. In other words, the cassette 26010 having the plural LCD panels 2601 stacked therein is conveyed into and mounted in the heating chamber 260100 through the conveyor 260500 described in FIG. 47 while being inclined at the predetermined angle θ.

Then, as the heater 260150 is operated to heat the heating chamber 260100 to a preset temperature (for example, about 50~70° C.).

Figure 48C:
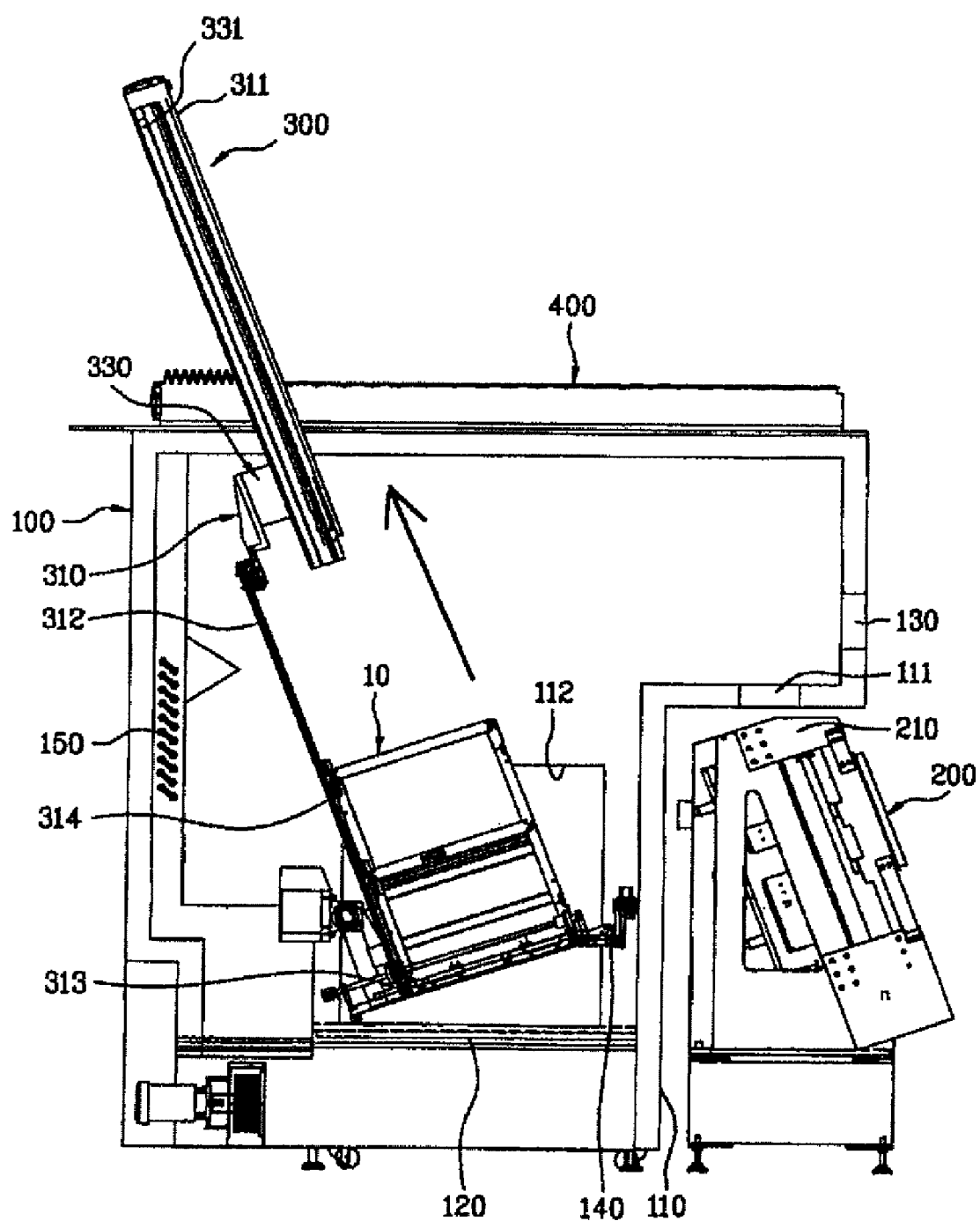

As illustrated in FIG. 48C, when the respective LCD panels 2601 received in the cassette 260100 reach the predetermined temperature in the heating chamber 260100 by the series of procedures as described above, the panel transferring part 260300 is driven.

That is, the first activating member 260322 constituting the forward and backward shifting member 260320 is operated to allow the hand member 260310 to be placed at a level of an LCD panel (while will hereinafter be referred to as "object panel") desired to be withdrawn at an upper portion of the cassette 26010 as illustrated in FIG. 48C, and the second activating member 260332 is operated to lower the fingers 260312 of the hand member 260310 to a location where the respective fingers 260312 can withdraw the object panel 2601 within the cassette 26010.

Next, the first activating member 260322 is operated to allow the respective fingers 260312 to support the rear side of the object panel 2601 while allowing the lower portion of the object panel 2601 to be positioned to face the clamping portion 260313 formed at the distal end of each finger 260312.

In addition, in the above state, when the respective fingers 260312 of the hand member 260310 are lifted by the second activating part 260332, the object panel 2601 is withdrawn from the cassette 26010 in the state wherein the lower portion of the object panel 2601 is clamped by the clamping portions 260313, and, at the same time, the rear side of the object panel 2601 is slanted to the respective panel 260312.

Figure 48D:
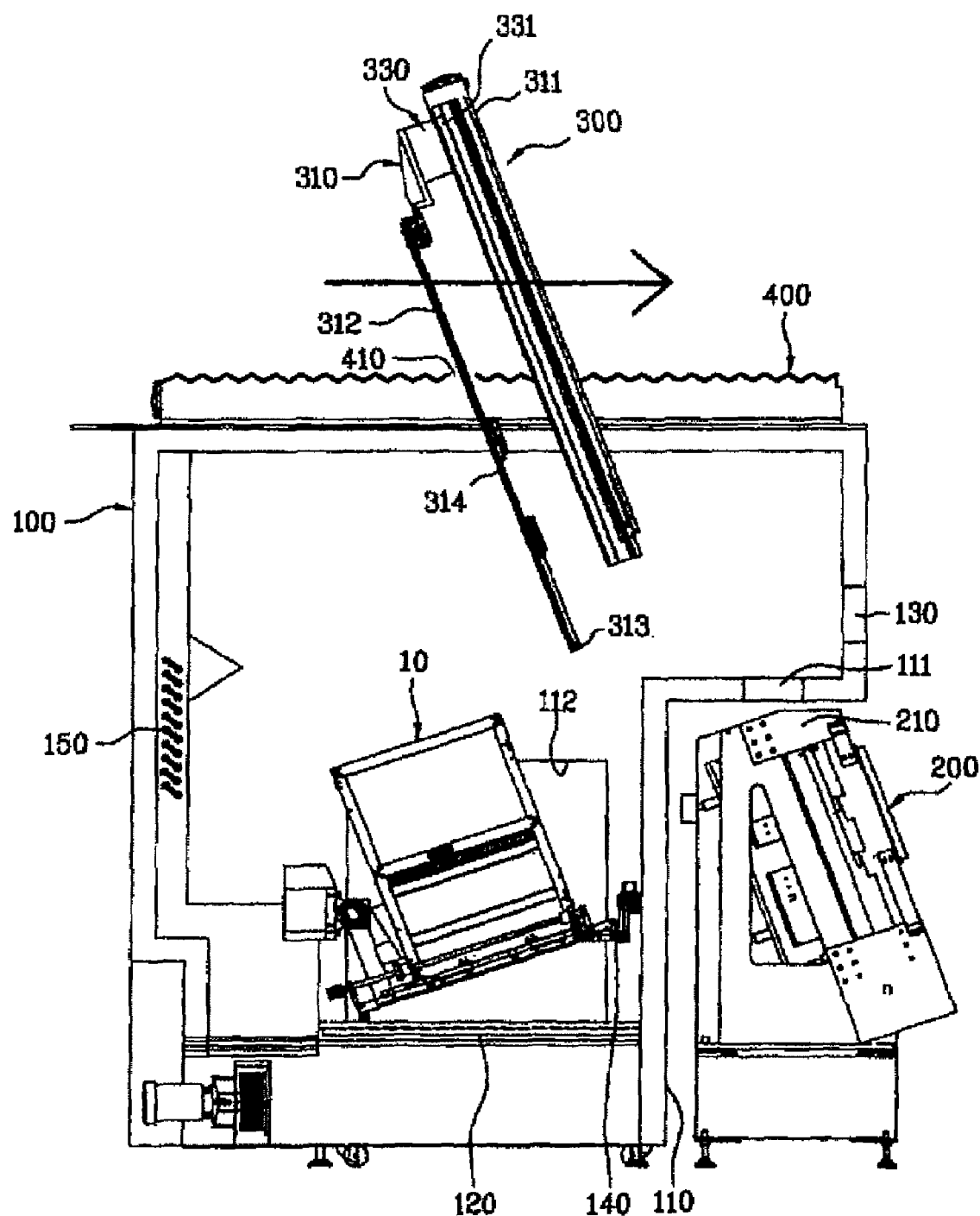

After the object panel 2601 is withdrawn, the hand member 260310 is lifted to a height where the hand member 260310 is not intervened by the cassette 26010, and is then moved to a location facing the panel entrance 260111 of the heating chamber 260100 by the first activating part 260322, as illustrated in FIG. 48D.

Figure 48E:
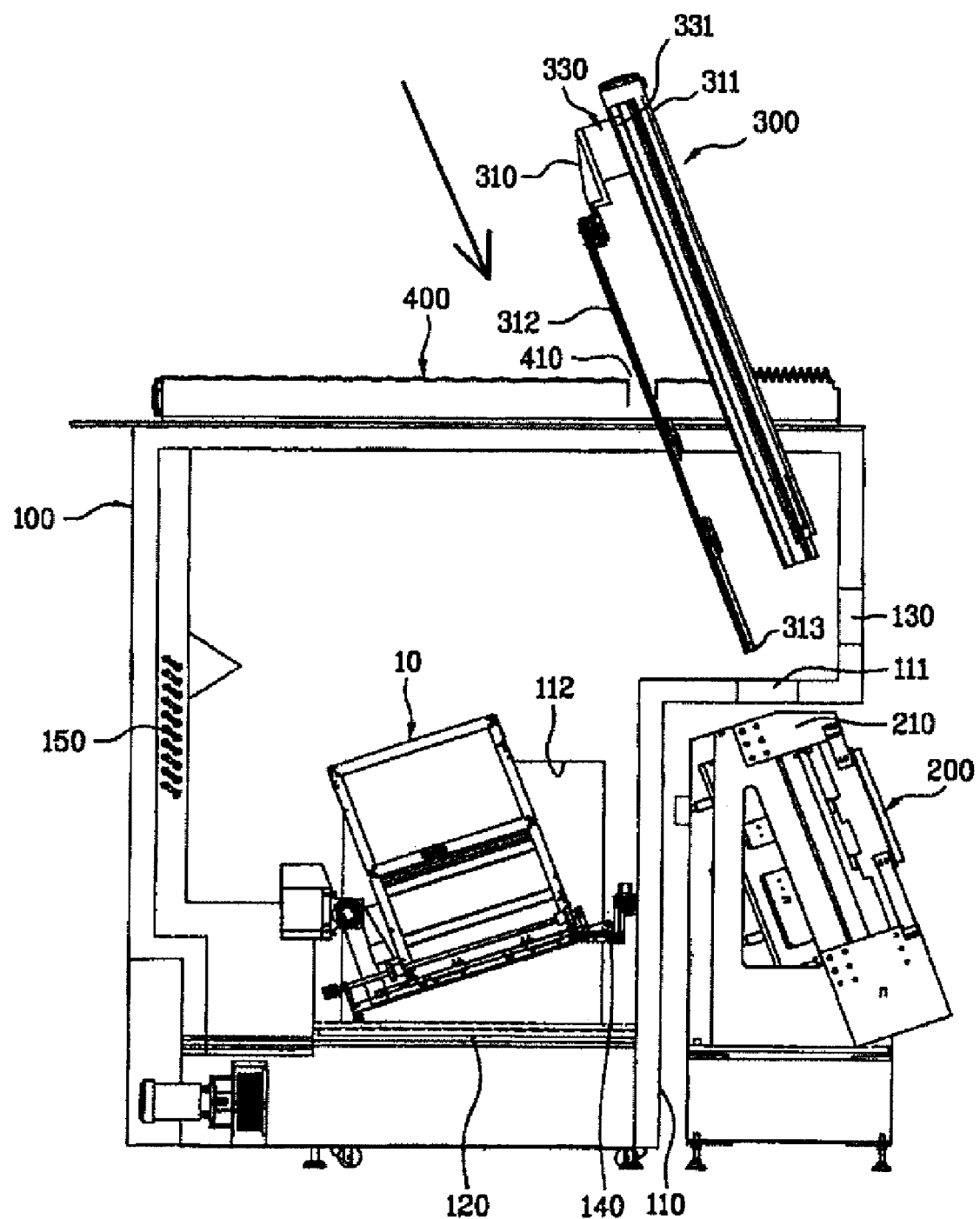
Figure 48F:
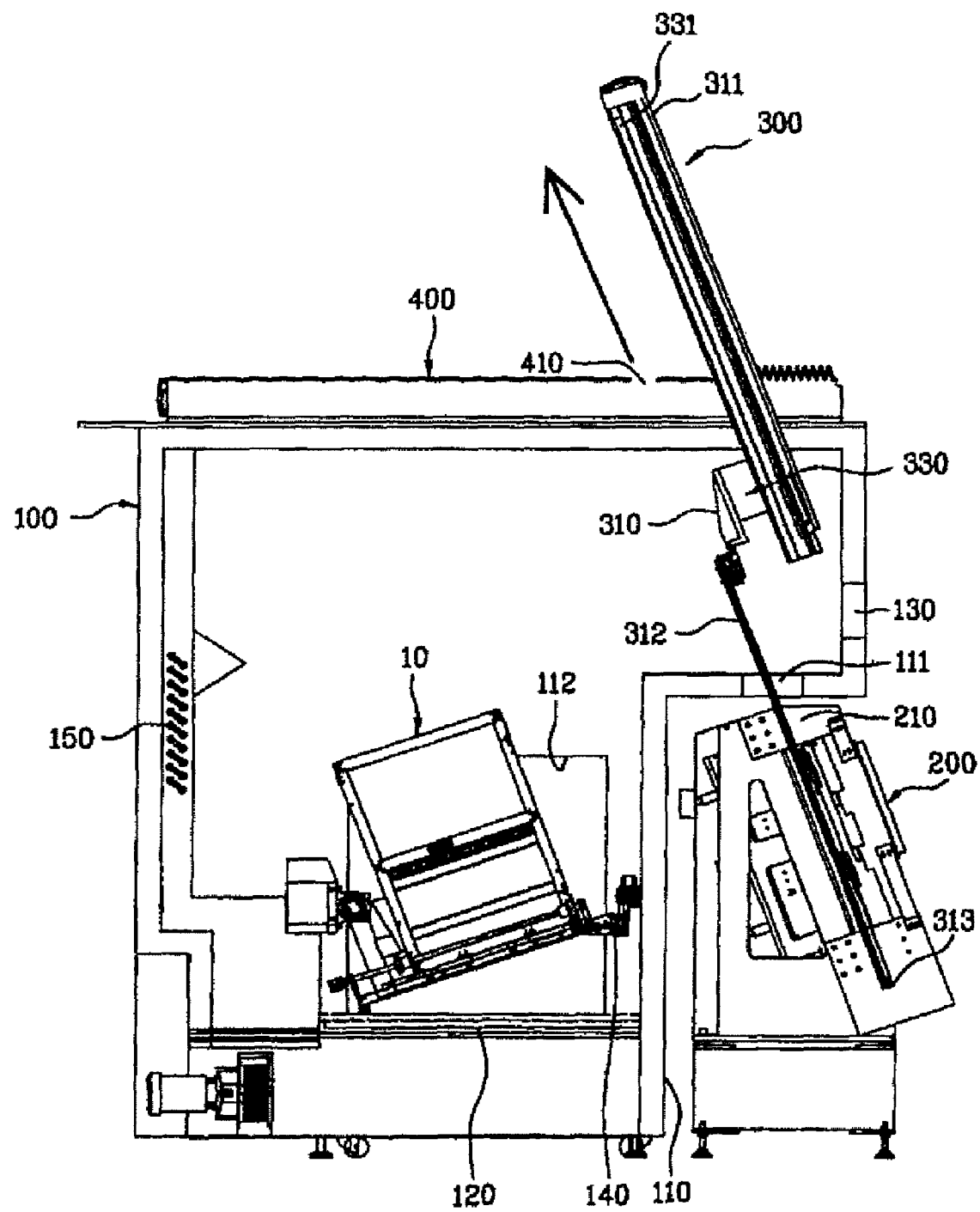

Then, as illustrated in FIGS. 48E and 48F, the hand member 260310 is lowered by the second activating part 260332, and thus the respective fingers 260312 and the object panel 2601 loaded on the fingers 260312 move to the inspection unit 260200 through the panel entrance 260111.

The inspection unit 260200 secures only the object panel 2601, and the respective fingers 260312 are withdrawn through the panel entrance 260111 by sequential operations of the first activating part 260322 and the second activating part 260332 with the object panel 2601 remaining in the inspection unit 260200.

Then, inspection for orientation abnormality of the object panel 2601 is performed in the inspection unit 260200. Then, after completing the inspection, the object panel 2601 is withdrawn from the inspection unit 260200, and then mounted again in the cassette 26010 in reverse of the procedures described above. These series of procedures are consecutively performed until every LCD panel 2601 received in the cassette 26010 is completely inspected.

If the inspection for all the LCD panels 2601 received in the cassette 26010 is completed, the cassette entrance 260112 is opened, allowing the cassette 26010 to be conveyed from the heating chamber while allowing another cassette (having plural LCD panels as objects for abnormality inspection) to be conveyed into the heating chamber, so that the inspection procedures are performed again as described above.

As apparent from the above description, the inspection apparatus for the LCD panels according to the invention allows the procedure of transferring the LCD panels from the cassette to the inspection unit to be performed within the heating chamber in the closed state.

Accordingly, the inspection apparatus of the present invention has an advantageous effect in that variation in temperature of the LCD panels is minimized, thereby enabling inspection for abnormality of the LCD panels to be accurately performed.

In addition, the inspection apparatus of the present invention has another advantageous effect in that variation in temperature of the heating chamber is minimized.

In order to solve the problems of the related liquid crystal injection methods such as the liquid crystal dipping method or the liquid crystal vacuum injection method, a liquid crystal dispensing method has been recently introduced. The liquid crystal dispensing method is a method for forming a liquid crystal layer by directly dropping the liquid crystal onto the substrates and spreading the dropped liquid crystal over the entire panel by pressing together the substrates during the assembling procedure of the substrates rather than by injecting the liquid crystal into the empty unit panel by the pressure difference between the inner and outer sides of the panel. According to the above liquid crystal dispensing method, the liquid crystal is directly dropped onto the substrate in a short time period so that the liquid crystal layer in an LCD of larger area can be formed quickly. In addition, the liquid crystal consumption can be minimized due to the direct dropping of the liquid crystal as much as required amount, and therefore, the fabrication cost can be reduced.

Fabrication and Assembly—Cooling Apparatus

Figure 49:
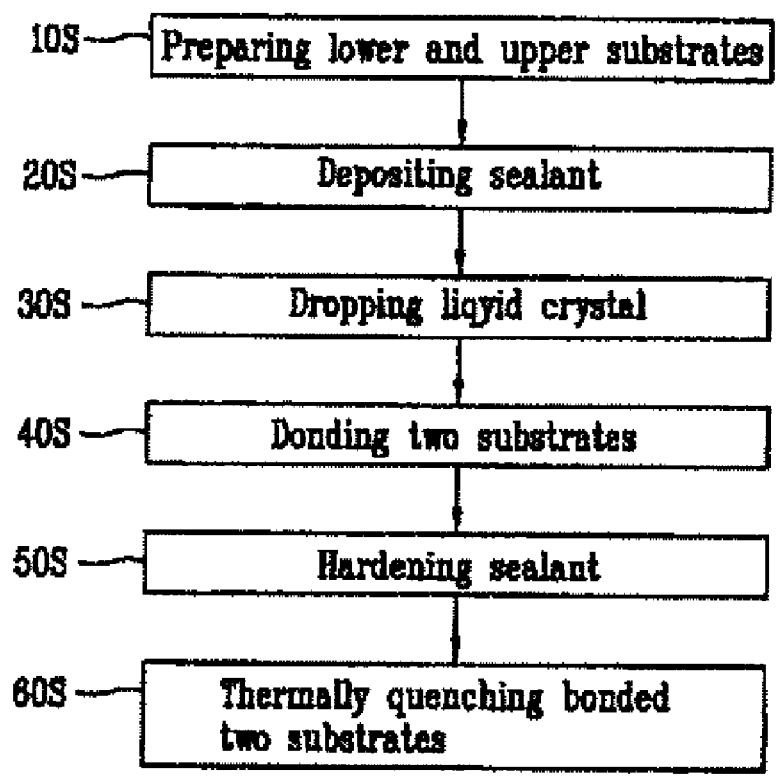
FIG. 49 is a flow chart illustrating a process for manufacturing a liquid crystal display device in accordance with an embodiment of the present invention.

FIG. 49 is a flow chart illustrating a process for manufacturing a liquid crystal display device in accordance with an embodiment of the present invention.

First, as illustrated in FIG. 49, a lower substrate and an upper substrate are prepared (27010S).

The lower substrate and the upper substrate are appropriately changed according to the driving mode of a liquid crystal display device.

That is, when the liquid crystal display device is driven in a Twisted Nematic (TN) mode, gate lines and data lines, which perpendicularly intersect with each other, for defining pixel regions, TFTs formed at the intersections of the gate lines and the data lines and serving as switching elements, and pixel electrodes formed in the pixel regions and serving as electrodes for forming an electric field are formed on the lower substrate, and a light shielding layer for preventing light from being leaked, color filter layers for forming colors, and common electrodes serving as electrodes for forming the electric field are formed on the upper substrate.

When the liquid crystal display device is driven in an In Plane Switching (IPS) mode, gate lines and data lines, which perpendicularly intersect with each other, for defining pixel regions, TFTs formed at the intersections of the gate lines and the data lines and serving as switching elements, pixel electrodes and common electrodes formed in the pixel regions and serving as pairs of electrodes for forming a horizontal electric field are formed on the lower substrate, and a light shielding layer for preventing light from being leaked and color filter layers for forming colors are formed on the upper substrate.

Thereafter, a sealant is deposited on one of the lower and upper substrates (27020S).

Here, the sealant is deposited on one of the lower and upper substrates so that a sealant layer without an injection port is formed on the substrate, and the deposition of the sealant is performed by one of known methods, such as a printing method and a dispensing method.

Thereafter, liquid crystal is dropped on one of the lower and upper substrates (27030S).

The deposition of the sealant (27020S) and the dropping of the liquid crystal (27030S) may be formed on the same substrate or different substrates.

Thereafter, the lower and upper substrates are bonded to each other (27040S).

The bonding of the two substrates is performed, under the condition that the substrate on which the liquid crystal is dropped is located at the lower part and the other substrate is located at the upper part, using a known bonding apparatus.

Thereafter, the sealant is hardened, thus bonding the two substrates to each other (27050S).

The hardening of the sealant (27050S) may be performed by irradiating only ultraviolet rays or by sequentially irradiating ultraviolet rays and applying heat, according to the kind of the sealant.

The hardening of the sealant (27050S) is performed at a temperature of approximately 270120° C. The orientation of the liquid crystal layer formed between the lower and upper substrates may be scattered by the hardening of the sealant performed at the above high temperature. Accordingly, the scattered orientation of the liquid crystal layer is returned to its original state through subsequent thermal quenching, which will be described later.

Thereafter, the two bonded substrates are thermally quenched (27060S).

The thermal quenching of the substrates (27060S) is performed at a temperature of less than a $T_{NI}$ of the liquid crystal within 30 seconds. The $T_{NI}$ of the liquid crystal refers to a clearing point of the liquid crystal, i.e., a temperature at which the transition of the liquid crystal from the mesophase, between the liquid phase and the solid phase, to the liquid phase occurs so that the liquid crystal becomes transparent.

The $T_{NI}$ of the liquid crystal is in the range of approximately 60° C.~90° C.

The above thermal quenching is performed in a designated cooling apparatus. The bonded substrates are placed in the cooling apparatus, and the temperature in the cooling apparatus is quickly lowered to −2° C.~−5° C.

After the hardening of the sealant is completed, the bonded substrates reach a temperature of approximately 120° C., and while the bonded substrates are transferred to the cooling apparatus, the bonded substrates reach a temperature of approximately 110° C., which is lowered by 10° C., and are put into the cooling apparatus. Accordingly, in order to lower the temperature of the liquid crystal from approximately 110° C. to the $T_{NI}$ within 30 seconds, the temperature in the cooling apparatus may be quickly lowered to −2° C.~−5° C.

In order to quickly lower the temperature in the cooling apparatus to −2° C.~−5° C., cold air of a temperature of less than −10° C. is supplied to the cooling apparatus.

When the thermal quenching of the bonded substrates is performed, dew is formed in the cooling apparatus due to a difference of temperatures between the inside of the cooling apparatus and the outside of the cooling apparatus. Accordingly, removal of the dew is additionally performed.

The removal of the dew is performed by applying heat locally to parts of the cooling apparatus in which the dew is formed. Further, in order to locally apply the heat, hot wires are installed at the parts of the cooling apparatus in which the dew is formed.

As described above, the thermal quenching of the bonded substrates (27060S) is performed in the cooling apparatus operated in a designated condition. Hereinafter, using the cooling apparatus of an embodiment of the present invention, the thermal quenching of the bonded substrates (27060S) and the removal of the dew will be described in more detail.

Figure 50:
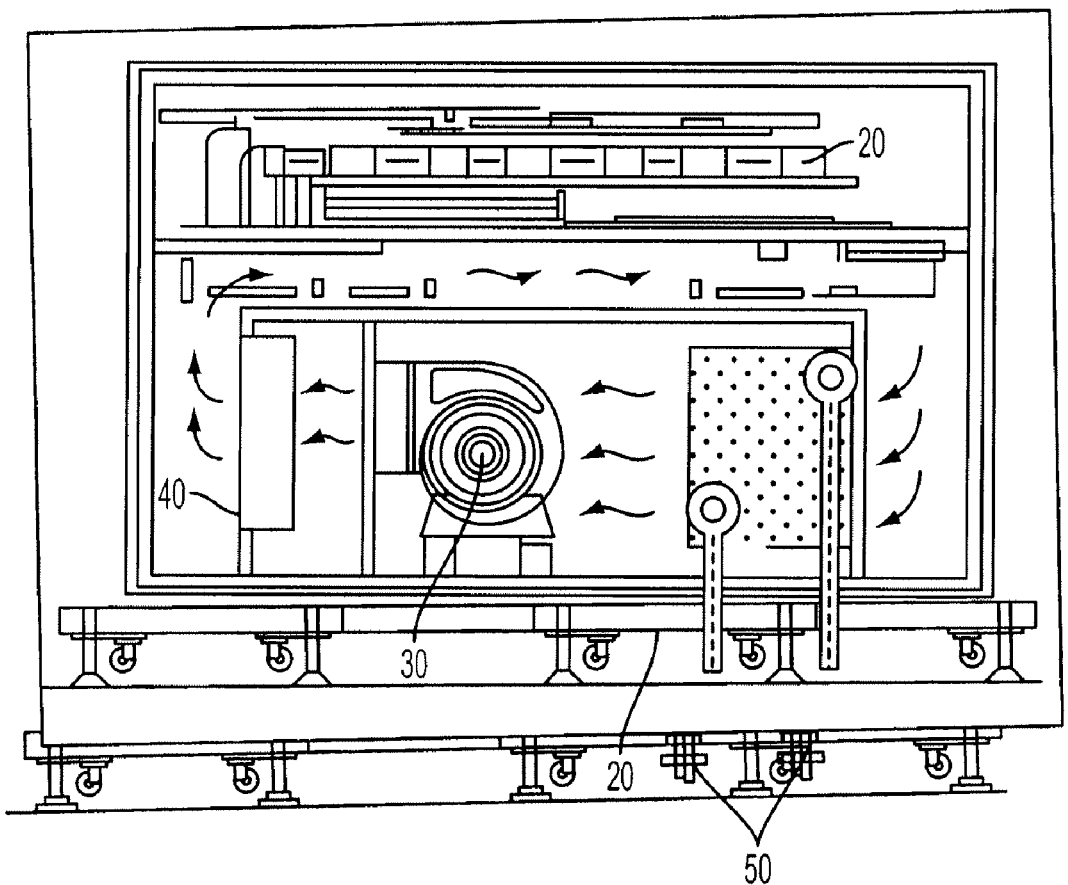
FIG. 50 is a sectional view illustrating the internal structure of a cooling apparatus in accordance with an embodiment of the present invention.
Figure 51A:
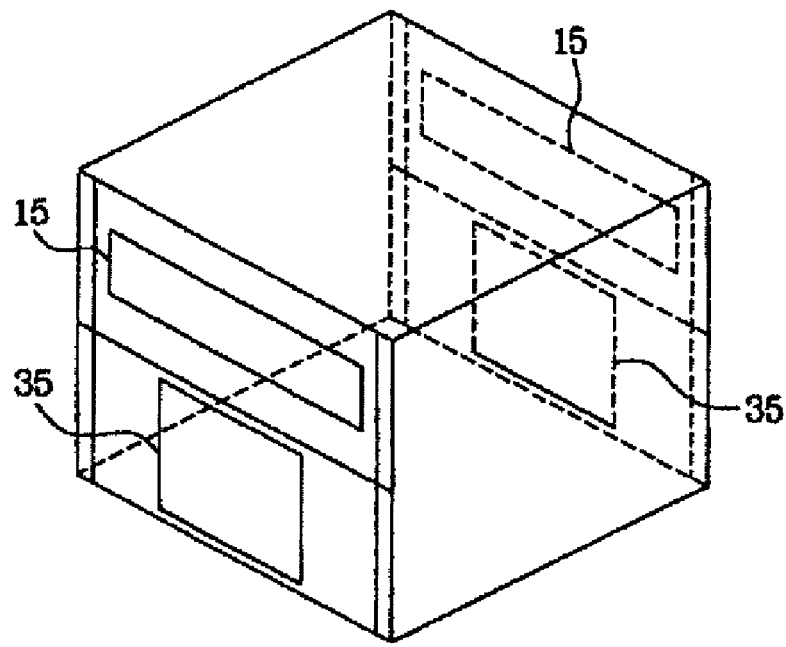
FIGS. 51A and 51B are perspective views illustrating hot wires for removing dew, which are installed in the cooling apparatus.
Figure 51B:
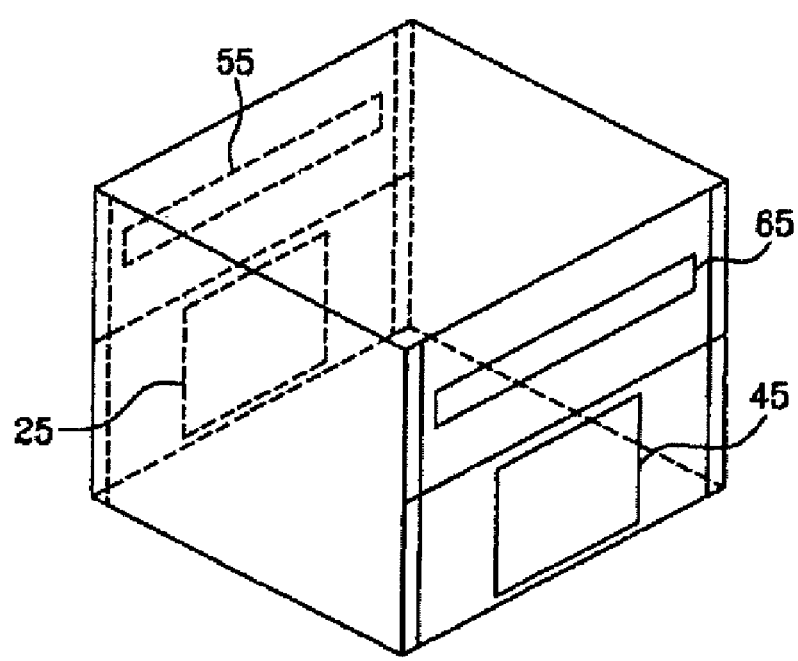

FIG. 50 is a sectional view illustrating the internal structure of a cooling apparatus in accordance with an embodiment of the present invention, and FIGS. 51A and 51B are perspective views illustrating hot wires for removing dew, which are installed in the cooling apparatus.

As illustrated in FIG. 50, the cooling apparatus of an embodiment of the present invention comprises a substrate stage 27010, cooling coils 27020, a fan 27030, and an air filter 27040.

The substrate stage 27010 serves to mount bonded substrates thereon.

The cooling coils 27020 are connected to pipes 27050 for supplying air to the cooling apparatus, and serve to cool the air supplied from the pipes 27050.

The fan 27030 serves to circulate the cold air obtained through the cooling coil 27020.

The air filter 27040 serves to remove foreign substances from the cold air. Although not illustrated in the drawings, another air filter may be additionally installed above the substrate stage 27010.

Now, the thermal quenching of bonded substrates using the above cooling apparatus will be described.

First, when bonded substrates are mounted on the substrate stage 27010, the cooling coils 27020 cool the air supplied from the pipes 27050, thus producing cold air. The cold air is circulated in the direction of arrows through the fan 27030, thereby thermal quenching the substrates mounted on the substrate stage 27010.

Here, when cold air having a temperature of less than −10° C. is produced by adjusting the condition of the cooling coils 27020 and the temperature in the cooling apparatus is set to −2° C.~−5° C. by adjusting the condition of the fan 27030, the temperature of the bonded substrates put into the cooling apparatus is lowered from 110° C. to the $T_{NI}$, i.e., approximately 60~90° C., within 30 seconds.

During the thermal quenching, dew may be formed in the cooling apparatus. Accordingly, hot wires for removing the dew are installed at parts of the cooling apparatus in which the dew is formed.

Now, with reference to FIGS. 51A and 51B, the removal of the dew using the hot wires will be described.

As illustrated in FIG. 51A, the hot wires are installed in substrate stage checking doors 27015 and fan checking doors 27035, which are respectively formed at the front and rear surfaces of the cooling apparatus.

Further, as illustrated in FIG. 51B, the hot wires are installed in a substrate inlet 27065 and a cooling coil checking door 27045 that are formed through and at the right side surface of the cooling apparatus and in a substrate outlet 27055 and an air filter checking door 27025, which are formed through and at the left side surface of the cooing apparatus.

Parts of the cooling apparatus in which the dew is formed are the substrate inlet and outlet 27065 and 27055 and the checking doors 27025, 27035 and 27045. Further, the hot wires may be installed in other parts of the cooling apparatus in which the dew is formed.

As described above, the present invention has several effects, as follows.

First, since thermal quenching of two bonded substrates is performed after hardening of a sealant is performed using a liquid crystal dropping method, the orientation of a liquid crystal layer, which is scattered by the hardening of the sealant, is returned to its original state, thus preventing domain defects.

Second, because hot wires are installed in a cooling apparatus, dew formation is suppressed during the thermal quenching of the two bonded substrates.

Dispensing Liquid Crystal

FIGS. 52A to 52D illustrate schematic views of a method for manufacturing an LCD device according to one preferred embodiment of the present invention. In each of FIGS. 52A to 52D, the left side illustrates the plan view of the LCD device, and the right side illustrates the cross sectional view along I-I'.

Figure 52A:
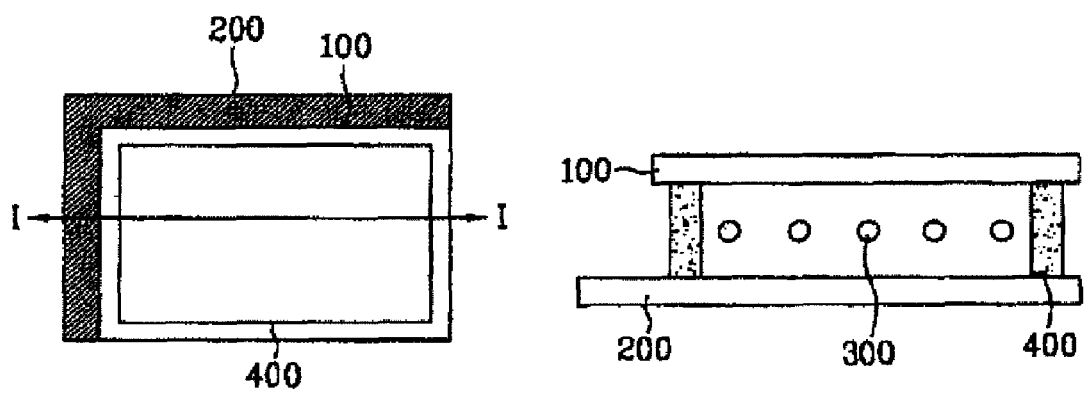
FIGS. 52A to 52D illustrate schematic views of a method for manufacturing an LCD device according to one preferred embodiment of the present invention.

First, as illustrated in FIG. 52A, the LCD device according to the present invention includes a liquid crystal cell comprised of a first substrate 280100, a second substrate 280200, a liquid crystal layer 280300 formed between the first and second substrates 280100 and 280200, and a first sealant 280400 for surrounding the liquid crystal layer 280300 between the first and second substrates 280100 and 280200.

The process of preparing the liquid crystal cell includes steps of preparing the first substrate 280100, preparing the second substrate 280200, and forming the liquid crystal layer 280300 between the first and second substrates 280100 and 280200.

Although not illustrated, the process of preparing the first substrate 280100 includes steps of forming a black matrix layer for prevention of light leakage on a transparent substrate, forming a color filter layer between each pattern of the black matrix layer, and forming a common electrode on the color filter layer.

If applying an In-Plane Switching (IPS) mode, the common electrode is formed in parallel to a pixel electrode on the second substrate 280200.

Although not illustrated, the process of preparing the second substrate 280200 includes steps of forming gate and data lines crossing each other to define a unit pixel region, forming a thin film transistor of a switch adjacent to a crossing portion of the gate and data lines, and forming the pixel electrode electrically connected with the thin film transistor and formed in the pixel region.

At this time, a gate pad is formed at one end of the gate line, and a data pad is formed at one end of the data line, wherein the gate and data lines are connected with a driving circuit by the gate and data pads.

The second substrate 280200 is slightly larger than the first substrate 280100 since the gate and data pads are formed on the second substrate 280200. That is, the gate and data pads are formed in portion corresponding to slant lines of the left drawing of FIG. 52A.

In the process of forming the liquid crystal layer 280300 between the first and second substrates 280100 and 280200, a liquid crystal dispensing method is used.

That is, the first sealant 280400 is formed on either of the first and second substrates 280100 and 280200, and a predetermined amount of liquid crystal is dispensed on either of the first and second substrates 280100 and 280200. Then, the first and second substrates 280100 and 280200 are bonded to each other.

The components and formation steps in the above process for preparing the liquid crystal cell may be changeable in various methods generally known to those skilled in the art.

After that, a step for measuring the amount of liquid crystal 280300 within the liquid crystal cell is performed by the naked eye. This step can be performed in various methods generally known to those skilled in the art.

If the amount of liquid crystal dispensed is not correct (that is, the liquid crystal is insufficiently or excessively dispensed), a step for regulating the amount of liquid crystal is performed as follows.

Figure 52B:
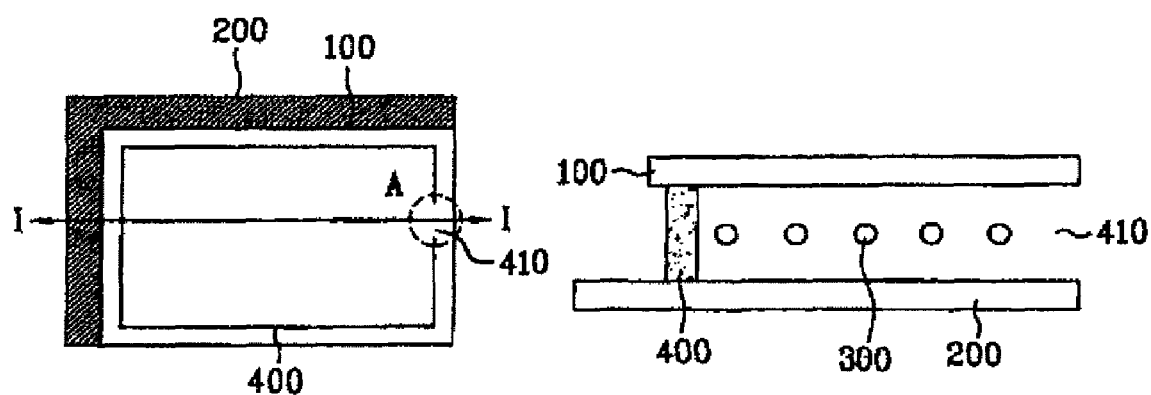

If dispensing liquid crystal insufficiently or excessively, as illustrated in FIG. 52B, an inlet or hole 280410 for liquid crystal to pass through is formed in a predetermined portion (A) of the first sealant 280400. By applying laser to the predetermined portion (A) of the first sealant 280400, the first sealant 280400 is removed from the predetermined portion (A), thereby forming the inlet 280410. Accordingly, it is possible to regulate the amount of liquid crystal through the inlet 280410 of liquid crystal.

The process of removing the first sealant by applying laser may be comprised of completely removing the predetermined portion of the first sealant, or may be comprised of partially removing the predetermined portion of the first sealant. If partially removing the predetermined portion of the first sealant, some first sealant may be left at a predetermined interval from the first or second substrate 280100 or 280200. In another aspect, the first sealant may be formed between the first and second substrates 280100 and 280200 in a closed shape having a width to be opened by the liquid crystal with the pressure.

Figure 53A:
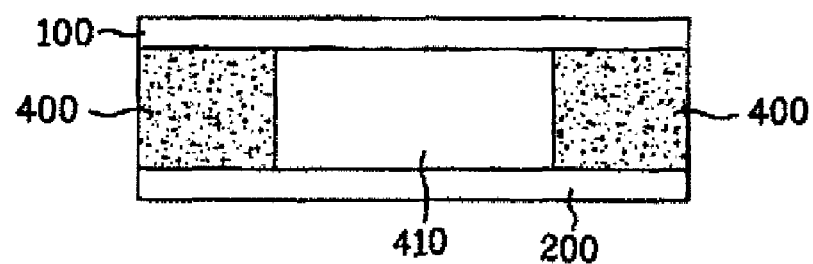
FIGS. 53A and 53B illustrate cross sectional views of 'A' along the line perpendicular to I-I' line of FIG. 52B.
Figure 53B:
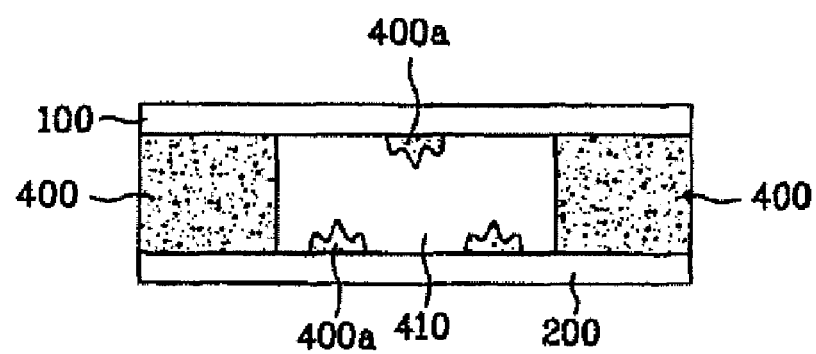
Figure 53C:
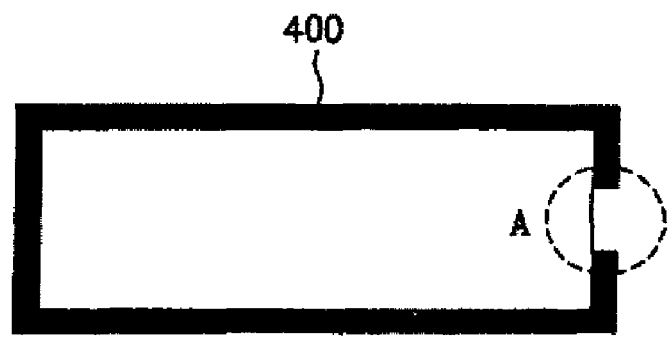
FIG. 53C illustrates an expanded view of a first sealant of FIG. 52B.

The shape of the first sealant in the predetermined portion removed by the laser may be various, as illustrated in FIGS. 53A to 53C.

FIG. 53A illustrates a cross sectional view of 'A' of the first sealant along the line perpendicular to I-I' line of FIG. 52B, wherein the first sealant of the predetermined portion is completely removed.

FIG. 53B illustrates a cross sectional view of 'A' of the first sealant along the line perpendicular to I-I' of FIG. 52B, wherein the first sealant of the predetermined portion is partially removed, and some first sealant 280400a is formed at a predetermined interval from the first or second substrate 280100 or 280200.

FIG. 53C illustrates an exploded view of the first sealant 280400 from FIG. 52B. In FIG. 53C, the first sealant 280400 is formed in the closed shape, wherein the predetermined portion of the first sealant is smaller in width than the other portions of the first sealant by applying of laser. That is, when the pressure is applied to the predetermined portion of the first sealant, the predetermined portion of the first sealant is opened due to the small width.

Referring to FIGS. 53A and 53B, as removing the predetermined portion of the first sealant 280400, an opening for the liquid crystal is formed therein, whereby the liquid crystal is discharged through the opening. When discharging the liquid crystal, bubbles may be generated.

As illustrated in FIG. 53C, instead of forming the opening in the predetermined portion of the first sealant 280400, the predetermined portion of the first sealant 280400 has a closed shape of decreased width. That is, when the pressure is applied to the predetermined portion of the first sealant 280400, the predetermined portion of the first sealant 280400 is opened by the liquid crystal because of the decreased width of the first sealant 280400. In this case, it is possible to prevent a bubble from being generated when discharging the liquid crystal.

If the first sealant 280400 is formed in the closed shape of FIG. 53C, it is possible to prevent the inside of liquid crystal cell from contacting with the external air or moisture. At this time, preferably, the width of the first sealant of the predetermined portion is formed between 0.25 mm and 0.6 mm, so as to prevent the bubble from being generated when discharging the liquid crystal through the predetermined portion of the first sealant.

The inlet 280410 for liquid crystal, formed in the first sealant 280400, is provided at least one side of the liquid crystal cell having no gate and data pads (slant lines), so as to minimize the bad effects applied to the pads when regulating the amount of liquid crystal in the following step.

Figure 52C:
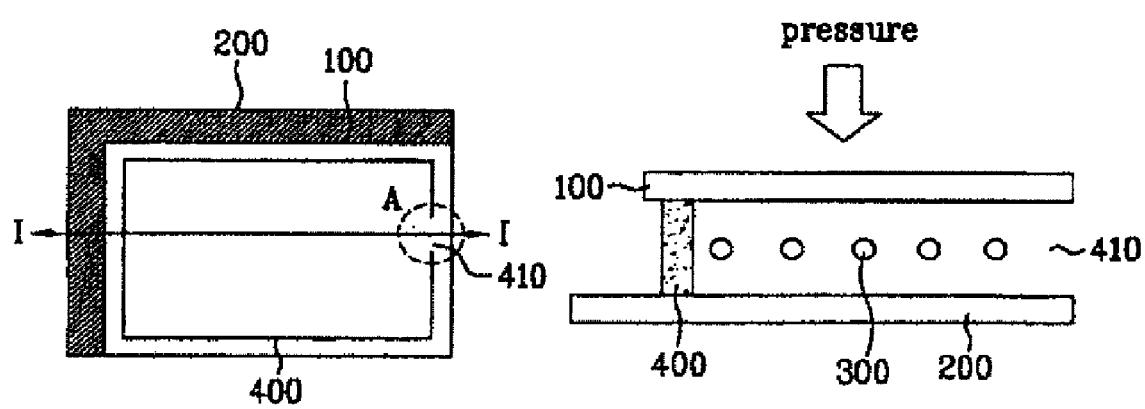

After that, as the pressure is applied to the liquid crystal cell as illustrated in FIG. 52C, the liquid crystal is discharged outside of liquid crystal cell.

FIG. 52C illustrates the case the liquid crystal is provided excessively. If the liquid crystal is provided insufficiently, a small amount of liquid crystal is provided to the inside of liquid crystal cell through the inlet 280410.

The amount of liquid crystal discharged to the outside of liquid crystal depends on the pressure applied to the liquid crystal cell. Thus, the pressure is selectively applied to the liquid crystal cell according to the amount of liquid crystal provided excessively.

Figure 52D:
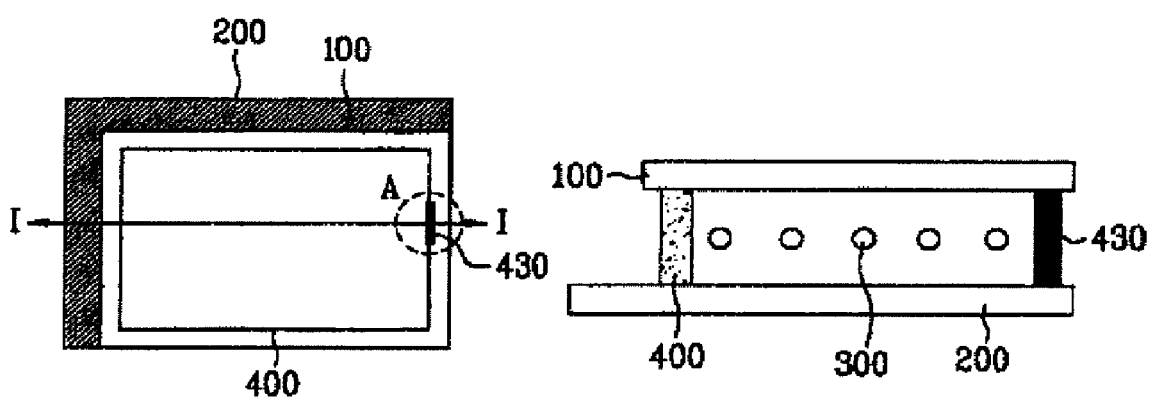

After that, as illustrated in FIG. 52D, the inlet 280410 is sealed.

The process of sealing the inlet 280410 may include steps of providing a second sealant 280430 to the inlet 280410 of the first sealant 280400, and curing the second sealant 280430.

If using the second sealant 280430 of UV-curing type, the process of curing the second sealant 280430 is performed by applying UV rays.

The second sealant 280430 and the first sealant 280400 are formed of the same material.

Hereinafter, an LCD device according to the present invention will be described as follows.

Figure 54:
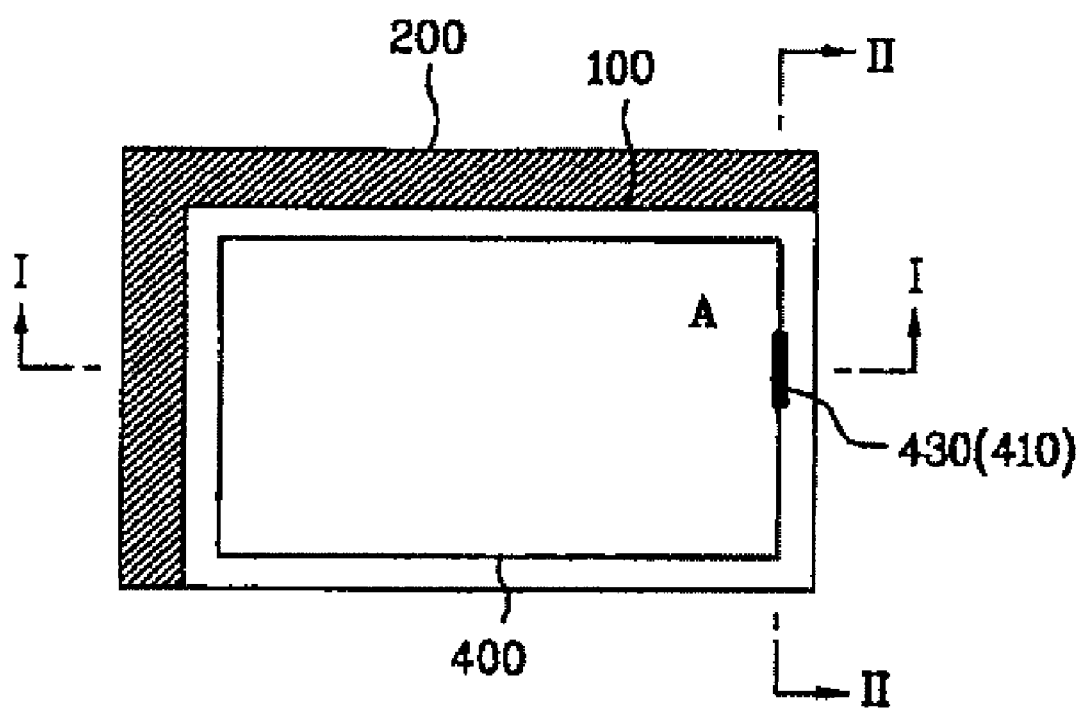
FIG. 54 illustrates a plane view of an LCD device in which an amount of liquid crystal is controlled according to one preferred embodiment of the present invention.
Figure 55A:
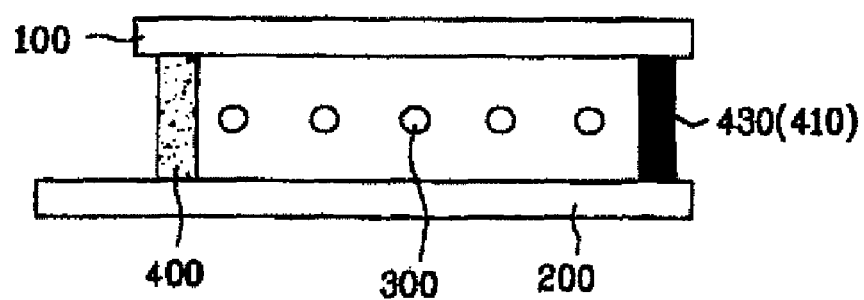
FIG. 55A illustrates an LCD device along I-I' of FIG. 54.
Figure 55B:
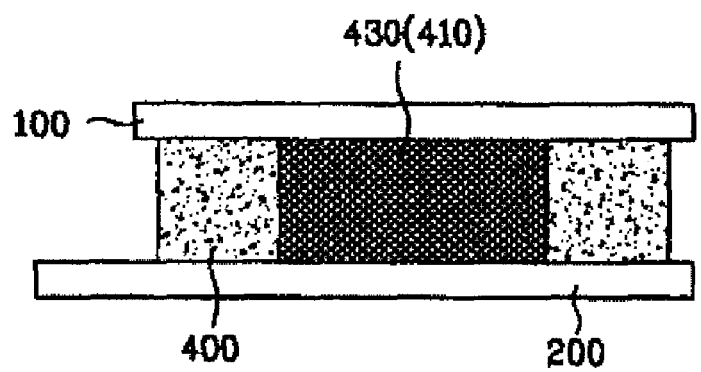
FIGS. 55B and 55C illustrate cross sectional views of various LCD devices along II-II' of FIG. 54.
Figure 55C:
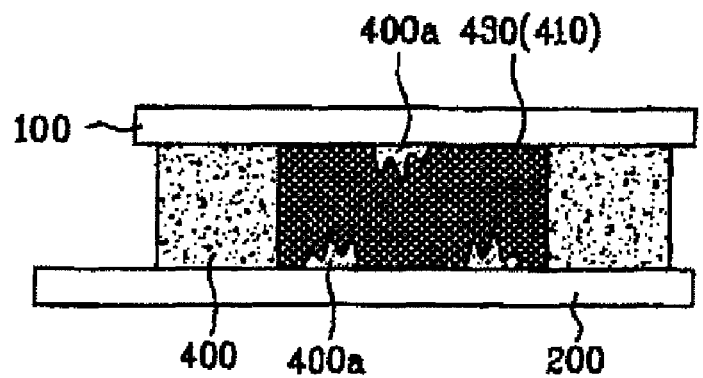

FIG. 54 illustrates a plane view of an LCD device in which an amount of liquid crystal is controlled according to one preferred embodiment of the present invention. FIG. 55A illustrates a cross sectional view of an LCD device along I-I' of FIG. 54. FIGS. 55B and 55C illustrate cross sectional views of various LCD devices along II-II' of FIG. 54.

As illustrated in FIGS. 54 and 55A, an LCD device according to one preferred embodiment of the present invention includes a first substrate 280100, a second substrate 280200, a liquid crystal layer 280300 formed between the first and second substrates 280100 and 280200, a first sealant 280400, formed in the periphery of the liquid crystal layer 280300 between the first and second substrates 280100 and 280200, having an inlet 280410 for providing or discharging liquid crystal therethrough, and a second sealant 280430 for sealing the inlet 280410 of the first sealant 280400.

Although not illustrated, the first substrate 280100 includes a black matrix layer for preventing light leakage, a color filter layer formed between each pattern of the black matrix layer, and a common electrode formed on the color filter layer.

Although not illustrated, the second substrate 280200 includes gate and data lines crossing each other to define a unit pixel region, a gate pad formed at one end of the gate line, and a data pad formed at one end of the data line. The gate and data pads correspond to slant lines of FIG. 54.

In addition, a thin film transistor is formed adjacent to a crossing portion of the gate and data lines, wherein the thin film transistor functions as a switch. Also, a pixel electrode is formed in the pixel region, and is electrically connected with the thin film transistor.

Also, an inlet 280410 for supplying or discharging liquid crystal may be formed by completely removing a predetermined portion of the first sealant 280400 as illustrated in FIG. 55B, or may be formed by partially removing a predetermined portion of the first sealant 280400 as illustrated in FIG. 55C. In FIG. 55C, as partially removing the predetermined portion of the first sealant 280400, some first sealant 280400a is formed at a predetermined interval from the first or second substrate 280100 or 280200.

Although not illustrated, the inlet 280410 for liquid crystal is formed with the first sealant 280400 being left in the predetermined portion. As explained in FIG. 53C, the inlet 280410 may be formed according as some of the first sealant having a predetermined width is opened by the liquid crystal inside the liquid crystal cell. Preferably, the width of the first sealant of the predetermined portion is formed between 0.25 mm and 0.6 mm.

Preferably, the inlet 280410 for liquid crystal is provided at least one side (the side corresponding to the other portions except slant lines in FIG. 54) of the liquid crystal cell having no gate and data pads.

The first and second sealants 280400 and 280430 may be formed of the same material.

As mentioned above, the LCD device according to the present invention has the following advantages.

Even though the liquid crystal is provided insufficiently or excessively to the LCD panel, the inlet is formed in the sealant. Thus, it is possible to regulate the amount of liquid crystal by supplying or discharging the liquid crystal through the inlet of the sealant.

FIGS. 56A to 56D are diagrams explaining a method of fabricating a liquid crystal display device according to another embodiment of the present invention. In each of the drawings, a left diagram indicates a layout of a liquid crystal display device and a right diagram indicates a cross-sectional diagram of the liquid crystal display device along a cutting line I-I of the left diagram.

Figure 56A:
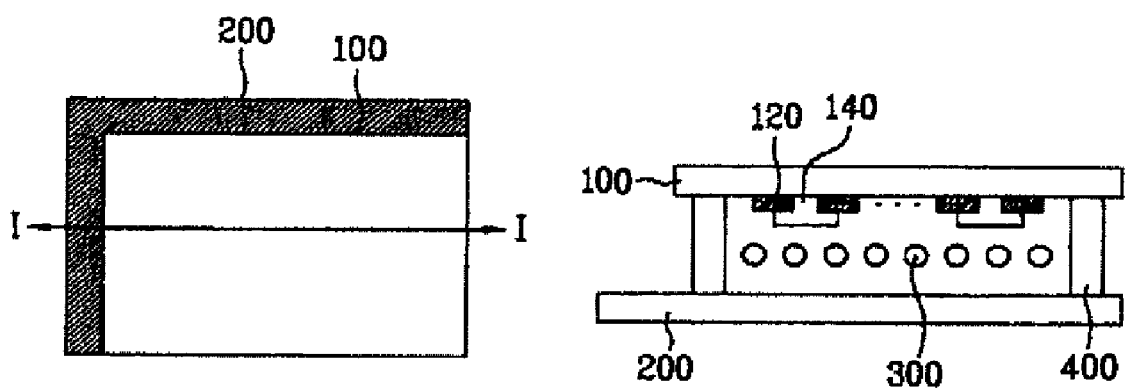
FIGS. 56A to 56D are diagrams for explaining a method of fabricating a liquid crystal display device according to an embodiment of the present invention.

Referring to FIG. 56A, a liquid crystal cell is prepared that includes a first substrate 290100, a second substrate 290200, and a liquid crystal layer 290300 formed between both of the substrates 290100 and 290200.

The liquid crystal cell is prepared by a process of preparing the first substrate 290100, a process of preparing the second substrate 290200, and a process of forming the liquid crystal layer 290300 between the substrates 290100 and 290200 and bonding the substrates 290100 and 290200 together.

The process of preparing the first substrate 290100 includes forming a shield layer 290120 to prevent light leakage on the transparent first substrate 290100 and forming a color filter layer 290140 on an area between the shield layer 290120.

In addition, a common electrode (not illustrated in the drawing) can be formed on the color filter layer 290140. In an IPS (in-plane switching) mode liquid crystal display device, the common electrode is formed not on the first substrate but on the second substrate 290200 in parallel with a pixel electrode.

The process of preparing the second substrate 290200 includes the steps of forming a gate line and a data line crossing with each other to define a pixel area, forming a thin film transistor switching device at a crossing of the gate line and the data line, and forming a pixel electrode in the pixel area to be electrically connected to the thin film transistor.

In this example, a gate pad part is formed at one end portion of the gate line and a data pad part is formed on one end portion of the data line. Thus, the gate or data line is connected to a drive circuit via the corresponding pad part.

Because the gate and data pad parts are provided to the second substrate 290200, each side of the second substrate 290200 is greater than that of the first substrate 290100. And, the gate or data pad part is formed on the corresponding side (a shaded portion in the left diagram of FIG. 56A) of the second substrate 290200.

The process of forming the liquid crystal layer 290300 between the substrates 290100 and 290200 and bonding the substrates 290100 and 290200 together is performed by a liquid crystal dropping method. In particular, a sealant 290400 is formed one of the substrates 290100 and 290200, a prescribed quantity of liquid crystals 290300 is dropped on one of the substrates 290100 and 290200, and the substrates 290100 and 290200 are then bonded together.

In the above-explained process of preparing the liquid crystal cell, materials and forming methods of the respective elements can be modified according to various methods known to those skilled in the art.

Subsequently, by checking a quantity of the liquid crystals 290300, it can be determined whether the filling process has provided an insufficient or excessive amount of the liquid crystals.

Checking the quantity of liquid crystals in a liquid crystal cell can be performed according to a general unaided-eye examination or other check methods known to those skilled in the art.

If it is decided that a proper quantity of the liquid crystals is not dropped according to the liquid crystal quantity check (i.e., in the event of an insufficiently filled area due to lack of a liquid crystal quantity or in the even of an excessively filled area due to an excessive quantity of liquid crystals), a liquid crystal quantity adjusting process discussed below is carried out.

Figure 56B:
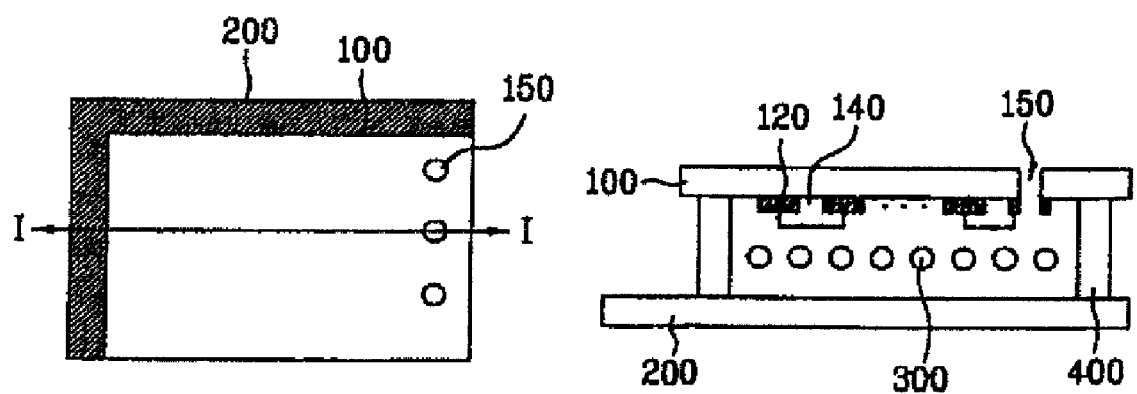

If the insufficient or excessive filling area has resulted, a hole 290150, as illustrated in FIG. 56B, is formed in the liquid crystal cell.

The hole 290150 is, for example, formed in an area where the shield layer 290120 of the first substrate 290100 is formed. For example, the hole 290150 is formed on an area where a most outer part of the shield layer 290120 of the first substrate 290100 is formed.

The hole 290150 may be formed in at least one side of the liquid crystal cell where the gate and pad parts (shaded portion) are not formed to minimize any effect or influence put on the pad parts in adjusting the liquid crystal quantity in a later process.

Moreover, a plurality of holes 290150 can be formed according to the extent of the insufficient or excessive filling instead of restricting the number of the holes 290150.

The hole 290150 can be formed in the liquid crystal cell using equipment such as a drill, an ultrasonic device, a laser device or the like. In addition, the hole 290150 can be formed in various ways known to those skilled in the art.

Figure 56C:
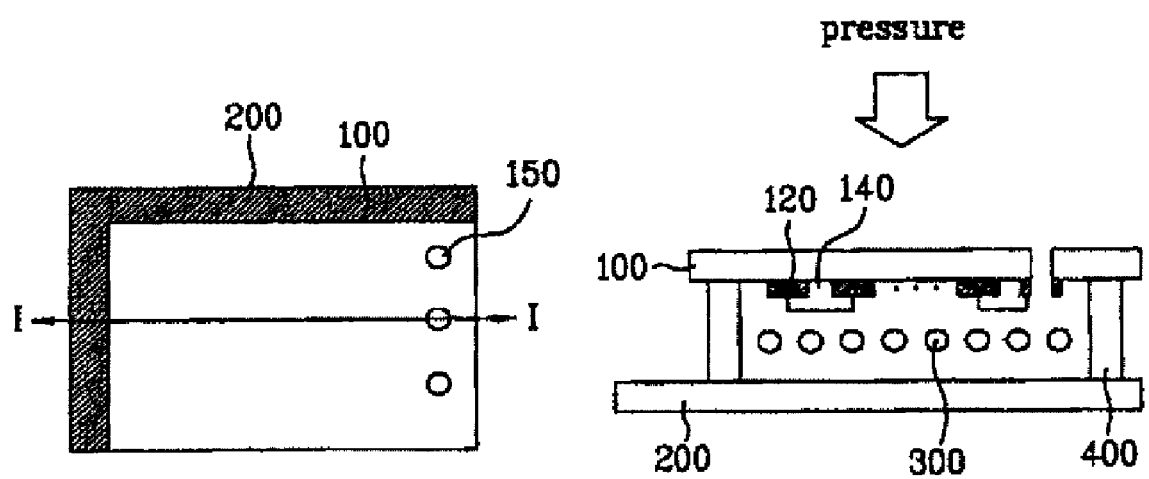

By pressurizing the liquid crystal cell, as illustrated in FIG. 56C, a prescribed quantity of the excess liquid crystals is externally discharged.

FIG. 56C illustrates an example of excessive filling of liquid crystals. In the event of insufficient filing of the liquid crystals, a prescribed quantity of liquid crystals is injected into the liquid crystal cell via the hole 290150.

Since the quantity of the externally discharged liquid crystals varies according to a size of the pressure applied to the liquid crystal cell, a proper pressure is selected according to the quantity of the excessive filling liquid crystals in the liquid crystal cell.

Figure 56D:
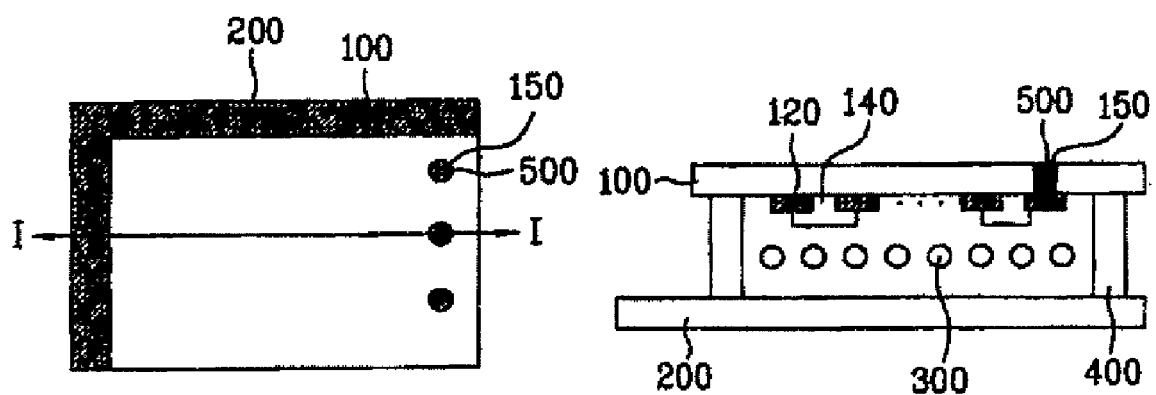

Subsequently, the hole 290150, as illustrated in FIG. 56D, is blocked or otherwise closed.

The process of blocking the hole 290150 includes the steps of injecting a filler 290500 in the hole 290150 and hardening the filler 290500.

In this case, the filler 290500 is hardened in a manner of applying heat or UV-rays according to a property of the filler 290500.

If the hole 290150 is formed on the area where the shield layer 290140 is formed, the filer 290500 is formed of an opaque material to enable a light-shielding function.

Figure 57:
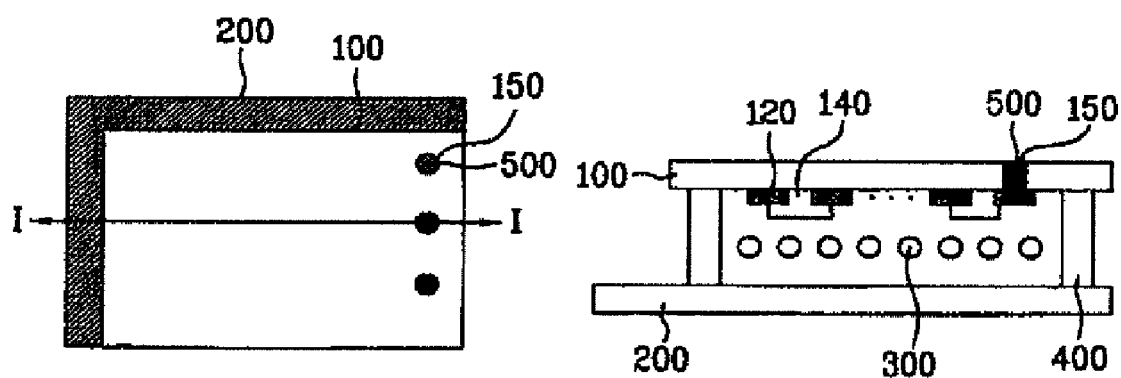
FIG. 57 is a diagram of a liquid crystal display device according to an embodiment of the present invention, in which a liquid crystal quantity is adjusted.

FIG. 57 is a diagram of a liquid crystal display device according to another embodiment of the present invention, in which a left diagram indicates a layout of a liquid crystal display device and a right diagram indicates a cross-sectional diagram of the liquid crystal display device along a cutting line I-I of the left diagram.

Referring to FIG. 57, a liquid crystal display device according to another embodiment of the present invention includes a first substrate 290100, a second substrate 290200, a liquid crystal layer 290300 formed between the substrates 290100 and 290200, a liquid crystal quantity adjusting hole 290150 formed in the first substrate 290100 and a filler 290500 blocking the hole 290150.

A shield layer 290120 is formed on the first substrate 290100 to prevent light leakage and a color filter layer 290140 is formed on an are on between the shield layer 290120.

And, a common electrode (not illustrated in the drawing) can be formed on the color filter layer 290140.

A gate line (not illustrated in the drawing) and a data line (not illustrated in the drawing) are formed crossing each other on the second substrate 290200 to define a pixel area. A gate pad part is formed at one end portion of the gate line and a data pad part is formed at one end portion of the data line. The gate and data pad parts are formed in a shaded portion illustrated in FIG. 57.

A thin film transistor is formed as a switching device at an intersection between the gate and data lines and a pixel electrode is formed in the pixel area to be electrically connected to the thin film transistor.

The hole 290150 is formed in an area where a shield layer 290120 of the first substrate 290100 is formed. For example, the hole 290150 may be formed in an area where a most outer shield layer 290120 is formed.

For example, the hole 290150 is formed in at least one side of a liquid crystal cell where the gate and data pad parts are not formed.

Optionally, a plurality of holes 290150 can be formed according to an extent of failure.

The filler 290500 blocking the hole 290150 is formed of an opaque material for a light-shielding function.

Accordingly, the present invention provides the following effect or advantage.

Although an insufficient or excessive filling area is generated due to an inaccurate quantity of dropped liquid crystals, the liquid crystal quantity can be adjusted through a hole formed in a liquid crystal cell. Hence, a liquid crystal quantity failure can be cured.

Figure 58:
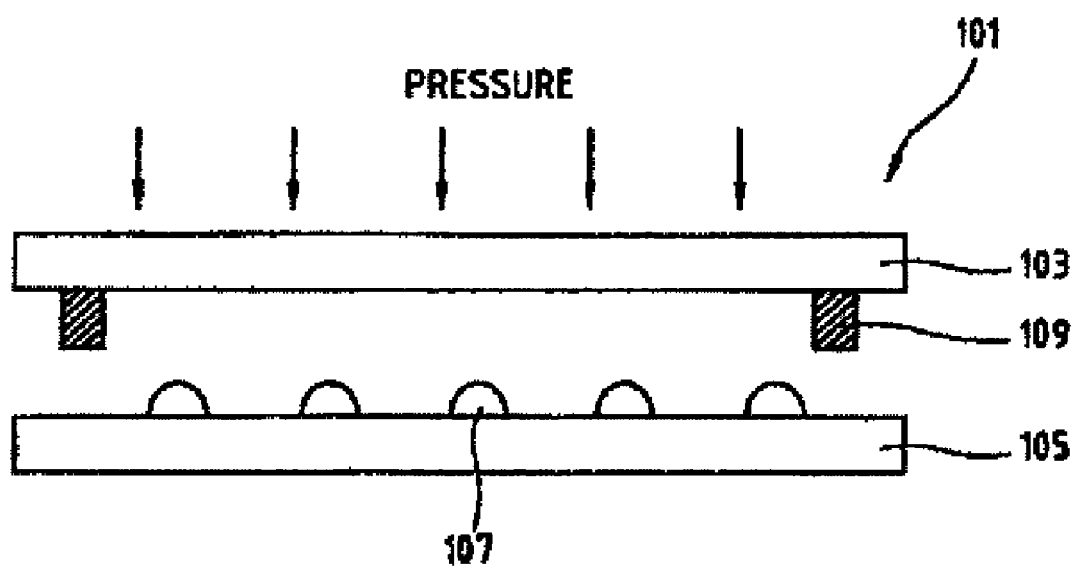
FIG. 58 is a view illustrating a LCD device fabricated by a liquid crystal dispensing method.

FIG. 58 is illustrates the concept of a liquid crystal dispensing method. As illustrated in FIG. 58, in the liquid crystal dispensing method, the liquid crystal is dropped onto a lower substrate 300105 before assembling the lower substrate 300105 and an upper substrate 300103 having a driving device array and a color filter respectively. Alternatively, the liquid crystal 300107 may be dropped onto the substrate 300103 on which the color filter is formed. That is, the liquid crystal 300107 may be dropped either on a TFT (thin film transistor) substrate or on a CF (color filter) substrate. The substrate on which the liquid crystal 300107 is dropped may be disposed as the lowermost substrate during assembly of substrate 300103 and 300105.

A sealing material 300109 is applied on a peripheral portion of the upper substrate 300103, and the upper substrate 300103 and the lower substrate 300105 are bonded as the upper substrate 300103 and the lower substrate 300105 are pressed together. During the bonding process, the liquid crystal drops 300107 are spread out due to the pressure, thereby forming a liquid crystal layer of uniform thickness between the upper substrate 300103 and the lower substrate 300105. That is, with the liquid crystal dispensing method, the liquid crystal 300107 is dropped onto the lower substrate 300105 before the panel 300101 is assembled, and subsequently the upper substrate 300103 and the lower substrate 300105 are attached by the sealing material 300109.

Figure 59:
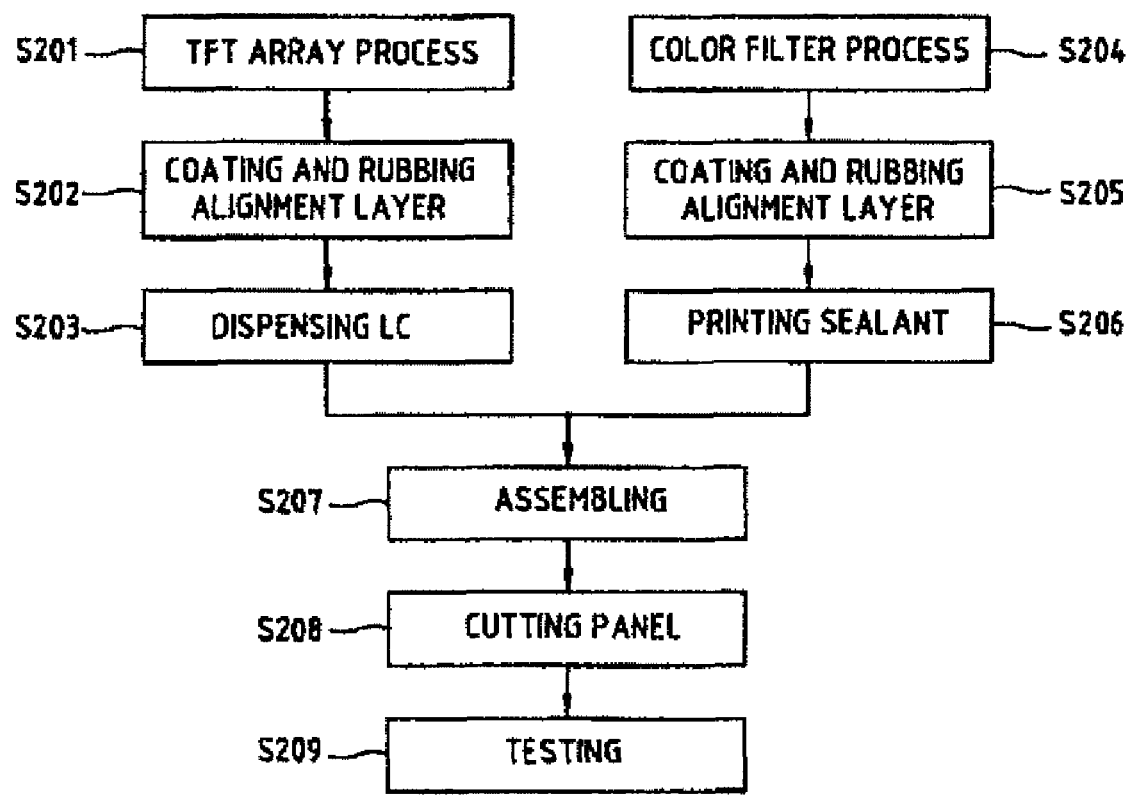
FIG. 59 is a flow chart illustrating a method of fabricating a liquid crystal display device using a liquid crystal dispensing method.

FIG. 59 illustrates a method for fabricating the LCD by applying the above liquid crystal dispensing method. As illustrated, the driving devices such as the TFT and the color filter layers are formed on the lower substrate 300105 and on the upper substrate 300103 with the TFT array process and the color filter process, respectively (300S201 and 300S202). The TFT array process and the color filter process are generally similar to those of the related art processes illustrated in FIG. 4. These processes are performed on the glass substrates having a plurality of the unit panel areas. By applying the liquid crystal dispensing method to the manufacturing of the LCD, a glass substrates of large area (e.g. having an area of 3001000×3001200 mm2) can be used.

On the lower and upper substrates 300105 and 300103 on which the TFT and the color filter layer are respectively formed, the alignment layers are formed and rubbed (300S202 and 300S205). The liquid crystal 300107 is dropped onto the liquid crystal unit panel areas of the lower substrate 300105, and the sealing material 300109 is applied onto the outer portion areas of the liquid crystal unit panel areas on the upper substrate (300S203 and 300S206).

Thereafter, the upper and lower substrates 300103 and 300105 are disposed facing each other and pressed together to bond to each other using the sealing material. Pressing together the upper 300103 and lower substrates 300105 causes the liquid crystal 300107 to spread out on the entire panel evenly (300S207). By this process, a plurality of liquid crystal unit panel areas 300101, on which the liquid crystal layers are formed, are formed on the assembled large glass substrates (i.e., the attached lower and upper substrates). The assembled glass substrates are processed and cut into a plurality of liquid crystal unit panels. The resultant liquid crystal unit panels are inspected, thereby finishing the LCD panel process (300S208 and 300S209).

Figure 1:
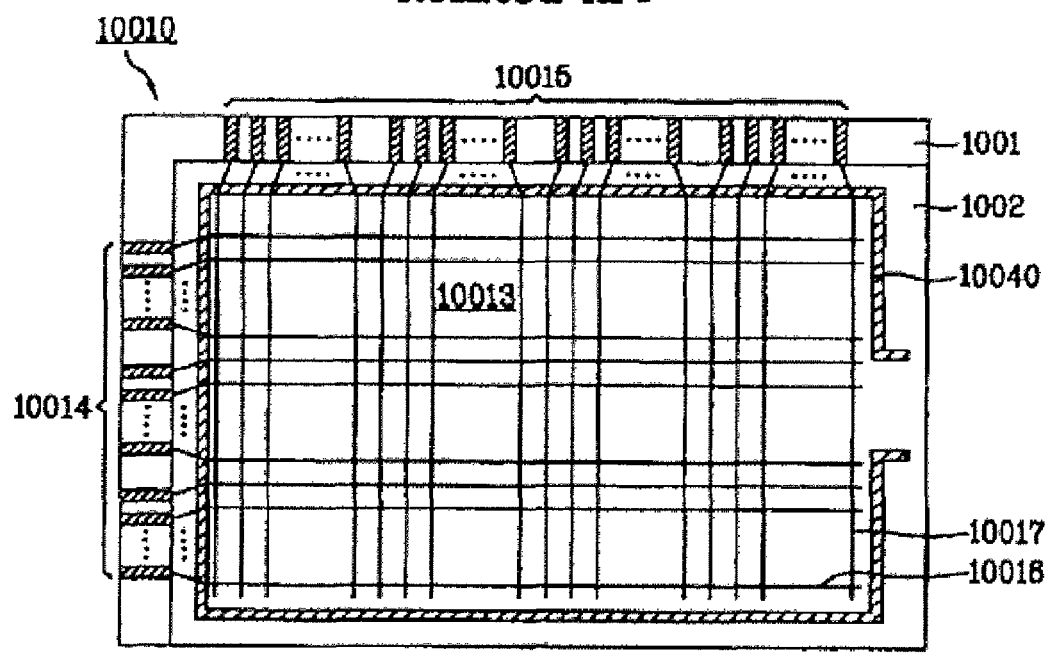
FIG. 1 is an exemplary view illustrating a plane structure of a unit liquid crystal display panel formed by attaching a thin film transistor (TFT) array substrate and a color filter substrate in a facing manner.
Figure 2:
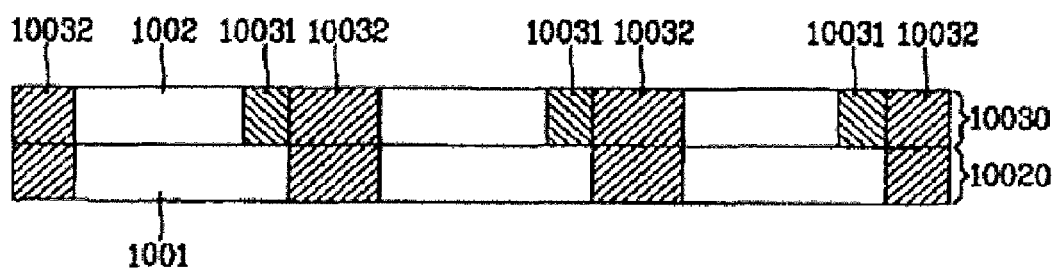
FIG. 2 is a view illustrating the structure of a section of the unit liquid crystal display panel formed by attaching the first mother substrate on which the TFT array substrates are formed and the second mother substrate on which the color filter substrates are formed.
Figure 3:
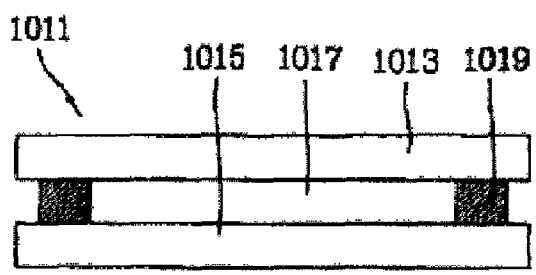
FIG. 3 is a cross-sectional view illustrating a related art liquid crystal display device.
Figure 4:
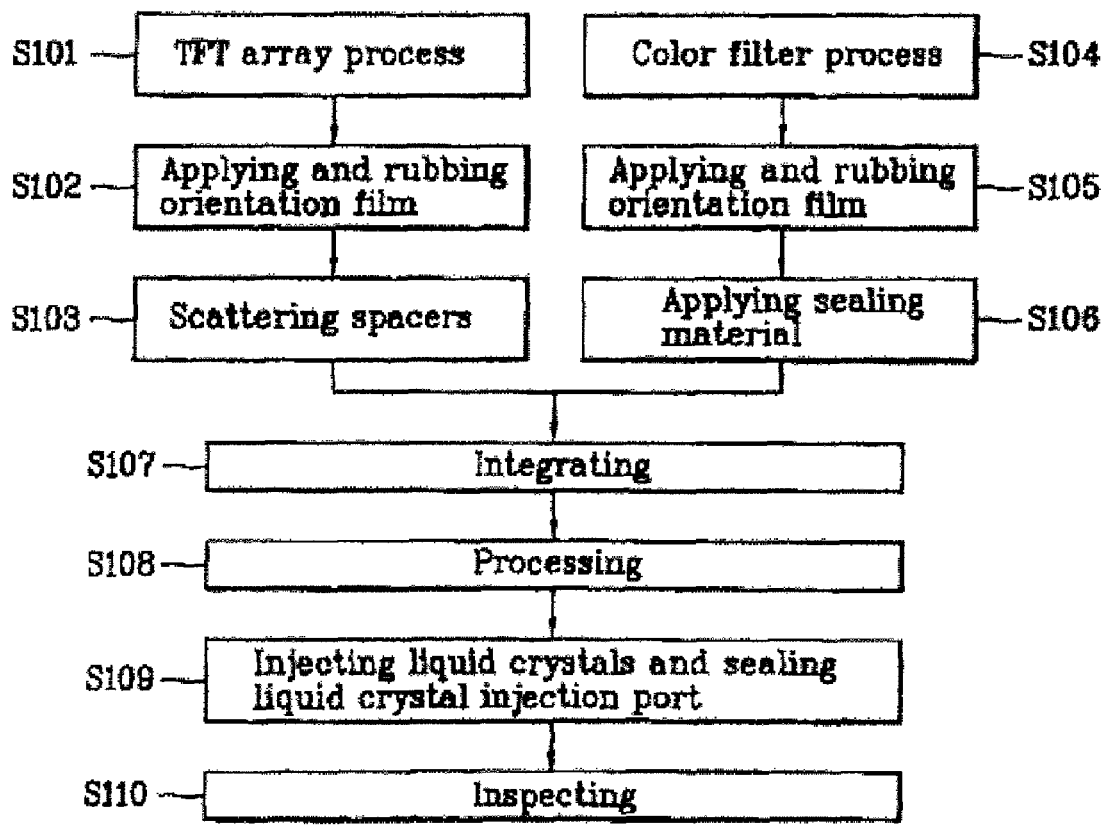
FIG. 4 is a flow diagram illustrating a method for manufacturing the related art liquid crystal display device.
Figure 5:
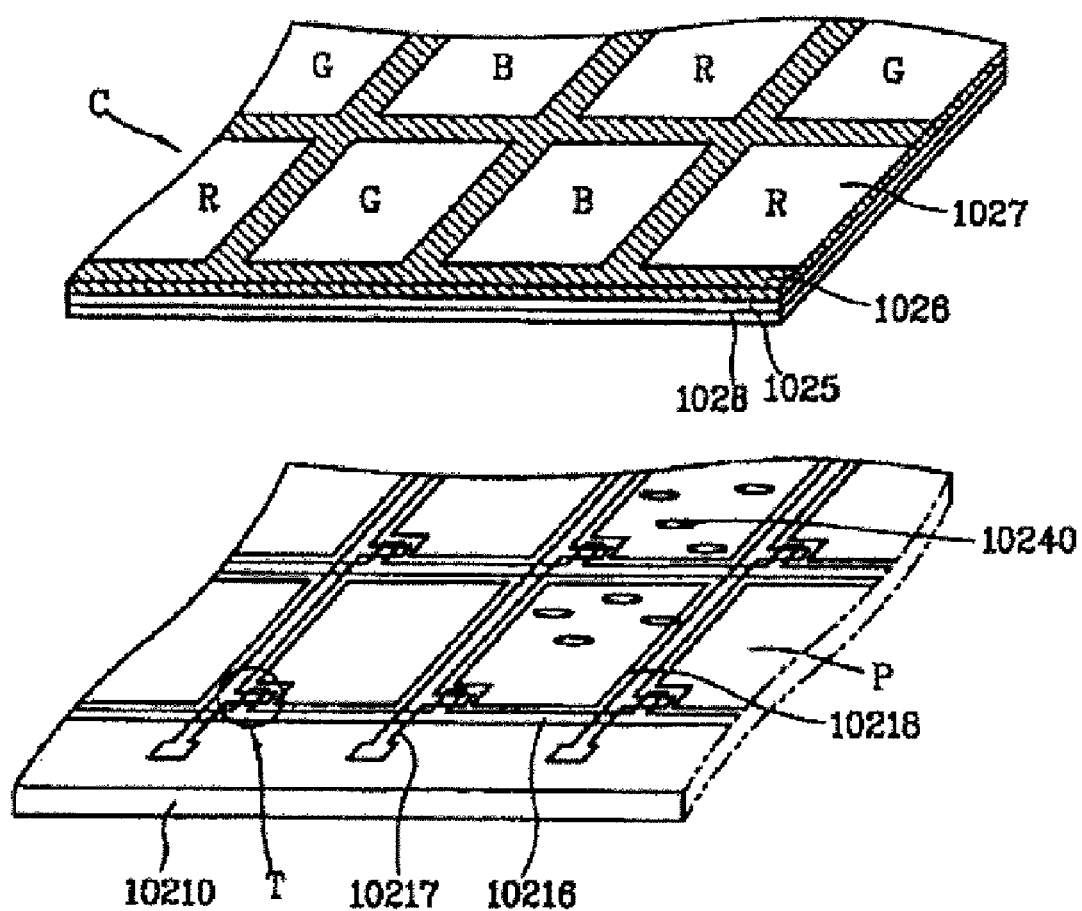
FIG. 5 is an exploded perspective view illustrating the structure of a LCD device.
Figure 6:
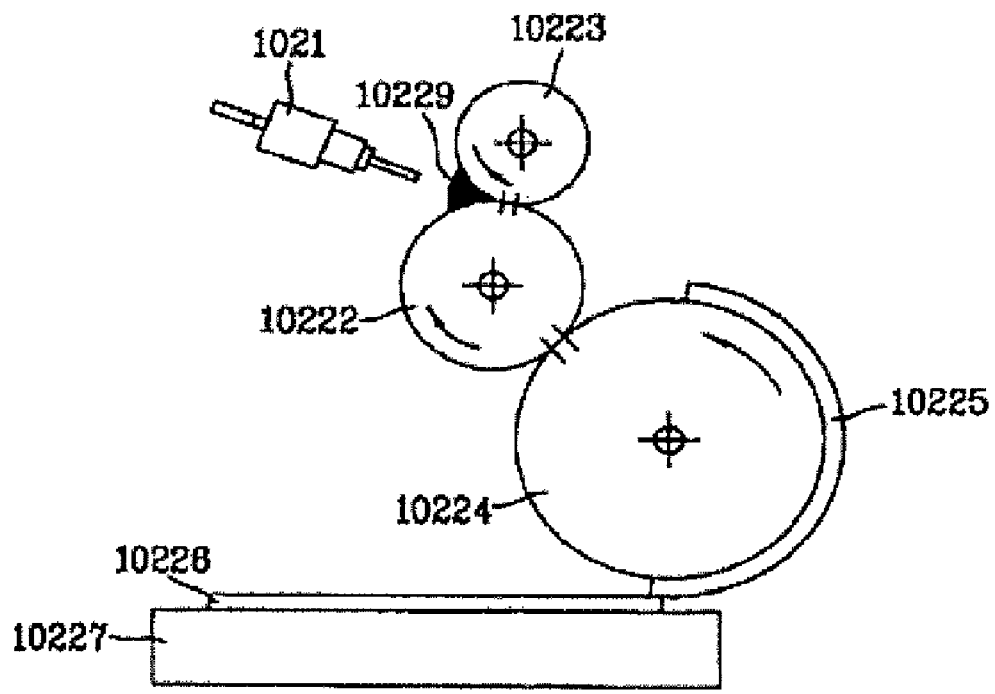
FIG. 6 is a view illustrating a method for forming an alignment film using a roll printing method.
Figure 7:
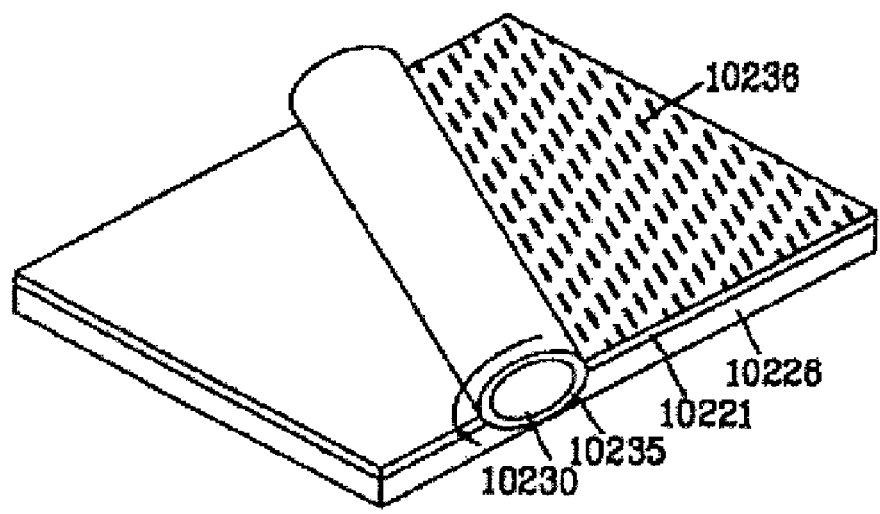
FIG. 7 is a perspective view illustrating a rubbing process.
Figure 8:
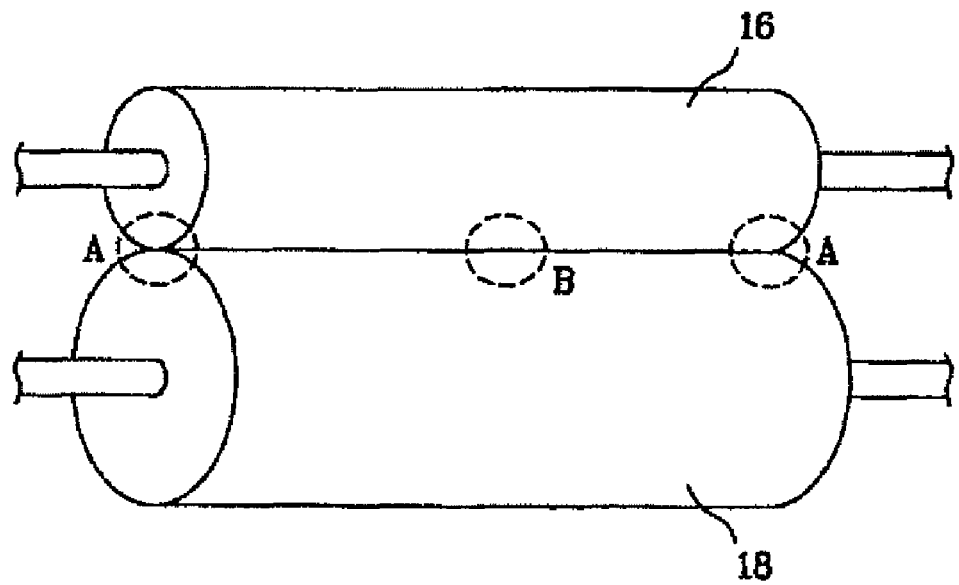
FIG. 8 is a perspective view illustrating a problem of a related art roll printing device.
Figure 9:
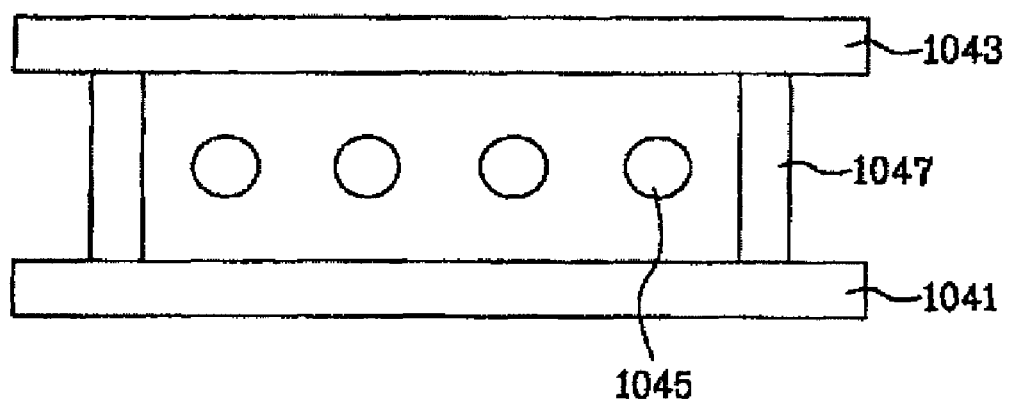
FIG. 9 is a schematic sectional view of a conventional liquid crystal display device.
Figure 10:
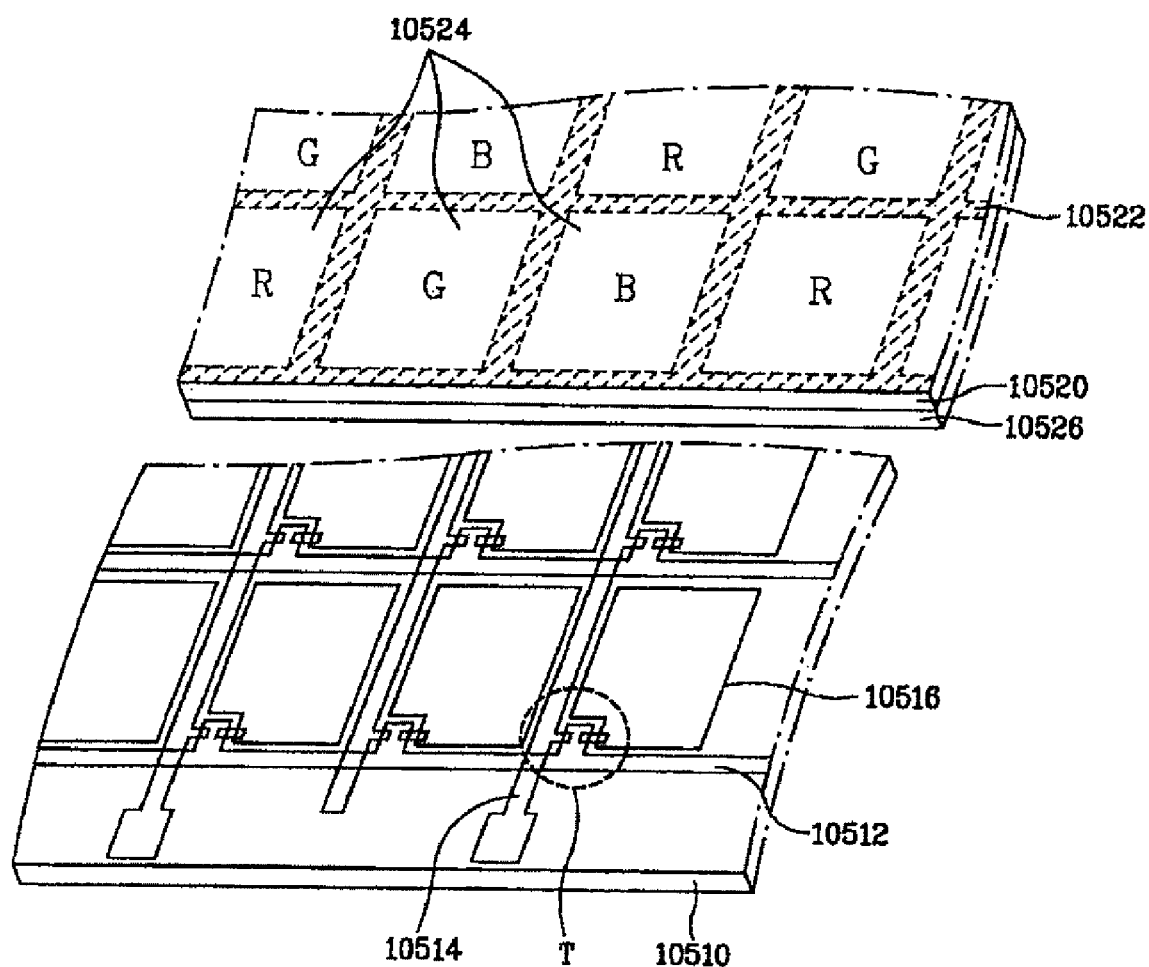
FIG. 10 illustrates an exploded perspective view of an LCD device according to the related art.
Figure 11:
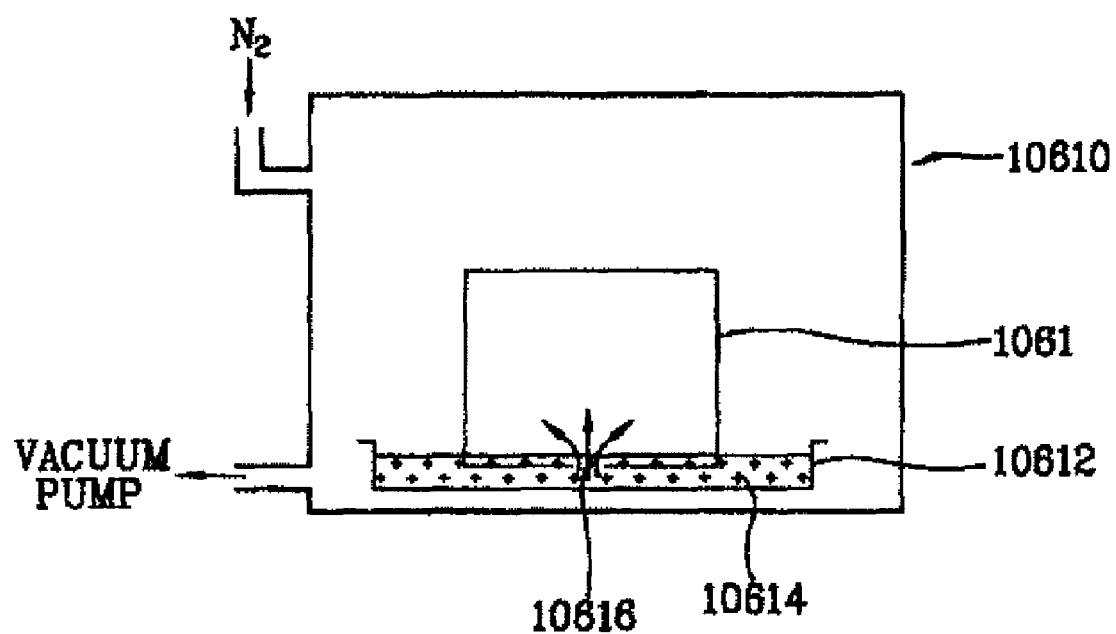
FIG. 11 is a view illustrating injection of liquid crystal according to the related art LCD device.
Figure 12:
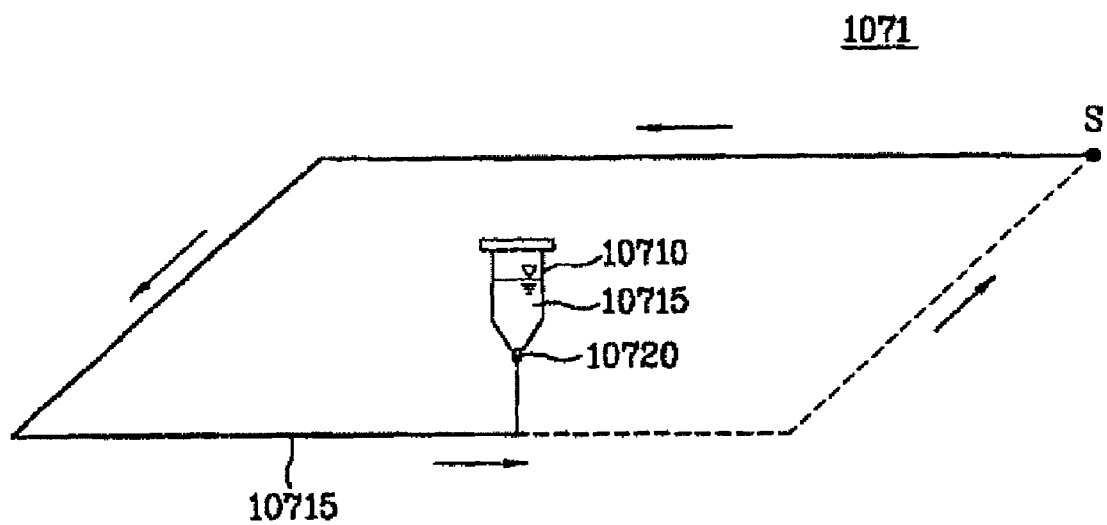
FIG. 12 is a schematic view illustrating a sealant dispensing method using a dispenser according to the related art.
Figure 13:
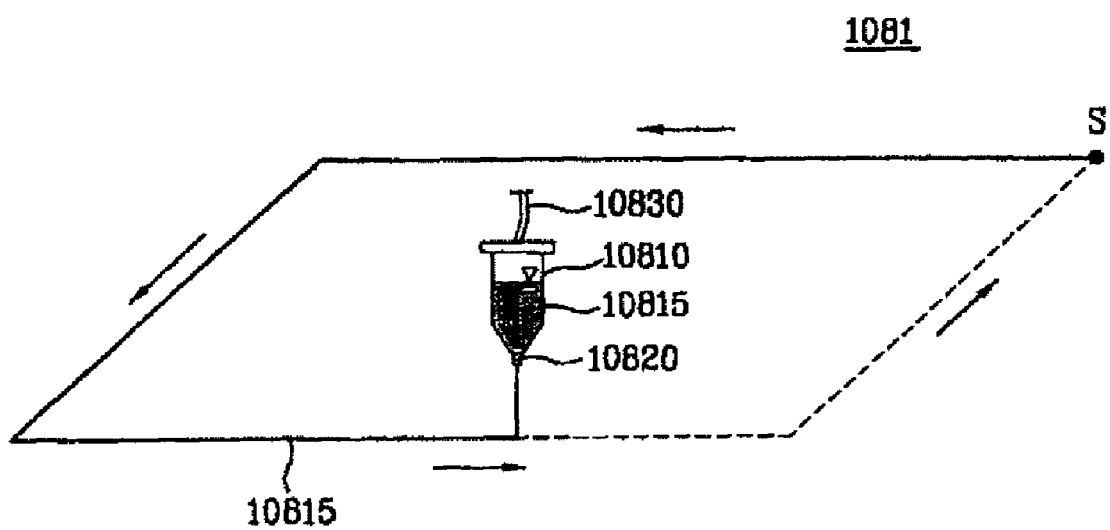
FIG. 13 is a schematic view illustrating a sealant forming method using a dispenser according to the related art.
Figure 14:
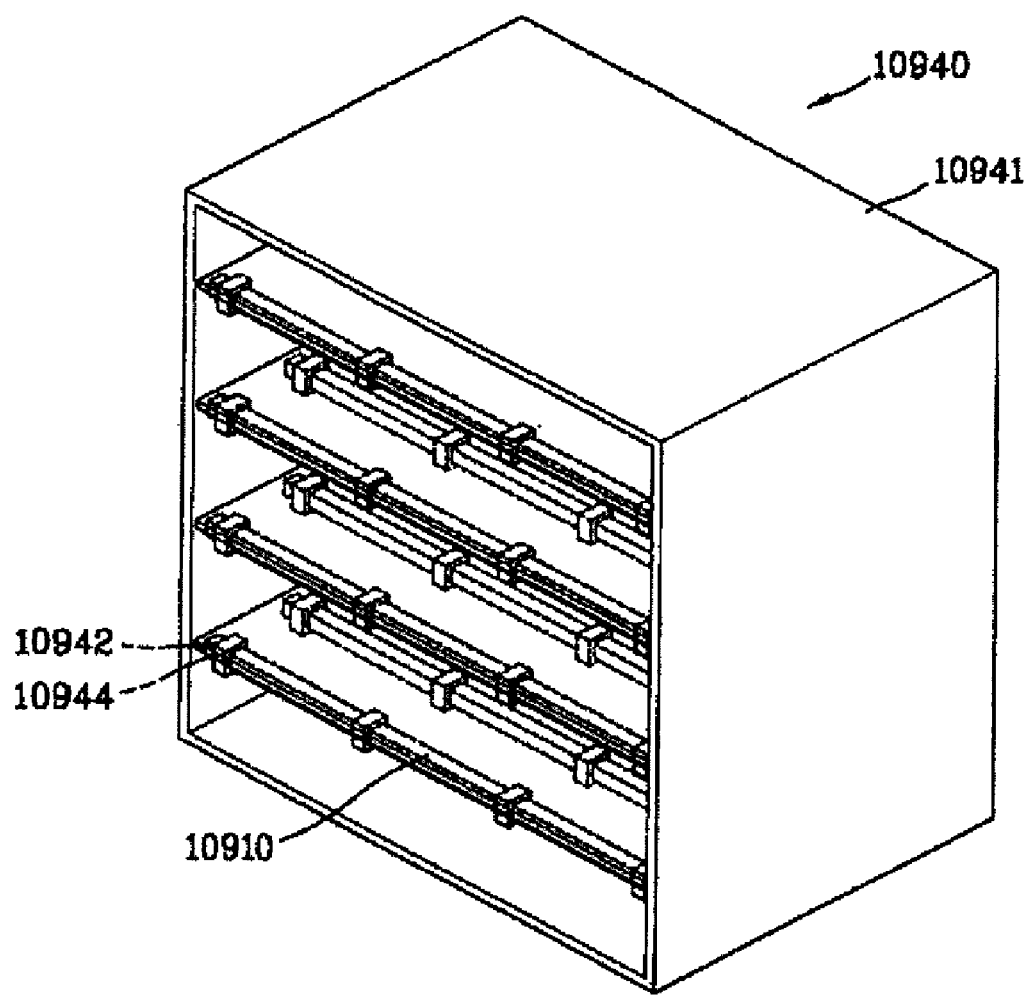
FIG. 14 is a perspective view illustrating a cassette for an LCD device in accordance with the related art.
Figure 15:
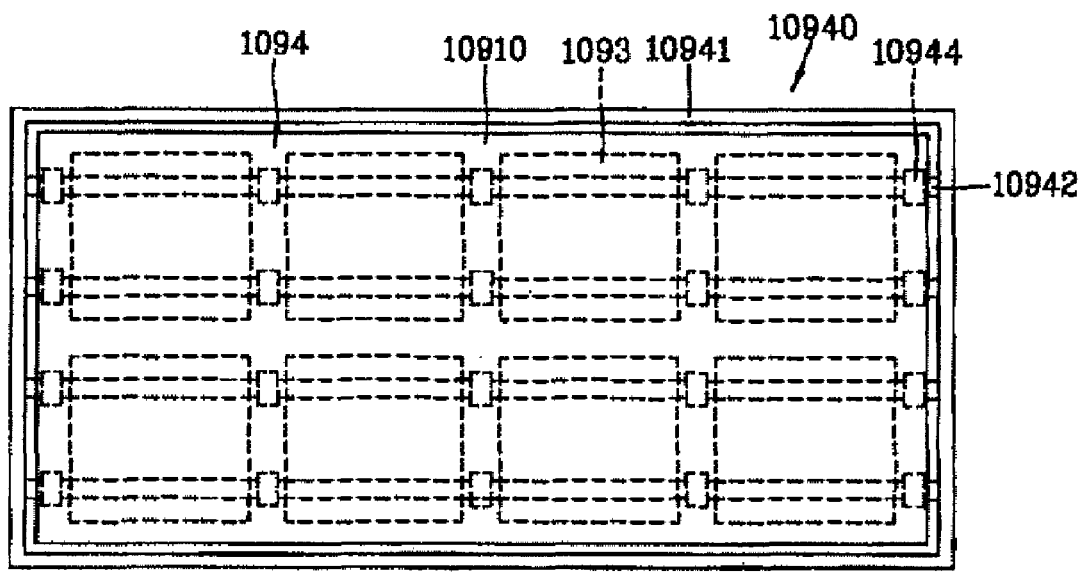
FIG. 15 is a plane view illustrating an inner structure of the cassette for an LCD device in accordance with the related art.
Figure 16:
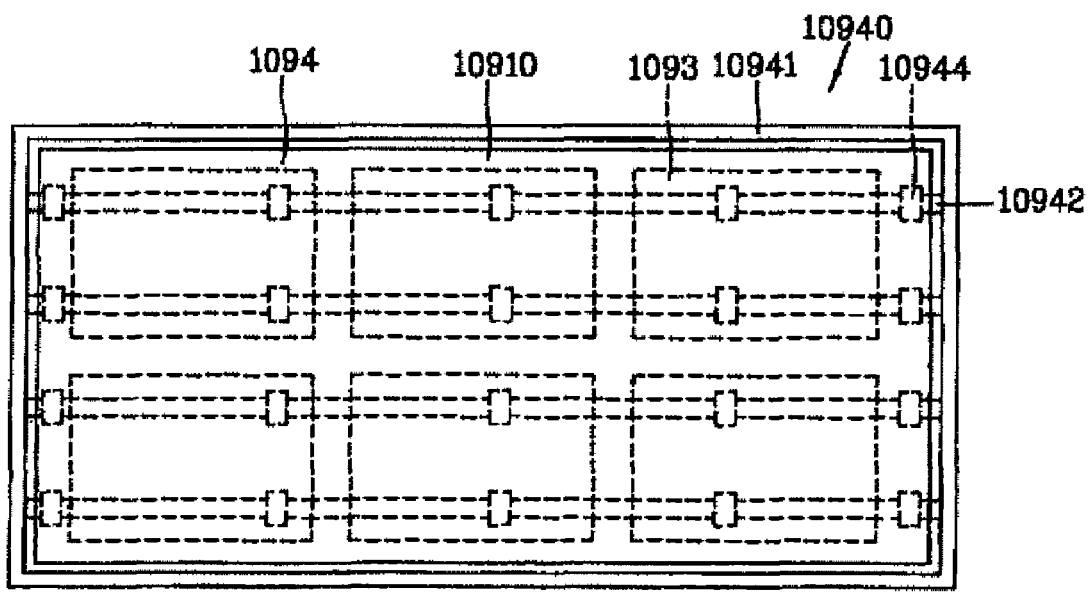
FIG. 16 is a plane view illustrating an inner structure of the cassette, in which a substrate having a different size from a substrate of FIG. 15 has been received.
Figure 17A:
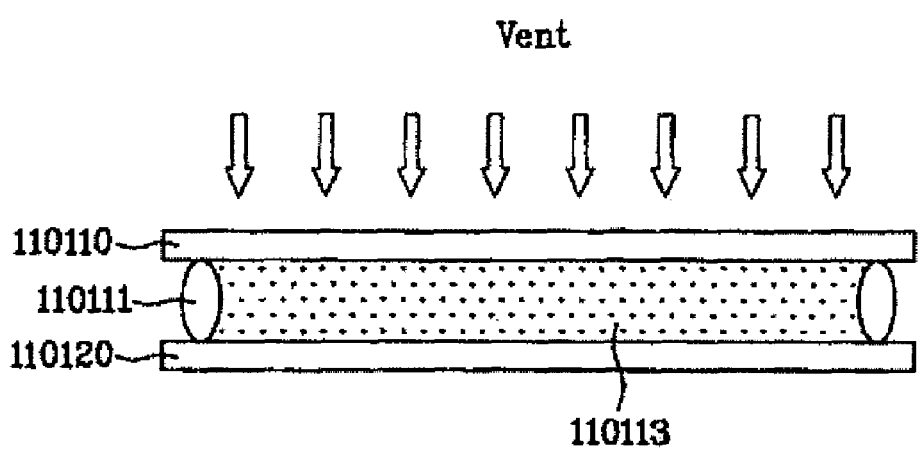
FIG. 17A is a schematic view illustrating bonding of substrates achieved in accordance with a uniform venting process.
Figure 17B:
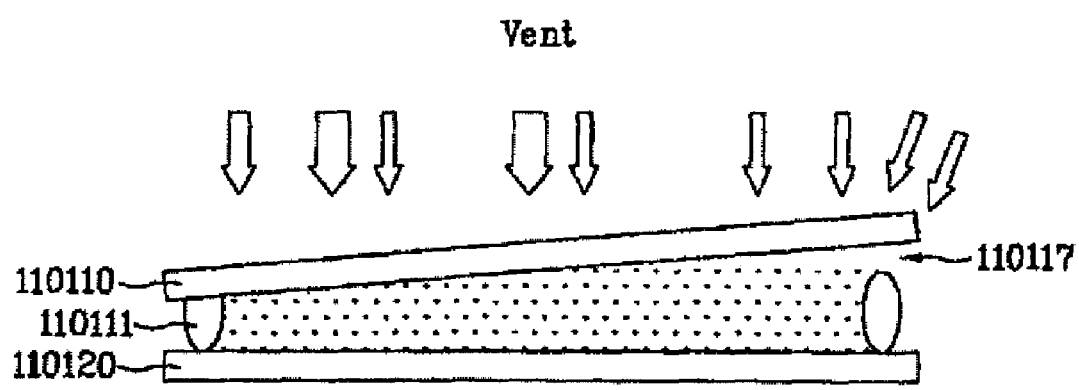
FIG. 17B is a schematic view illustrating bonding of substrates achieved in accordance with a non-uniform venting process.
Figure 18:
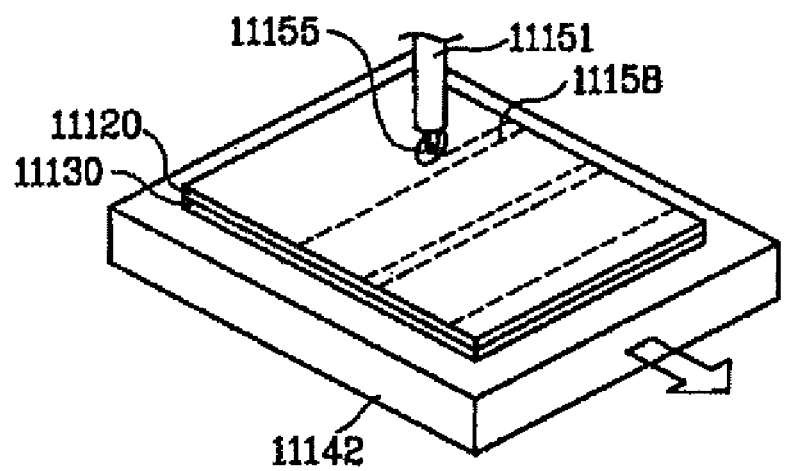
FIG. 18 is an exemplary view illustrating a cutting process of a liquid crystal display panel.
Figure 19A:
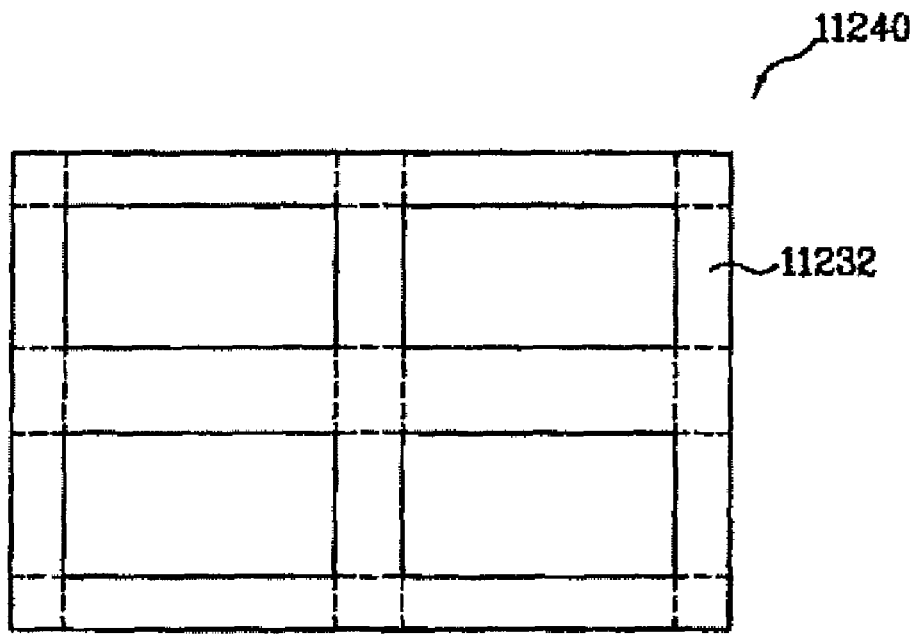
FIGS. 19A through 19I are plan views illustrating a substrate on which cutting lines are formed via a scribing process and a breaking process.
Figure 19B:
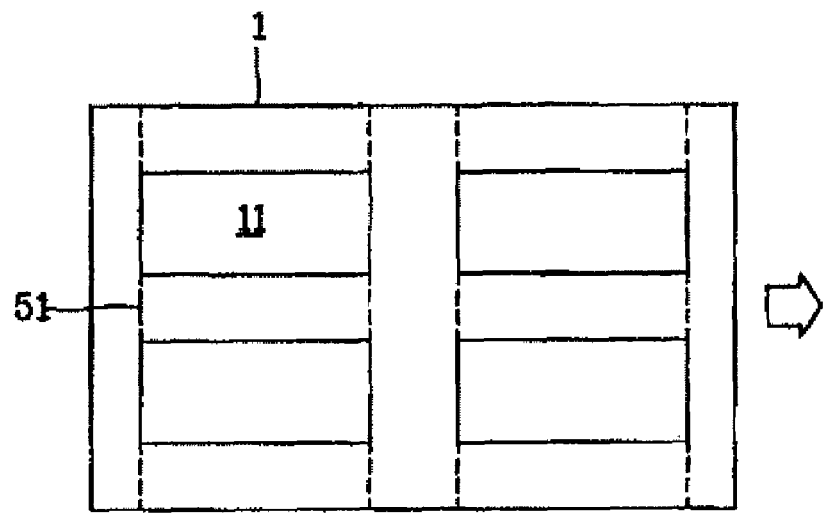
Figure 19C:
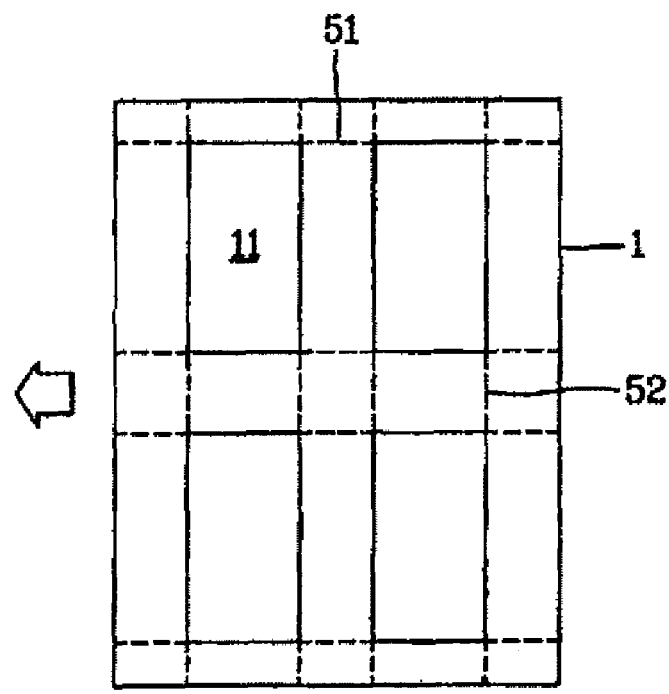
Figure 19D:
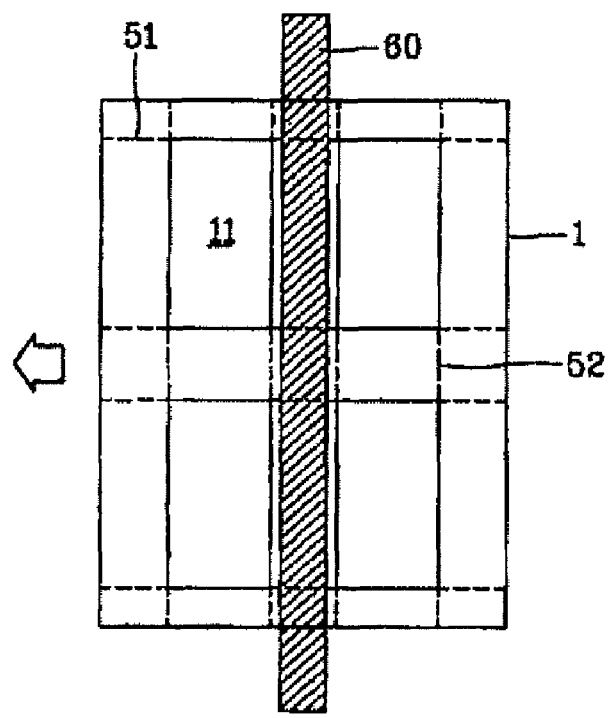
Figure 19E:
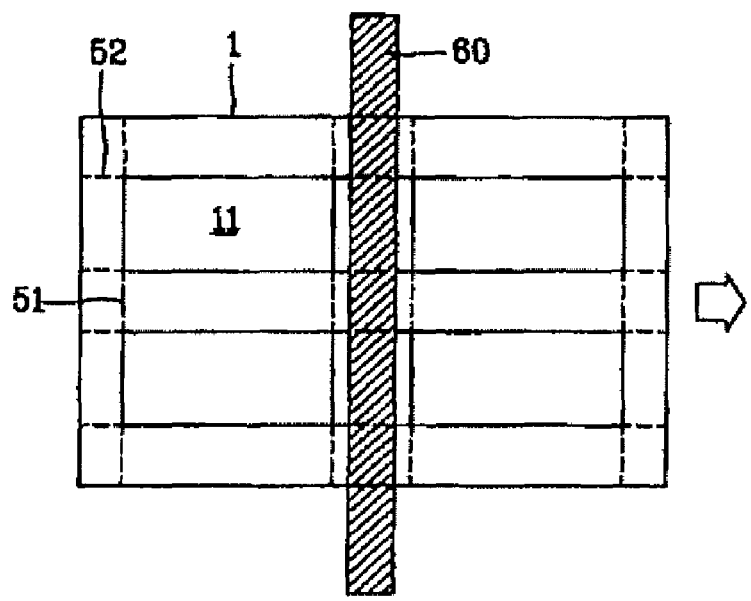
Figure 19F:
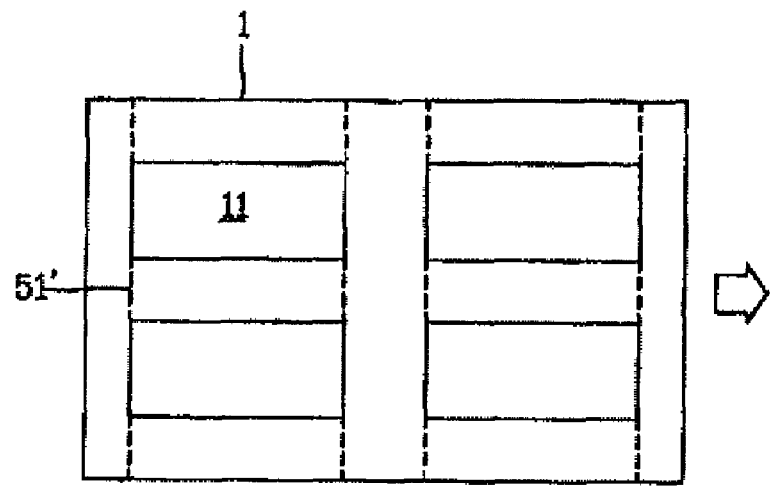
Figure 19G:
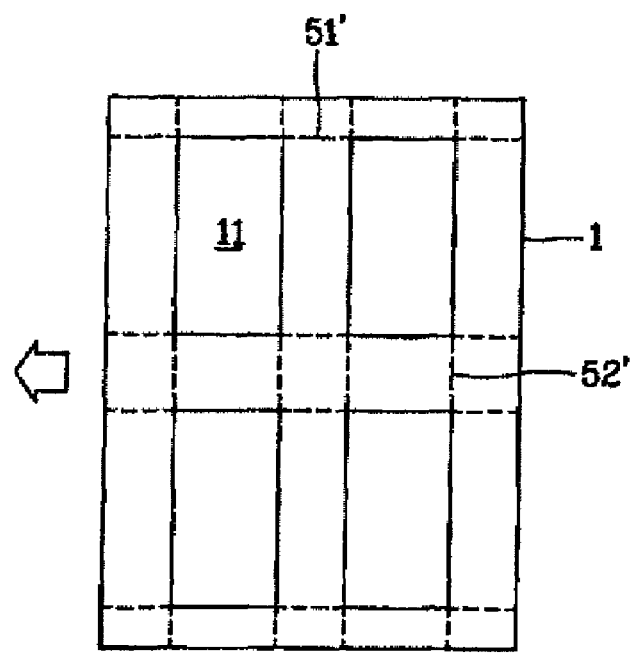
Figure 19H:
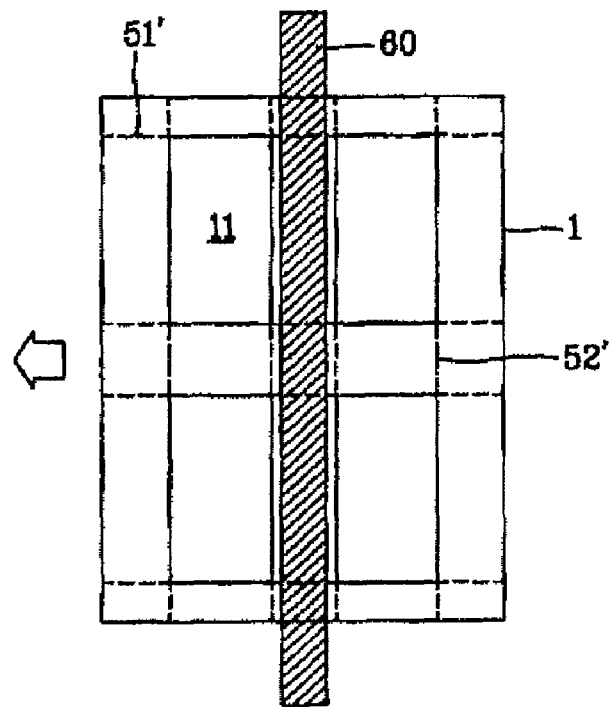
Figure 19I:
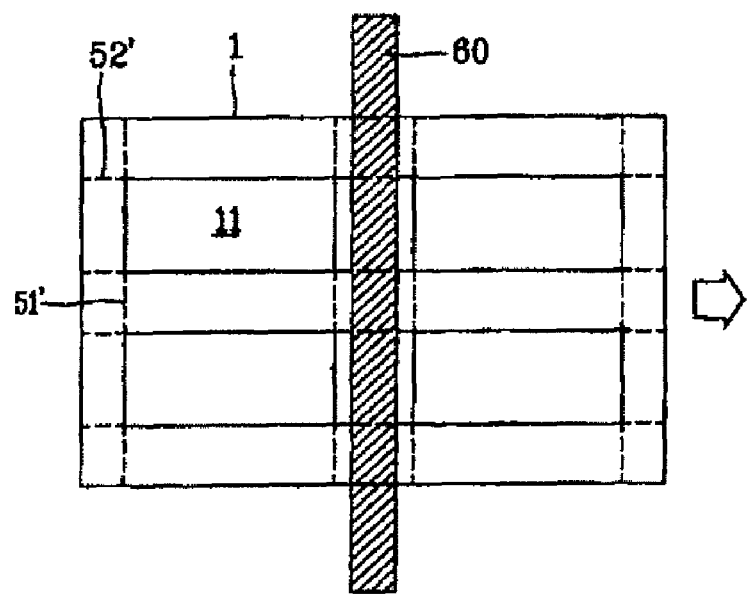
Figure 20:
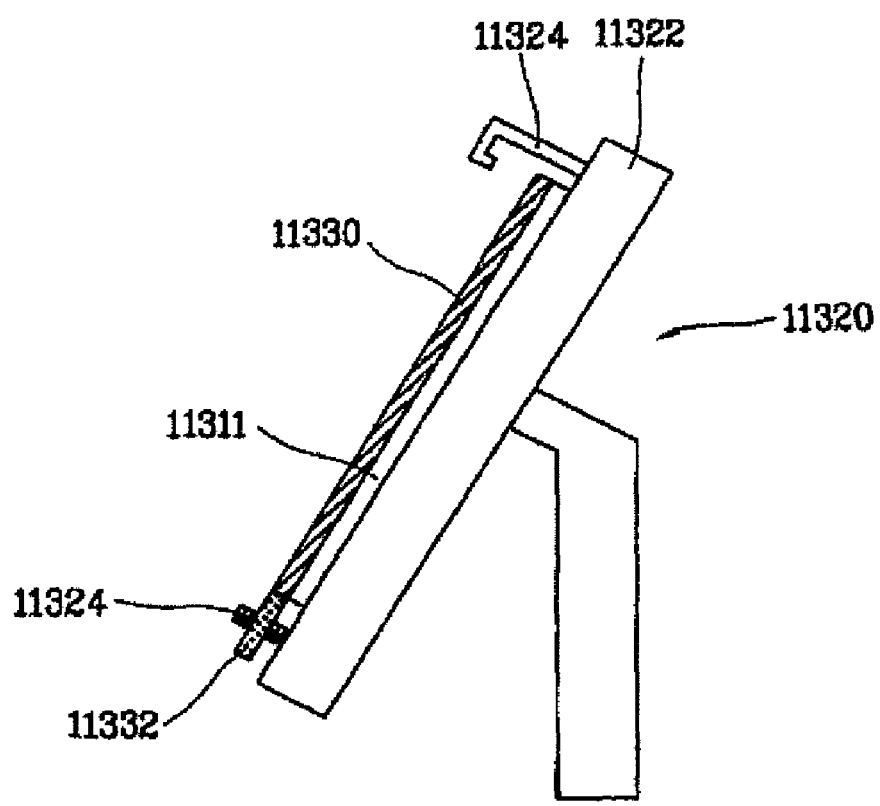
FIGS. 20 and 21 are views illustrating a related art apparatus for testing an appearance of an LCD panel.
Figure 21:
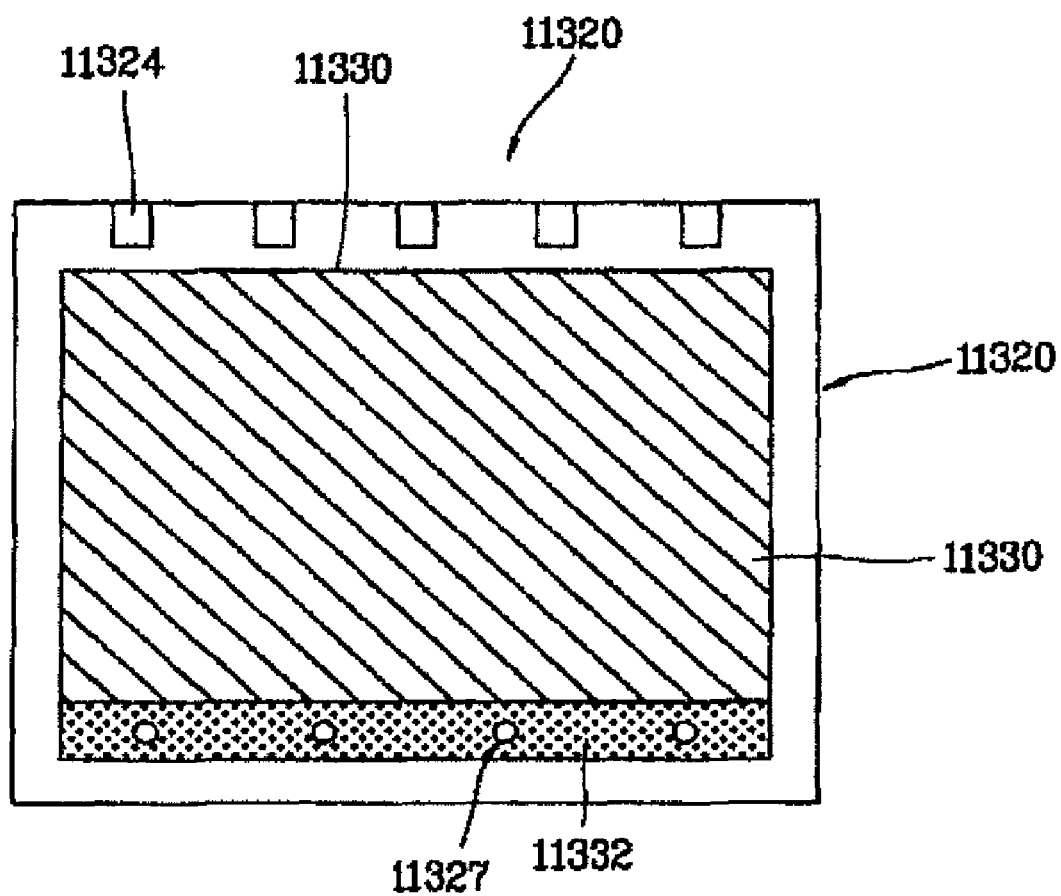

Differences between the method for fabricating the LCD by applying the liquid crystal dispensing method illustrated in FIG. 59 and the method for fabricating the LCD by applying the related art liquid crystal injection method illustrated in FIG. 4 will be described as follows. First, the difference in fabricating time between the dropping and injecting of the liquid crystal allows the dispensing method to be usable with larger LCDs. In the injection method for fabricating the LCD of FIG. 4, the liquid crystal is injected through an injection opening and then the injection opening is sealed with a sealing material.

However, with the dispensing method of fabricating the LCD, the liquid crystal is dropped directly onto the substrate and a process for an injection opening can be omitted. In addition, in the method for fabricating the LCD by applying the related liquid crystal injection method, the substrate contacts the liquid crystal during the liquid crystal injection process, thereby contaminating the outer surface of the panel. A process for cleaning the substrate may be employed to remove the contamination. However, when using the liquid crystal dispensing method, the liquid crystal is directly dropped onto the substrate. Therefore, the panel is not contaminated by the liquid crystal, and the substrate cleaning process may be avoided. Accordingly, the method for fabricating LCD by the liquid crystal dispensing method is simpler than that by the liquid injection method, thereby improving efficiency and yield.

In the method for fabricating LCD using the liquid crystal dispensing method, the dropping positions for the liquid crystal and the amount of dropped liquid crystal are controlled to form the liquid crystal layer with a desired thickness. Since the thickness of the liquid crystal layer is closely related to the cell gap of the liquid crystal panel, the dropping position and the dropping amount of the liquid crystal are carefully controlled to prevent defects in the resultant liquid crystal panel. An embodiment of the present invention provides a dispensing apparatus for dropping specific amount of liquid crystal at a predetermined position.

Figure 60:
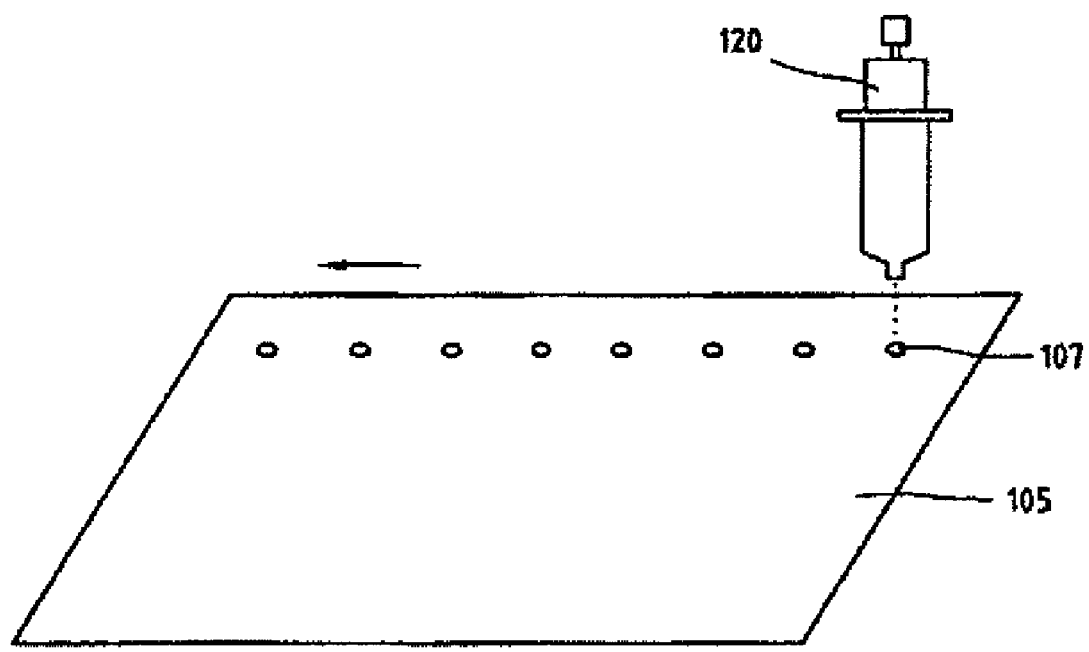
FIG. 60 is a view illustrating the basic concept of a liquid crystal dispensing method.

FIG. 60 illustrates the basic concept for dropping the liquid crystal 300107 onto the substrate 300105 (glass substrate of larger area) using the liquid crystal dispensing apparatus 300120. As illustrated, the liquid crystal dispensing apparatus 300120 is disposed above the substrate 300105. Liquid crystal is contained in the liquid crystal dispensing apparatus 300120, and a predetermined amount of the contained liquid crystal is dropped onto the substrate 300105.

A precise amount of liquid crystal can be dropped by dispensing liquid crystal using the liquid crystal dispensing apparatus 300120. A dispensed amount of liquid crystal can be measured in various ways, for example, by measuring the weight of an amount of liquid crystal dropped from the liquid crystal dispensing apparatus 300120 and correlating the measured weight to a volume of liquid crystal, or by detecting the decrease in the amount of liquid crystal contained in the liquid crystal dispensing apparatus 300120 as the liquid crystal is dropped. The measurement of the dispensed amount of the liquid crystal is provided to a dispensed amount test unit to determine a dispensing state.

The dispensing state of the liquid crystal is determined because the liquid crystal panel may have a gravitational defect or an underfill defect when the amount of liquid crystal is dropped onto the liquid crystal panel is not proper.

A gravitational defect occurs when the liquid crystal layer formed in the liquid crystal panel becomes too voluminous due to a temperature increase, such that the cell gap of the liquid crystal panel becomes larger than a spacer. When the cell gap increases beyond the size of a spacer, the liquid crystal material can flow downwardly due to gravity, thereby making the cell gap of the LCD panel uneven and deteriorating the quality of the liquid crystal display device.

An underfill defect occurs when a smaller amount of liquid crystal than the proper preset amount is filled into the liquid crystal panel. When pressure is applied to the screen of the liquid crystal display panel having an underfill defect, the liquid crystal of a corresponding region moves to other regions thereby failing to display an image at the corresponding region. Gravitational and underfill defects are major causes of the deterioration of the quality of the liquid crystal display device.

Therefore a testing process for the liquid crystal panel includes a gravitational defect test and an underfill defect test. The gravitational defect test and underfill defect test are performed a user's naked eye observation. Because the gravitational defect test and the filling state defect test take a great deal of time, the tests may be performed on selected samples of the liquid crystal panels rather than being performed on every liquid crystal panel. The use of sampling to select the liquid crystal display panels to test results in a problem that a liquid crystal display device with a gravitational defect or an underfill defect resulting in a low quality liquid crystal display may be produced but not tested.

In an embodiment of the present invention, after measuring a dispensed amount of liquid crystal dropped from the liquid crystal dispensing apparatus 300120 to indicate or detect a possible defect of the liquid crystal layer, the dispensed amount information is transmitted to the testing unit of the liquid crystal panel, thereby enabling a rapid and accurate test of the liquid crystal display device. Gravitational and underfill defects of the liquid crystal panel occur mainly because an amount of dropped liquid crystal is smaller or larger than a preset amount. Therefore, the dispensed amount dropped from the liquid crystal dispensing apparatus 300120 is measured and the measurement is used to detect whether the dispensing state is acceptable or unacceptable. In particular, the measurement is used to determine whether the dispensed amount of liquid crystal is smaller or larger than a preset dispensed amount, and this information is transmitted to the testing unit.

Figure 61:
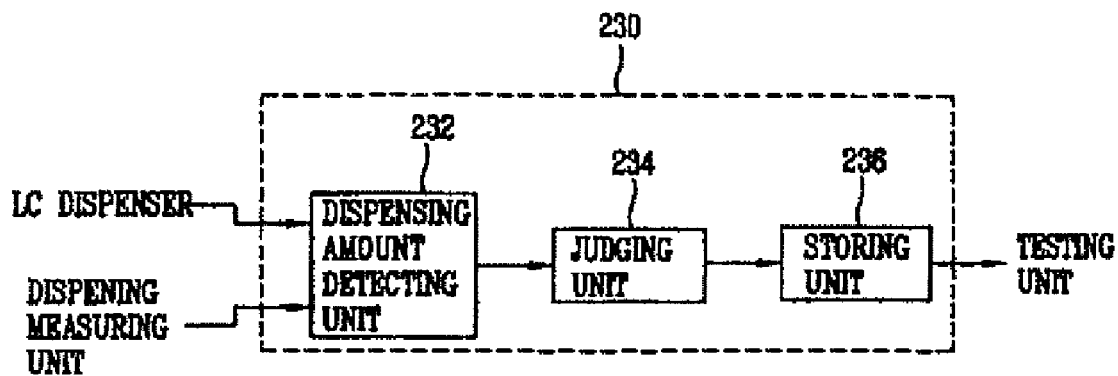
FIG. 61 is a block diagram illustrating a structure of a dispensed amount checking unit in according to an embodiment of the present invention.
Figure 62:
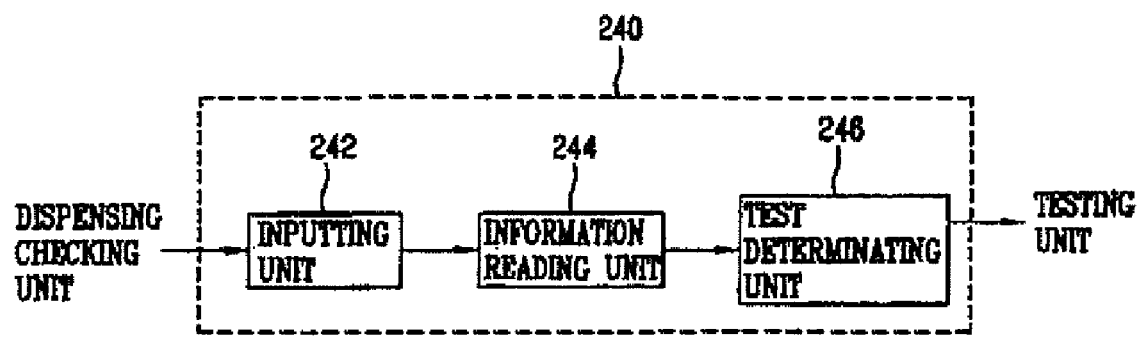
FIG. 62 is a block diagram illustrating a structure of a testing unit in according to an embodiment of the present invention.

FIGS. 61 and 62 illustrate a dispensing amount checking unit 300230 for determining a dispensing state of liquid crystal dropped by a liquid crystal dispensing apparatus and a testing unit 300240 executing a test using output from the dispensing amount checking unit.

As illustrated in FIG. 61, the dispensing amount checking unit 300230 comprises: a dispensing amount detecting unit for detecting a current dispensed amount of liquid crystal dropped onto a substrate on the basis of information input from the liquid crystal dispensing apparatus 300120 or a dispensing amount measuring apparatus; a judging unit 300234 for comparing dispensed amount of liquid crystal detected from the dispensing amount detecting unit 300232 with a preset dispensed amount, and judging that the dispensing is good if the detected dispensed amount is within a range of the preset dispensed amount, that is, an allowable limit value, and judging that the dispensing is defective if the detected dispensed amount differs from the preset dispensed amount by more than the allowable limit value; and a storage unit 300236 for storing the result judged in the judging unit 300234 and the detected dispensed amount for each corresponding liquid crystal panel.

Information input into the dispensing amount detecting unit 300232 may include a value obtained by multiplying a single dispensed amount for the liquid crystal dispensing apparatus 300120 by a count of the number of times of dispensing; a measurement of a weight decrease from the liquid crystal dispensing apparatus; or weight information measured by a dispensed amount measuring apparatus such as a gravimeter. The dispensing amount detecting unit 300232 detects a current dispensed amount of liquid crystal dropped on a substrate on the basis of this information.

The judging unit 300234 has a set limit value for the dispensed amount of liquid crystal. The limit value corresponds to the deviation in the dispensed amount from the preset dispensed amount which will not result in a defect. The judging unit 300234 judges that a dispensed amount is acceptable if a deviation in the detected dispensed amount of liquid crystal is within a limit value, and judges that a dispensed amount is unacceptable if the deviation in the detected dispensed amount of liquid crystal exceeds a limit value. Additionally, the judging unit 300234 makes separate judgments on the case where a dispensed amount of liquid crystal is less than a lowest limit value or on the case where a dispensed amount of liquid crystal is greater than a highest limit value. That is, if a dispensed amount of liquid crystal is less than the lowest limit value, the corresponding code, for example, a code named "LSL (Lower Spec. Limit)" is allocated to the corresponding panel and stored in the storage unit 300236. If a dispensed amount of liquid crystal is less than the highest limit value, the corresponding code, for example, a code named "USL (Upper Spec. Limit)" is allocated to the corresponding panel and stored in the storage unit 300236. Moreover, if a dispensed amount of liquid crystal is within a limit value, a code named, for example, G, is allocated. The above described codes are only one example for representing quality information for a liquid crystal panel, and other codes may be allocated or no codes may be allocated.

The storage unit 300236 stores information identifying the liquid crystal panel formed by attaching the substrates where liquid crystal is dropped and code information determined for the corresponding liquid crystal panel. This information is transmitted to the testing unit 300240.

The testing unit 300240 makes a determination to perform a test of the liquid crystal panel on the basis of information input from the dispensed amount checking unit 300230. As illustrated in FIG. 62, the testing unit 300240 comprises: an input unit 300242 for inputting dispensing information on the liquid crystal panel stored in the dispensing amount checking unit 300230; an information reading unit 300244 for reading the dispensing information of the liquid crystal panel input through the input unit 300242; and a test determination unit 300246 for determining whether to test the corresponding liquid crystal panel based on the result read by the information reading unit 300244.

The information reading unit 300244 checks a current dispensing state of the liquid crystal panel by reading the code allocated to the corresponding liquid crystal panel. The test determination unit 300246 selects the testing of the liquid crystal display panel to be a gravitational defect test, an underfill defect test, or no test on the basis of the read result.

For example, if a G code is allocated to the current liquid crystal panel, it is determined that the dispensed amount of liquid crystal is normal. The normality of the dispensed amount of liquid crystal indicates that a set amount of liquid crystal has been dispensed. In this case, it is presumed that neither a gravitation defect nor an underfill defect has occurred at the liquid crystal panel. Accordingly, the test determination unit 300246 determines to omit testing.

If the LSL code or USL code is allocated, it is judged that a dispensed amount of liquid crystal is not normal, and the test determination unit 300246 determines the test to be performed for the liquid crystal panel. For example, if the code allocated to the liquid crystal panel is the LSL code, an underfill detect test is selected and performed, and if the code allocated thereto is the USL code, a gravitational defect test is selected and performed. The allocation of the LSL code or USL code to the liquid crystal panel, that is, the abnormality of the dispensed amount of liquid crystal, does not invariably mean that the liquid crystal panel has a defect. The dropping of liquid crystal is for forming a liquid crystal layer, but an improper dropping of liquid crystal does not mean the formation of a defective liquid crystal layer. Variables associated with other processes, including the bonding of the substrates may result in a normal liquid crystal layer even if there is an abnormality in the dropping of liquid crystal. It should be noted that there is almost no probability of a defect if normal liquid crystal dropping is accomplished, while there is a high probability of a defect if there is an abnormality in terms of a dispensed amount. Thus, it may be efficient to test only the liquid crystal displays for which an abnormality in terms of a dispensed amount of liquid crystal is detected.

Defect information such as codes may be allocated during processes other than the liquid crystal dispensing process. When the liquid crystal display device passes through a number of processes, testing may be carried out after the completion of each process. Accordingly, the defect information may include the result of a test executed by a tester installed on various kinds of process lines.

Once the test determination unit 300246 determines to perform a test, the corresponding panel is dispensed onto a gravitational defect testing device or underfill defect testing device to perform the corresponding test.

A method of testing a liquid crystal panel using the above described liquid crystal panel testing system will be described below with reference to FIG. 63.

Figure 63:
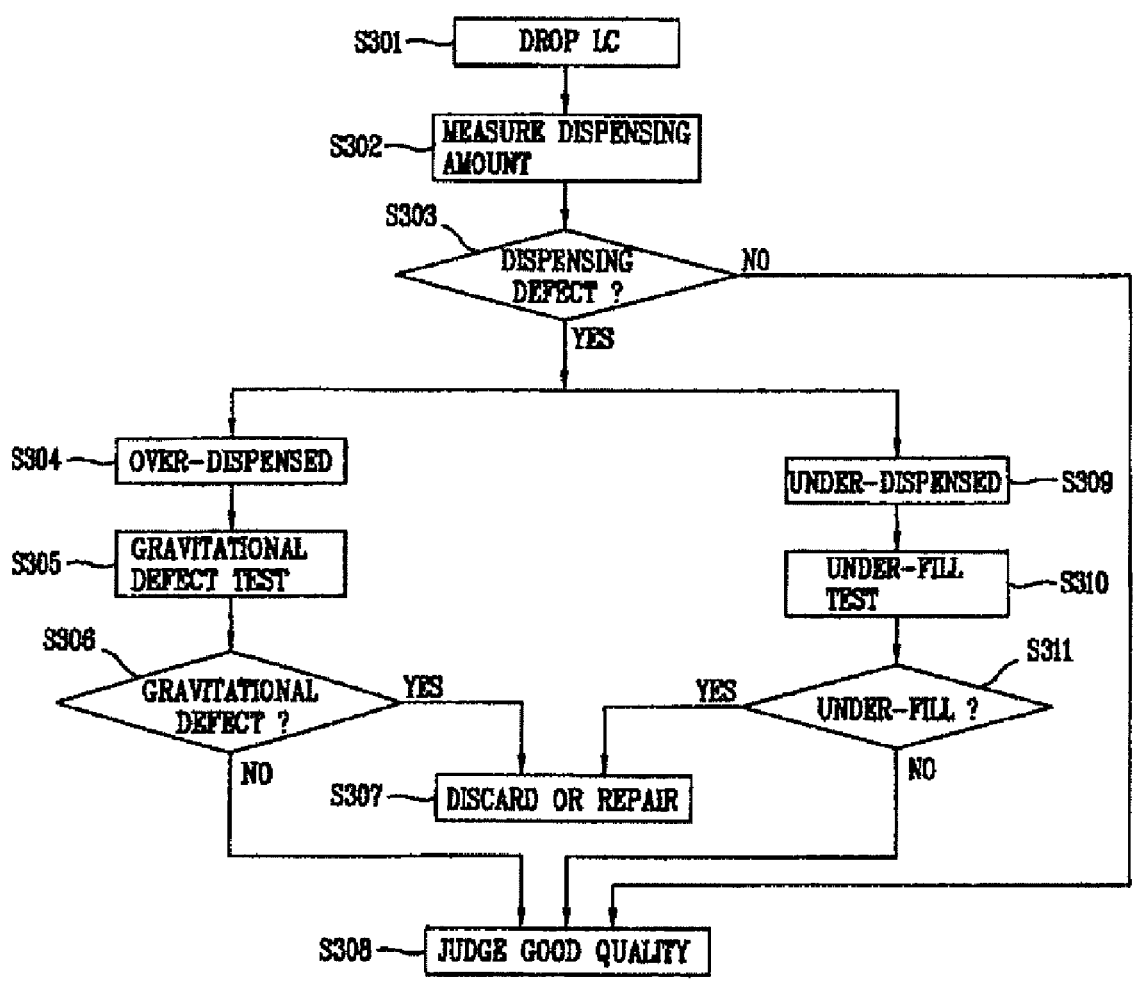
FIG. 63 is a flow chart illustrating a method of testing a liquid crystal display panel in accordance with an embodiment of the present invention.

First, as illustrated in FIG. 63, when liquid crystal is dropped onto a substrate using the liquid crystal dispensing apparatus 300120 (300S301), a dispensed amount of liquid crystal dropped onto the substrate is measured by measuring a decrement of the liquid crystal contained in the liquid crystal dispensing apparatus 300120 or by measuring the weight of the liquid crystal dropped from the liquid crystal dispensing apparatus 300120 (300S302). If the measured dispensed amount is within a set range, it is judged that a normal dropping has been completed, and the testing unit 300140 does not perform a gravitational defect test or underfill defect test and judges the corresponding liquid crystal panel to be a non defective product (300S308).

If the measured dispensed amount is outside of a set range, it is judged that there is an abnormality in the dispensing (300S303). At this time, if the dispensed amount of liquid crystal exceeds the set range (the USL code is allocated), that is, if liquid crystal has been over-dispensed, a gravitational defect test is performed (300S304, 300S305). If a gravitational defect is detected, the corresponding liquid crystal panel is discarded or repaired, and if no gravitation defect is detected, the liquid crystal panel is judged to be a non defective product (300S307, 300S308).

If the dispensed amount of liquid crystal is less than a set range (the LSL code is allocated), that is, if liquid crystal has been under-dispensed, an underfill defect test is performed (300S309, 300S310). If the liquid crystal panel is detected to be in an underfilled state, it is judged to be defective, and the corresponding liquid crystal panel is discarded or repaired, while if the liquid crystal panel is determined not to be in an underfilled state, it is judged to be a non defective product (300S307, 300S308).

As described above, in a method of testing a liquid crystal panel according to an embodiment of the current invention, a gravitational defect test and an underfill defect test are selectively performed based on a dispensed amount of liquid crystal. Thus, every liquid crystal panel suspected to be defective can be tested, thereby preventing or reducing the shipment of defective products.

In the embodiment described above, information related to the dispensed amount of liquid crystal is used to determine whether to perform a gravitational defect test or an underfill defect test of the liquid crystal panel. However, the present invention is not limited thereto. That is, the variable for determining to test for a gravitational defect or an underfill defect of the liquid crystal panel are not limited to a dispensed amount of liquid crystal. For example, the size of a cell gap of the liquid crystal panel may be used as a factor for selecting testing for a gravitational defect or an underfill defect. Moreover, alternative means for checking a dispensed amount of liquid crystal or an amount of liquid crystal filled between substrates may be used. For example, it is also possible to check a liquid crystal layer with a naked eye inspection.

Accordingly, in an embodiment of the present invention, a gravitational defect test and underfill defect test of the liquid crystal panel may be executed based on liquid crystal display cell gap information. For example, if it is observed by the user that a gap in the liquid crystal panel is greater than a set gap, the LSL code is allocated, and an underfill defect test is performed on the liquid crystal panel of this LSL code. If the gap is smaller than the set gap, the USL code is allocated, and a gravitational defect test is performed on the liquid crystal panel of this USL code. This applies in the same way to the checking of a liquid crystal amount using a microscopic examination. It should be noted that these codes are directly allocated by the user because a naked eye check or microscopic examination are performed by the user themselves. That is, the checking will be carried out according to the process as illustrated in FIG. 63 except that a user may directly allocate information of the liquid crystal panel.

As described above, a dispensed state of liquid crystal or a state of a liquid crystal formed after the dispensing of liquid crystal are checked, and a gravitational defect test or an underfill defect test are performed based on the result thereof. Accordingly, even if every liquid crystal panel is not tested, all of the liquid crystal panels having a high probability of a defect are tested, thereby avoiding or reducing the shipment of defective products.

Meanwhile, the liquid crystal dispensing apparatus 300120 according to the present invention is not limited to a specific structure. For example, it may also be possible to use a needle type liquid crystal dispensing apparatus for dropping liquid crystal onto a substrate wherein the apparatus includes a needle connected to a liquid crystal container through a nozzle opened and closed by tension of a spring and a magnetic force of a solenoid coil. Alternately, a pump type liquid crystal dispensing apparatus may use a discharge pump for dropping liquid crystal onto a substrate. Although the following description is made with respect to a liquid crystal dispensing apparatus having a discharge pump, the described apparatus is merely an illustration of an embodiment of the present invention and the invention is not limited to the example described liquid crystal dispensing apparatus.

Figure 64:
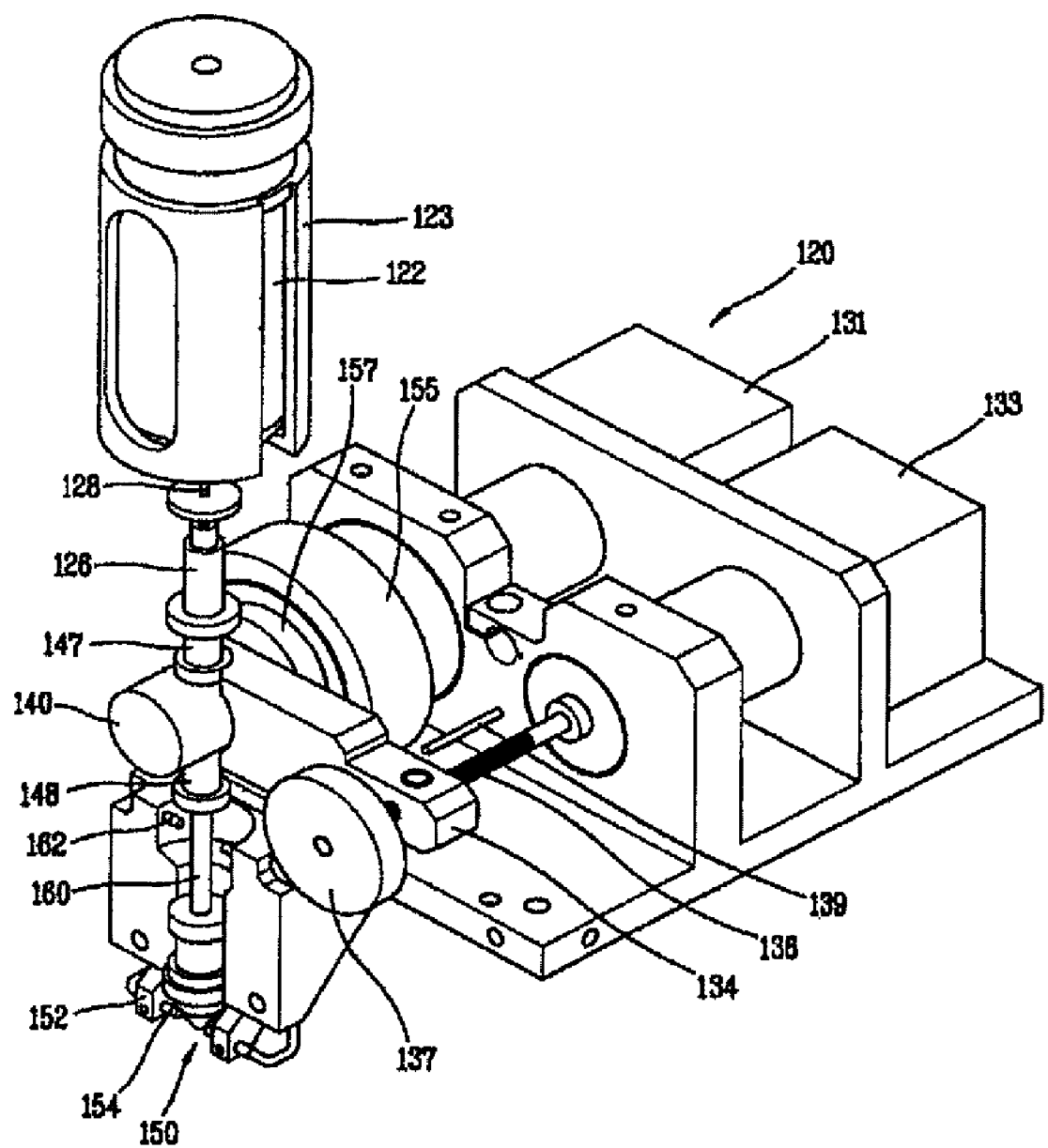
FIG. 64 is a perspective view illustrating a structure of a liquid crystal dispensing apparatus according to an embodiment of the present invention.
Figure 65:
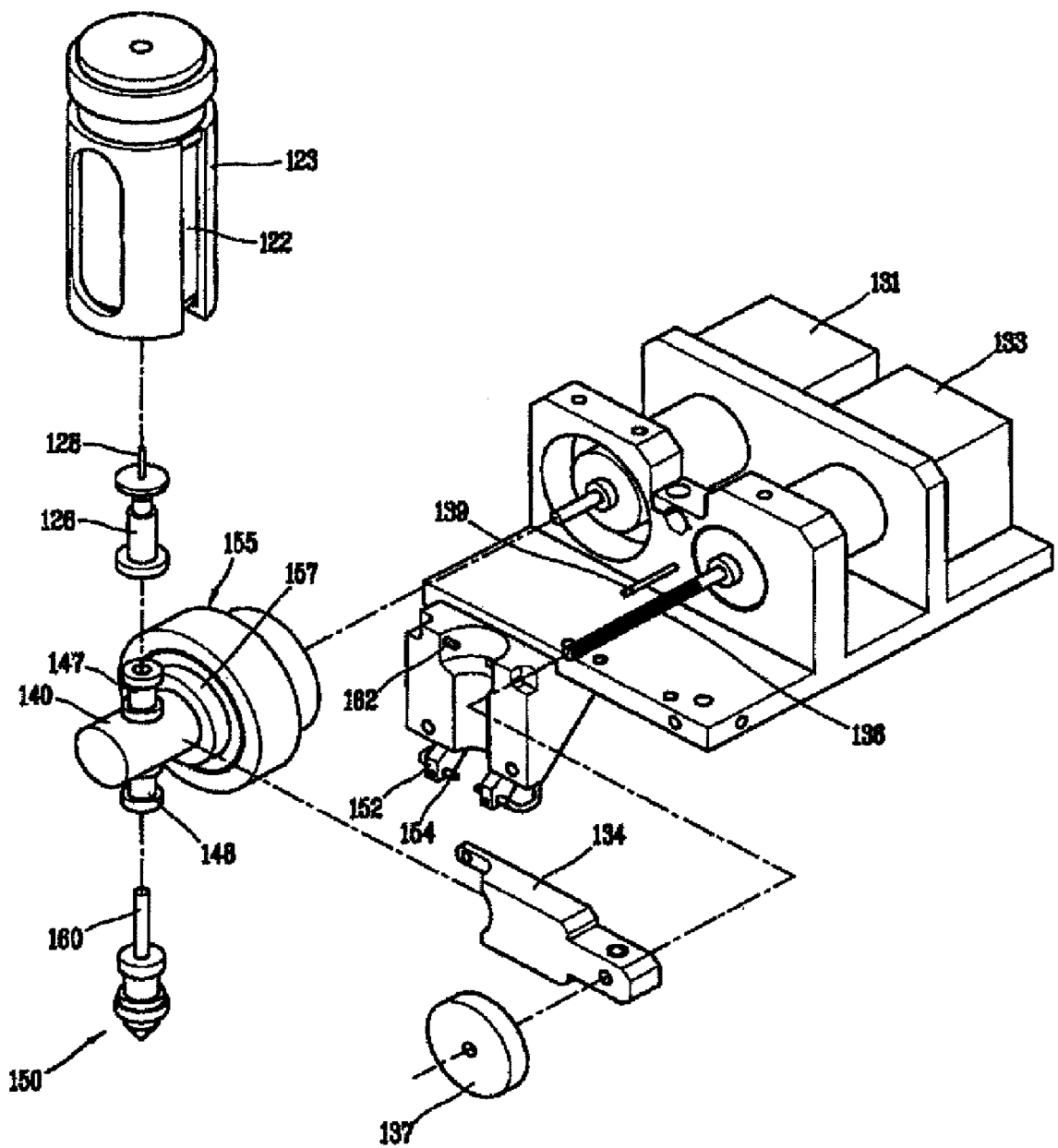
FIG. 65 is an exploded perspective view illustrating the structure of the liquid crystal dispensing apparatus in accordance an embodiment of the present invention.

FIG. 64 is a perspective view of a structure of a liquid crystal dispensing apparatus in accordance with an embodiment of the present invention, and FIG. 65 is an exploded perspective view of the liquid crystal dispensing apparatus illustrated in FIG. 64. As illustrated in FIGS. 64 and 65, the liquid crystal dispensing apparatus 300122 may include a cylindrically shaped liquid crystal container 300122 encompassed within a case 300123. The liquid crystal container 300122 may be formed of polyethylene, and the liquid crystal 300107 is contained in the liquid crystal container 300122. The case 300123 may be formed of a stainless steel and encompasses the liquid crystal container 300122 therein. Since the polyethylene has a high plasticity, a container of a desired shape can be easily formed with the polyethylene. In addition, the polyethylene is non-reactive with the liquid crystal 300107 making the material suitable for containing liquid crystal. However, polyethylene has a low strength and may therefore become easily deformed by application of stress. If the liquid crystal container 300122 is deformed, the liquid crystal 300107 may not be precisely dispensed onto a substrate. Accordingly, the liquid crystal container 300122 may be inserted within the case 300123 formed of stainless steel having a high strength.

A gas supply tube may be arranged at an upper portion of the liquid crystal container 300122, so that inert gas, such as nitrogen, may be provided thereto. The gas occupies portions of the liquid crystal container 300122 not occupied by the liquid crystal 300107. Accordingly, the gas exerts pressure on the liquid crystal 300107 to induce the liquid crystal material to be dispensed onto the substrate.

Alternatively the liquid crystal container 300122 could be made from a metal such as stainless steel. A metallic liquid crystal container 300122 is unlikely to be distorted and an outer case 300123 may be omitted, thereby reducing fabrication costs of the liquid crystal dispensing apparatus 300120. The interior of the liquid crystal container 300122 may be coated with a fluorine resin, thereby preventing the liquid crystal 300107 contained within the liquid crystal container 300122 from chemically reacting with the metal of the container 300122.

A liquid crystal discharge pump 300140 is arranged at a lower portion of the liquid crystal container 300122. The liquid crystal discharge pump 300140 can discharge a certain or predetermined amount of liquid crystal from the liquid crystal container 300122 onto a substrate. The liquid crystal discharge pump 300140 is provided with a liquid crystal suction (or intake) opening 300147 connected to the liquid crystal container 300122 for drawing in liquid crystal during operation of the liquid crystal discharge pump 300140, and a liquid crystal discharge opening 300148 at the opposite side of the liquid crystal suction opening 300147 for discharging liquid crystal during operation of the liquid crystal discharge pump 300140.

As illustrated in FIG. 65, a first connecting tube 300126 is coupled to the liquid crystal suction opening 300147. Although the liquid crystal suction opening 300147 is illustrated as being friction coupled to the first connecting tube 300126, the liquid crystal suction opening 300147 can be coupled to the first connecting tube 300126 by a coupling means such as a screw. A pin 300128 such as an injection needle of having a hollow interior is formed at one side of the first connecting tube 300126. A pad formed of a material having a high compression characteristic and a hermetic sealing characteristic such as silicon or a butyl rubber group material is arranged at a lower portion of the liquid crystal container 300122 for discharging liquid crystal to the first connecting tube 300126. The pin 300128 is inserted into the liquid crystal container 300122 through the pad, thereby introducing the liquid crystal 300107 of the liquid crystal container 300122 into the liquid crystal suction opening 300147. When the pin 300128 is inserted into the liquid crystal container 300122, the pad is strongly compressed by the pin 300128, thereby preventing leakage of the liquid crystal 300107 at the insertion region of the pin 300128. By coupling liquid crystal suction opening 300147 to the liquid crystal container 300122 using the pin and the pad, the coupling structure is simple and coupling/detachment of the components is facilitated.

Alternatively, the liquid crystal suction opening 300147 and the first connecting tube 300126 may be formed as a unit. In this case, the pin 300128 is formed at the liquid crystal suction opening 300147 and is directly inserted into the liquid crystal container 300122 using a simple structure.

A nozzle 300150 is formed at a lower portion of the liquid crystal discharge pump 300140. The nozzle 300150 is connected to the liquid crystal discharge opening 300148 of the liquid crystal discharge pump 300140 through a second connecting tube 300160 to drop the liquid crystal 300107 discharged from the liquid crystal discharge pump 300140 onto the substrate.

The second connecting tube 300160 may be formed of an opaque material. However, the second connecting tube 300160 may be formed of a transparent material for the following reasons.

At the time of the liquid crystal dropping, if vapor is contained in the liquid crystal 300107, the amount of the liquid crystal 300107 dispensed onto the substrate may not be precisely controlled. Therefore, the vapor may be removed at the time of the liquid crystal dropping. Vapor in liquid crystal 300107 to be contained in the container 300122 or vapor in the liquid crystal 300107 already in the container 300122 can be removed by a vapor removing device, but in some instances the vapor may not be completely removed. Moreover, vapor may be generated when the liquid crystal 300107 is introduced into the liquid crystal discharge pump 300140 from the liquid crystal container 300122. Accordingly, the operation of the liquid crystal dispensing apparatus may be stopped at the time of liquid crystal dropping to remove vapor contained in the liquid crystal 300107.

By forming the second connecting tube 300160 of a transparent material generation of defective LCD devices may be prevented by revealing vapor contained in the liquid crystal container 300122 or vapor generated from the liquid crystal container 300122 in the transparent second connecting tube 300160. The vapor can be found by a naked eye visual inspection, and can alternatively be automatically detected by a first sensor 300162 such as a photo coupler installed at opposites sides of the second connecting tube 300160 allowing action to be taken to prevent forming defective LCD devices.

The nozzle 300150 into which the discharged liquid crystal is introduced through the second connecting tube 300160 may be provided with a protection unit 300152 for protecting the nozzle 300150 from external stress and etc. at both side surfaces thereof. A second sensor 300154 for detecting vapor contained in the liquid crystal dropped from the nozzle 300150 and for detecting liquid crystal masses on the surface of the nozzle 300150 is installed at the protection unit 300152 at the lower portion of the nozzle 300150.

The forming of liquid crystal masses on the surface of the nozzle 300150 may interfere with a precise dropping of the liquid crystal 300107. When the liquid crystal drops through the nozzle 300150 having liquid crystal masses formed on the surface, a certain amount of liquid crystal spreads on the surface of the nozzle 300150 when a preset amount of liquid crystal is discharged from the liquid crystal discharge pump 300140. Accordingly, an amount of liquid crystal less than the preset amount is dispensed onto the substrate. In addition, when a liquid crystal mass from the surface of the nozzle 300150 drops on the substrate, a defect in the LCD device may be generated. To prevent the liquid crystal from massing on the surface of the nozzle 300150, a hydrophobic material such as fluorine resin having a high contact angle with liquid crystal, may be deposited on the surface of the nozzle 300150 by a dipping method or a spray method. The deposition of the fluorine resin reduces or eliminates the spread of liquid crystal on the surface of the nozzle 300150 allowing the liquid crystal to be dispensed onto the substrate through the nozzle 300150 as a perfect drop shape.

The liquid crystal discharge pump 300140 is received within a rotating member 300157 that is secured to a fixing unit 300155. The rotating member 300157 is connected to a first motor 300131. As the first motor 300131 is operated, the rotating member 300157 is rotated and the liquid crystal discharge pump 300140 connected to the rotating member 300157 is operated.

The liquid crystal discharge pump 300140 is in contact with one side of a liquid crystal capacity amount controlling member 300134 having a bar shape. A hole is formed at another side of the liquid crystal capacity amount controlling member 300134, and a rotational shaft 300136 is inserted into the hole. A screw is formed at the perimeter of the hole of the liquid crystal capacity amount controlling member 300134 and the rotational shaft 300136, so that the liquid crystal capacity amount controlling member 300134 and the rotational shaft 300136 are screw-coupled to each other. One end of the rotational shaft 300136 is connected to a second motor 300133, and another end thereof is connected to a controlling lever 300137.

The discharged amount of liquid crystal from the liquid crystal material container 300122 through the liquid crystal discharge pump 300140 is varied according to a fixation angle of the liquid crystal discharge pump 300140 to the rotating member 300157. In other words, a liquid crystal capacity of the liquid crystal discharge pump 300140 is varied according to an angle that the liquid crystal discharge pump 300140 is fixed to the rotating member 300157. When the second motor 300133 connected to the rotational shaft 300136 is driven (automatically controlled) or the controlling lever 300137 is operated (manually controlled), the rotational shaft 300136 is rotated. One end of the liquid crystal capacity amount controlling member 300134 is screw-coupled to the rotational shaft 300136 and moves back and forth (along a linear direction) along the rotational shaft 300136. Accordingly, as one end of the liquid crystal capacity amount controlling member 300134 moves, a force applied to the liquid crystal discharge pump 300140 is varied, and therefore the fixation angle of the liquid crystal discharge pump 300140 is varied.

As described above, the first motor 300131 operates the liquid crystal discharge pump 300140 to discharge liquid crystal of the liquid crystal container 300122 and to drop the liquid crystal onto the substrate. The second motor 300133 controls the fixation angle of the liquid crystal discharge pump 300140 fixed to the rotating member 300157 to control the amount of liquid crystal discharged from the liquid crystal discharge pump 300140.

The single dispensed amount of liquid crystal to be dropped onto the substrate through the liquid crystal discharge pump 300140 is very minute, and therefore, a variation amount of the liquid crystal discharge pump 300140 controlled by the second motor 300133 is also minute. Accordingly, to control the discharge amount of the liquid crystal discharge pump 300140, an inclination angle of the liquid crystal discharge pump 300140 is controlled very precisely. A step motor operated by a pulse input value may be used as the second motor 300133 as a method of achieving precise control.

Figure 66A:
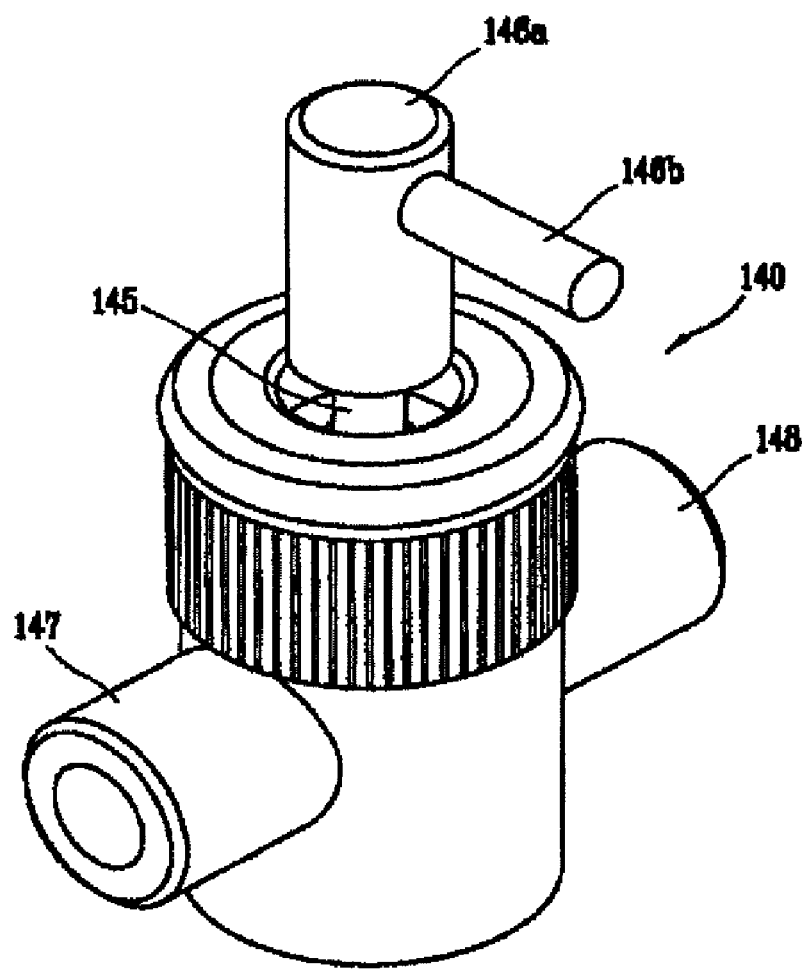
FIG. 66A is a perspective view of a structure of a liquid crystal discharge pump of the liquid crystal dispensing apparatus in accordance with an embodiment of the present invention.
Figure 66B:
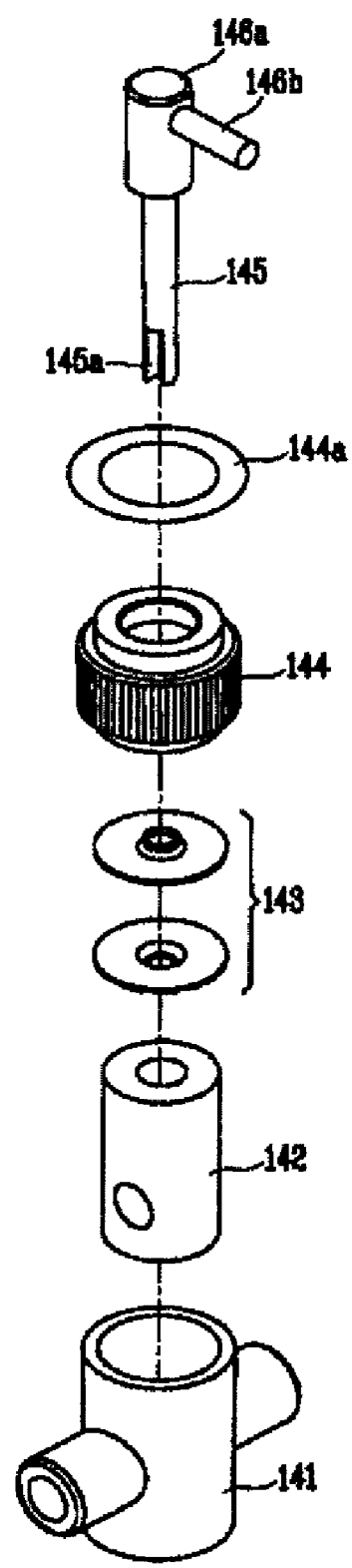
FIG. 66B is an exploded perspective view of the structure of a liquid crystal discharge pump in accordance with an embodiment of the present invention.

FIG. 66A is a perspective view of a structure of a liquid crystal discharge pump, and FIG. 66B is an exploded perspective view of the structure of the liquid crystal discharge pump illustrated in FIG. 30012A.

As illustrated in FIGS. 66A and 66B, the liquid crystal discharge pump 300140 includes: a case 300141 having the liquid crystal suction opening 300147 and the liquid crystal discharge opening 300148; a cap 300144 having an opening at an upper portion thereof and coupled to the case 300141; a cylinder 300142 inserted into the case 300141 for drawing in liquid crystal; a sealing member 300143 for sealing the cylinder 300142; an o-ring 300144a positioned above the cap 300144 for preventing leakage of liquid crystal; and a piston 300145 movable up and down and rotatable in the cylinder 300142 through the opening of the cap 300144, for drawing in and discharging the liquid crystal 300107 through the liquid crystal suction opening 300147 and the liquid crystal discharge opening 300148 respectively. A head 300146a fixed to the rotating member 300157 is installed above the piston 300145, and a bar 300146b is installed at the head 300146a. The bar 300146b is inserted into a hole (not illustrated) of the rotating member 300157 and is fixed to thereby rotate the piston 300145 when the rotating member 300157 is rotated by the first motor 300131.

A groove 300145a is formed at the end of the piston 300145. The groove 300145a has an area corresponding to approximately ¼ (or less) of a sectional area of a circle shape of the piston 300145. The groove 300145a opens and closes the liquid crystal suction opening 300147 and the liquid crystal discharge opening 300148 when the piston 300145 is cycled (that is, repeatedly moved up and down), thereby drawing in and discharging liquid crystal through the liquid crystal suction opening 300147 and the liquid crystal discharge opening 300148 respectively.

Operation of the liquid crystal discharge pump 300140 will be explained with reference to FIG. 67.

Figure 67:
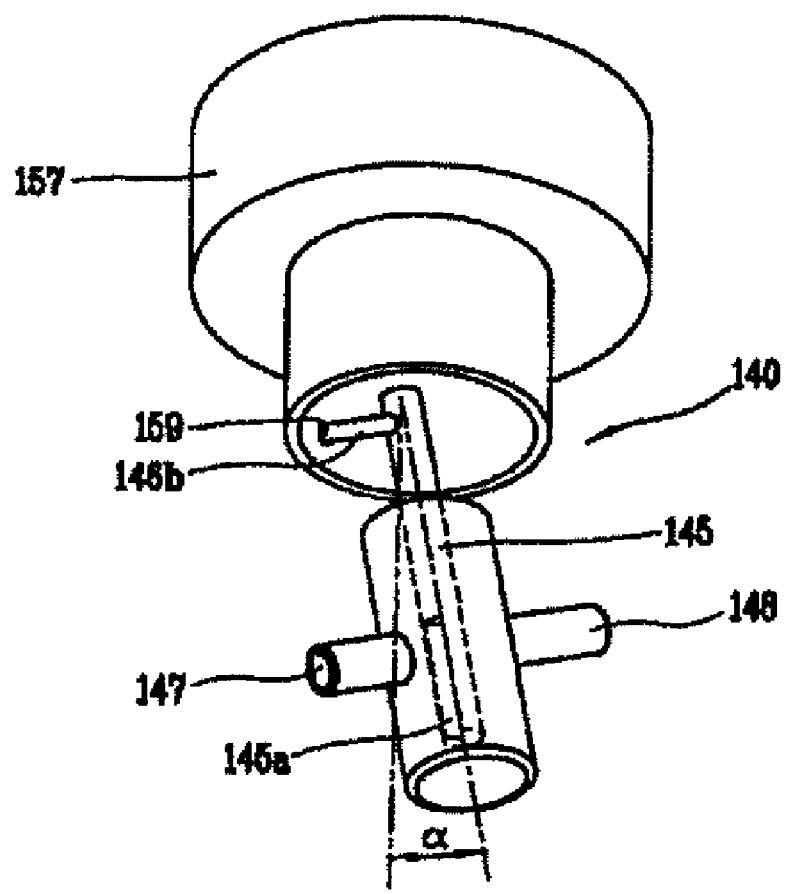
FIG. 67 is a view illustrating the liquid crystal discharge pump illustrated in FIG. 12B fixed at an angle to the rotating member.

FIG. 67 is a view illustrating the liquid crystal discharge pump 300140 fixed to the rotating member 300157. As illustrated In FIG. 67, the piston 300145 is fixed to the rotating member 300157 forming a certain angle ($\alpha$). The bar 300146b formed at the piston head 300146a is inserted into a hole 300159 formed inside the rotating member 300157, so that the piston 300145 and the rotating member 300157 are coupled to each other. Although not illustrated, a bearing is provided inside the hole 300159 and thereby the bar 300146b of the piston 300145 inserted into the hole 300159 can move back and forth and right and left. When the first motor 300131 is operated, the rotating member 300157 is rotated, thereby rotating the piston 300145 coupled (i.e., fixed) to the rotating member 300157.

Herein, if the fixation angle ($\alpha$) of the liquid crystal discharge pump for the rotating member 300157, that is, the fixation angle ($\alpha$) of the piston 300145 for the rotating member 300157 is set to be 0, the piston 300145 performs only a rotational motion along the rotating member 300157. However, since the fixation angle ($\alpha$) of the piston 300145 is not 0, substantially (that is, the piston 300145 is fixed with a certain angle), the piston 300145 not only rotates along the rotating member 300157 but also moves up and down.

As the piston 300145 moves upward while rotating through a certain angle, a space is formed inside the cylinder 300142 and liquid crystal is drawn into the space through the liquid crystal suction opening 300147. As the piston 300145 moves downward by further rotation, the liquid crystal in the cylinder 300142 is discharged through the liquid crystal discharge opening 300148. Herein, the groove 300145a formed at the piston 300145 opens and closes the liquid crystal suction opening 300147 and the liquid crystal discharge opening 300148 during the drawing in and discharging the liquid crystal by the rotation of the piston 300145.

Hereinafter, operation of the liquid crystal discharge pump 300140 will be explained in more detail with reference to FIGS. 68A to 68D.

Figure 68A:
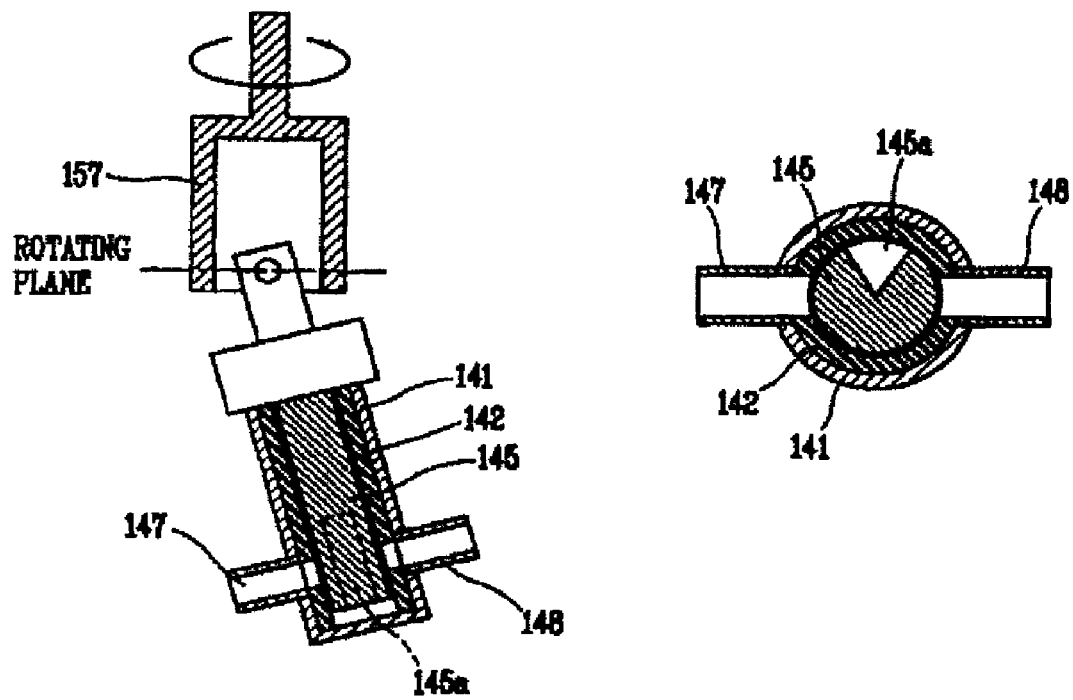
FIGS. 68A to 68D are views illustrating operation of the liquid crystal discharge pump of FIG. 66B.
Figure 68B:
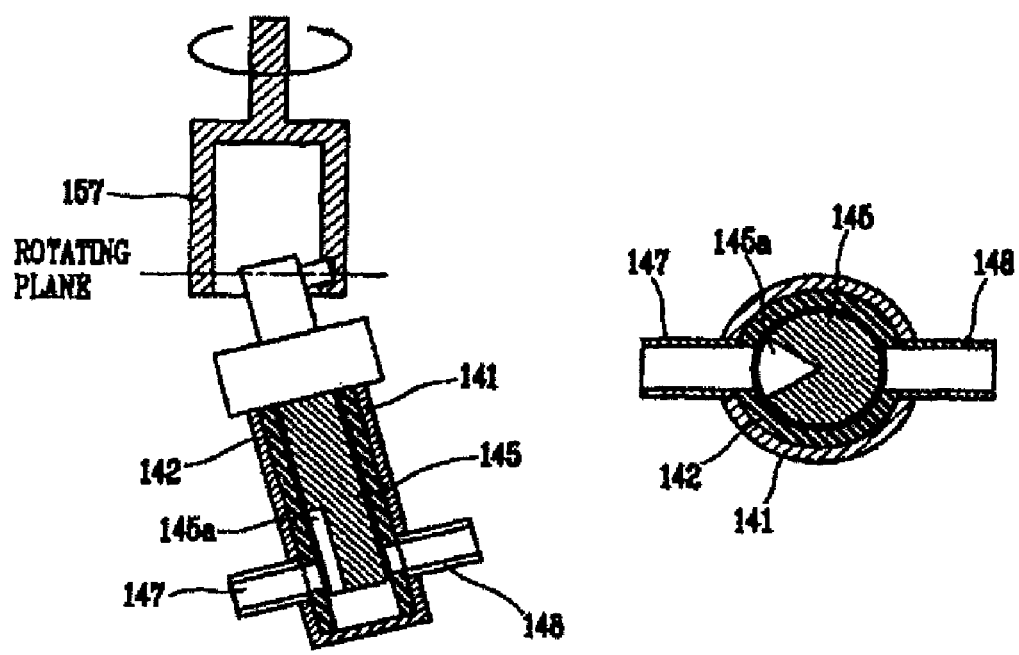
Figure 68C:
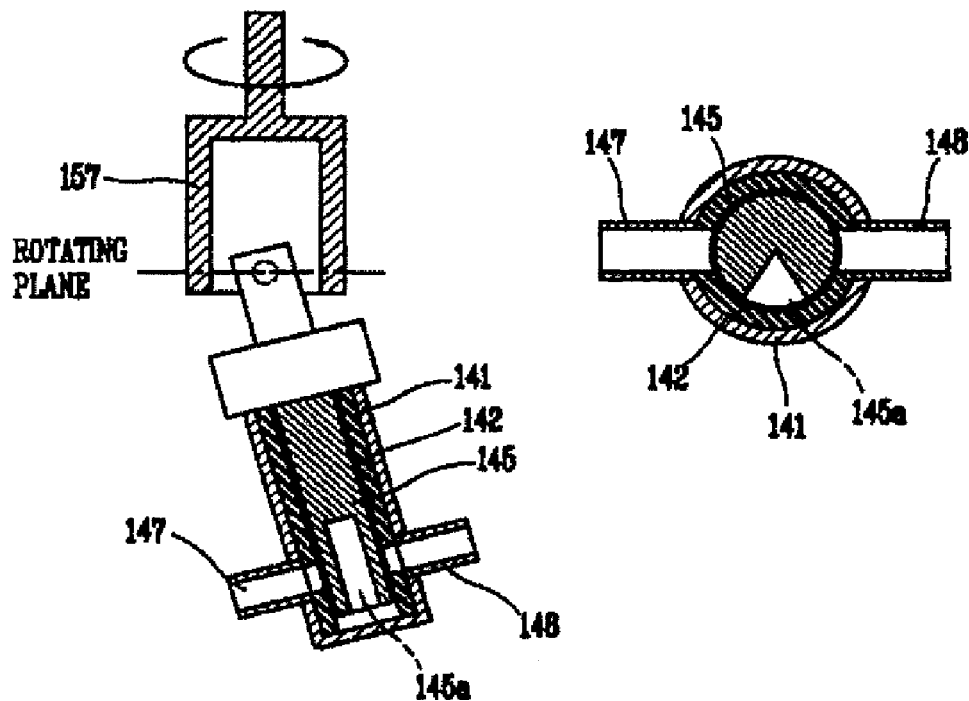
Figure 68D:
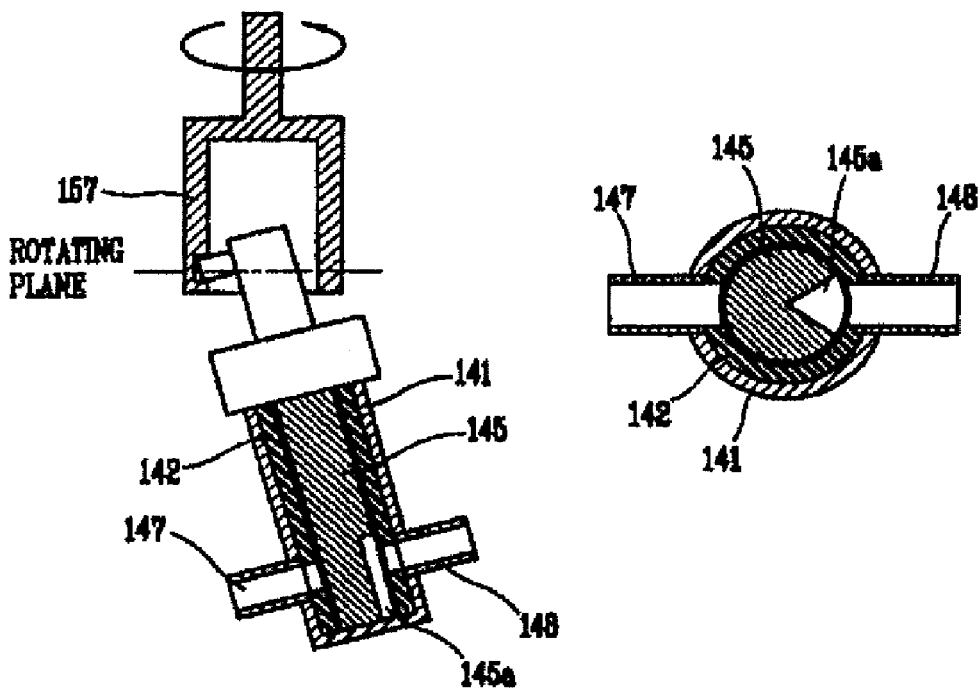

In FIGS. 68A to 68D, the liquid crystal discharge pump 300140 discharges the liquid crystal 300107 of the liquid crystal material container 300122 to the nozzle 300150 as the liquid crystal discharge pump 300140 operates through 4 strokes. FIGS. 68A and 68C illustrate cross strokes, FIG. 68B is a suction stroke drawing liquid crystal through the liquid crystal suction opening 300147, and FIG. 68D is a discharge stroke discharging liquid crystal through the liquid crystal discharge opening 300148.

In FIG. 68A, the piston 300145 fixed to the rotating member 300157 with a certain angle ($\alpha$) rotates accordingly as the rotating member 300157 rotates. At this time, the liquid crystal suction opening 300147 and the liquid crystal discharge opening 300148 are closed by the piston 300145.

When the rotating member 300157 rotates through approximately 45°, the piston 300145 rotates and the liquid crystal suction opening 300147 is open by the groove 300145a of the piston 300145 as illustrated in FIG. 68B. The bar 300146b of the piston 300145 is inserted into the hole 300159 of the rotating member 300157, thereby coupling the rotating member 300157 and the piston 300145. Accordingly as the rotating member 300157 rotates, the piston 300145 rotates. At this time, the bar 300146b rotates along a rotating plane.

Since the piston 300145 is fixed to the rotating member 300157 with a certain angle and the bar 300146b rotates along the rotating plane, the piston 300145 moves upward as the rotating member 300157 rotates. In addition, as the rotating member 300157 rotates, a space is formed at the cylinder 300142 positioned at the lower portion of the piston 300145 since the cylinder 300142 is fixed. Liquid crystal is drawn into the space through the liquid crystal suction opening 300147 that has been open by the groove 300145a.

The suction (or intake) stroke of liquid crystal continues until the cross stroke of FIG. 65C starts (the liquid crystal suction opening 300147 is closed) as the rotating member 300157 rotates through approximately 45° after the suction stroke starts (that is, the liquid crystal suction opening 300147 is open).

Then, as illustrated in FIG. 65D, the liquid crystal discharge opening 300148 is open and the piston 300145 downwardly moves accordingly as the rotating member 300157 continues to rotates, so that the liquid crystal sucked into the space inside the cylinder 300142 is discharged through the liquid crystal discharge opening 300148 (discharge stroke).

The liquid crystal discharge pump 300140 repeatedly executes four strokes described above including the first cross stroke, the suction stroke, the second cross stroke, and the discharge stroke to discharging liquid crystal 300107 contained in the liquid crystal container 300122 to the nozzle 300150.

Herein, the discharge amount of liquid crystal is varied according to an up-down motion range of the piston 300145. The up-down motion range of the piston 300145 is varied according to the angle of the liquid crystal discharge pump 300140 fixed to the rotating member 300157.

Figure 69:
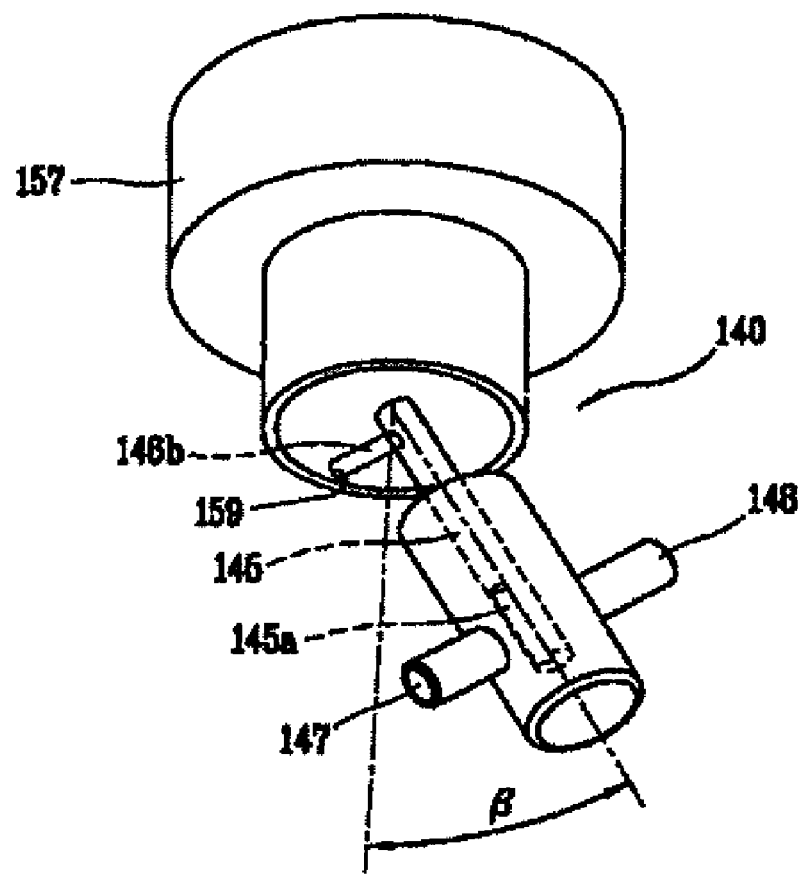
FIG. 69 is a view illustrating the structure of a liquid crystal discharge pump whose fixation angle is increased beyond that illustrated in FIG. 13.

FIG. 69 is a view illustrating the liquid crystal discharge pump is fixed to the rotating member with an angle of β. When compared to the liquid crystal discharge pump 300140 of FIG. 64 fixed to the rotating member 300157 with the angle of α, the liquid crystal discharge pump 300140 of FIG. 66 fixed to the rotating member 300157 with an angle of β(>α) enables the piston 300145 to move further upward. Accordingly, the greater the angle of the liquid crystal discharge pump 300140 fixed to the rotating member 300157, the larger the amount of the liquid crystal 300107 drawn into the cylinder 300142 during the piston motion. As a result, the discharged amount of liquid crystal can be controlled by adjusting the angle of the liquid crystal discharge pump 300140 fixed to the rotating member 300157.

The angle of the liquid crystal discharge pump 300140 fixed to the rotating member 300157 is controlled by the liquid crystal capacity amount controlling member 300134 of FIG. 61, and the liquid crystal capacity amount controlling member 300134 is moved by operating the second motor 300133. In other words, the angle of the liquid crystal discharge pump 300140 fixed to the rotating member 300157 may be controlled by controlling the second motor 300133.

The fixation angle of the liquid crystal discharge pump 300140 can be manually adjusted by handling the angle controlling lever 300137 by the user. However, in this case, a precise adjustment is not possible, a lot of time is required, and the driving of the liquid crystal discharge pump has to be stopped during the operation. Alternatively, the fixation angle of the liquid crystal discharge pump 300140 may be adjusted by the second motor 300133.

The fixation angle of the liquid crystal discharge pump 300140 is measured by a sensor 300139 such as a linear variable differential transformer. If the fixation angle exceeds a preset angle, the sensor 300139 may control the ringing of an alarm to prevent the liquid crystal discharge pump 300140 from being damaged.

As described above, in the present invention, a defect in the dispensing of liquid crystal dispensing or a defect in the a liquid crystal layer after the formation of a liquid crystal layer are checked at the time of dropping liquid crystal, and based on this information, a gravitational defect test or an underfill defect test are selected for execution. Accordingly, every liquid crystal panel suspected to be defective (or having a high probability of having a defect) can be checked, thereby preventing shipment of defective products. Additionally, liquid crystal panels judged to be non defective products (or having a low probability of having a defect) are shipped without being checked, thereby enabling a quick test FIG. 58 is a view illustrating a basic concept of a liquid crystal dispensing method in an alternate embodiment. As illustrated in the drawing, in the liquid crystal dispensing method, liquid crystal 300107 is dropped or dispensed onto a lower substrate 300105 before the lower substrate 300105 and an upper substrate 300103, respectively having a thin film transistor (TFT) and a color filter (CF), are bonded together. The liquid crystal 300107 may be dropped onto the substrate 300103 having the color filter. That is, in the liquid crystal dispensing method, the liquid crystal may be dropped onto any one of both TFT and CF substrates. However, the substrate onto which the liquid crystal has been dropped should be placed under the other substrate at the time of bonding of the two substrates.

Here, a seal pattern 300109 is applied around an outer edge of the upper substrate 300103, so that the upper substrate 300103 and the lower substrate 300105 are bonded together by applying pressure thereto. At the same time, liquid crystal drops 300107 are spread widely by the pressure, thereby forming a liquid crystal layer between the upper and lower substrates 300103 and 300105. That is, such a liquid crystal dispensing method is particularly characterized in that the bonding of a panel 300101 using a seal pattern 300109 is performed after liquid crystal 300107 is dropped onto the lower substrate.

Seal Forming and Seal Patterns

A method of fabricating the LCD device using such a liquid crystal dispensing method is different from a fabrication method adopting the related art liquid crystal injection method. In the related art liquid crystal injection method, after a large-sized glass substrate having a plurality of panel regions is divided into individual panels, injection of liquid crystal is performed. In contrast to this related art method, in the liquid crystal dispensing method, liquid crystal is previously dropped onto a substrate to thereby form a liquid crystal layer, and then the glass substrate can be processed and separated into individual panels. Such process differences provide many advantages in fabricating an actual LCD device. Of course, as for those advantages, some occur due to the liquid crystal dispensing method itself (i.e., rapid generation of a liquid crystal layer), and some occur because a liquid crystal layer is formed in a unit of a glass substrate having a plurality of panel regions. This will now be described in detail by taking the case where four panel regions are formed in a glass substrate as an example. In the liquid crystal injection method, when liquid crystal is injected into four processed liquid crystal panels, the liquid crystal panels having the same cell gaps can be formed only under the same conditions (e.g., the same liquid crystal container, the same injection pressure, etc.). However, in the liquid crystal dispensing method, four processed liquid crystal panels having different cell gaps may be formed by controlling the amount of liquid crystal being dropped onto the liquid crystal panels at once.

In contrast, in the liquid crystal dispensing method, the liquid crystal is dropped onto the substrate through a liquid crystal dispenser. When cell gaps of liquid crystal panels having lower substrates made from one large-sized glass substrate are to be different from one another, the amount of liquid crystal dropped onto each of the panel regions should be precisely and individually controlled, which causes inconvenience. Furthermore, in the liquid crystal dispensing method, the amount of liquid crystal dropped onto the panel regions may be less or more than the set reference amount. Here, the set reference amount refers to the amount of liquid crystal that can be filled in a cell gap region of a liquid crystal panel.

Also, in such liquid crystal dispensing method, a seal pattern is formed in a closed pattern along an outer edge of a panel region and then bonding into a liquid crystal panel is made after the liquid crystal is dropped. For this reason, both additional injection of liquid crystal and removable of surplus liquid crystal cannot be performed even when the amount of liquid crystal provided to the panel region is less or more than the set reference amount.

Therefore, the present invention provides a method of fabricating an LCD device capable of particularly solving those problems by forming a seal pattern that can allow removal of surplus liquid crystal from a liquid crystal panel. That is, a protruding portion is formed that protrudes outward from one side of the seal pattern, and a sufficient amount of liquid crystal is dropped onto the substrate. In a process of separating liquid crystal panels after bonding of the panel, the protruding portion of the seal pattern is cut to thereby form an aperture, and the surplus liquid crystal is removed through the aperture.

Figure 70:
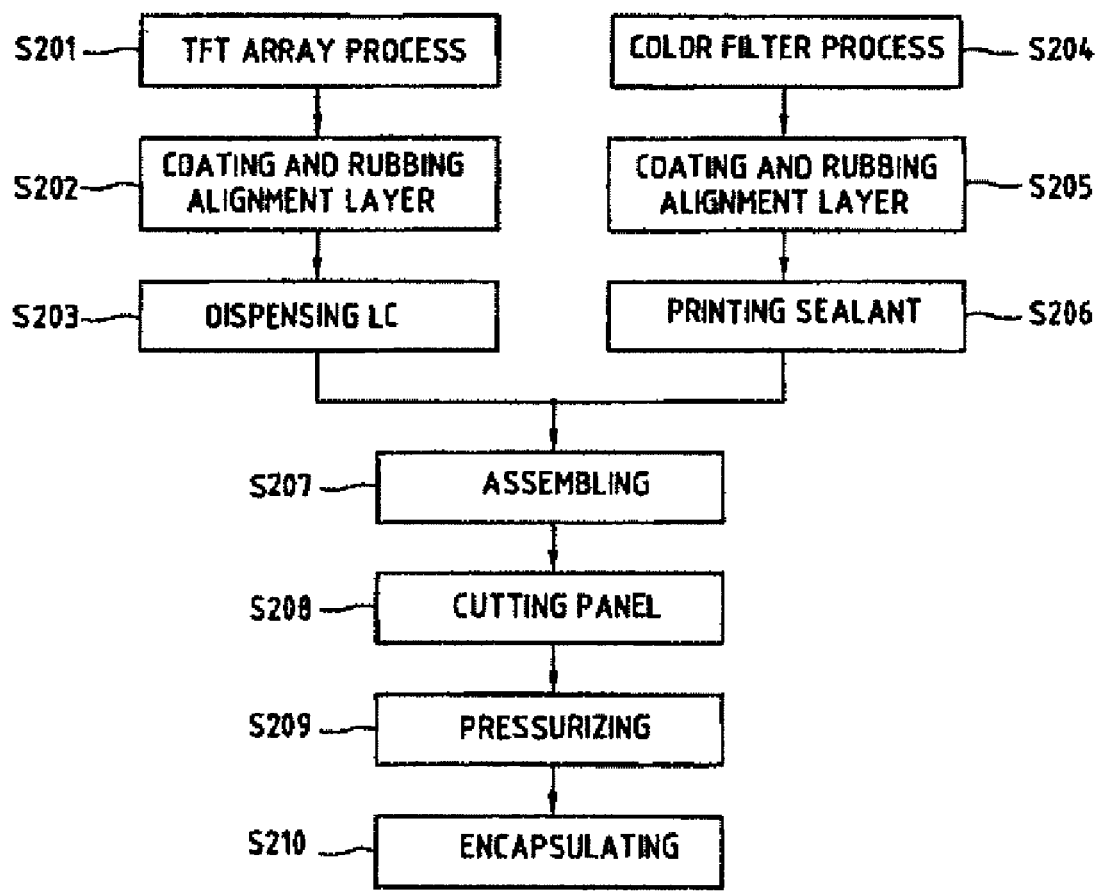
FIG. 70 is a flow chart illustrating a method of fabricating the LCD device according to the present invention.

FIG. 70 is a view illustrating a flow chart of a fabrication process of an LCD device employing a liquid crystal dispensing method according to another embodiment. FIGS. 71 to 75B are views illustrating a specific fabrication method according to the process order. Accordingly, the method of fabricating an LCD device according to the present invention will now be described with reference to FIG. 70 and FIGS. 71 to 75B.

Figure 71:
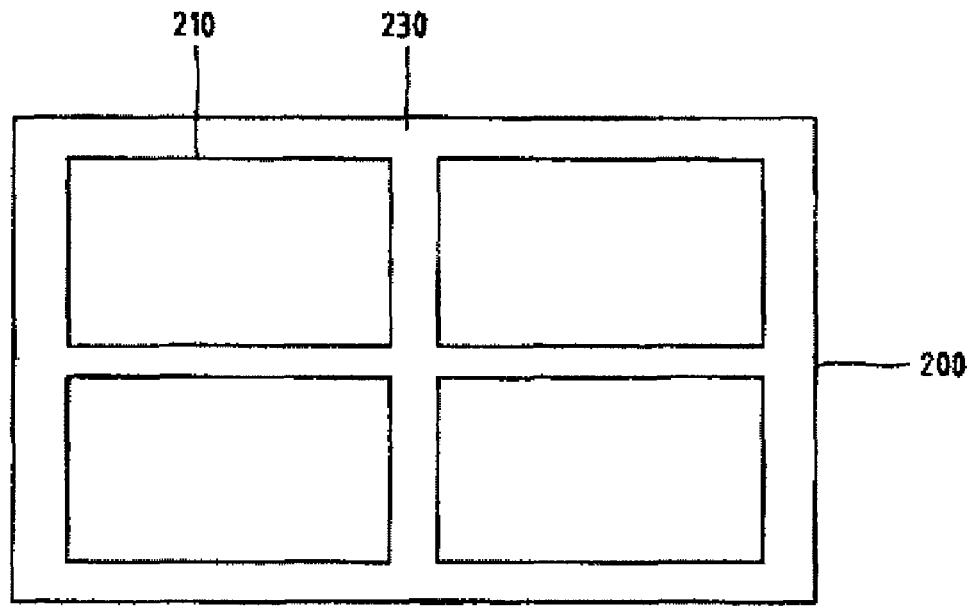
FIG. 71 is a schematic plan view of a thin film transistor array substrate and a color filter substrate defined into panel regions and a dummy region.

As illustrated in FIGS. 70 and 71, substrate 310200 having panel regions 310210 and dummy regions 310230 are defined are prepared. Then, a TFT and a color filter layer (not illustrated), driving devices and electronic components of the different substrates 310200 are formed through a TFT array process and a color filter process, respectively (310S201, 310S202). The TFT array process and the color filter process may be collectively performed on large-sized glass substrates 310200 including a plurality of panel regions 310210. Particularly, because the present fabrication method employs the liquid crystal dispensing method, it can be effectively applied to a larger glass substrate (e.g., a large glass substrate having an area of more than 1000×200 mm²).

Then, alignment layers are respectively applied onto a thin film transistor array substrate including the TFT and a color filter substrate including the color filter layer, and then rubbing is performed thereon (310S202, 310S205). The liquid crystal is dropped or dispensed in the panel region on the thin film transistor array substrate, and the seal pattern is formed along an outer edge of the panel region on the color filter substrate (310203, 310S306). Alternately, the liquid crystal may be dropped in the panel region of the color filter substrate and the seal pattern may be applied along an outer edge of the panel region of the thin film transistor array substrate. Also, the dispensing of liquid crystal and the applying of the seal pattern may be performed on one substrate.

Figure 72A:
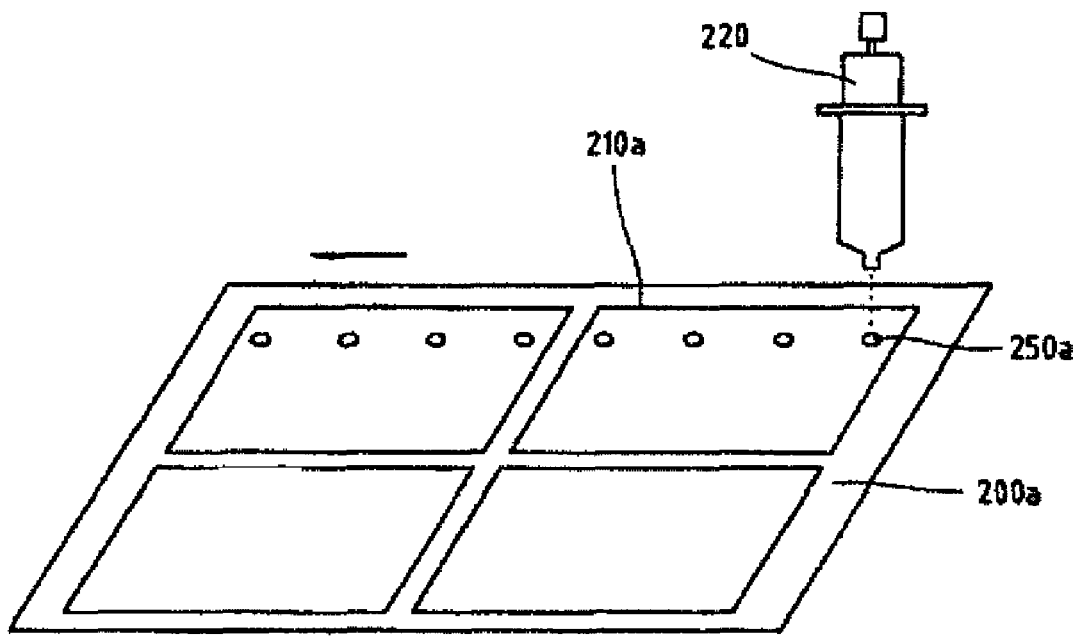
FIG. 72A is a view illustrating a process of dropping liquid crystal on a color filter substrate.
Figure 72B:
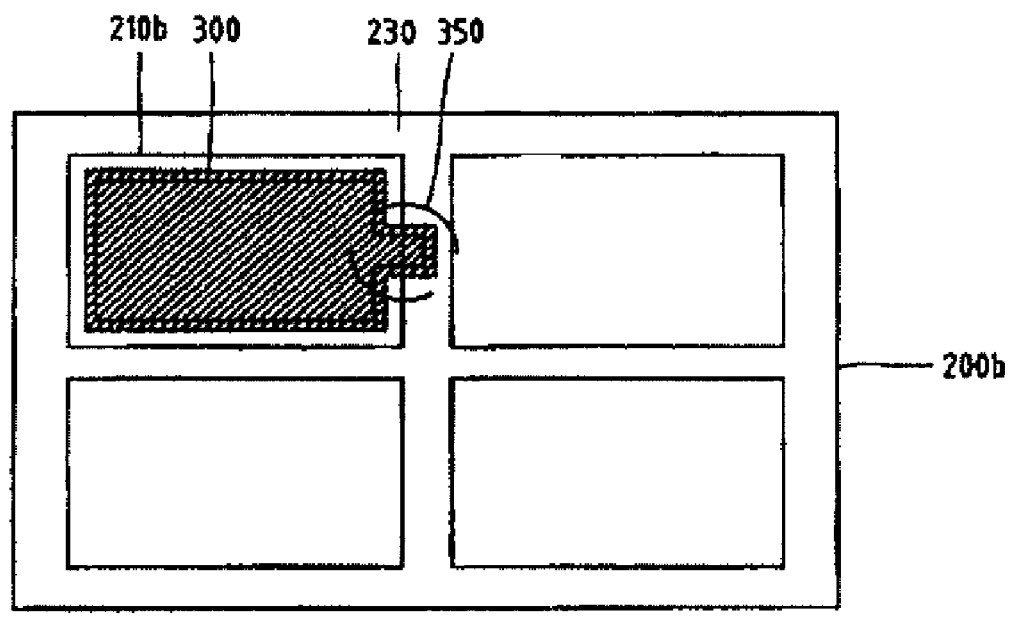
FIG. 72B is a view illustrating a process of forming a seal pattern on a thin film transistor arrays substrate.

FIGS. 72A and 72B are detailed views illustrating processes of dispensing liquid crystal and forming a seal pattern. As illustrated in FIG. 72A, in the liquid crystal dispensing process, a liquid crystal dispenser 310220 is placed above a color filter substrate 310200a, and then liquid crystal 310250a is dropped to a desired region, namely, a panel region, while the substrate 310200a is moving. In the present example it is assumed that the amount of liquid crystal 310205a dropped to the panel region 310210a is more than the set reference amount, so that a cell gap region is over-filled with liquid crystal.

As illustrated in FIG. 72B, a seal pattern 310300 is formed along a panel region 310210b of a thin film transistor array substrate 310200b. Here, one side of the seal pattern 310300 extends out of the panel region 310210b. That is, a protruding portion 310350 extending out of the panel region 310210b and protruding to a dummy region 310230 is formed at one side of the seal pattern 310300.

As described above, the liquid crystal 310250a is dropped onto the color filter substrate 310210, and the seal pattern 310300 is formed on the thin film transistor array substrate 310210b. Then, the color filter substrate 310210a and the thin film transistor array substrate 310210b are aligned. In this state, the two aligned substrates 310210a and 310210b are pressurized to be bonded together by the seal pattern 310300, and, at the same time, the dropped liquid crystal is substantially uniformly distributed over the entire panel by the pressurization (310S207). In such a manner, a plurality of liquid crystal panels each having liquid crystal layers is formed in the large-sized glass substrate (the lower substrate and the upper substrate) (310S207).

Figure 73:
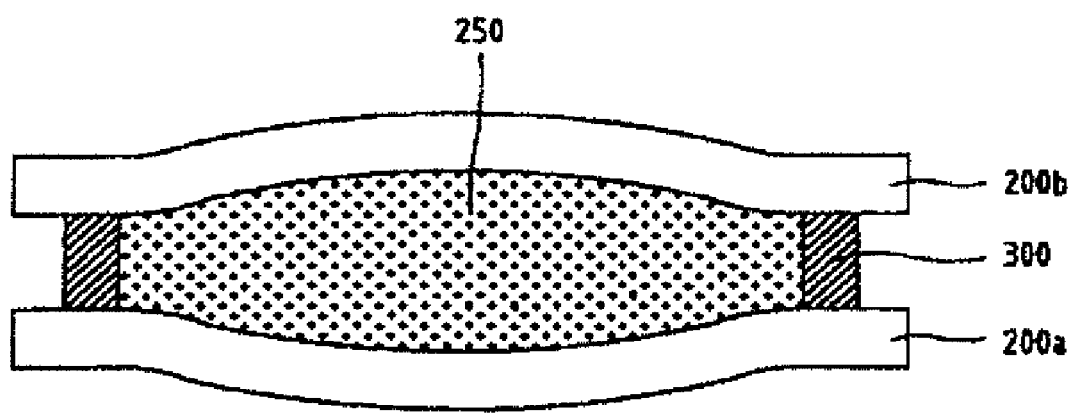
FIG. 73 is a cross-sectional view illustrating a bonding process of the thin film transistor array substrate and the color filter substrate formed by FIGS. 7A and 7B.

FIG. 73 is a cross-sectional view of the liquid crystal panel. As illustrated therein, a liquid crystal layer 310250 formed between the color filter substrate 310200a and the thin film transistor array substrate 310200b may have a thickness greater than a set thickness of a cell gap. This may occur because a surplus of liquid crystal (more than the reference amount) is dropped during dispensing of the liquid crystal.

Figure 74A:
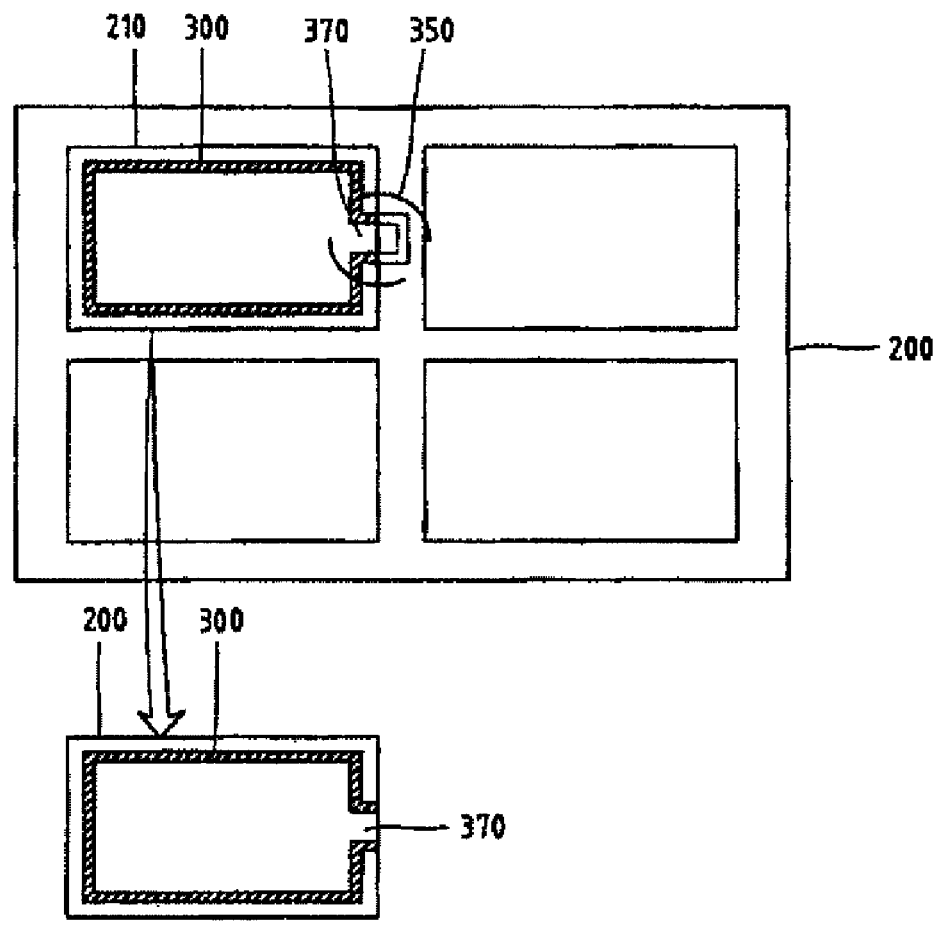
FIGS. 74A and 74B are a plan view and a cross-sectional view, respectively, illustrating a separating and pressurizing a plurality of liquid crystal panels.

Then, the bonded substrates are processed and cut into a plurality of liquid crystal panels (310S208). That is, as illustrated in FIG. 74A, the plurality of liquid crystal panels are separated along a cutting line of the substrate 310200. Here, the protruding portion of the seal pattern 310300 is also cut so that an aperture 310370 is formed at one side of the seal pattern.

Figure 76:
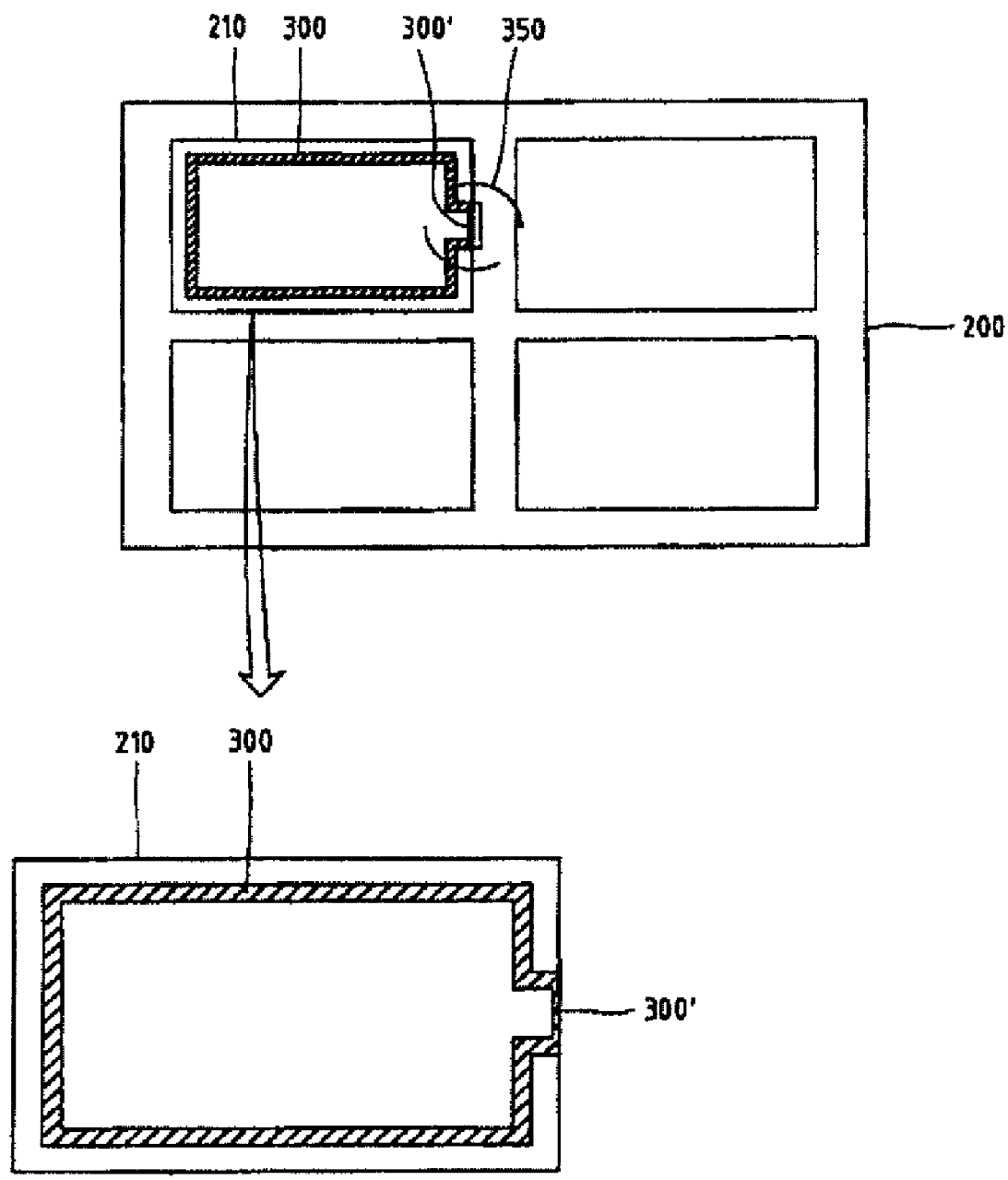
FIG. 76 is a view illustrating a seal pattern protruding portion of an LCD device prior to a cutting process and a unit panel after the cutting process according to an embodiment of the present invention.

Here, as illustrated in FIG. 76, the protruding portion 310350 of the seal pattern may be formed in part along the cutting line, and the detailed description thereon will be made later.

Figure 74B:
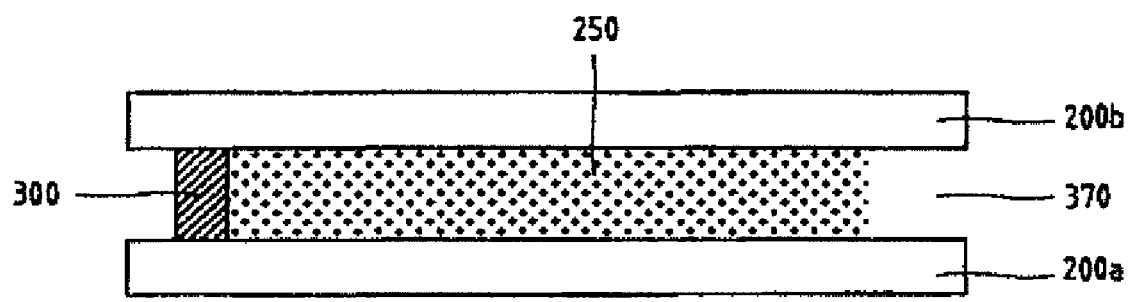

Thereafter, the surplus liquid crystal is removed through a pressurizing process (310S209). That is, as illustrated in FIG. 74B, the surplus liquid crystal to the liquid crystal layer 310250 is removed through the aperture 310370 by pressurizing the color filter substrate 310200a and the thin film transistor array substrate 310200b, so that the liquid crystal layer has the same height as the set height of a cell gap.

It is also possible to inject liquid crystal through the aperture 310370 to add liquid crystal to the liquid crystal layer if the cell gap has been underfilled.

Figure 75A:
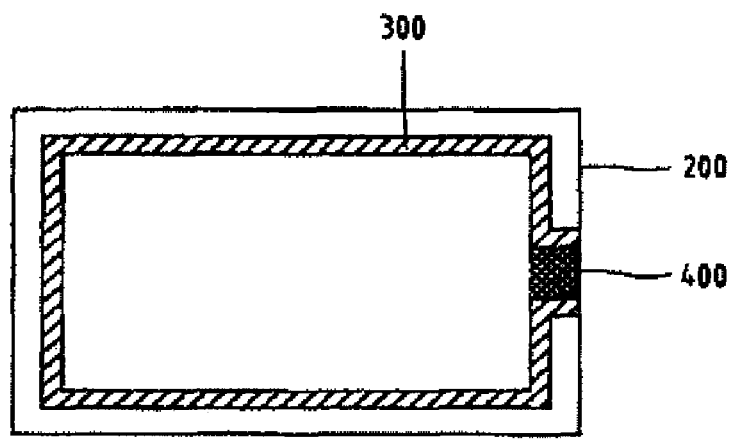
FIGS. 75A and 75B are a plan view and a cross-sectional view, respectively, illustrating an encapsulating process.
Figure 75B:
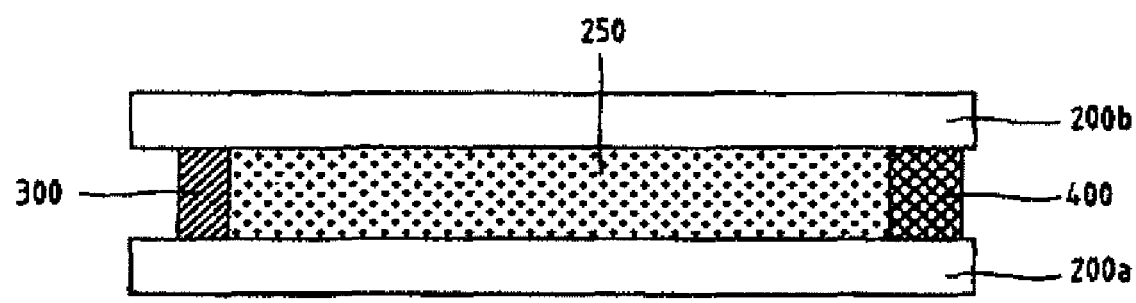

After the removal of the surplus liquid crystal, the aperture is encapsulated by an encapsulating material, thereby completing an LCD device (310S210). That is, as illustrated in FIGS. 75A and 75B, the cut region of the seal pattern 310300 is encapsulated or "plugged" by an encapsulating material 310400, thereby fabricating the LCD device.

The encapsulation using the encapsulating material 310400 is performed by injecting a seal material into the aperture and hardening it.

Accordingly, the method of fabricating the LCD device by the liquid crystal dispensing method makes processes simpler than those of the fabrication method using the related art liquid crystal injection method. Thus, the method according to the present invention may improve fabrication efficiency and achieve a high production yield.

In the method of fabricating the LCD device according to the present invention, a protruding portion protruding to a dummy region is formed at one side of a seal pattern, and the protruding portion is cut during the process of separating a liquid crystal panel, thereby forming a seal pattern having an aperture at one side of a liquid crystal panel. Also, surplus liquid crystal is removed from the liquid crystal panel, so that a liquid crystal layer has the same height as a desired cell gap size, so that image quality degradation may be prevented that is caused by an insufficient or excessive amount of liquid crystal.

An LCD device employing a general liquid crystal dispensing method has advantages of a quick manufacturing process. However, such an LCD device may have an image-quality degradation problem due to an insufficient or excessive amount of liquid crystal when an incorrect amount of liquid crystal is removed. Particularly, because it is difficult to precisely control the amount of liquid crystal according to a cell gap, the amount of liquid crystal should be controlled in every liquid crystal panel according to a model of the LCD device. Particularly, in the case of a multi-model glass substrate, the amount of liquid crystal should be controlled for each individual panel region which may be inconvenient.

Therefore, in the present invention, when liquid crystal is dropped, a surplus amount of liquid crystal more than the reference amount may be dispensed and then the surplus liquid crystal is removed. Thus, an accurate amount of liquid crystal may be provided to a liquid crystal panel without causing any of the aforementioned problems. Also, as described above, this becomes possible by forming a protruding portion at a seal pattern that protrudes to the dummy region. That is, in an operation of separating a plurality of liquid crystal panels after bonding of the liquid crystal panel, an aperture is formed at one side of the seal pattern by cutting the protruding portion, and the surplus liquid crystal is removed through the aperture. Also, liquid crystal may be further injected to the panel through the aperture.

However, in the present invention described above, a pressure difference between the liquid crystal layer and the outside of the liquid crystal panel occurs because the aperture is formed by completely removing the protruding seal pattern portion, which may cause bubbles to occur in the liquid crystal layer from the outside through the aperture.

Therefore, in order to minimize the bubble generation in the liquid crystal layer, the present invention may prevent the liquid crystal layer from being exposed to the outside as much as possible by allowing a part of the protruding portion of the seal pattern to remain by partially removing the protruding portion.

That is, as illustrated in FIG. 76, the protruding portion of the seal pattern partially remains on the substrate after the cutting process, so that an internal pressure of the liquid crystal can be maintained. Thereafter, the remaining portion of the seal pattern 310300' is opened, punctured or burst, and at the same time, surplus liquid crystal can be removed through the burst region of the seal pattern.

In such a manner, bubble generation due to the pressure difference between the liquid crystal layer and the outside can be prevented by allowing a part of the seal pattern to remain, instead of completely removing the protruding portion of the seal pattern and forming an aperture in the cutting process. That is, when the protruding seal pattern is completely removed in the cutting process to form the aperture, the liquid crystal layer is exposed to the outside through the aperture before and until the pressurizing process Thus the pressure difference between the liquid crystal layer and the outside may cause bubbles to occur in the liquid crystal layer from the outside through the aperture. Therefore, in the present embodiment, a part of the protruding portion of the seal pattern remains during the cutting process, so that the liquid crystal layer is not exposed to the outside right until just before the pressurizing process. Thus, the internal pressure of the liquid crystal layer can be retained. Also, the remaining protruding portion of the seal pattern is burst by the pressure applied to the liquid crystal panel during the pressurizing process, and, at the same time, an aperture is formed and the surplus liquid crystal is removed through this region. Accordingly, bubbles are prevented from being generated in the liquid crystal layer between the cutting process and the pressurizing process.

As described so far, in an LCD device fabricated using the liquid crystal dispensing method according to the present invention, a seal pattern is formed to have a protruding portion to a dummy region, and a part of the protruding portion of the seal pattern is cut in a cutting process for separating a liquid crystal panel to thereby form an aperture. Thus, surplus liquid crystal within the liquid crystal panel may be removed through the aperture, or, liquid crystal may be injected into the liquid crystal panel through the aperture. Accordingly, when the liquid crystal is dispensed in the present invention, a surplus amount of liquid crystal more than the reference amount may be dispensed, and a seal pattern encapsulating process of encapsulating the aperture may be additionally performed.

Furthermore, in the present invention, a part of the protruding portion of the seal pattern may remain in the cutting process, thereby retaining an internal pressure of the liquid crystal layer even after the cutting process. Accordingly, bubbles can be effectively minimized or prevented from being introduced into the liquid crystal layer from the outside.

In the present invention, both the removal of surplus liquid crystal from and additional supply of liquid crystal to the liquid crystal panel may be performed through the aperture formed by pressurizing the liquid crystal panel.

As described so far, an LCD device is fabricated through a liquid crystal dispensing method according to the present invention, so that productivity can be improved through simplified fabrication processes.

Also, according to the present invention, surplus liquid crystal is removed from the liquid crystal panel or liquid crystal is further provided to the liquid crystal panel through a seal pattern protruding to a dummy region. Thus, gravity inferiority due to an excessive or insufficient amount of liquid crystal provided in a liquid crystal panel can be prevented, and thus image quality of an LCD device can be improved.

FIGS. 77A to 77D are perspective views illustrating a method for manufacturing an LCD device according to an embodiment of the present invention.

Figure 77A:
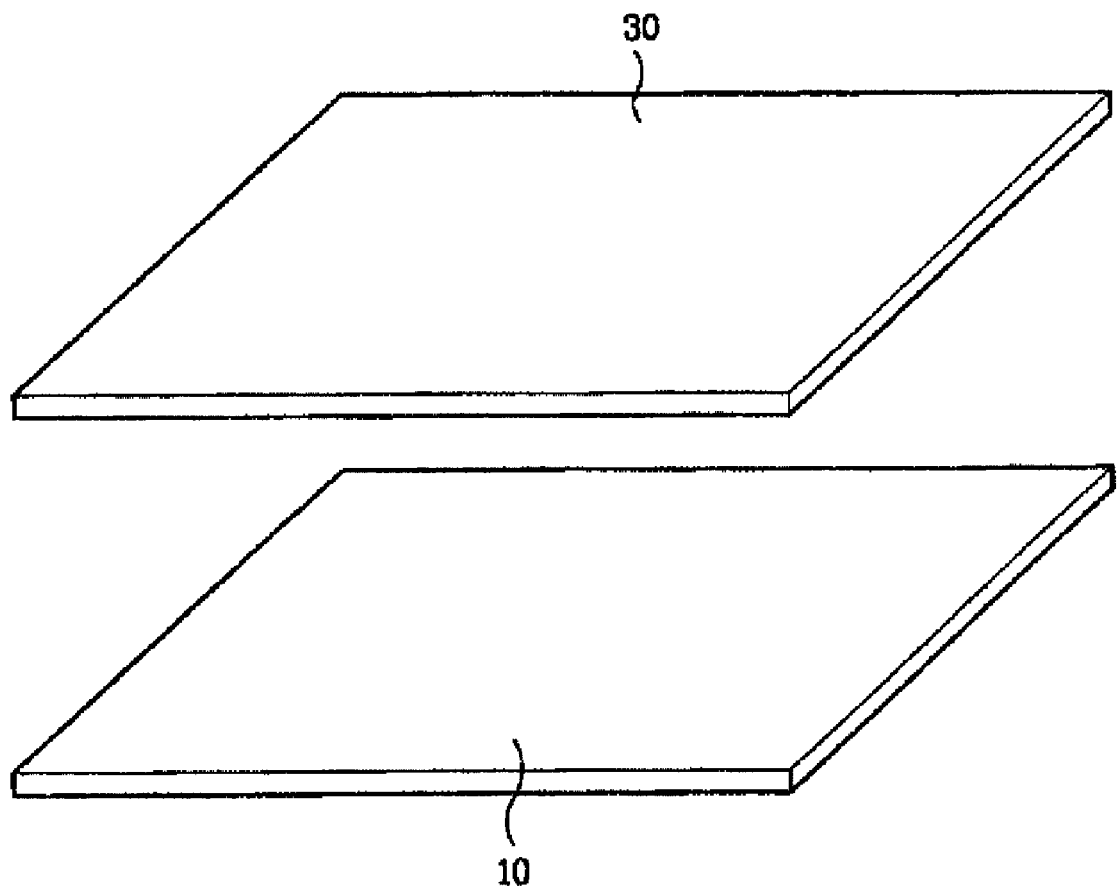
FIGS. 77A to 77D are perspective views illustrating a method for manufacturing an LCD device according to an embodiment of the present invention.

First, as illustrated in FIG. 77A, a first substrate 32010 and a second substrate 32030 are prepared.

Although not illustrated, the first substrate 32010 includes a plurality of gate and data lines, a plurality of thin film transistors, and a plurality of pixel electrodes. Each gate line is substantially perpendicular to each data line to define a plurality of unit pixel regions. Also, each thin film transistor is formed adjacent to a crossing portion of the gate and data lines, wherein the thin film transistor includes a gate electrode, a gate insulating layer, a semiconductor layer, an ohmic contact layer, source and drain electrodes, and a passivation layer. Each pixel electrode is formed in the unit pixel region, wherein the pixel electrode is electrically connected with the thin film transistor.

Although not illustrated, the second substrate 32030 includes a black matrix layer, a color filter layer, and a common electrode. The black matrix layer shields the gate line, the data line, and the thin film transistor from light. The color filter layer of red, green, and blue patterns is formed on the black matrix layer. The common electrode is formed on the color filter layer. Also, an overcoat layer may be additionally formed between the color filter layer and the common electrode.

In case of an In-Plane Switching (IPS) mode LCD device, the common electrode is formed substantially parallel to the pixel electrode on the first substrate, to thereby induce a transverse electric field.

Also, an alignment layer for initial alignment of liquid crystal may be formed on each of the lower and upper substrates 32010 and 32030. The alignment layer may be formed by a rubbing method or a photo-alignment method.

A spacer for maintaining a cell gap between the lower and upper substrates 32010 and 32030 is formed on any one of the lower and upper substrates 32010 and 32030. The spacer may be formed of a ball spacer or a column spacer.

Figure 77B:
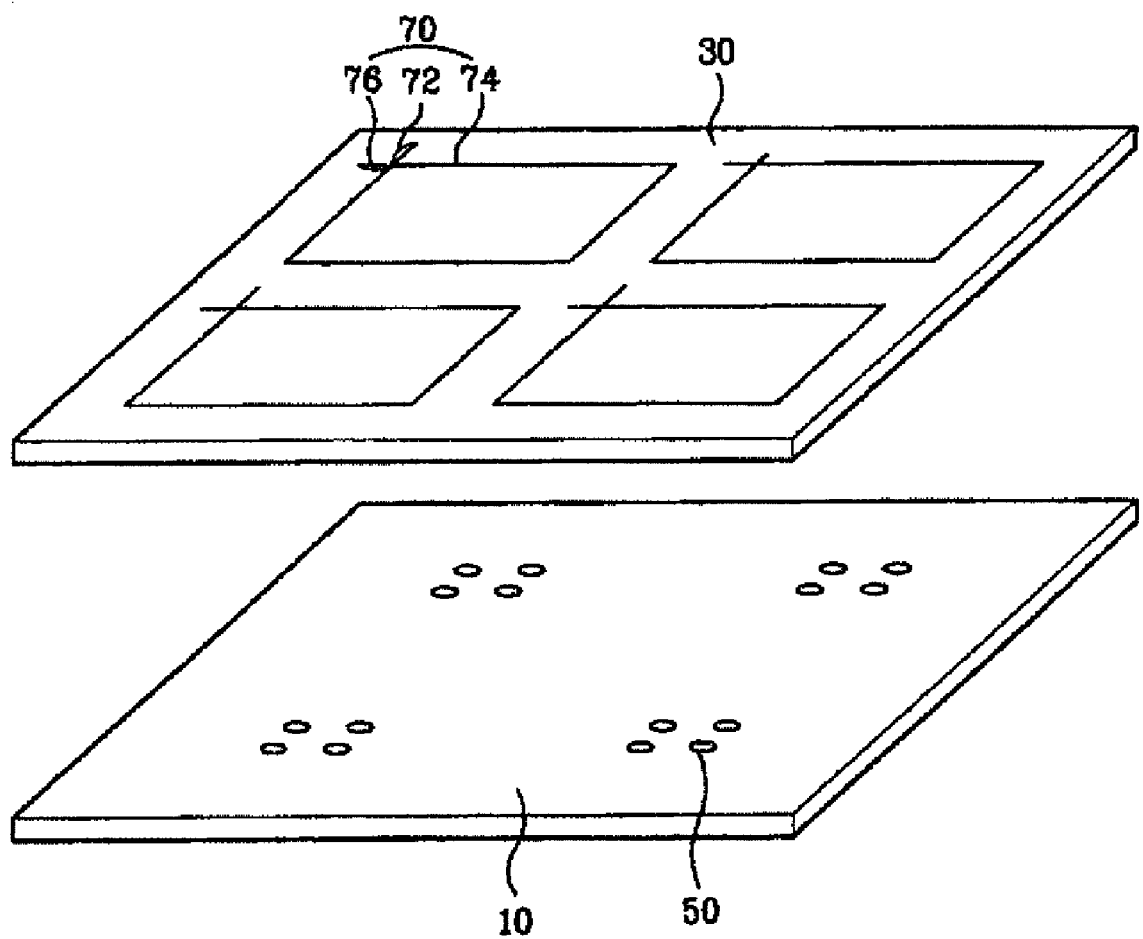

As illustrated in FIG. 77B, liquid crystal 32050 may be dispensed on a first substrate 32010 to thereby form a liquid crystal layer. A sealant 32070 may be dispensed on a second substrate 32030. Although not illustrated here, the liquid crystal 32050 and sealant may be dispensed on the same substrate.

The sealant 32070 includes a main sealant pattern 32074, and first and second dummy sealants patterns 32072 and 32076 extended from the main sealant pattern 32074 and formed in the periphery of the main sealant pattern 32074.

The sealant 32070 is dispensed on the upper substrate 32030 by a dispenser, and the dispenser will be explained with reference to FIGS. 78A to 78C.

Figure 78A:
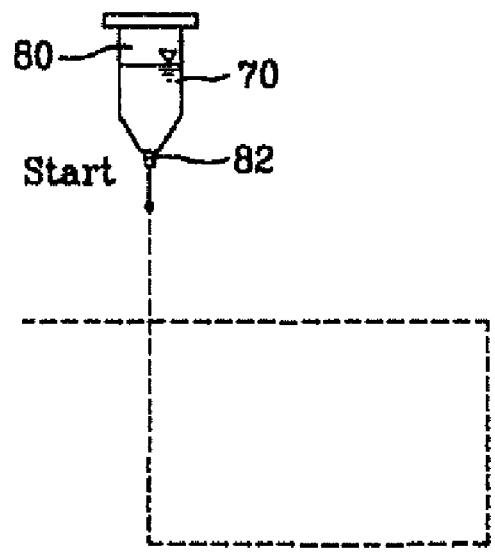
FIGS. 78A to 78C are schematic views of a sealant dispensing method using a dispenser according to an embodiment of the present invention.

As in FIG. 78A, the dispenser includes a syringe 32080 having the sealant 32070 therein, and a nozzle 32082 connected to a lower end of the syringe 32080.

The dispenser is positioned in the periphery of the main sealant pattern. The main sealant pattern corresponds to a rectangular pattern. That is, the dispenser is positioned adjacent to one corner of the rectangular pattern along which the main sealant pattern will be formed.

Figure 78B:
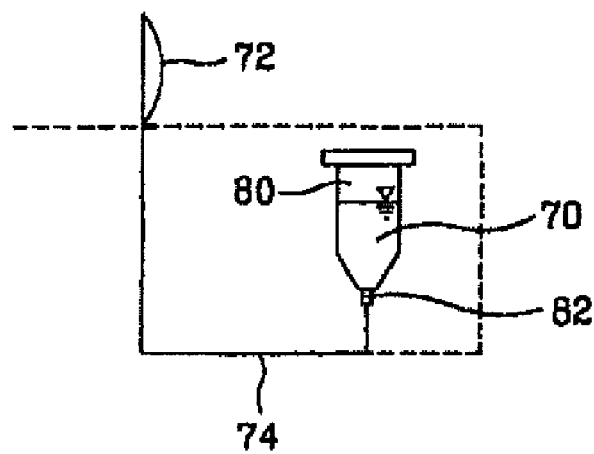

As illustrated in FIG. 78B, the first dummy sealant pattern 32072 by the dispenser and then the main sealant pattern 32074 is formed.

Figure 78C:
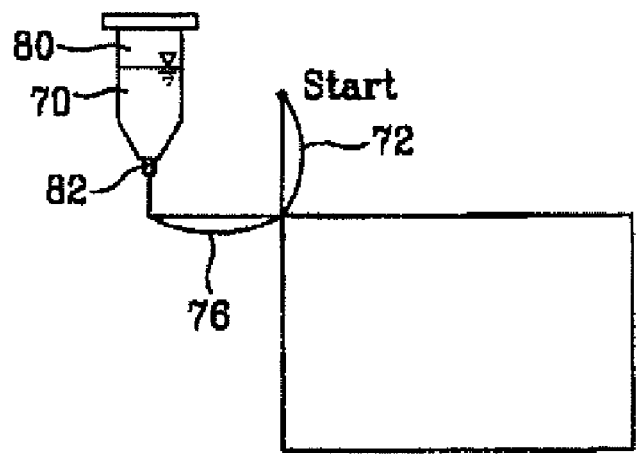

As illustrated in FIG. 78C, after completing the main sealant pattern 32074, the dispensing is performed to the periphery of the main sealant pattern 32074, to thereby form the second dummy sealant pattern 32076. Accordingly, it is possible to form the first and second dummy sealant patterns 32072 and 32076 being formed adjacent to one corner of the rectangular main sealant pattern 32074, extending from respective line sections of the main sealant pattern 32074.

After forming the first dummy sealant pattern 32072 in the periphery of the main sealant pattern 32074, the rectangular main sealant pattern 32074 is formed. Then, the second dummy sealant pattern 32076 is formed substantially perpendicular to the first dummy sealant pattern 32072 in the periphery of the main sealant pattern 32074.

Accordingly, the starting and ending points of dispensing are formed in the periphery of the main sealant pattern 32074, so that it is possible to prevent the main sealant pattern 32074 from including coagulated sealant or being disconnected.

As the main sealant pattern 32074 is not coagulated, preventing the liquid crystal positioned inside the main sealant pattern 32074 from being contaminated. Also, the main sealant pattern 32074 has no disconnection, preventing the liquid crystal from flowing to the outside of the main sealant pattern 32074.

The sealant 32070 may be a UV-curing type.

Referring to FIG. 77B, if the liquid crystal 32050 contacts the sealant 32070 before curing the sealant 32070, the liquid crystal 32050 is contaminated. Accordingly, it is preferable to dispense the liquid crystal 32050 on the central portion of the first substrate 32010. As the liquid crystal dispensed on the central portion of the lower substrate 32010 spreads slowly until and after curing the sealant 32070, the liquid crystal is dispensed at the same density on the entire surface of the first substrate 32010.

In the drawings, the liquid crystal 32050 is formed on the first substrate 32010, and the sealant 32070 is formed on the second substrate 32030. However, the liquid crystal 32050 may be formed on the second substrate 32030, and the sealant 32070 may be formed on the first substrate 32010.

Also, the liquid crystal 32050 and the sealant 32070 may be formed on the same substrate. If forming the liquid crystal 32050 and the sealant 32070 on the same substrate, it may cause nonuniformity between the processing times the substrate having the liquid crystal and sealant and the other substrate, thereby increasing the manufacturing time. In this respect, it may be preferred to form the liquid crystal 32050 and the sealant 32070 on the different substrates.

Figure 77C:
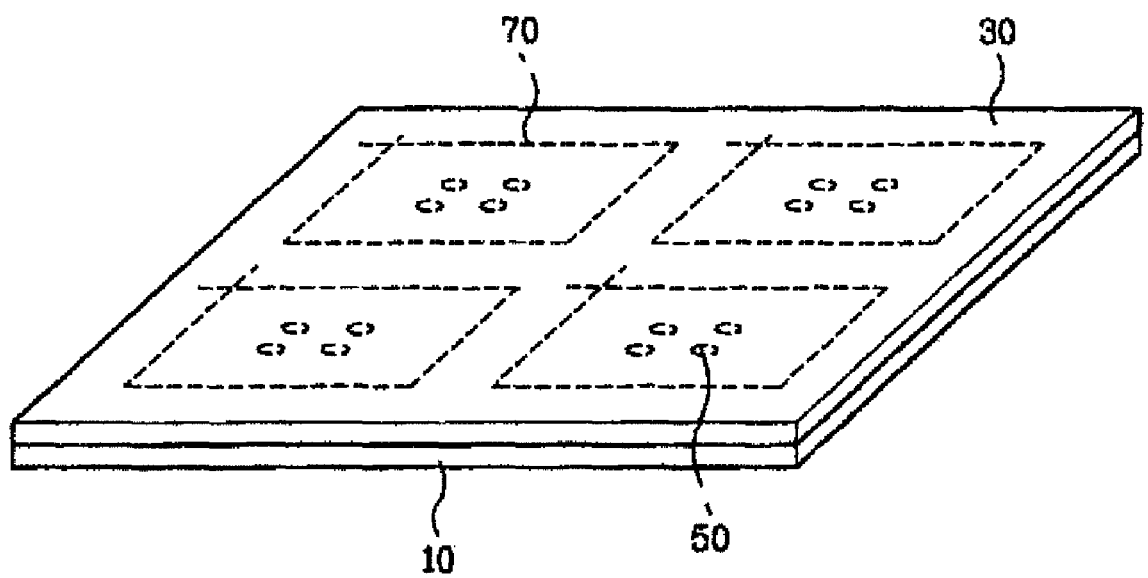

As illustrated in FIG. 77C, the first and second substrates 32010 and 32030 are bonded to each other. The first substrate 32010 may be positioned at a lower position, and the second substrate 32030 may be positioned above the first substrate 32010. At this time, the surface of the first substrate 32010 on which the liquid crystal 32050 is dispensed faces to the surface of the second substrate 32030 on which the plurality of layers are formed.

Figure 77D:
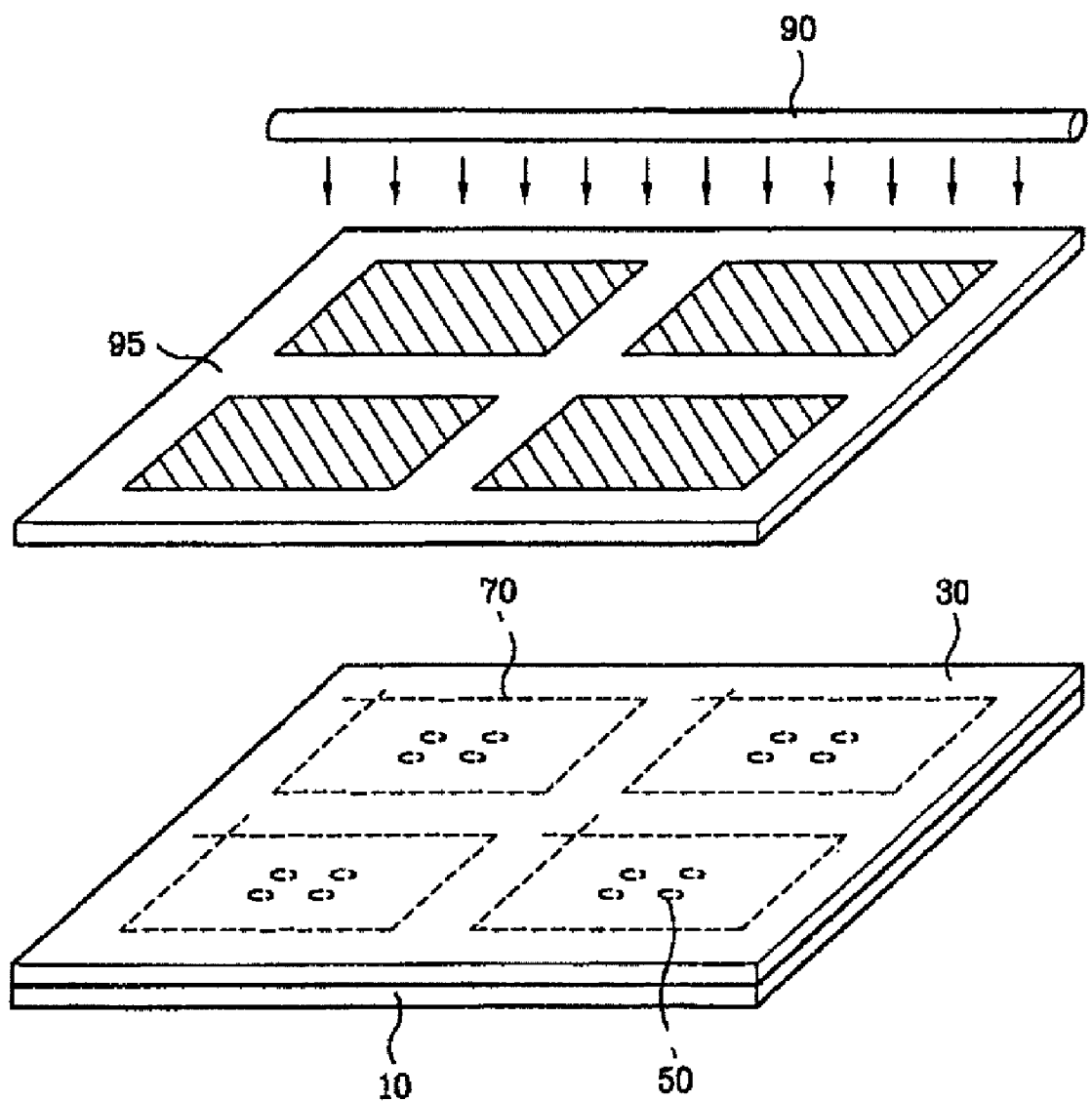

As illustrated in FIG. 77D, the sealant 32070 is cured. If using the sealant 32070 of UV-curing type, as illustrated in FIG. 77D, UV light is applied to the sealant 32070 by a UV-irradiation apparatus 32090.

If applying UV light onto the entire surface of the bonded substrates, UV light may have bad effects on an active region if the thin film transistor. Also, a pretilt angle of an alignment layer for initial alignment of liquid crystal may be changed due to UV light.

Accordingly, as illustrated in FIG. 77D, the active region is covered with a mask 32095, and then UV light is applied to the substrate to cure the sealant.

Even if using the UV-curing sealant 32070, a thermal curing process may be additionally performed to the sealant 32070 after applying UV light.

Although not illustrated, after applying UV light, the substrate is cut into unit cells, and a final inspection test is performed, thereby completing the LCD device.

Hereinafter, an LCD device according to the present invention will be described with reference to the accompanying drawings.

Figure 79:
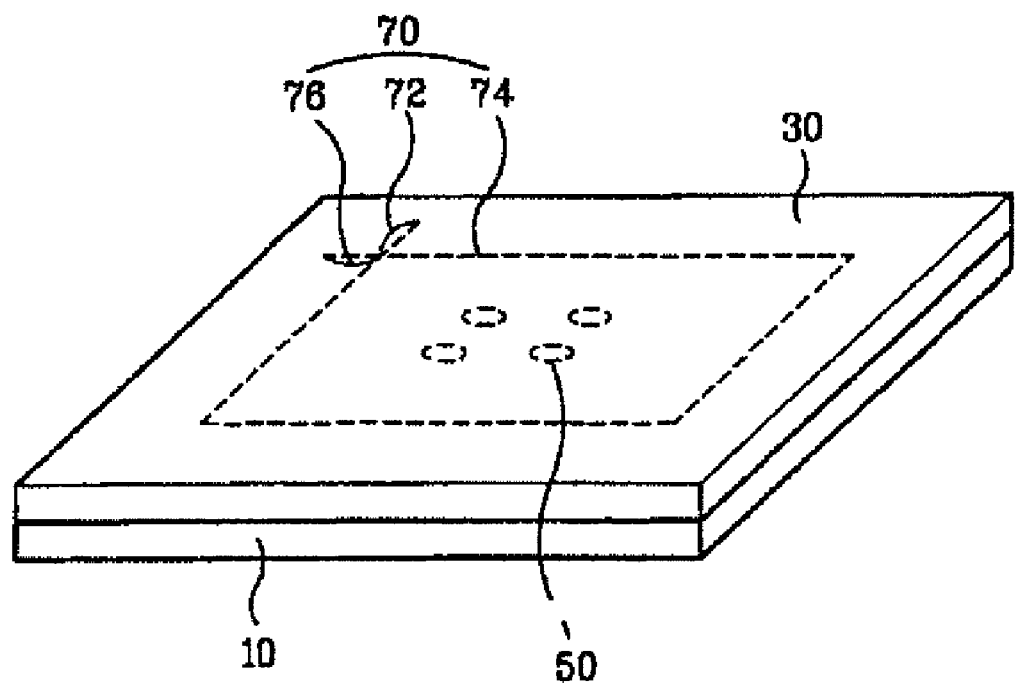
FIG. 79 is a perspective view of an LCD device according to an embodiment of the present invention.

FIG. 79 is a perspective view illustrating an LCD device according to another embodiment of the present invention.

As illustrated in FIG. 79, an LCD device according to another embodiment of the present invention includes a lower substrate 32010, an upper substrate 32030, a liquid crystal layer 32050 formed between the lower and upper substrates 32010 and 32030, and a sealant 32070 surrounding the liquid crystal layer 32050 between the lower and upper substrates 32010 and 32030.

The lower and upper substrates 32010 and 32030 are similar in structure as those explained above, thus a detailed explanation is omitted.

The sealant 32070 includes a main sealant pattern 32074, and first and second dummy sealant patterns 32072 and 32076 extended from the main sealant pattern 32074 and formed in the periphery of the main sealant pattern 32074.

The first and second dummy sealant patterns 32072 and 32076 are formed adjacent to one corner of the main sealant pattern 32074. Also, the extended direction of the first dummy sealant pattern 32072 is different from the extended direction of the second dummy sealant pattern 32076.

As illustrated in FIG. 79, the main sealant pattern 32074 is formed in a substantially rectangular shape, and the first and second dummy sealant pattern 32072 and 32076 are formed adjacent to one corner of the substantially rectangular main sealant pattern 32074. At this time, the first dummy sealant pattern 32072 is substantially perpendicular to the second dummy sealant 32076.

The sealant 32070 may be a UV-curing type.

Although not illustrated, a spacer for maintaining a cell gap is formed between the lower and upper substrates 32010 and 32030. The spacer may be of a ball spacer or a column spacer.

As mentioned above, the LCD device and method for manufacturing the same according to the present invention has the following advantages.

Before dispensing the main sealant pattern, the first dummy sealant is formed in the periphery of the main sealant pattern. After dispensing the main sealant pattern, the second dummy sealant is formed in the periphery of the main sealant pattern. That is, the starting and ending points of the sealant dispensing are formed in the periphery of the main sealant pattern, whereby it is possible to prevent the main sealant pattern from being coagulated or disconnected.

As the main sealant pattern has no coagulation, it is possible to prevent the liquid crystal positioned inside the main sealant pattern from being contaminated after bonding the substrates. Also, since the main sealant pattern has no disconnection, the liquid crystal does not flow to the outside of the main sealant pattern after bonding the substrates.

Hereinafter, a sealant forming device, a sealant forming method and a method of manufacturing an LCD device using the sealant forming device according to the present invention will be explained with reference to the accompanying drawings.

Figure 80:
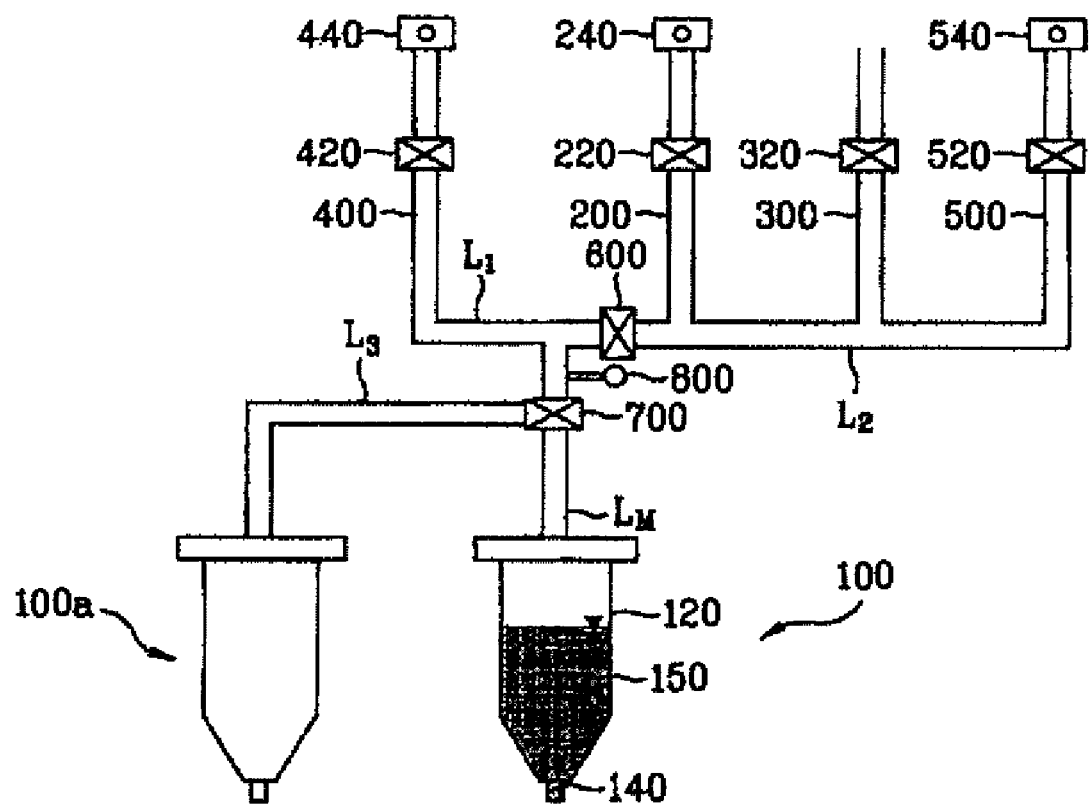
FIG. 80 is a schematic view illustrating a sealant forming device according to an embodiment of the present invention.

First, a sealant forming device according to the present invention will now be explained. FIG. 80 is a schematic view illustrating a sealant dispensing apparatus according to an embodiment of the present invention.

Referring to FIG. 80, the sealant forming device is provided with a dispenser 330100, a dispensing tube 330200, an atmospheric tube 330300, an instantaneous suction tube 330400 and an additional suction tube 330500. The dispenser 330100 includes a syringe 330120 and a nozzle 330140 connected to a lower end of the syringe 330120 to discharge a sealant 330150.

The dispensing tube 330200 applies a pressure to the syringe 330120 of the dispenser 330100 to discharge the sealant 330150 through the nozzle 330140. The dispensing tube 330200 is connected to the syringe 330120 of the dispenser 330100. Specifically, the dispensing tube 330200 is connected to a second tube ($L_2$) diverged from a main tube ($L_M$) which is connected to the syringe 330120. The dispensing tube 330200 is provided with a dispensing valve 330220 for switching the dispensing tube 330200 and a dispensing regulator 330240 for controlling the pressure applied to the syringe 330120.

The atmospheric tube 330300 applies an atmospheric pressure to the dispenser 330100 after discharging the sealant 330150, and then the instantaneous suction tube 330400 extracts the remaining sealant 330150. When the instantaneous suction tube 330400 draws the remaining sealant 330150 out right after discharging the sealant 330150, it is difficult to extract all the remaining sealant 330150 due to the pressure applied through the dispensing tube 330200. Accordingly, the atmospheric pressure is applied to the dispenser 330100 to change the pressure of the dispenser 330100 before extracting the remaining sealant.

The atmospheric tube 330300 is connected to the syringe 330120 of the dispenser 330100. Specifically, the atmospheric tube 330300 is connected to the second tube ($L_2$) diverged from the main tube ($L_M$) which is connected to the syringe 330120. The atmospheric tube 330300 is provided with an atmospheric valve 330320 for switching the atmospheric tube 330300. In this case, an end of the atmospheric tube 330300 is open to the external air so that the atmospheric tube 330300 does not require a regulator.

The instantaneous suction tube 330400 extracts the sealant 330150 remaining in the nozzle 330140 right after the atmospheric pressure is applied to the dispenser 330100 to prevent the sealant 330150 from coagulating in the nozzle 330140.

The instantaneous suction tube 330400 is connected to the syringe 330120 of the dispenser 330100. Specifically, the instantaneous suction tube 330400 is connected to a first tube ($L_1$) diverged from the main tube ($L_M$) which is connected to the syringe 330120. The instantaneous suction tube 330400 is provided with an instantaneous suction valve 330420 for switching the instantaneous suction tube 330400 and an instantaneous suction regulator 330440 for controlling the vacuum state applied to the syringe 330120.

The additional suction tube 330500 prevents the sealant 330150 from being moved to the end of the nozzle 330140 after extracting the sealant using the instantaneous suction tube 330400. After extracting the sealant 330150 using the instantaneous suction tube 330400, the instantaneous suction valve 330420 is switched to an off-state in which the sealant 330150 may move down and coagulate in the nozzle 330140. To prevent the sealant 330150 from moving down and coagulating in the nozzle 330140, the sealant forming device includes the additional suction tube 330500 to make the syringe 330120 in a vacuum state.

The additional suction tube 330500 is connected to the syringe 330120 of the dispenser 330100. Specifically, the additional suction tube 330500 is connected to the second tube ($L_2$) diverged from the main tube ($L_M$) which is connected to the syringe 330120. The additional suction tube 330500 is provided with an additional suction valve 330520 for switching the additional suction tube 330500 and an additional suction regulator 330540 for controlling the vacuum state applied to the syringe 330120.

The main tube ($L_M$) is connected to the syringe 330120 of the dispenser 330100, and the first ($L_1$) and second ($L_2$) tubes are diverged from the main tube ($L_M$). The first tube ($L_1$) is connected to the instantaneous suction tube 330400. The second tube ($L_2$) is connected to the dispensing tube 330200, the atmospheric tube 330300 and the additional suction tube 330500.

The second tube ($L_2$) is provided with a protection valve 330600. When the instantaneous suction tube 330400 is in the on-state for instantaneously extracting the sealant 330150 remaining in the nozzle 330140, the dispensing tube 330200, the atmospheric tube 330300 and the additional suction tube 330500 are in the off-state. During the extraction of the sealant 330150, the sealant 330150 may be moved to the second tube ($L_2$) instead of the instantaneous suction tube 330400. In this respect, the protection valve 330600 is provided to prevent the flow of the sealant 330150 toward the second tube ($L_2$).

The main tube ($L_M$) includes a pressure sensor 330800 which senses the pressure inside the dispenser 330100, and measures the amount of sealant 330150 included in the dispenser 330100 to determine the level of pressure or vacuum in the dispensing tube 330200, the atmospheric tube 330300, the instantaneous suction tube 330400, and the additional suction tube 330500.

The main tube ($L_M$) is connected to a third tube ($L_3$), and the third tube ($L_3$) is connected to an empty syringe 330100a. The main tube ($L_M$) also includes a selection valve 330700 for controlling the turn-on/off state of the main tube ($L_M$) and the third tube ($L_3$).

In operating the sealant dispensing device, it is beneficial to determine the degree of pressure applied to the dispensing tube 330200 and the degree of vacuum applied to the instantaneous suction tube 330400 before dispensing. The degrees of pressure and vacuum are determined based on the amount of the sealant 330150 provided in the syringe 330120.

Accordingly, the empty syringe 330100a, the third tube ($L_3$), the selection valve 330700 and the pressure sensor 330800 are used to determine the amount of the sealant 330150.

To determine the precise amount of the sealant 330150, the selection valve 330700 is first controlled such that the third tube ($L_3$) becomes off-state and the main tube ($L_M$) becomes on-state. Then, a pressure is applied to the syringe 330100 and the pressure sensor 330800 measures the pressure of the syringe 330100. The selection valve 330700 is then controlled to make the third tube ($L_3$) on-state and the main tube ($L_M$) off-state. Then, after applying the pressure to the empty syringe 330100a, the pressure sensor 330800 measures the pressure of the empty syringe 330100a. By comparing the pressure difference between the syringe 330100 and empty syringe 330100a, it is possible to measure the amount of the sealant 330150 in the syringe 330100.

Figure 81:
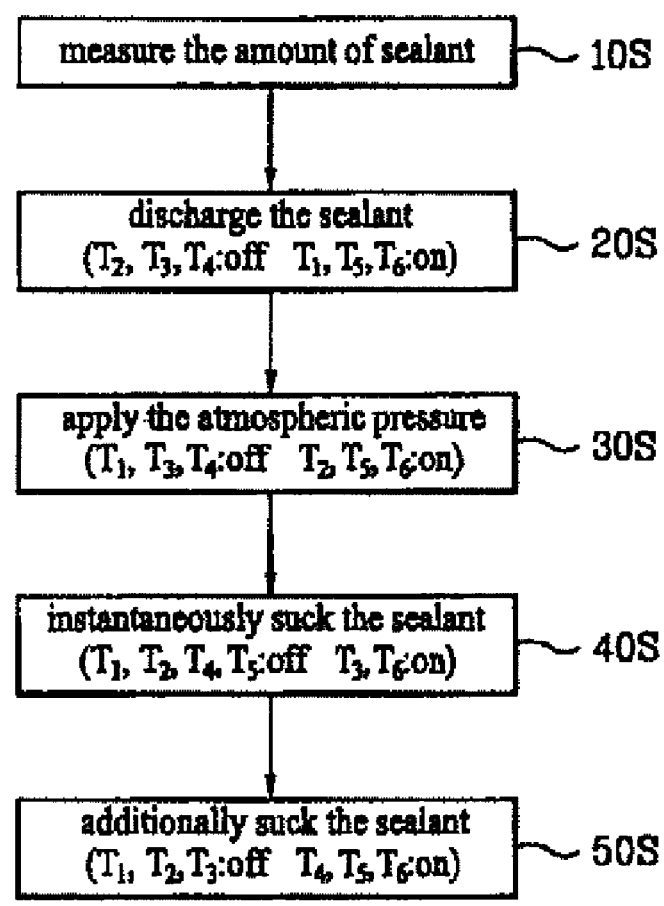
FIG. 81 is a flow chart of a sealant forming process according to an embodiment of the present invention.

Hereinafter, a method for forming a sealant according to the present invention will be explained with reference to FIG. 81. FIG. 81 is a flow chart of a sealant forming process according to an embodiment of the present invention.

First, an amount of the sealant 330150 in the syringe 330100 is measured (33010S) for initially setting the sealant forming device. To measure the amount of the sealant 330150, a pressure is applied to the syringe 330100 and the empty syringe 330100a using the selection valve 330700, and then the pressure difference between the syringe 330100 and the empty syringe 330100a is measured using the selection valve 330700 and the pressure sensor 330800 as described above.

Next, the sealant 330150 is discharged from the nozzle 330140 of the dispenser 330100 and dispensed on a substrate (33020S). To discharge the sealant 330150, the atmospheric valve 330320 of the atmospheric tube 330300, the instantaneous suction valve 330420 of the instantaneous suction tube 330400 and the additional suction valve 330520 of the additional suction tube 330500 are in the off-state, and a pressure is applied to the sealant 330150 by using the dispensing regulator 330240 of the dispensing tube 330200. At this time, the protection valve 330600 of the second tube ($L_2$) is in the on-state and the selection valve 330700 of the main tube ($L_M$) is in the on-state. To form a seal pattern on the substrate, at least one of the dispenser 330100 or the substrate can be moved.

After completion of the sealant forming process, the sealant forming device may be moved to a predetermined position or standby position until another substrate is loaded to perform another sealant forming process. In the mean time, the following processes are conducted to prevent the sealant 330150 from coagulating in the nozzle 330120 of the dispenser 330100.

After dispensing the sealant 330150, the atmospheric pressure is applied to the dispenser 330100 (33030S) to decrease the pressure difference, thereby improving the efficiency in the instantaneous suction process.

In the process of applying the atmospheric pressure to the dispenser 330100, the dispensing valve 330220 of the dispensing tube 330200, the instantaneous suction valve 330420 of the instantaneous suction tube 330400 and the additional suction valve 330520 of the additional suction tube 330500 are in the off-state, and the atmospheric valve 330320 of the atmospheric tube 330300 is in the on-state. At this time, the protection valve 330600 of the second tube ($L_2$) is in the on-state, and the selection valve 330700 of the main tube ($L_M$) is in the on-state.

Next, after applying the atmospheric pressure to the dispenser 330100, the sealant 330150 remaining in the nozzle 330140 of the dispenser 330100 is substantially instantaneously extracted (33040S). To extract the sealant 330150 remaining in the nozzle 330140, the dispensing valve 330220 of the dispensing tube 330200, the atmospheric valve 330320 of the atmospheric tube 330300 and the additional suction valve 330520 of the additional suction tube 330500 are in the off-state, and the instantaneous suction valve 330420 of the instantaneous suction tube 330400 is in the on-state. Thereafter, a vacuum pressure is applied and maintained by the instantaneous suction regulator 330440 of the instantaneous suction tube 330400. At this time, the protection valve 330600 of the second tube ($L_2$) is in the off-state, and the selection valve 330700 of the main tube ($L_M$) is in the on-state.

Because of the vacuum pressure, the sealant 330150 remaining in the nozzle 330140 moves up through the instantaneous suction tube 330400. This instantaneous suction process is performed to prevent the sealant 330150 from coagulating in the nozzle 330140.

After the instantaneous suction process, an additional suction process is performed to prevent the sealant 330150 from moving down to the nozzle 330140 of the dispenser 330100 (33050S).

In the additional suction process of the dispenser 330100, the dispensing valve 330220 of the dispensing tube 330200, the atmospheric valve 330320 of the atmospheric tube 330300 and the instantaneous suction valve 330420 of the instantaneous suction tube 330400 are in the off-state, and the additional suction valve 330520 of the additional suction tube 330500 is in the on-state. In this state, a vacuum pressure is applied by the additional suction regulator 330540 of the additional suction tube 330500. At this time, the protection valve 330600 of the second tube (L2) is in the on-state, and the selection valve 330700 of the main tube (LM) is in the on-state.

As described above, a method for forming a sealant according to the present invention can easily control the pressures of the sealant forming device and prevent or minimize a blur problem caused by the coagulated sealant. Also, a linear seal pattern may be formed along a shape of pads (for example, an LCD type having four pads) depending a type of LCD devices.

Hereinafter, a method for manufacturing an LCD device using the sealant forming device according to a further embodiment the present invention will now be described.

First, lower and upper substrates are prepared.

Elements provided on the lower and upper substrates can be changed according to a driving mode of the LCD device. That is, for the TN mode LCD device, the lower substrate includes gate and data lines, a thin film transistor TFT and a pixel electrode, and the upper substrate includes a black matrix layer, a color filter layer and a common electrode. The gate and data lines cross each other to thereby define a pixel region. The thin film transistor TFT is formed adjacent to a crossing of the gate and data lines, wherein the thin film transistor serves as a switching element. The pixel electrode is formed in the pixel region to generate an electric field. Then, the black matrix layer prevents light leakage, and the color filter layer is provided for displaying various colors. Also, the common electrode generates the electric field in conjunction with the pixel electrode.

For the IPS mode LCD device, the lower substrate includes gate and data lines, a thin film transistor, a pixel electrode and a common electrode, and the upper substrate includes a black matrix layer and a color filter layer. The gate and data lines cross each other to thereby define a pixel region. The thin film transistor TFT is formed adjacent to a crossing of the gate and data lines, wherein the thin film transistor serves as a switching element. The pixel and common electrodes are formed in parallel in the pixel region, wherein the pixel and common electrodes generate a parallel electric field. Then, the black matrix layer prevents light leakage, and the color filter layer is provided for displaying various colors.

Thereafter, a sealant is dispensed on at least one of the lower and upper substrates. The sealant is dispensed according to the above-mentioned method. The sealant may be formed in a pattern having an injection hole, or in a pattern having no injection hole, depending on a method of forming a liquid crystal layer.

After that, a liquid crystal layer is formed between the lower and upper substrates. The liquid crystal layer may be formed by a vacuum injection method or a dispensing method. In the vacuum injection method, the sealant is dispensed in the pattern having an injection hole, and the lower and upper substrates are bonded to each other. Then, liquid crystal is injected to a space between the lower and upper substrates through the injection hole of the sealant. In the dispensing method, the sealant is dispensed in the pattern having no injection hole, and liquid crystal is dispensed on any one of the lower and upper substrates. Then, the lower and upper substrates are bonded to each other.

As described above, the sealant forming device, the sealant forming method and the method of manufacturing an LCD device using the sealant forming device according to the present invention have the following advantages.

A process for substantially instantaneously extracting the sealant remaining in the nozzle is additionally performed after dispensing the sealant on the substrate so that it is possible to minimize or prevent the sealant from coagulating in the nozzle.

Also, a method for forming a sealant according to the present invention can easily control the pressures of the sealant forming device and prevent or minimize a blur problem caused by the coagulated sealant. Accordingly, a linear seal pattern may be formed along a shape of pads (for example, an LCD type having four pads) depending a type of LCD devices. The present invention allows seal patterns to be formed entirely outside of the dummy region and away from the scribing or cutting paths on the substrate, thus preventing excessive wear of the scribing or cutting tools caused by scribing or cutting through hardened sealant.

Bonding

Figure 82:
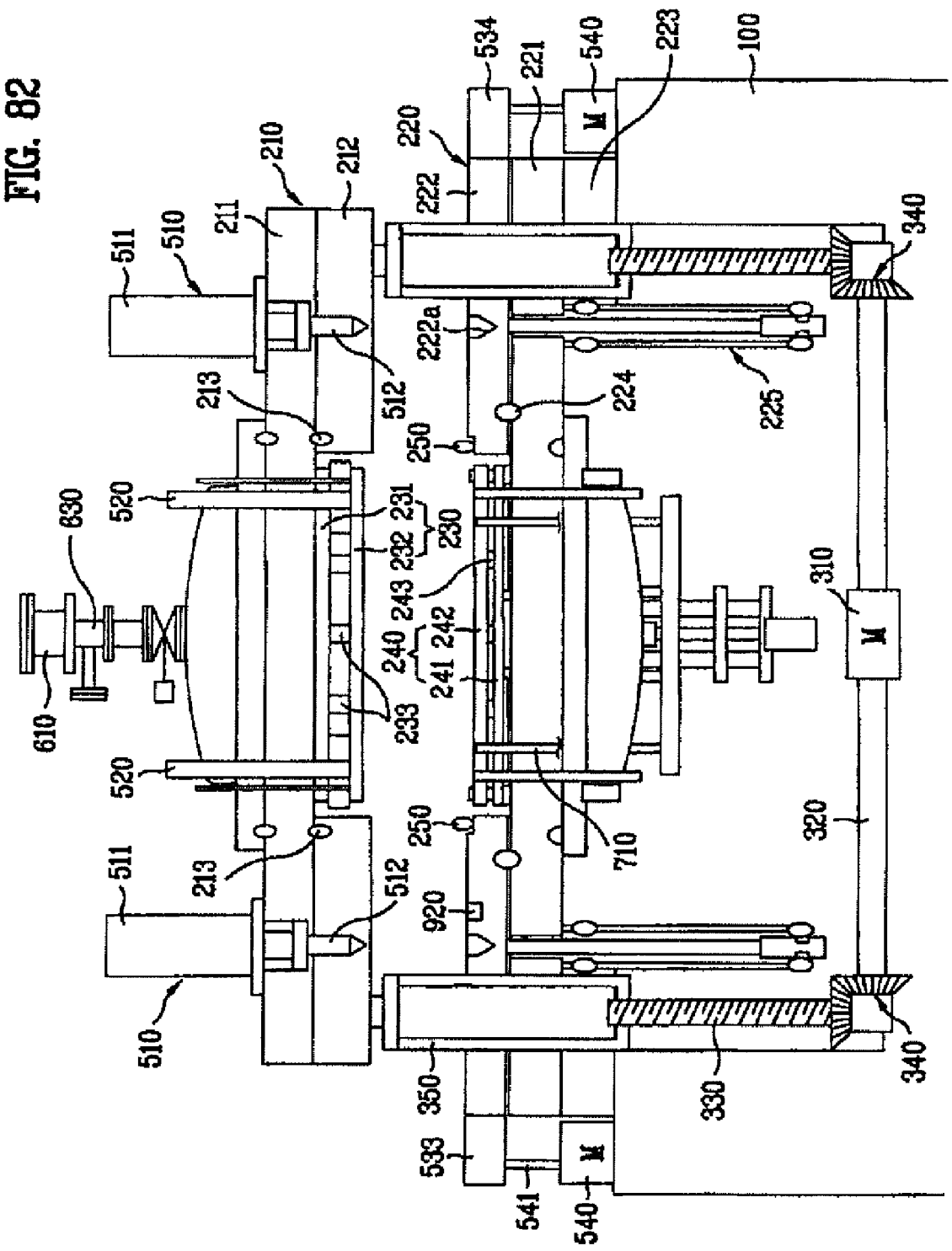
FIG. 82 is a schematic view illustrating an initial state of a substrate bonding apparatus for an LCD panel according to the present invention.

FIG. 82 illustrates an initial state of a substrate bonding apparatus for an LCD panel in accordance with an exemplary embodiment of the present invention.

As illustrated in FIG. 82, the substrate bonding apparatus includes a base frame 340100, an upper chamber unit 340210, a lower chamber unit 340220, a chamber moving unit 340310, 340320, 340330, 340340 and 340350, an upper stage 340230, a lower stage 340240, a sealing unit, alignment identifying cameras 340520, an aligning unit, a linking unit 340510, supporting units 340710, and vacuum pump units 340610, 340621, and 340622.

The base frame 340100, which is included in the substrate bonding apparatus of the present invention, is fixed to the ground. The base frame 340100 defines the appearance of the substrate bonding apparatus and functions to support the various elements of the substrate bonding apparatus.

The upper and lower chamber units 340210 and 340220 are mounted to upper and lower ends of the base frame 340100, respectively, such that the upper and lower chamber units 340210 and 340220 are inter-connectable.

The upper chamber unit 340210 includes an upper base 340211 that is exposed to an external environment, and an upper chamber plate 340212 that is fixed to a lower surface of the upper base 340211 while being in close contact with the lower surface of the upper base 340211. The upper chamber plate 340212 has a rectangular frame structure such that a defined space is defined in the upper chamber plate 340212.

The upper stage 340230 is arranged in the space defined in the upper chamber plate 340212. The upper stage 340230 is mounted to the upper chamber unit 340210 such that the upper stage 340230 is linked to the upper chamber unit 340210.

A seal member 340213 is interposed between the upper base 340211 and upper chamber plate 340212 that constitute the upper chamber unit 340210, to isolate the inner space of the upper chamber plate 340212 from the outside of the upper chamber plate 340212. The seal member 340213 will be referred to as a "first seal member", hereinafter.

The lower chamber unit 340220 includes a lower base 340221 which is fixed to the base frame 340100, and a lower chamber plate 340222 which is mounted to an upper surface of the lower base 340221 such that the lower chamber plate 340222 is movable in forward, rearward, left and right directions. The lower chamber plate 340222 has a rectangular frame structure such that a space is defined in the lower chamber plate 340222.

The lower stage 340240 is arranged in the space defined in the lower chamber plate 340222. The lower stage 340240 is mounted to the upper surface of the lower base 340221.

In accordance with the illustrated embodiment of the present invention, the lower chamber unit 340220 may further include a support plate 340223 arranged between the base frame 340100 and the lower base 340221, to stably fix the base frame 340100 and lower base 340221.

A seal member 340224 is interposed between the lower base 340221 and lower chamber plate 340222 that constitute the lower chamber unit 340220, to isolate the inner space of the lower chamber plate 340222 from the outside of the lower chamber plate 340222. The lower stage 340240 is arranged in the inner space of the lower chamber plate 340222. The seal member 340224 will be referred to as a "second seal member", hereinafter.

At least one support member 340225 is arranged between the lower base 340221 and the lower chamber plate 340222, in order to support the lower chamber plate 340222 such that the lower chamber plate 340222 is spaced apart from the lower base 340221 by a predetermined distance.

The support member 340225 is fixed, at one end thereof, to a lower surface of the lower chamber plate 340222. The other end of the support member 340225 is connected to a lower portion of the lower base 340221 so that it is freely movable horizontally.

Accordingly, the lower chamber plate 340222 moves freely with respect to the lower base 340221 by the support member 340225. Thus, the lower chamber plate 340222 may be moved in the forward, rearward, left and right directions.

The chamber moving unit includes a drive motor 340310 that is fixed to the base frame 340100, drive shafts 340320 which are axially coupled to the drive motor 340310, and connecting shafts 340330 that extend in a direction perpendicular to the drive shafts 340320 and receive drive forces from the drive shafts 340320, respectively. The chamber moving unit also includes connectors 340340, each of which connects an associated one of the connecting shafts 340330 to an associated one of the drive shafts 340320, and jacks 340350, each of which is mounted to an end of an associated one of the connecting shafts 340330.

The drive motor 340310 includes a dual-shaft motor that is arranged at the bottom of the base frame 340100 inside the base frame 340100 and that is provided with shafts extending in parallel to the ground in opposite directions.

The drive shafts 340320 are connected to respective shafts of the drive motor 340310, to transmit the drive force of the drive motor 340310 in a direction parallel to the shafts of the drive motor 340310. On the other hand, the connecting shafts 340330 are connected to the drive shafts 340320 to transmit the drive forces from the drive shafts 340320 in a direction perpendicular to the drive shafts 340320, respectively.

The jack 340350 mounted to each connecting shaft 340330 functions to move the upper chamber unit 340210 upward or downward in accordance with the rotation direction of the connecting shaft 340330 that is in contact with the upper chamber unit 340210. The jack 340350 has a nut housing structure.

Each connector 340340 includes bevel gears that mesh with each other to vertically transmit a rotating force transmitted horizontally from the drive shaft 340320 to the associated connecting shaft 340330.

The upper stage 340230 includes an upper fixing plate 340231 fixed to the upper chamber unit 340210, an upper chucking plate 340232, to which a first substrate is chucked, and a plurality of fixing blocks 340233 arranged between the upper fixing plate 340231 and the upper chucking plate 340232. Similarly, the lower stage 340240 includes a lower fixing plate 340241 fixed to the lower chamber unit 340220, a lower chucking plate 340242, to which a second substrate is chucked, and a plurality of fixing blocks 340243 arranged between the lower fixing plate 340241 and the lower chucking plate 340242.

Each of the upper and lower chucking plates 340232 and 340242 is constituted by an electrostatic chuck (ESC) which electrostatically chucks a substrate.

The sealing unit includes an O-ring 340250 that is mounted on an upper surface of the lower chamber plate 340222 included in the lower chamber unit 340220 such that the O-ring 340250 protrudes upward to a certain level. The O-ring 340250 will be referred to as a "third seal member", hereinafter. The third seal member 340250 is made of a rubber material.

The third seal member 340250 has a thickness preventing the first and second substrates 340110 and 340120 respectively chucked to the upper and lower stages 340230 and 340240 arranged in the chamber units 340210 and 340220 from coming into contact with each other when the chamber units 340210 and 340220 are coupled to each other. Of course, when the third seal member 340250 is compressed, its thickness is reduced to allow the first and second substrates 340110 and 340120 to come into contact with each other.

The aligning unit is arranged in the lower chamber unit 340220 to determine the positions of the substrates 340110 and 340120 and the alignment of the substrates 340110 and 340120.

The linking unit 340510 functions to link the chamber units 340210 and 340220 such that the chamber units 340210 and 340220 move equally in the same direction.

The linking unit 340510 includes a plurality of receiving grooves 340222a formed at the lower chamber plate 340222 of the lower chamber unit 340220 and a plurality of linear actuators 340511, each fixed at one end thereof to the upper chamber unit 340210 that moves a moving shaft 340512, such that the moving shaft 340512 may be received in an associated one of the receiving grooves 340222a.

The aligning and linking units do not cause a displacement of the lower stage 340240, but cause a movement of the lower chamber unit 340220, thereby causing a displacement of the upper stage 340230. As a result, alignment of the first and second substrates 340110 and 340120 is carried out.

The supporting units 340710 protrude upward through the lower stage 340240 to seat the second substrate 340120 on the lower stage 340240 during loading of the second substrate 340120 or to unload the first and second substrate 340110 and 340120 bonded to each other from the lower stage 340240. Each supporting unit 340710 has a lift pin structure.

The upper ends of the supporting units 340710 are arranged below the upper surface of the lower stage 340240 when not loading the second substrate 340120.

The vacuum pump units 340610, 340621, and 340622 are arranged in at least one of the chamber units 340210 and 340220, to form a vacuum in the inner spaces of the chamber units 340210 and 340220.

Figure 83:
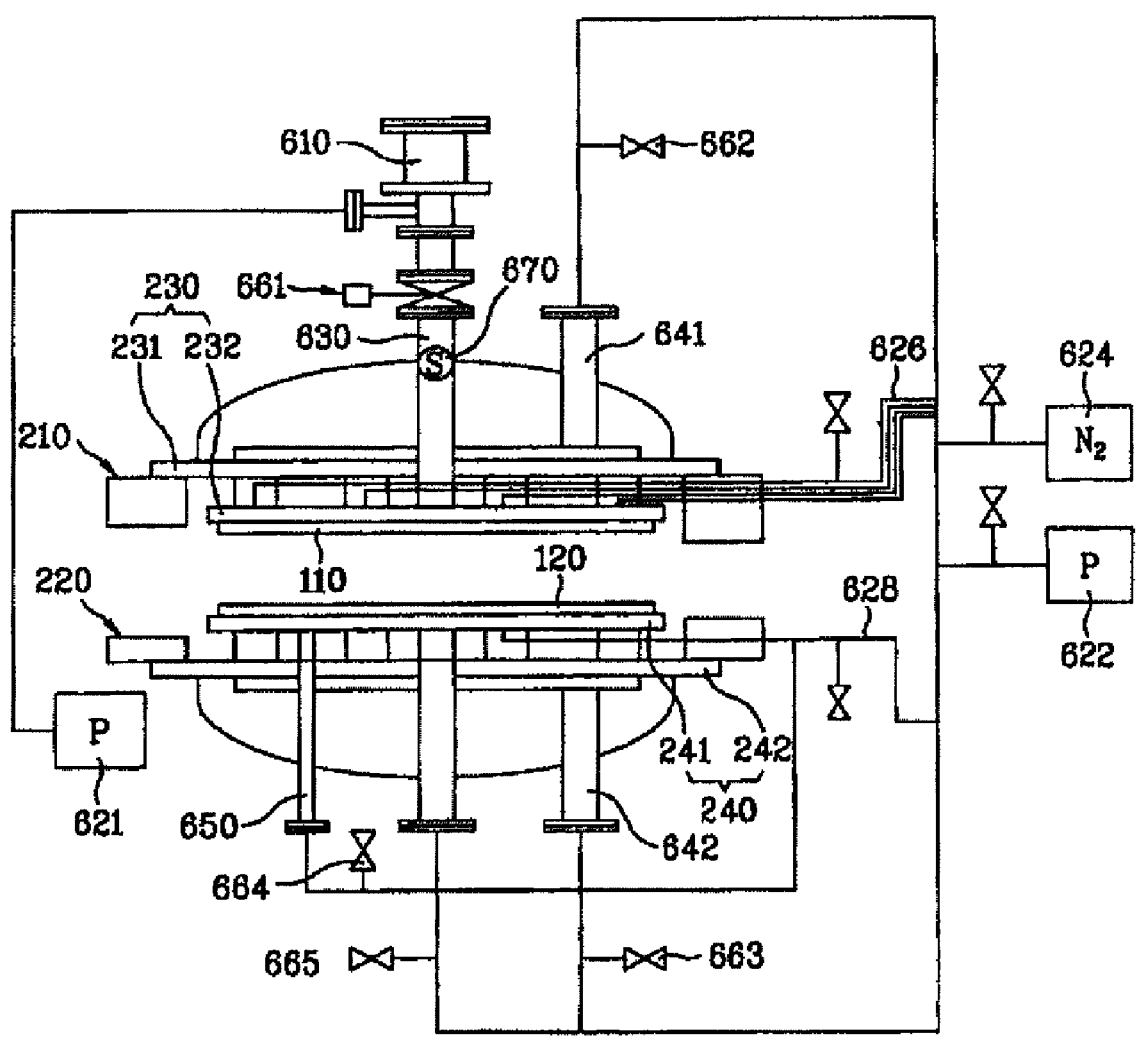
FIG. 83 is a schematic view illustrating a connection state of vacuum pumps in the substrate bonding apparatus according to the present invention.

As illustrated in FIG. 83, each of the vacuum pump units 340610, 340621, and 340622 includes a high-vacuum pump 340610 which may be a turbo molecular pump (TMP), and first through third low-vacuum pumps 340621, 340622, and 340624, each of which may be a dry pump.

A pressure sensor 340670 is arranged in a high-vacuum chamber conduit 340630 that connects the inner spaces of the chamber units 340210 and 340220 to the high-vacuum pump 340610. The high-vacuum chamber conduit 340630 extends through a central portion of the upper chamber unit 340210. The pressure sensor 340670 measures the internal pressure of the inner spaces of the chamber units 340210 and 340220 where the substrates are arranged.

The first low-vacuum pump 340621 is connected to the high-vacuum chamber conduit 340630, to form a vacuum reaching a predetermined negative pressure in the inner spaces.

The second low-vacuum pump 340622 is connected to low-vacuum chamber conduits 340641 and 340642 respectively extending through lateral walls of the upper and lower chamber units 340210 and 340220. The second low-vacuum pump 340622 is also connected, via a line 340628, to a substrate chucking conduit 340650 connected to passages respectively defined in the stages 340230 and 340240 for vacuum-chucking of the substrates.

The third low-vacuum pump 340624 is connected to the low-vacuum chamber conduits 340641 and 340642 and to the conduit 340650. The third low-vacuum pump 340624 is also connected, via lines 340626, to the upper chucking plate 340232 that is connected to a plurality of passages defined in the upper stage 340230, respectively.

At least one opening/closing valve is arranged in each of the conduits 340630, 340641, 340642, and 340650 and lines 340626 and 340628. In FIG. 83, the opening/closing valves are designated by reference numerals 340661, 340662, 340663, 340664, and 340665.

The conduits 340641, 340642, and 340650, to which the third low-vacuum pump 340624 is connected, are also used as venting conduits. In a venting process, gas, for example, $N_2$ gas, is injected from the third low-vacuum pump 340624 into the inner space of each chamber unit 340210 or 340220 maintained in a vacuum state, to change the inner space to an atmospheric state, via the conduits 340641, 340642, and 340650. The third low-vacuum pump 340624 is connected to main vent holes (not illustrated), which are formed through the upper chucking plate 340232, via the venting lines 340626, respectively.

The alignment identifying cameras 340520 observe alignment marks (not illustrated) formed on the substrates 340110 and 340120, to identify alignment of the substrates 340110 and 340120. Each alignment identifying camera 340520 is mounted to the upper chamber unit 340210 (or the lower chamber unit 340220) such that the alignment identifying camera 340520 extends through the upper chamber unit 340210 (or the lower chamber unit 340220).

Figure 84A:
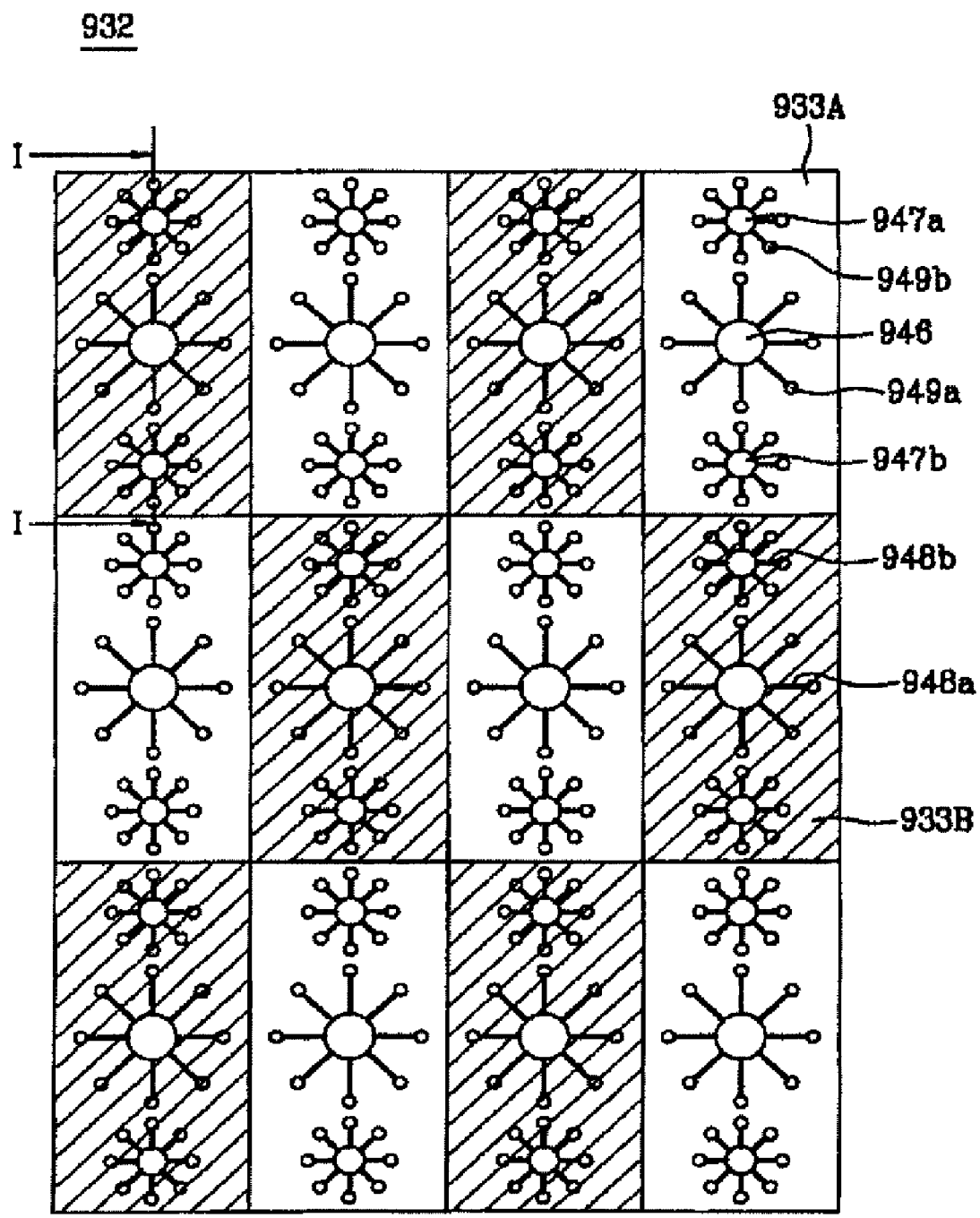
FIG. 84A is a schematic view illustrating an upper electrostatic chuck constituting an upper chucking plate illustrated in FIGS. 2 and 3.
Figure 84B:
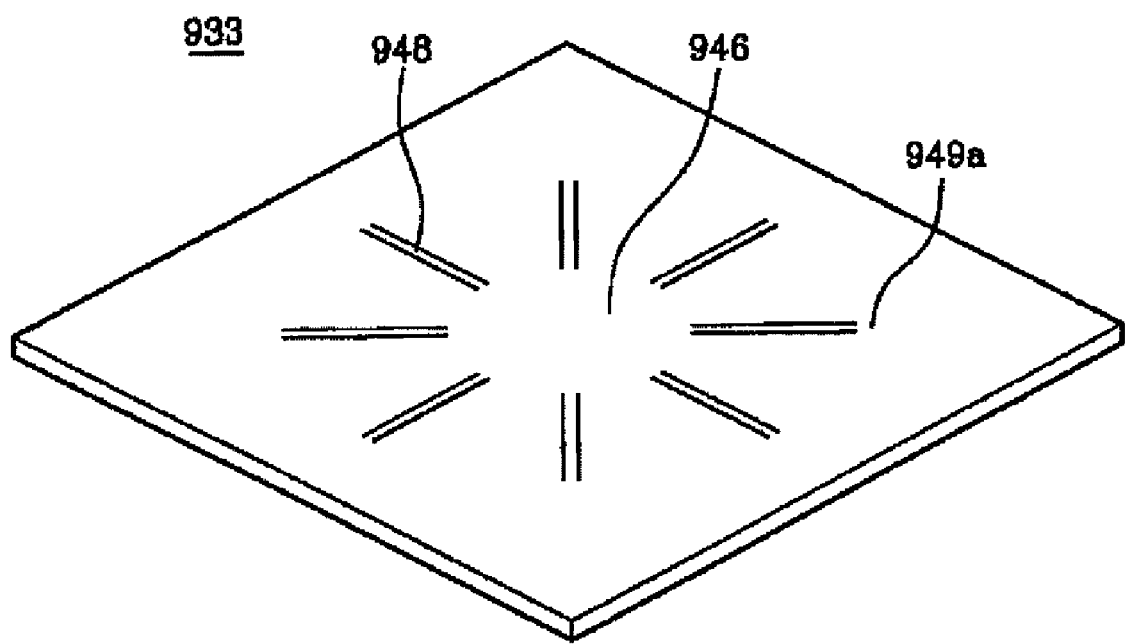
FIG. 84B is a perspective view illustrating a main venting hole region illustrated in FIG. 84A.
Figure 85:
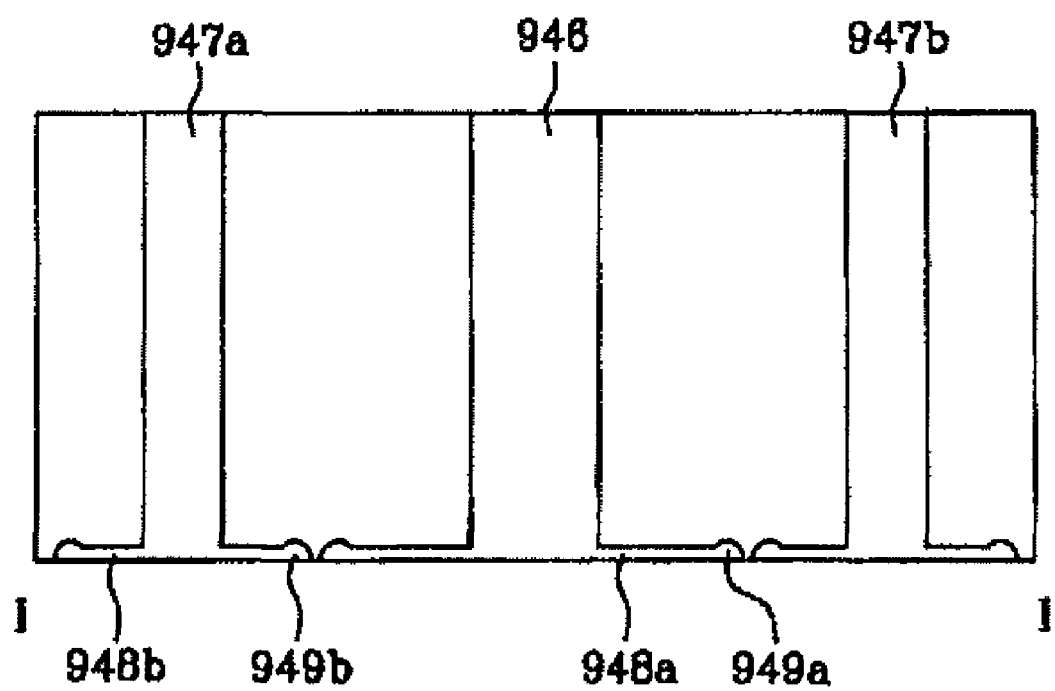
FIG. 85 is a cross-sectional view taken along a line I-I' of FIG. 84A.

FIG. 84A schematically illustrates an upper ESC 340932 included in the upper chucking plate 340232 illustrated in FIG. 83. FIG. 84B is a perspective view illustrating a main venting hole region 340933 illustrated in FIG. 84A. FIG. 85 is a cross-sectional view taken along the line I-I' of FIG. 84A.

Referring to FIGS. 84A, 84B, and 85, together with FIG. 83, the upper ESC 340932 used in the substrate bonding apparatus according to the illustrated embodiment of the present invention includes a plurality of first electrostatic blocks 340933A, to which a first voltage is supplied from an upper ESC controller (not illustrated), and a plurality of second electrostatic blocks 340933B, to which a second voltage different from the first voltage is supplied from the upper ESC controller.

For simplicity of description, it is assumed that the upper ESC 340932 includes 3406 first electrostatic blocks 340933A and 3406 second electrostatic blocks 340933B. The first electrostatic blocks 340933A and second electrostatic blocks 340933B are alternately arranged in longitudinal and lateral directions.

Each of the first and second electrostatic blocks 340933A and 340933B has a main venting hole 340946 formed through a central portion of the electrostatic block 340933A or 340933B, and sub venting holes 340947a and 340947b arranged at opposite sides of the main venting hole 340946 in a longitudinal direction of the electrostatic block 340933A or 340933B, respectively.

Each of the first and second electrostatic blocks 340933A and 340933B also has on its back surface a plurality of first venting grooves 340948a extending radially from the main vent hole 340946 of the first or second electrostatic block 340933A or 340933B, and a plurality of second venting grooves 340948b extending radially from each sub venting hole 340947a or 340947b of the first or second electrostatic block 340933A or 340933B.

Each of the first and second electrostatic blocks 340933A and 340933B further on its back surface a plurality of first circular grooves 340949a formed at respective outer ends of the first venting grooves 340948a of the first or second electrostatic block 340933A or 340933B, and a plurality of second circular grooves 340949b formed at respective outer ends of the second venting grooves 340948b of the first or second electrostatic block 340933A or 340933B.

Figure 86:
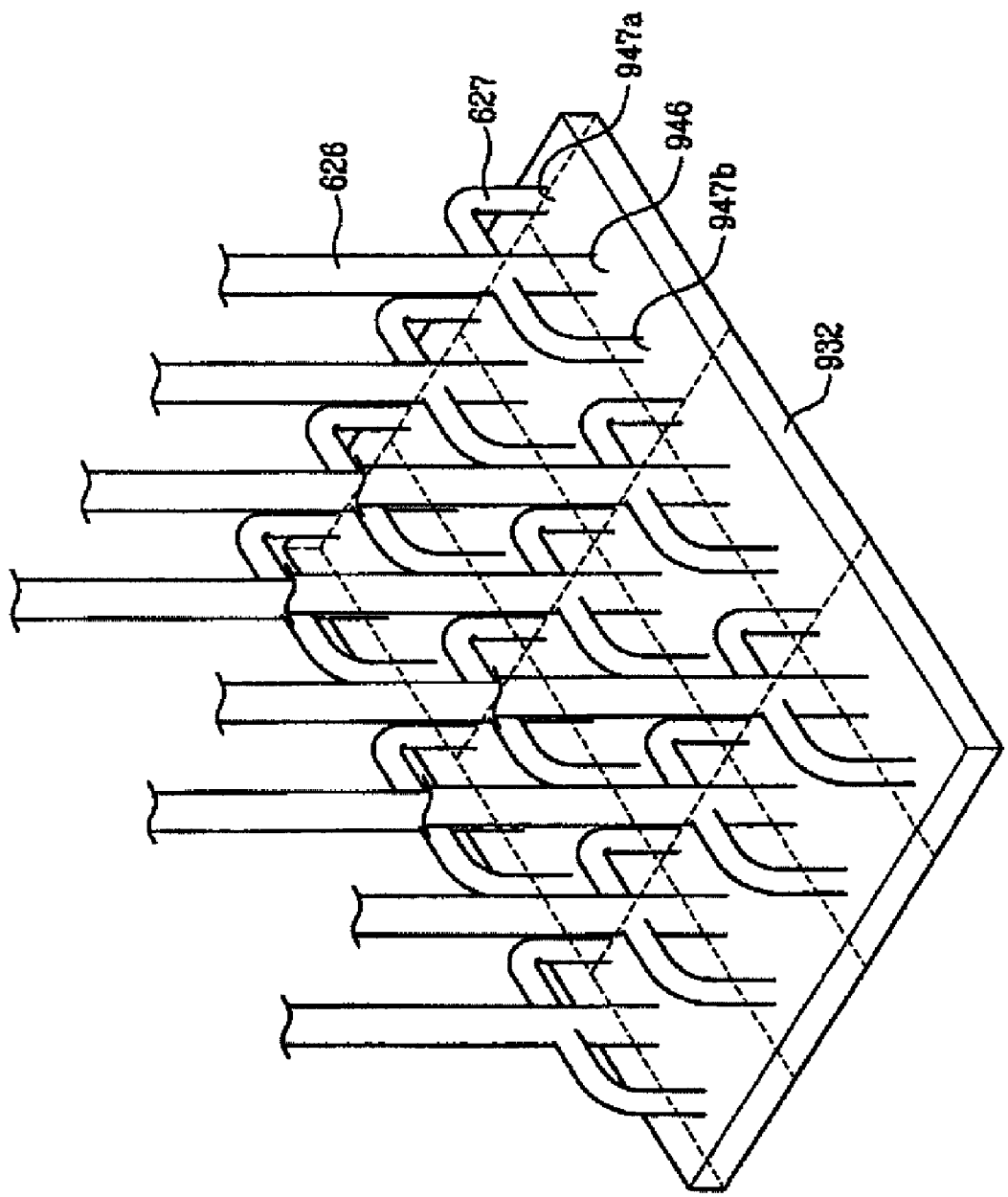
FIG. 86 is a perspective view illustrating lines connected to the upper electrostatic chuck illustrated in FIG. 84A.

As illustrated in FIG. 86, the main venting lines 340626 connected to the third low-vacuum pump 340624 are connected to the main venting holes 340946 of each electrostatic block 340933A or 340933B, respectively, in a venting process.

Also, sub venting lines 340627, that branch off from associated ones of the main venting lines 340626, respectively and have a bent structure, are connected to the sub venting holes 340947a and 340947b of each electrostatic block 340933A or 340933B, respectively, in the venting process.

Thus, in the upper ESC 340932 of the substrate bonding apparatus according to the illustrated embodiment of the present invention, the main venting holes 340949 of the electrostatic blocks 340933A and 340933B are connected to the main venting lines 340626, respectively, in the venting process. Also, the sub venting holes 340947a and 340947b of the electrostatic blocks 340933A and 340933B are connected to the sub venting lines 340627 that branch off from the main venting lines 340626, respectively, in the venting process.

Accordingly, the substrate bonding apparatus according to the illustrated embodiment of the present invention can enhance the uniformity of venting in the venting process, thereby preventing poor bonding of the substrates caused by non-uniform venting.

Meanwhile, in the substrate bonding apparatus according to the illustrated embodiment of the present invention, when it is desired to bond the first and second substrates 340110 and 340120, the substrate chucked to the upper ESC 340932 must be released from the upper ESC 340932. To this end, the upper ESC 340932 is turned off, and at the same time, gas is injected into the upper ESC 340932 via the main venting holes 340946 and sub venting holes 340947a and 340947b of the electrostatic blocks 340933A and 340933B. As a result, the substrate chucked to the upper ESC 340932 is released from the upper ESC 340932, and moves downward due to gravity. Thus, it is possible to achieve a reduction in processing time.

Hereinafter, the process for bonding the substrates using the substrate bonding apparatus having the above-described configuration according to the illustrated embodiment of the present invention will be described in detail.

Figure 87:
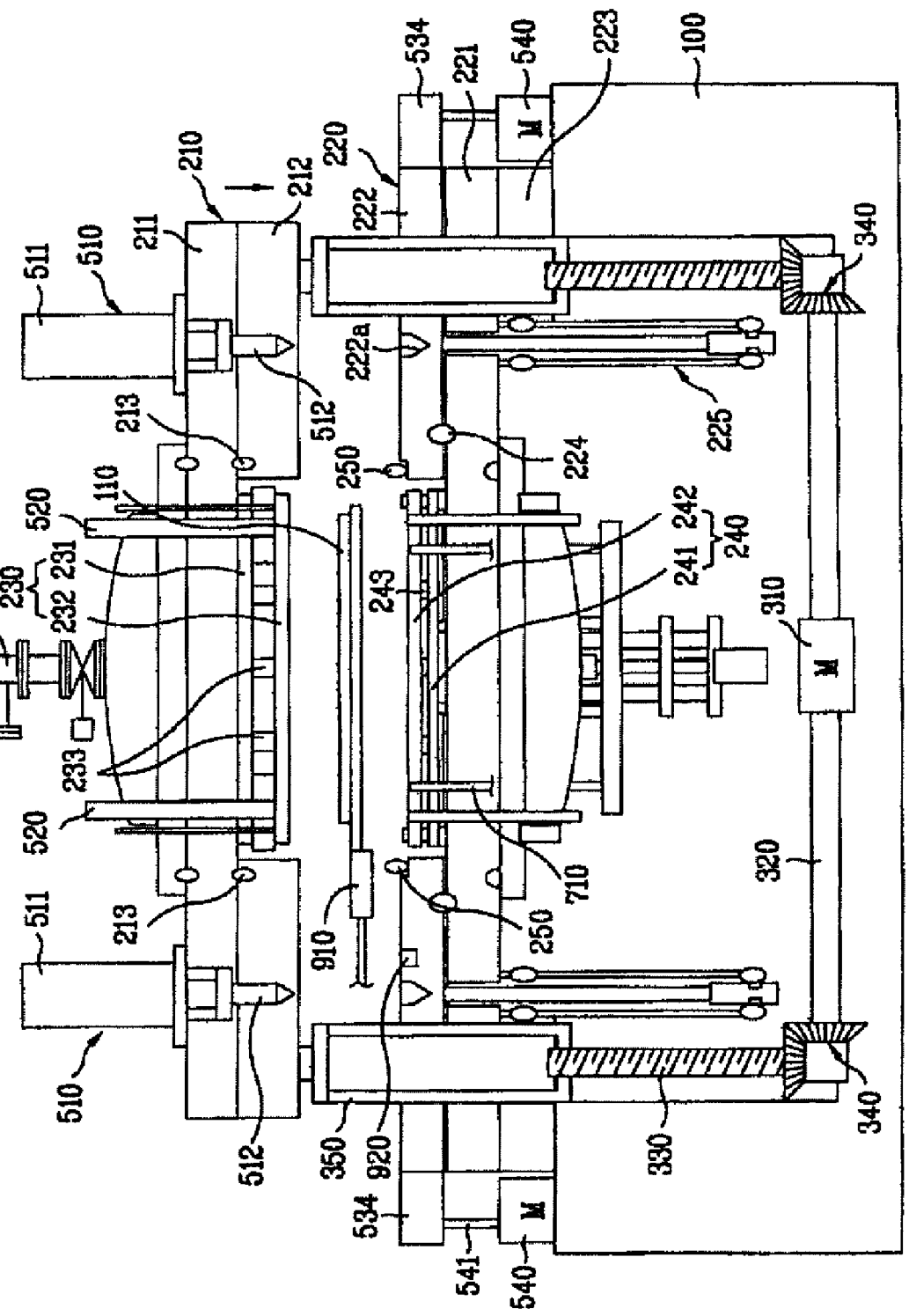
FIG. 87 is a schematic view illustrating a substrate loading procedure carried out by a loader in the substrate bonding apparatus according to the present invention.

In the substrate bonding process, the first substrate 340110 coated with the sealant is transferred from an initial position illustrated in FIG. 82 to a space defined between the chamber units 340210 and 340220 by the loader 340910, for loading of the first substrate 340110, as illustrated in FIG. 87.

Figure 88:
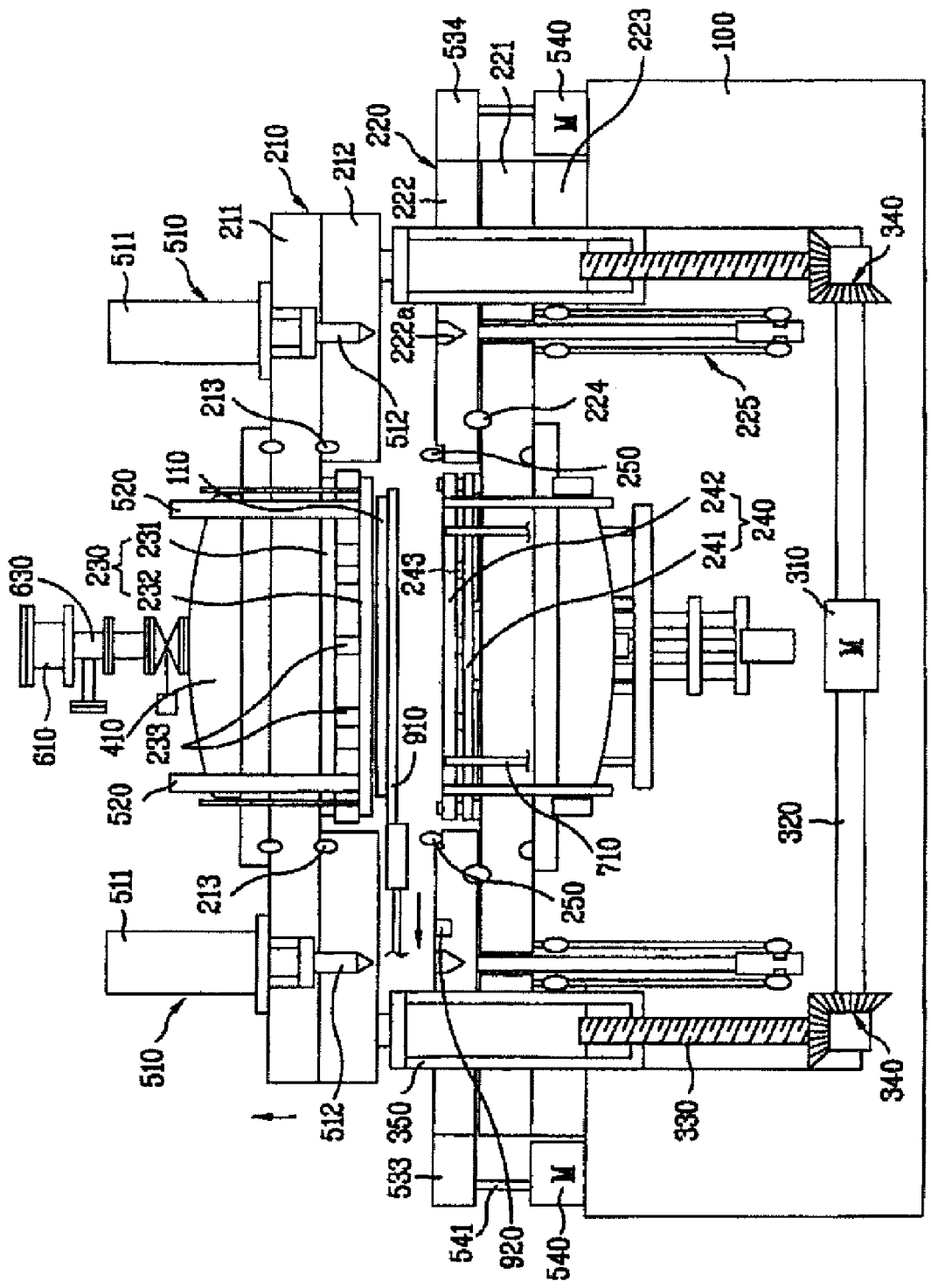
FIG. 88 is a schematic view illustrating a procedure for fixing a first substrate to an upper stage in the substrate bonding apparatus according to the present invention.

The first substrate 340110 loaded in the above-described manner is then attached to the upper stage 340230 in accordance with a downward movement of the upper chamber, a vacuum chucking operation of the second low-vacuum pump 340622, and an electrostatic chucking operation of the upper ESC 340932 included in the chucking plate 340232, as illustrated in FIG. 88.

Figure 89:
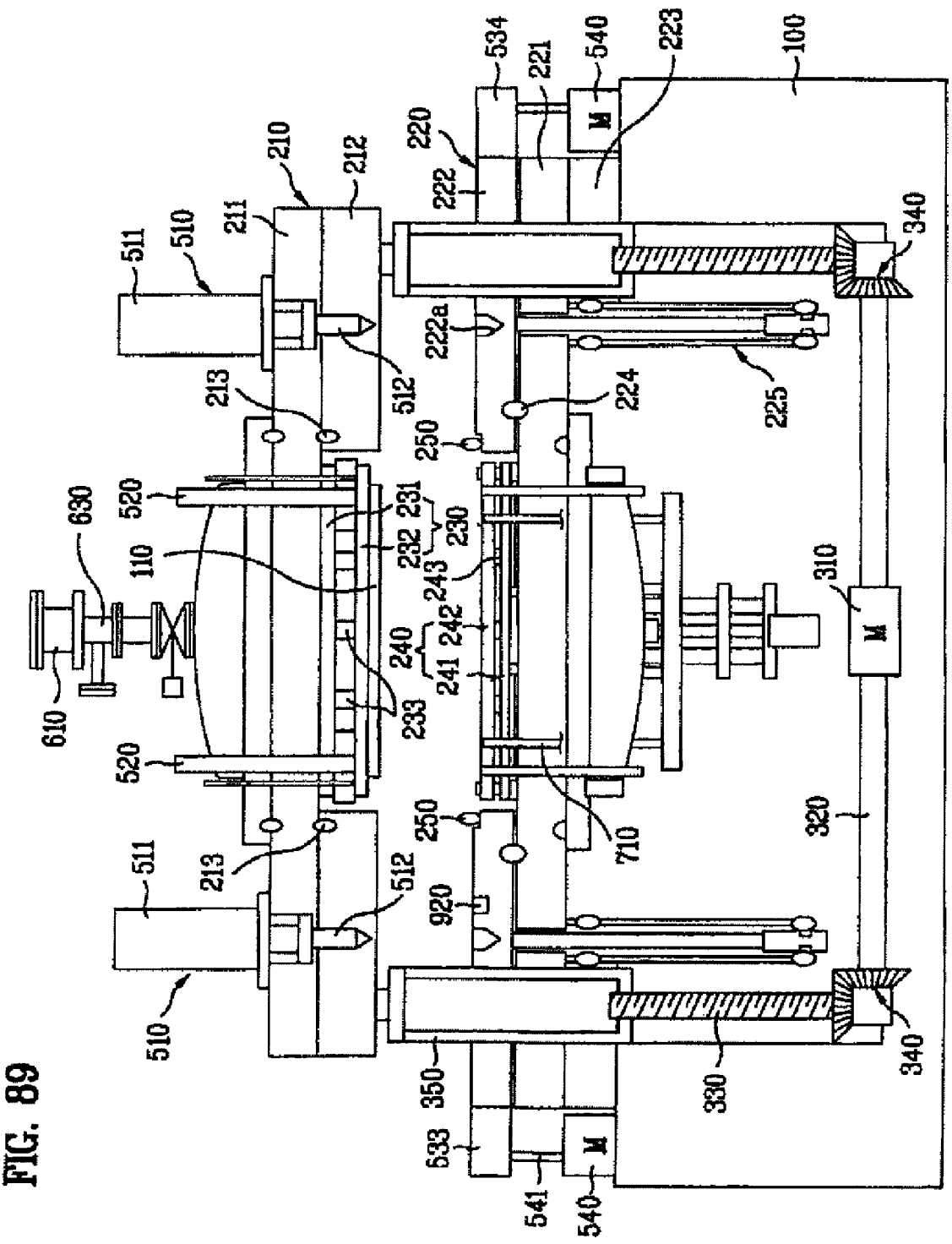
FIG. 89 is a schematic view illustrating a procedure for fixing a first substrate to an upper stage in the substrate bonding apparatus according to the present invention.

After completion of the attachment of the first substrate 340110 to the upper stage 340230, the loader 340910 retracts from the space between the chamber units 340210 and 340220, as illustrated in FIG. 89. The upper chamber unit 340210 then returns to an initial position thereof while moving upward.

Figure 90:
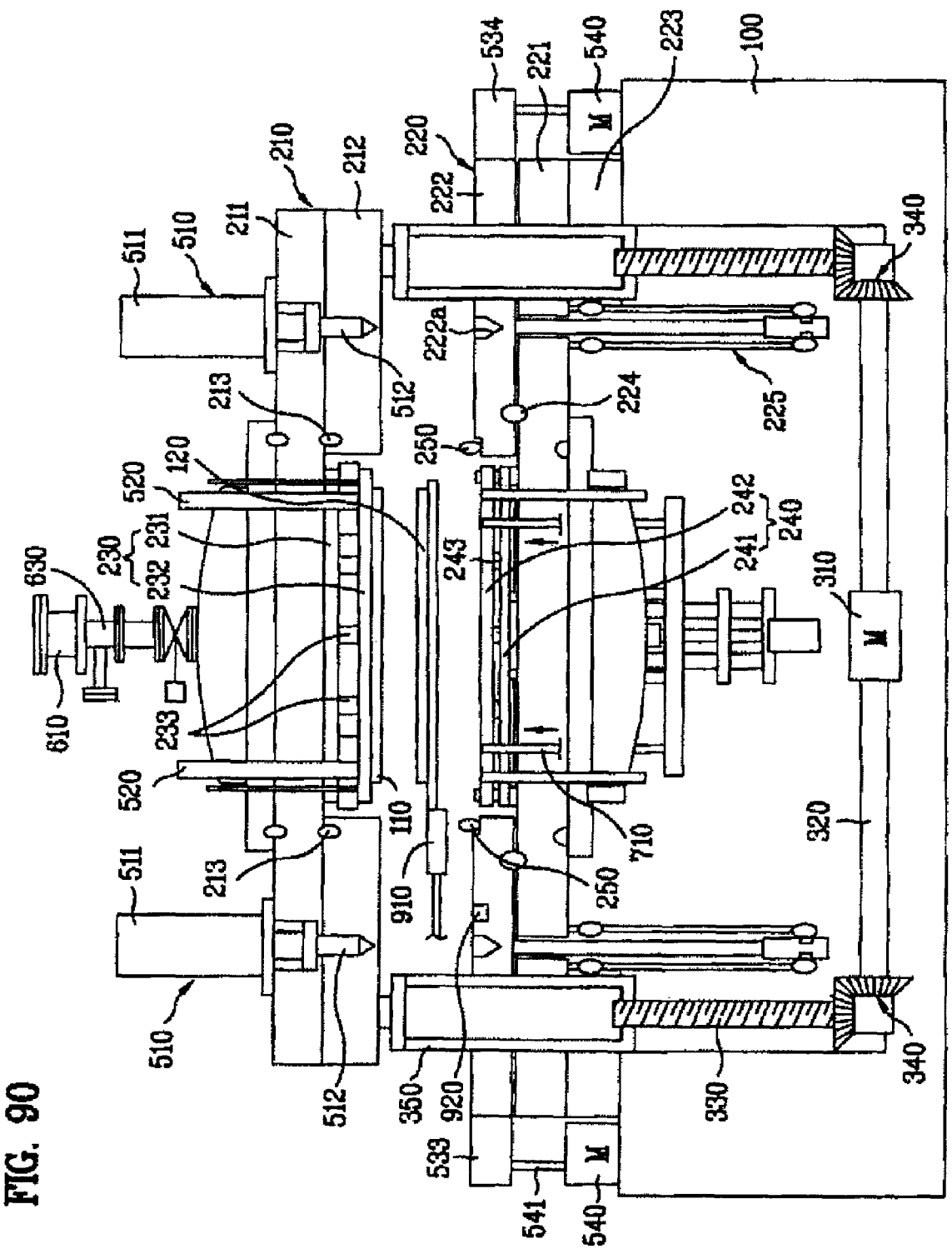
FIG. 90 is a schematic view illustrating procedures for loading a second substrate and fixing the second substrate to a lower stage in the substrate bonding apparatus according to the present invention.

Thereafter, the loader 340910 extends again to the space between the chamber units 340210 and 340220, as illustrated in FIG. 90, to load the second substrate 340120 dispensed with the liquid crystal material into the space between the chamber units 340210 and 340220.

Figure 91:
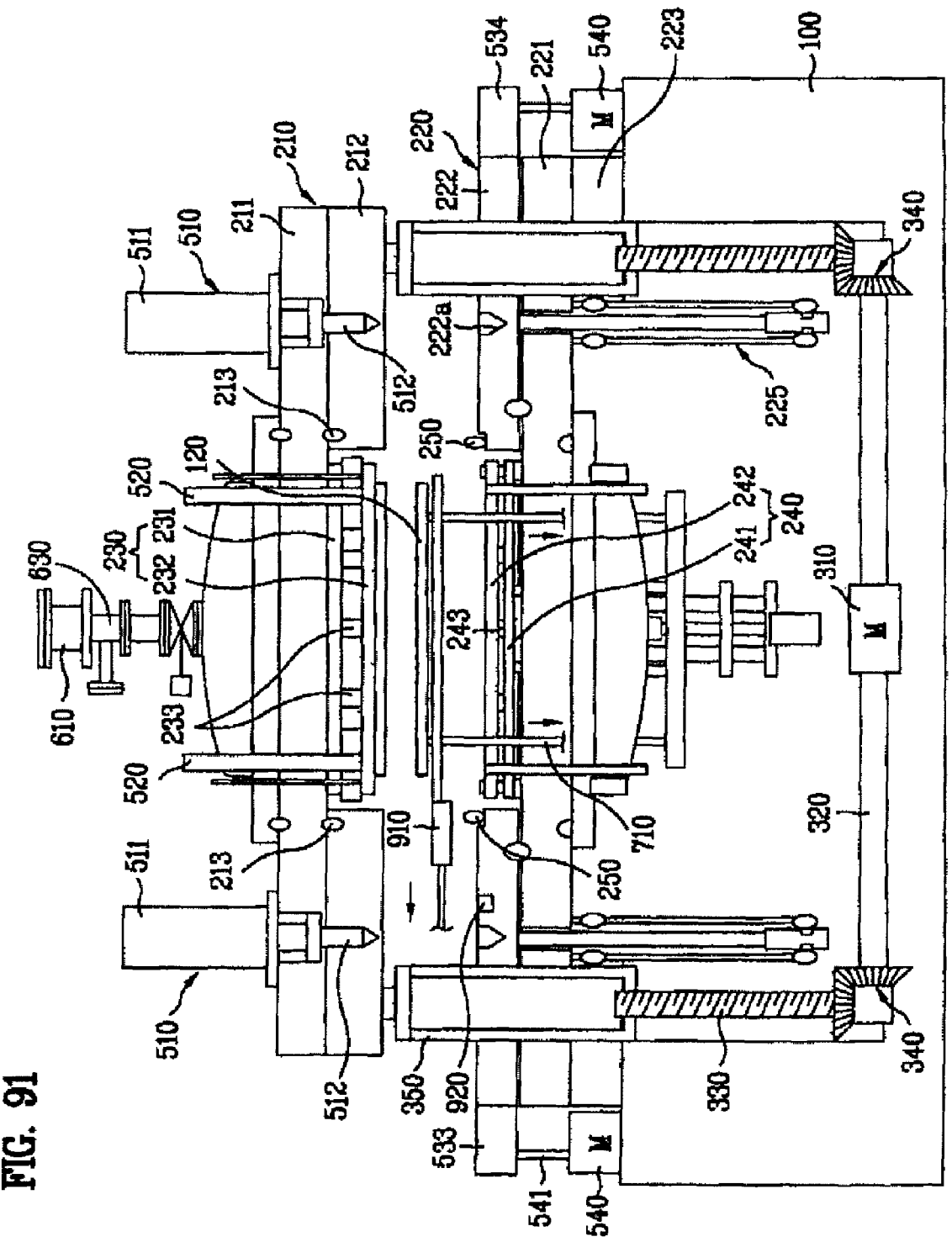
FIG. 91 is a schematic view illustrating procedures for loading a second substrate and fixing the second substrate to a lower stage in the substrate bonding apparatus according to the present invention.
Figure 92:
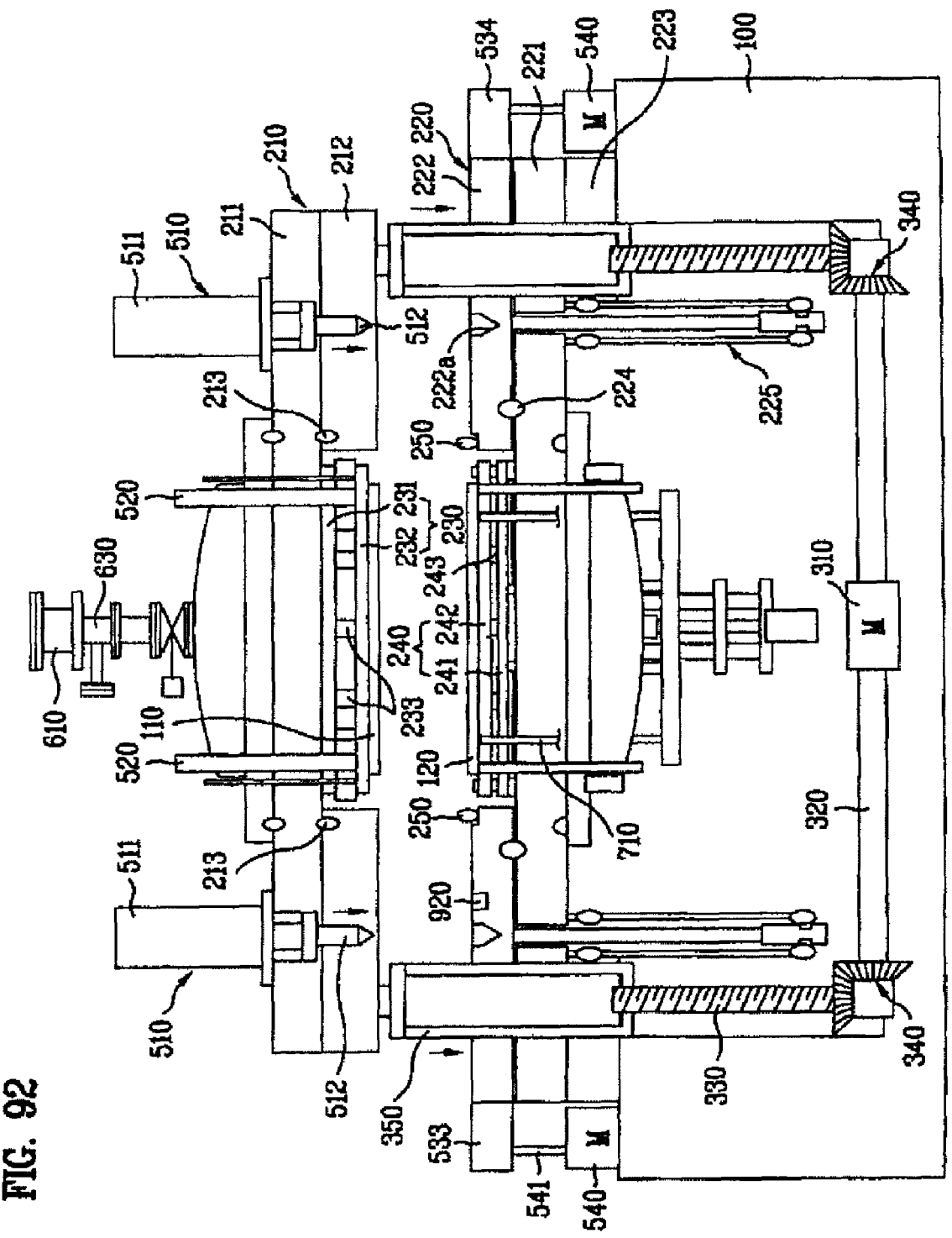
FIG. 92 is a schematic view illustrating procedures for loading a second substrate and fixing the second substrate to a lower stage in the substrate bonding apparatus according to the present invention.

In this state, the lift-pin-shaped supporting units 340710 move upward the second substrate 340120 laid on the loader 340910 to a predetermined level while moving upward through the lower stage 340240, as illustrated in FIG. 91. The loader 340910 retracts after the second substrate 340120 is separated from the loader 340910 in accordance with the upward movement of the supporting units 340710. After the retraction of the loader 340910, the supporting units 340710 move downward to seat the second substrate 340120 on the lower stage 340240, as illustrated in FIG. 92.

At this time, the lower stage 340240 fixes the seated second substrate 340120 using a vacuum force and an electrostatic force.

After completion of the loading of the substrates 340110 and 340120, the upper chamber unit 340210 is moved downward by the chamber mover. In accordance with the downward movement of the upper chamber unit 340210, the moving shafts 340512 of the linear actuators 340511, which protrude downward are moved downward such that they are positioned at a predetermined level.

Figure 93:
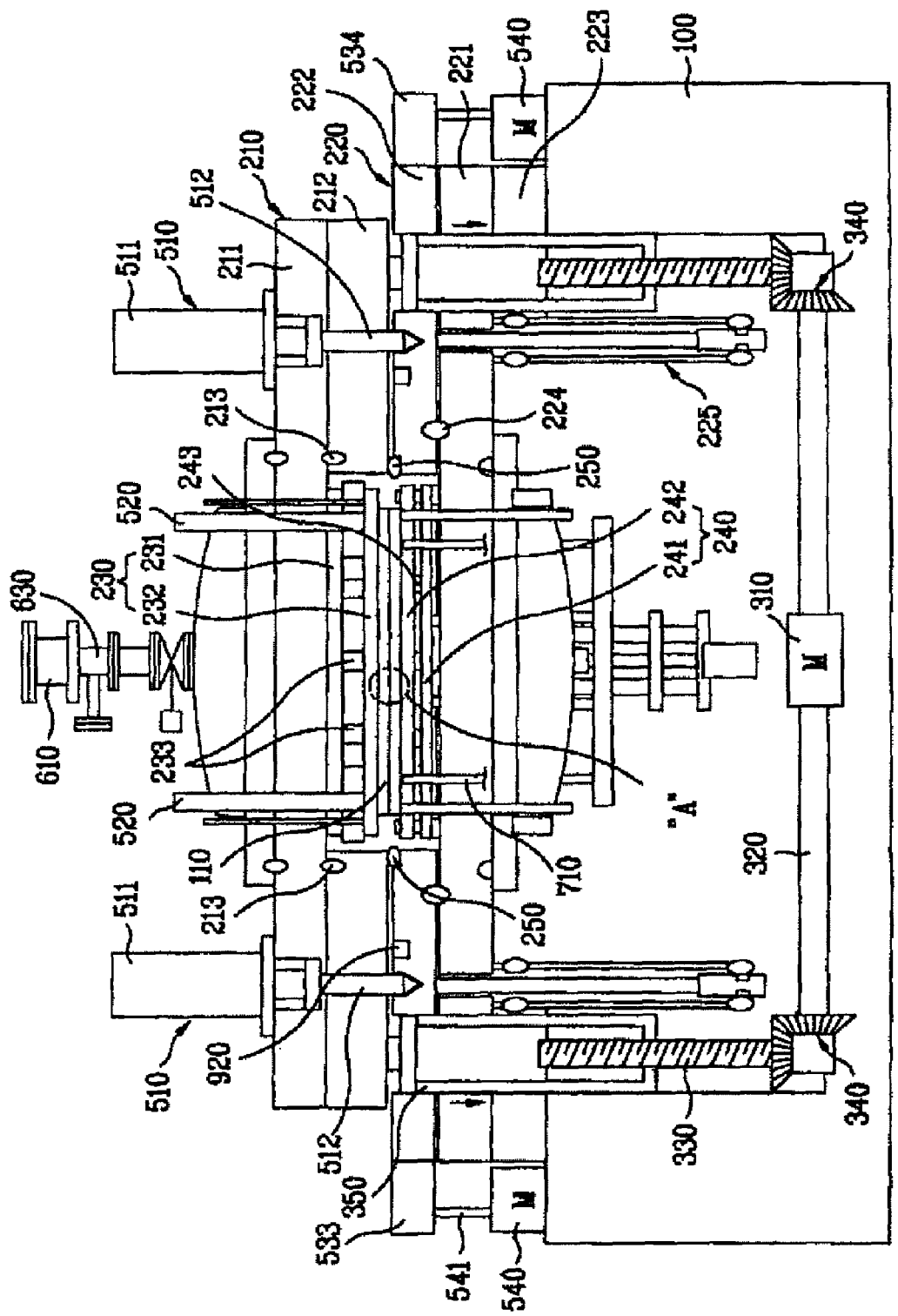
FIG. 93 is a schematic view illustrating operations of the stages for bonding the substrates.

In this case, the moving shafts 340512 of the linear actuators 340511 are received in the receiving grooves 340222a formed at the upper surface of the lower chamber plate 340222 of the lower chamber unit 340220, as illustrated in FIG. 93. Also, the upper chamber plate 340212 of the upper chamber unit 340210 supported by the jacks 340350 of the chamber mover comes into contact with the upper surface of the third seal member 340250 mounted along the inner peripheral edge of the lower chamber plate 340222.

Figure 94:
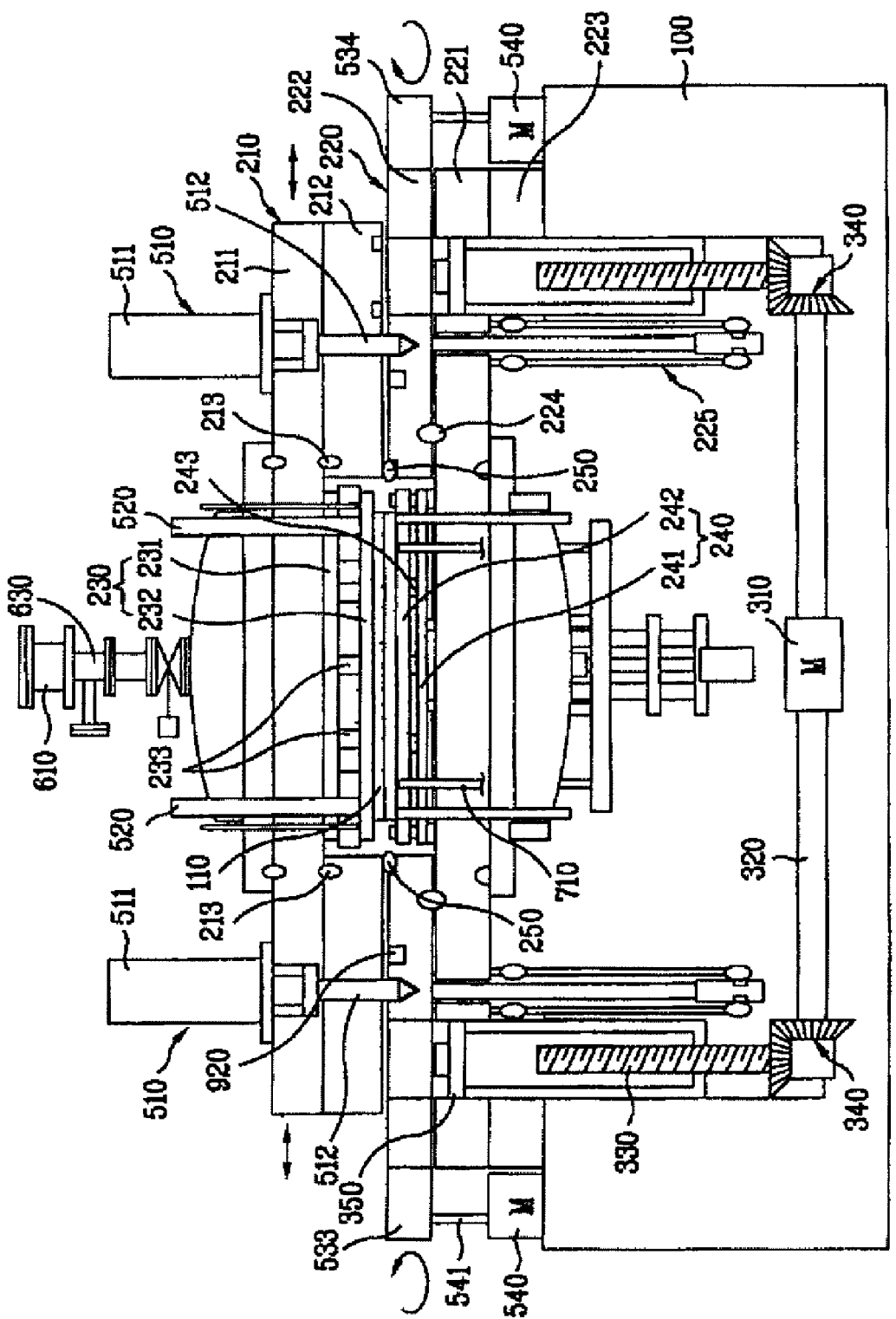
FIG. 94 is a schematic view illustrating alignment of the substrates carried out by an aligning unit included in the substrate bonding apparatus according to the present invention.

When the jacks 340350 further move downward from the above-described state, they are separated from the upper chamber unit 340210, as illustrated in FIG. 94. In this state, the inner space defined between the chamber units 340210 and 340220, in which the substrates 340110 and 340120 are disposed, is sealed from the outside of the space by the weight of the upper chamber unit 340210 and the atmospheric pressure.

In this state, the substrates 340110 and 340120 respectively attached to the upper and lower stages 340230 and 340240 are maintained to form a fine gap therebetween without coming into contact with each other. The reason why the substrates 340110 and 340120 must be maintained in this state is to enable alignment of the substrates 340110 and 340120 to be carried out, to enable bonding of the substrates 340110 and 340120 in a vacuum state, and thus, to enable complete bonding of the substrates 340110 and 340120 to be achieved using a pressure difference in a venting process. The gap between the upper and lower chamber units 340210 and 340220 (or the gap between the substrates) is measured by a gap measuring sensor 340920.

Thereafter, the first low-vacuum pump 340621 operates to form a vacuum in the space where the substrates 340110 and 340120 are disposed. At this time, the main venting lines 340626 are maintained in a closed state by the valves thereof.

When it is determined, in accordance with a pressure measurement by the pressure sensor 340660, that the space where the substrates 340110 and 340120 are disposed is evacuated to a predetermined vacuum level in accordance with operation of the first low-vacuum pump 340621, the high-vacuum pump 340610 operates to form a complete vacuum in the space.

When the high-vacuum pump 340610 operates, the operation of the first low-vacuum pump 340621 is stopped. This is because the high-vacuum pump 340610 and first low-vacuum pump 340621 use the same conduit, namely, the high-vacuum chamber conduit 340630.

When a complete vacuum is formed in the space where the substrates 340110 and 340120 are disposed, alignment of the substrates is carried out by the alignment identifying cameras 340520 and aligning unit. That is, the alignment identifying cameras 340520 observe the alignment marks (not illustrated) formed on the substrates 340110 and 340120, to identify any positional deviation between the substrates 340110 and 340120.

The identified positional deviation is used as a reference to determine the distance by which the upper stage 340230 should be moved.

After completion of the identification of the positional deviation, the distance by which the upper stage 340230 should be moved is calculated based on the identified positional deviation.

The reason why the distance by which the upper stage 340230 should be moved is calculated is that the positional alignment of the substrates 340110 and 340120 respectively fixed to the stages 340230 and 340240 should be carried out by movement of the upper stage 340230 because the lower stage 340240 is fixed to the upper surface of the lower base 340221 such that the lower stage 340240 moves separately from the lower chamber plate 340222 of the lower chamber unit 340220, whereas the upper stage 340230 is fixed to the upper chamber unit 340210 such that the upper stage 340230 moves integrally with the upper chamber plate 340210 and upper base 340211.

When the lower chamber plate 340222 is moved in a desired direction by a predetermined distance through the above-mentioned procedure, the upper chamber unit 340210 is moved in the same direction by the predetermined distance, integrally with the lower chamber plate 340222, in accordance with operation of the linking unit 340510.

Accordingly, the substrates 340110 and 340120 are completely aligned with each other.

The procedure for aligning the substrates 340110 and 340120 may not be achieved through a single aligning operation. Where the alignment marks formed at each substrate are divided into rough marks and fine marks, an aligning operation using the fine marks is carried out after an aligning operation using the rough marks.

Figure 95A:
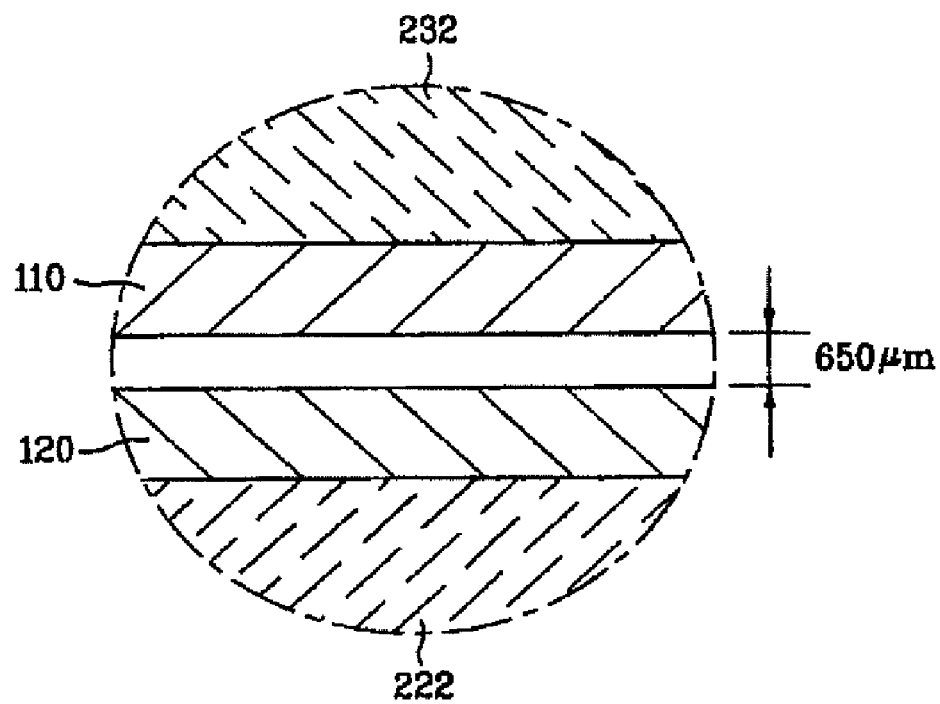
FIGS. 95A and 95B are enlarged views corresponding to a portion A of FIG. 93, respectively.
Figure 95B:
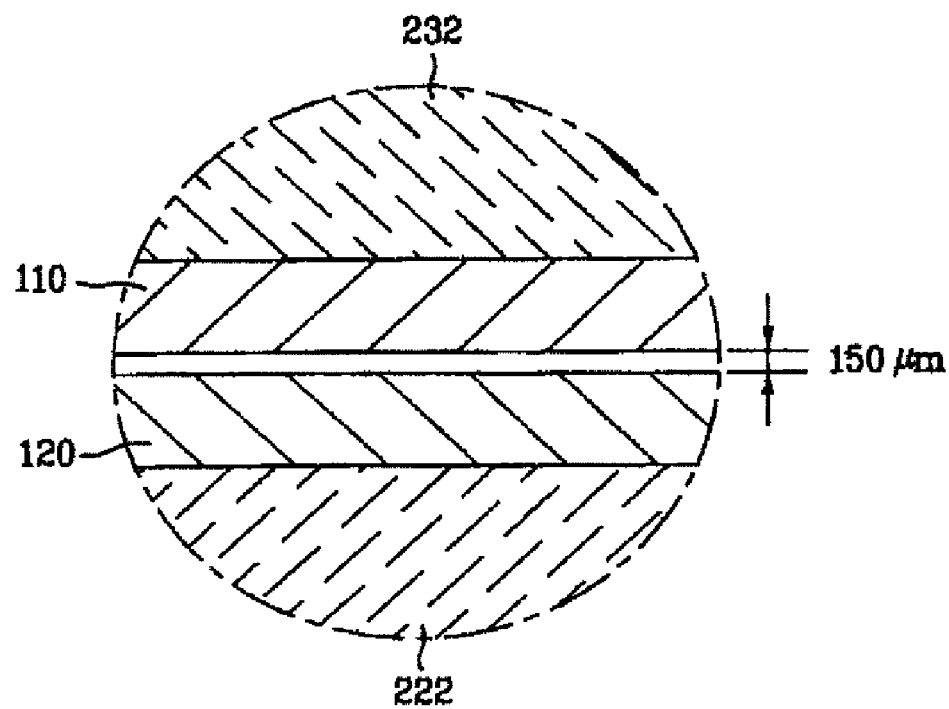

The aligning operation using the rough marks is carried out under the condition in which the distance between the substrates 340110 and 340120 is about 500 to 800 μm, preferably about 650 μm, as illustrated in FIG. 95A, which is an enlarged view corresponding to a portion A of FIG. 93. On the other hand, the aligning operation using the fine marks is carried out when the distance between the substrates 340110 and 340120 is about 100 to 250 μm, preferably about 150 μm, as illustrated in FIG. 95B.

Figure 96A:
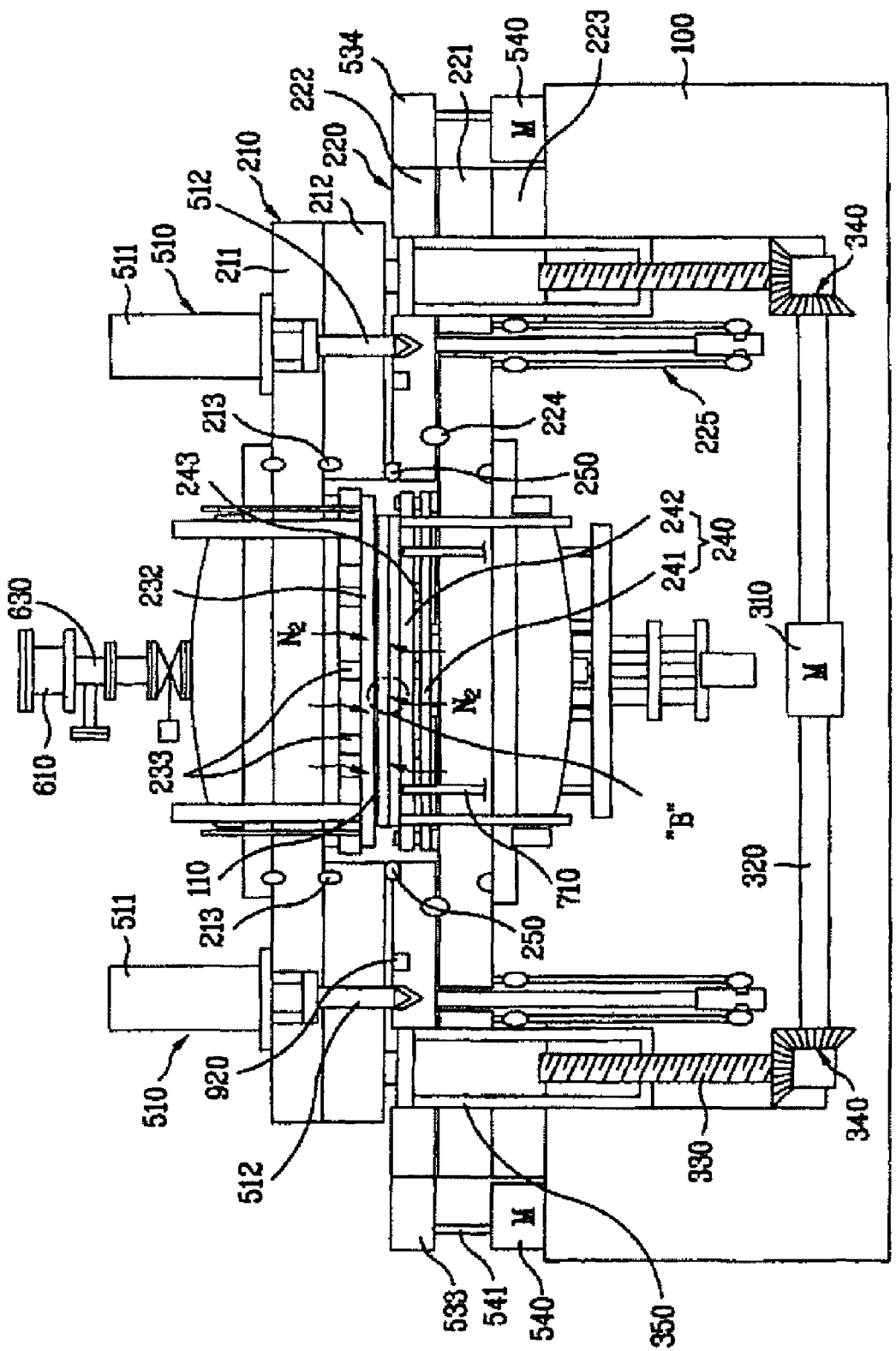
FIG. 96A is a schematic view illustrating a state in which the substrate bonding apparatus is ready to carry out a venting process.
Figure 96B:
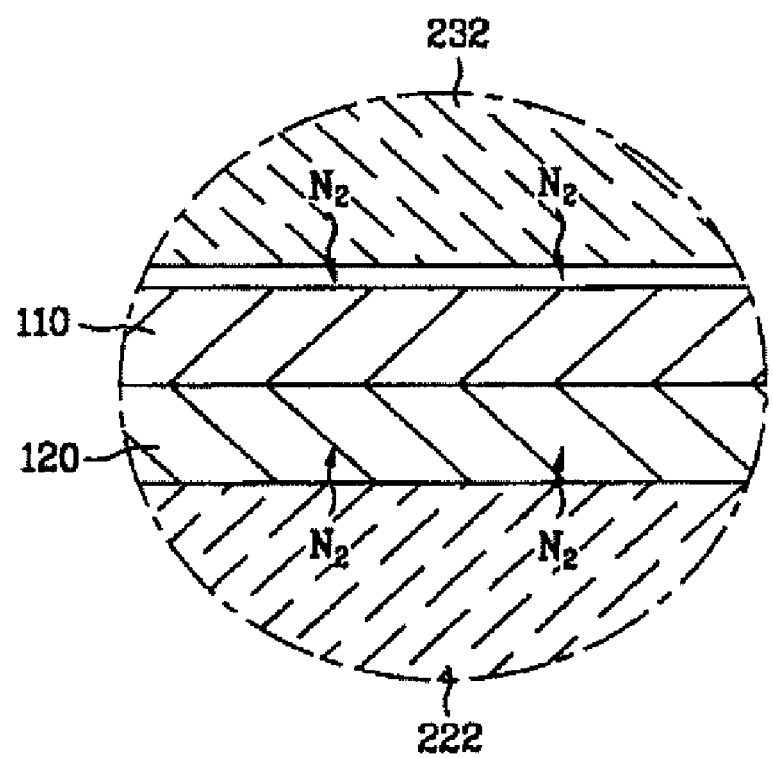
FIG. 96B is an enlarged view corresponding to a portion B of FIG. 96A.

After completion of the alignment of the substrates 340110 and 340120, the voltage supplied to the upper stage 340230 generating an electrostatic force is cut off. At the same time, a venting process for evacuating the space where the substrates 340110 and 340120 are disposed is carried out, as illustrated in FIGS. 96A and 96B. FIG. 96B is an enlarged view corresponding to a portion B of FIG. 96A.

That is, $N_2$ gas is injected into the space via the low-vacuum chamber conduits 340641 and 340642 connected to the third vacuum pump 340624 and the main venting lines 340626. As a result, the space has an atmospheric pressure.

In the venting process, the main venting holes 340946 and sub venting holes 340947a and 340947b formed through the electrostatic blocks 340933A and 340933b of the upper ESC 340932 constituting the upper chucking plate 340232 are connected to the main venting lines 340626 and sub venting lines 340627, as illustrated in FIG. 86. As a result, the first substrate 340110 electrostatically chucked to the upper chucking plate 340232 falls down onto the second substrate 340120. At the same time, the first substrate 340110 comes into tight contact with the second substrate 340120 due to the pressure of the $N_2$ gas discharged out of the upper ESC 340932. As the venting process is further advanced, the substrates 340110 and 340120 are completely bonded to each other due to the difference between the pressure between the substrates 340110 and 340120 and the atmospheric pressure outside the substrates 340110 and 340120.

That is, because the space defined between the substrates 340110 and 340120 is maintained in a vacuum state, the substrates 340110 and 340120 more tightly come into contact with each other by virtue of the difference between the pressure between the substrates 340110 and 340120 and the atmospheric pressure outside the substrates 340110 and 340120. As a result, the substrates 340110 and 340120 are completely bonded to each other.

Thereafter, the bonded substrates 340110 and 340120 are unloaded. Thus, the bonding procedure is completed.

A bonding procedure for next substrates is carried out, simultaneously with the unloading of the bonded substrates 340110 and 340120.

As apparent from the above description, the substrate bonding apparatus according to the illustrated embodiment of the present invention provides various effects.

First, in the substrate bonding apparatus according to the present invention, the ESC, which chucks a substrate, and subsequently releases the chucked substrate, is divided into a plurality of electrostatic blocks each having a main venting hole and a plurality of sub-venting holes, to which gas is supplied via a plurality of main venting lines in a venting process. In accordance with this configuration, the uniformity of venting in the venting process is greatly enhanced, thereby preventing poor bonding of the substrates.

Second, the venting carried out when the substrate chucked to the ESC is released from the ESC can be finely controlled using the venting holes of the electrostatic blocks such that the chucked substrate falls down uniformly onto the lower substrate. Accordingly, it is possible to prevent air from being introduced into a space defined between the substrates.

Third, in addition to the prevention of poor bonding of substrates, the substrate bonding apparatus according to the present invention can reduce the time taken to release the chucked substrate, thereby achieving a great enhancement in productivity.

Hereinafter, a cassette for an LCD device according to further embodiments of the present invention will be explained in detail with reference to the attached drawings.

Figure 97:
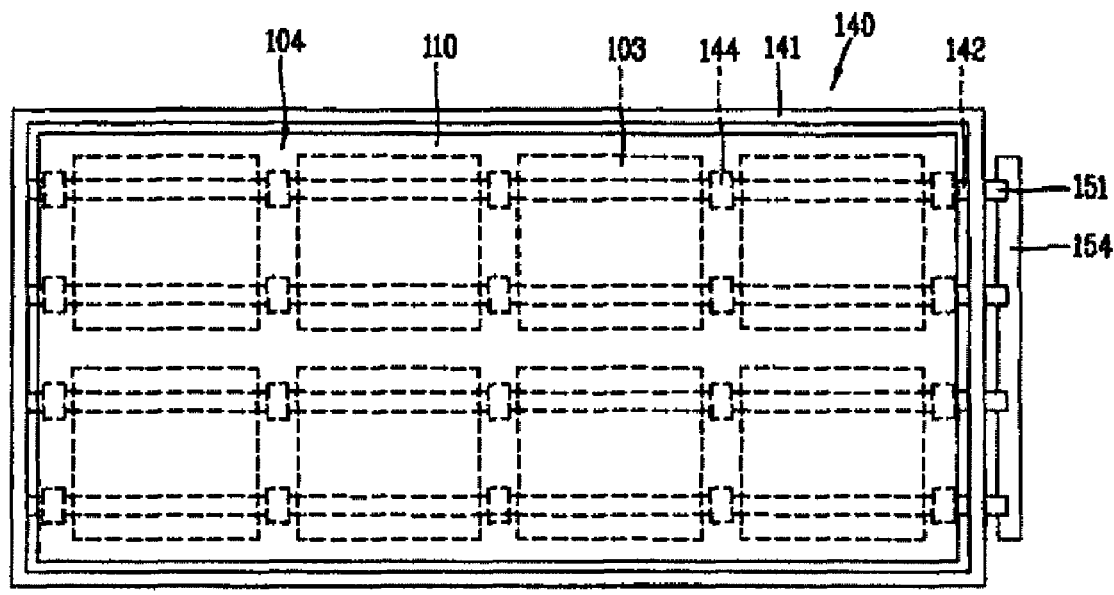
FIG. 97 is a plan view illustrating an inner structure of a cassette for an LCD device according to an embodiment of the present invention.

As illustrated in FIG. 97, the cassette 350140 according to an embodiment of the present invention comprises a body 350141; a plurality of supporting bars 350142 formed in the body and on which a substrate 350110 having a plurality of LCD panels 350103 are formed is positioned; a pad 350144 formed at the supporting bar 350142 and fixing the substrate 350110 by contacting the substrate 350110; a rotation shaft 350151 connected to the supporting bar 350142 for rotating the supporting bar 350142; and a supporting bar controlling member 350154 coupled to the rotation shaft 350151 for rotating the supporting bar 350142 by applying a driving force to the rotation shaft 350151.

The cassette 350140 may receive a plurality of substrates 350110 on the supporting bars 350142 formed in multiple layers. In addition, the cassette 350140 can receive a plurality of substrates 350110 on a supporting bar 350142 of a single layer. In the illustrated embodiment, four supporting bars 350142 are formed in the body 350141 thereby to receive the substrate 350110. However, it is also possible that 3 or fewer or 5 or more supporting bars 350142 are installed according to a size of the substrate 350110 thereby to receive the substrate 350110.

The rotation shaft 350151 for rotating the supporting bar 350142 is connected to the supporting bar controlling member 350154 and is rotated by adjusting the supporting bar controlling member 350154.

Figure 98A:
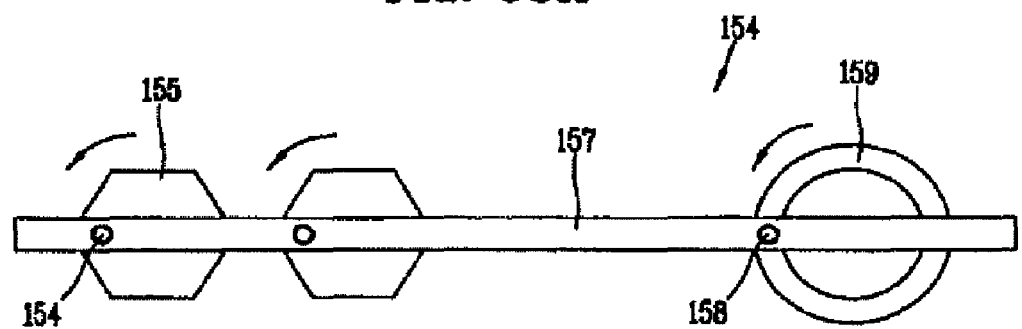
FIGS. 98A and 98B are views schematically illustrating supporting bar controlling members according to embodiments of the present invention.

FIG. 98A illustrates a supporting bar controlling member for rotating the supporting bar. The supporting bar controlling member 350154 comprises a rotation shaft 350151 connected to the supporting bar 350142 to rotate the supporting bar 350142; a controlling bar 350157 rotatably coupled to the rotation shaft 350151 by a fixing member and applying a rotation force to the rotation shaft 350151; a protrusion 350158 formed at the controlling bar 350157; and a guide groove 350159 for inserting the protrusion 350158 and guiding it. In illustrated embodiment, the rotation shaft 350151 has a hexagonal shape. However, the shape of the rotation shaft 350151 may correspond to the shape of the supporting bar 350142. The supporting bar controlling member 350154 converts a linear motion of the controlling bar 350157 into a rotary motion of the rotation shaft 350151. That is, as the protrusion 350158 of the controlling bar 350157 is moved along the guide groove 350159, the controlling bar 350157 performs a crank motion. As a force generated from the crank motion is transmitted to the rotation shaft 350151, the rotation shaft 350151 is rotated. As the rotation shaft 350151 is rotated, the supporting bar 350142 connected to the rotation shaft 350151 is rotated.

A plurality of stops such as fixing grooves for fixing the protrusion 350158 may be formed at the guide groove 350159 to thereby fix the rotation shaft 350151 after rotation by certain mode-set angles. Herein, a rotation angle of the rotation shaft 350151, that is, an angular distance that the protrusion 350158 is moved in the guide groove 350159, varies according to the shape of the supporting bar 350142.

Figure 98B:
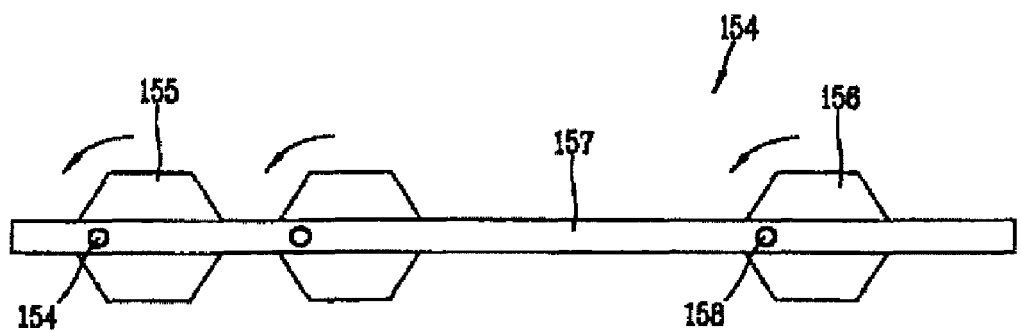

FIG. 98B is a view illustrating the supporting bar controlling member 350154 for rotating the supporting bar 350142 according to another embodiment of the present invention. FIG. 98B illustrates a similar structure as the structure illustrated in FIG. 98A, in which a rotation member 350156 having a similar shape as the rotation shaft 350151 connected to the supporting bar 350142 can be installed in lieu of the guide groove 350159. As the rotation member 350156 is rotated, the controlling bar 350157 is rotated and thus the rotation shaft 350151 and the supporting bar 350142 connected to the rotation shaft 350151 are rotated.

FIGS. 98A and 98B illustrate only two rotation shafts 350151. However, the number of the rotation shafts 350151 may correspond to the number of the supporting bars 350142 formed on a support layer of the cassette 350140. As the plurality of rotation shafts 350151 is coupled to the controlling bar 350157 and the controlling bar 350157 performs a crank motion, the supporting bars 350142 on the same layer are rotated by a mode-set angle.

As the upper and lower rotation shafts 350151 are rotated, the supporting bars 350142 arranged on a plurality of layers in the cassette 350140 may simultaneously or individually rotated by a driving unit. That is, the supporting bars 350142 on multiple layers formed in the cassette 350140 can be rotated simultaneously by operating the supporting bar controlling member 350154 coupled to the rotation shaft 350151. Alternatively, the rotation shafts 350151 formed on each layer can be individually rotated. The rotation shaft 350151 can be directly rotated by a user.

Figure 99:
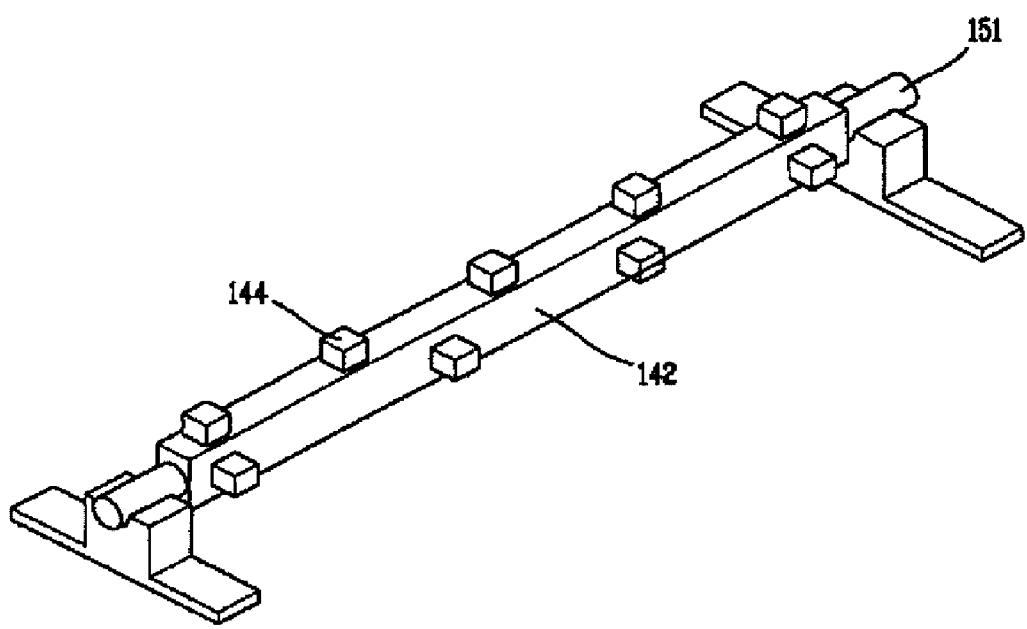
FIG. 99 is a perspective view illustrating a structure of a supporting bar according to an embodiment of the present invention.

Referring to FIG. 99, the pads 350144 are illustrated as being formed on only two surfaces of the rectangular supporting bar 350142. However, the pads 350144 may be formed on all four surfaces of the supporting bar 350142. A gap between the pads 350144 formed on one surface of the supporting bar 350142 differs from a gap between the pads 350144 formed on another surface of the supporting bar 350142. A position of the pads 350144 corresponds to a dummy region 350104 of the substrate 350110 for a particular size of LCD panel. A separation distance between the pads 350144 corresponds to a dimension of a particular LCD panel 350103 formed on the substrate 350110 received and received by a corresponding supporting bar 350142 allowing the LCD panels 350103 formed on the substrate 350110 to be varied.

In the embodiment of the present invention illustrated in FIG. 99, each gap between the pads 350144 on four surfaces of the supporting bar 350142 is different from one another. Therefore, a substrate 350110 having the LCD panels 350103 of at least four different sizes can be received.

Figure 100:
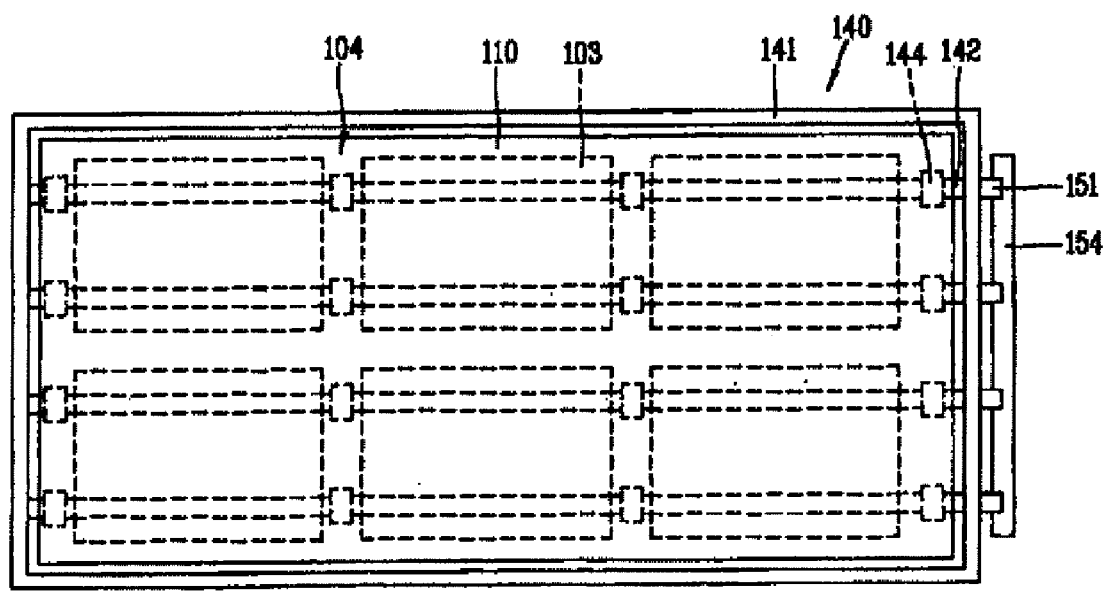
FIG. 100 is a plan view illustrating an inner structure of the cassette, in which a substrate having a different size from a substrate of FIG. 97 has been received according to an embodiment of the present invention.

FIG. 100 illustrates a cassette 350140 in which a substrate 350110 having LCD panels 350103 of a different area from the LCD panels of FIG. 97 is received. A gap between the pads 350144 formed on the supporting bar 350142 for supporting the substrate 350101 illustrated in FIG. 100 is wider than a gap between the pads 350144 illustrated in FIG. 97. That is, the gap between the pads 350144 of FIG. 100 has been increased by rotating the supporting bar 350142 using the rotation shaft 350151. Herein, the gap between the pads 350144 is selected to correspond to the area of the LCD panel 350103 formed on the substrate 350110 so that the pad 350144 can be positioned at the dummy region 350104 of the substrate 350110 between the LCD panels 350103.

The pads 350144 having a gap therebetween corresponding to the area of the particular LCD panel formed on the substrate 350110 may be brought into contact with the substrate 350110 by rotating the supporting bar 350142 by an angle according to the area of the substrate 350110. Accordingly, pads 350144 can be positioned at the dummy region 350104 of the substrate 350110. As the result, even when the substrate 350110 having the LCD panels 350103 of various sizes is received in the cassette the supporting bar 350142 contacts the dummy region of the substrate 350110 but does not contact an area of the LCD panel 350103 for displaying an image. Therefore, defects in an LCD device caused when the image display region is pressed due to the weight of the substrate 350110 can be prevented.

Receiving the substrate 350110 includes rotating the supporting bar 350142 to contact a surface of the supporting bar 350142 on which the pads 350144 are formed with a different gap therebetween to the substrate 350110 may be performed on each of the multiple layers inside the cassette 350140. Substrates 350110 having LCD panels 350103 of varying sizes can be received on a corresponding layer inside the cassette 350140, with each substrate 350110 contacting a corresponding surface of the supporting bar 350142 to the substrate 350110 by rotating the respective supporting bar for the layer 350142 by a different angle. That is substrates 350110 having LCD panels 350103 of various sizes can be received in one cassette 350140. The supporting bars 350142 arranged on each layer of the cassette can be arranged to contact the dummy region of the substrates 350110.

The supporting bar 350142 can have various shapes such as a pentagonal shape, a circular shape, a hexagonal shape, or a triangular shape as well as a rectangular shape. When the supporting bar 350142 has a pentagonal shape, five surfaces on which the pads 350144 are formed with a different gap therebetween are implemented thereby to effectively receive the substrate 350110 having the LCD panels 350103 of five different sizes. When the supporting bar 350142 has a hexagonal shape, six surfaces on which the pads 350144 are formed with a different gap therebetween are implemented thereby to effectively receive the substrate 350110 having the LCD panels 350103 of six different sizes. It is also possible to use a supporting bar 350142 having another polygonal shape. When the supporting bar 350142 has a polygonal shape having surfaces more than four, the rotation shaft is to be rotated by an angle (mode set angle) less than 90° to vary the size of LCD panel to be accommodated. Moreover, when the supporting bar 350142 has a circular shape, a rotation angle of the rotation shaft can be freely controlled.

As aforementioned, in embodiments of the present invention, the polygonal or circular supporting bar for supporting the substrate or the LCD panels is rotatably constructed and pads are positioned on each surface of the supporting bar with a different gap therebetween. The pads on a corresponding surface of the supporting bar having a gap therebetween corresponding to the size of the LCD panels formed on the substrate contact the substrate at dummy regions. As a result, a pressure against an image display region due to a contact with the supporting bar can be prevented, thereby preventing stains from being generated on the LCD device.

Cutting and Panel Forming

A method for cutting a liquid crystal display panel and a method for fabricating a liquid crystal display panel using the same according to a further embodiment of the present invention will be described with reference to the accompanying drawings.

Figure 101:
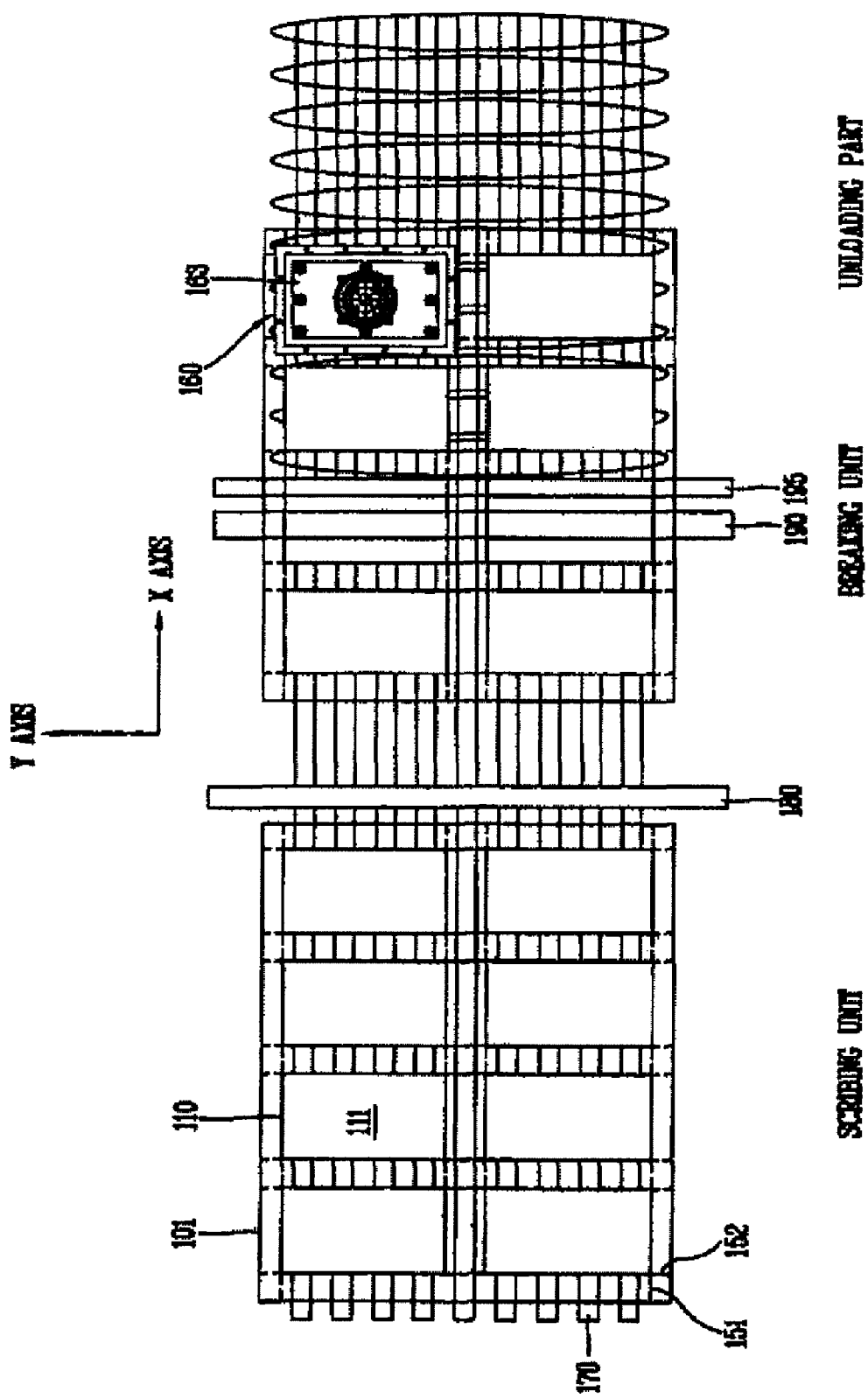
FIG. 101 is an exemplary view illustrating a cutting process of a liquid crystal display panel in accordance with the present invention.

FIG. 101 is an exemplary view illustrating a cutting process of a liquid crystal display panel in accordance with a first embodiment of the present invention.

As illustrated in FIG. 101, a pair of attached mother substrates 360101 on which a plurality of panel regions 360111 have been arranged are transferred to a scribing part through a conveying unit so as to be divided into individual unit liquid crystal display panels along the panel regions 360111.

The panel regions 360111 can be an array substrate on which thin film transistors (TFTs) have been formed through an array process, and the lower panel region 360111 can be a color filter substrate on which color filters have been formed through a color filter process. In this embodiment of the present invention, the panel regions have the same size, but the present invention is not limited thereto and the panel regions 360111 can be formed with at least two different sizes. In this case, the upper array substrate and the lower color filter substrate are attached to form a unit liquid crystal display panel 360110.

In the drawing, the conveying unit includes a plurality of conveyer belts 360170, but the present invention is not limited thereto and the conveying unit may include a plurality of transfer rollers. In addition, the conveying unit may include a first convey part formed as a conveyer belt and a second convey part formed as a transfer roller, which are coupled.

After the mother substrates 360101 are transferred to the scribing part, first prearranged cut lines 360151 are formed to section the panel regions 360111 on the front and rear surfaces of the mother substrates 360101 in a first direction with a scribing unit 360180.

The scribing unit 360180 driven in an X axis direction includes a pair of heads (not illustrated) and repeatedly performs a first scribing process by four times to form the first prearranged cut lines 360151 in the first direction, namely, in the X axis direction on the mother substrates 360101 through the heads.

After the first scribing process in the first direction is finished, in a state that the scribing unit 360180 is maintained at a certain position with respect to an X axis, the heads of the scribing unit 360180 are driven in a Y axis direction to form second prearranged cut lines 360152 for sectioning the panel regions 360111 on the front and rear surfaces of the mother substrates 360101 in a second direction. In this case, in order to form the second prearranged cut lines 360152 on the mother substrates 360101 through the heads, eight times of scribing process are repeated in the second direction, namely, in the Y axis direction.

In this case, in this embodiment of the present invention, the first scribing process is performed four times in the X axis direction and the second scribing process is performed eight times in the Y axis direction to form the total eight sheets of liquid crystal display panels 360110 on the large-scale mother substrates 360101, but the present invention is not limited thereto and can be applicable regardless of the number of times of performing the scribing process in the X and Y axes directions.

The scribing unit 360180 includes a head at the upper and lower portions thereof to form the first and second prearranged cut lines 360151 and 360152 on the front and rear surfaces of the mother substrates 360101. A scribing wheel (not illustrated) made of a material having a higher hardness than glass is mounted at each head.

After the scribing process in the first and second directions is finished, the mother substrate 360101 is moved to the breaking part. In the breaking part, steam is sprayed onto the front and rear surfaces of the mother substrates 360101 through a steam break 360190 disposed to be substantially perpendicular to the proceeding direction of the mother substrates 360101 to make cracks along the prearranged cut lines 360151 and 360152 to thereby separate liquid crystal display panels 360110.

Although not illustrated, the steam break 360190 includes a body for receiving water through a water supply pipe, a heating unit provided inside the body and heating water supplied through the water supply pipe to generate steam and a spraying unit for spraying steam generated by the heating unit onto the surface of the mother substrates 360101.

Steam generated from the spraying unit is sprayed onto the front and rear surfaces of the mother substrates 360101 at a temperature of about 100° C.-250° C. to expand the mother substrates 360101 made of the glass material according to heat and pressure. In this case, the first and second prearranged cut lines 360151 and 360152 of the mother substrates 360101 are expanded to be cut therealong, while the mother substrates 360101 are being transferred to an unloading part.

In this case, an air knife 360195 for spraying dried air with a certain pressure is installed at a rear surface of the steam break 360190 in order to remove moisture or glass chips remaining on the surface of the mother substrates 360101 after the steam is sprayed on the mother substrates 360101, and at the same time, proceed with making cracks formed along the first and second prearranged cut lines 360151 and 360152.

As stated above, according to the method for cutting the liquid crystal display panel in the first embodiment of the present invention, the first prearranged cut lines are simultaneously formed on the front and rear surfaces of the mother substrates and then the scribing heads are driven in the Y axis direction to simultaneously form the second prearranged cut lines on the front and rear surfaces of the mother substrates. Thus, without having to rotate or reverse the mother substrates, the first and second prearranged cut lines can be formed on the front and rear surfaces of the mother substrates.

In addition, as for the mother substrates 360101 on which the first and second prearranged cut lines 360151 and 360152 have been formed, a crack is formed along the first and second prearranged cut lines 360151 and 360152 using the steam break 360190 and the air knife 360195 to separate the unit liquid crystal display panels 360110. Thus, compared with the breaking process performed by striking using the break bar, a required time can be shortened and the liquid crystal display panels 360110 can be separated without causing damage thereto.

The unit liquid crystal display panels 360110 separated from the mother substrates 360101 through the scribing process and the breaking process are extracted through a transfer unit such as a trans-hand 360160 and transferred to a reversing unit.

In this case, the trans-hand 360160 also serves to completely separate a dummy glass, if any, that has not been separated from the liquid crystal display panels 360110 yet through the breaking process.

Namely, a plate 360163 with a certain form is attached at an edge of the trans-hand 360160 to remove a dummy glass which has not been separated from the edge of the liquid crystal display panels 360110 before the liquid crystal display panels 360110 are extracted, and then, extracts the respective liquid crystal display panels 360110 in an upper direction to separate them from the mother substrates. By doing that, the problem of the related art in which, after the breaking process is performed, the liquid crystal display panels are adsorbed and moved upwardly using the trans-hand and then the dummy glass which has been moved upward together with the liquid crystal display panels are removed using a pusher attached at the edge of the trans-hand, and in this case, the dummy glass separated by the pusher may be dropped onto the mother substrates which have not been separated yet to damage other liquid crystal display panels or the dropped the dummy glass can be caught by the conveyer belt to interfere proceeding of the mother substrates.

Figure 102:
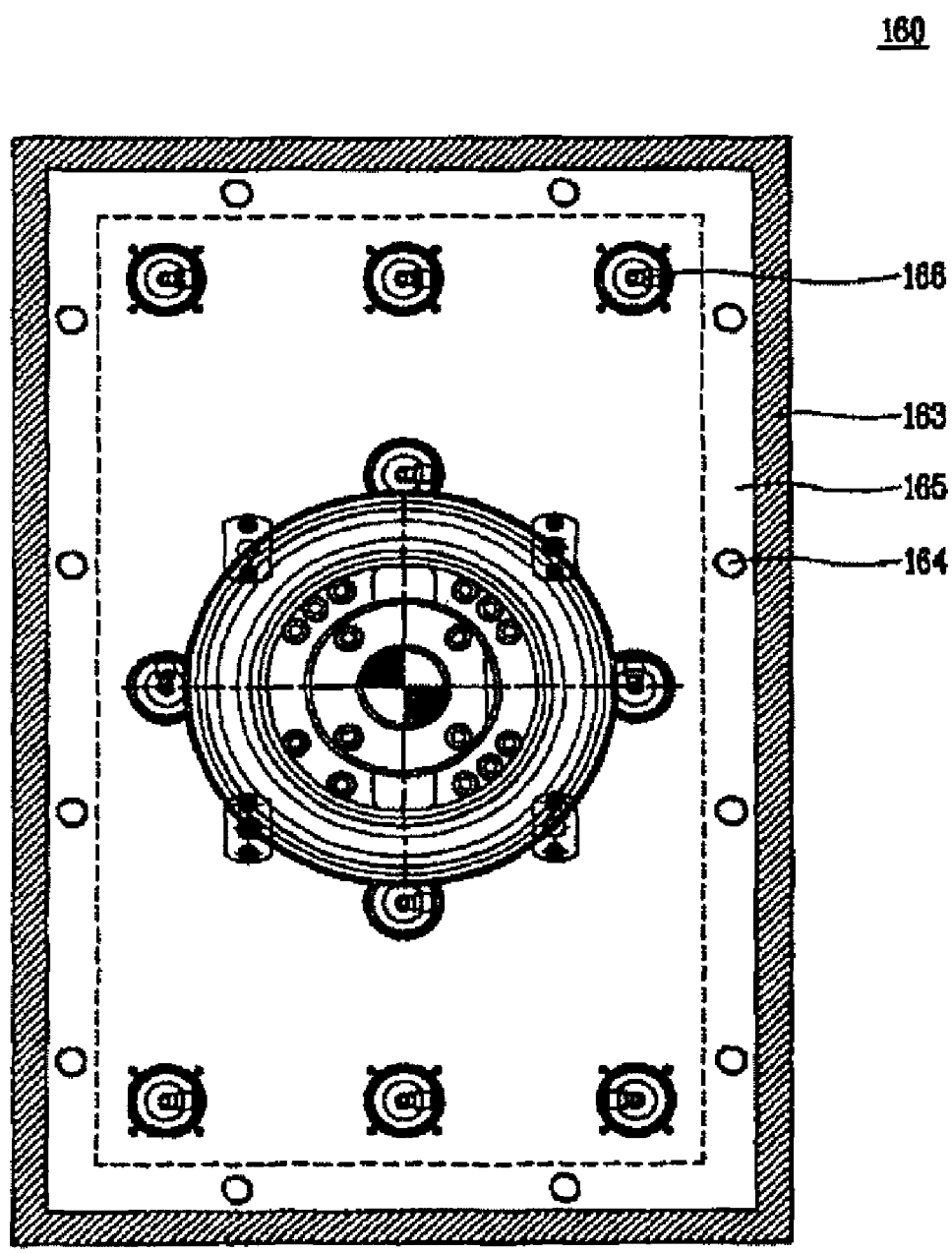
FIG. 102 is an exemplary view illustrating a plane structure of a trans-hand for taking out a liquid crystal display panel in accordance with the present invention.

FIG. 102 is an exemplary view illustrating a plane structure of a trans-hand for taking out a liquid crystal display panel in accordance with the present invention.

As illustrated in FIG. 102, in the trans-hand 360160, a plurality of adsorption members 360166 are formed on a body 360165, through which the liquid crystal display panels are adsorbed to be separate from the mother substrates to be extracted.

The plate 360163 with a certain form is formed at an edge of the body 360165 of the trans-hand 360160 in order to remove a dummy glass. In FIG. 102, a rectangular plate 360163 is illustrated as an example, but the present invention is not limited thereto and can be applicable regardless of the form of the plate 360163.

The plate 360163 includes a plurality of cylinders 360164 for allowing the plate 360163 to be driven separately from the body 360165 of the trans-hand 360160, in order to remove the dummy glass which has not been separated yet from the liquid crystal display panels before the liquid crystal display panels are extracted.

Namely, the plate 360163 of the trans-hand 360160 is driven up and down separated from the body 360165 of the trans-hand 360160 through the cylinders 360164 installed at the plate 360163 in order to separate and remove the dummy glass around the liquid crystal display panels adsorbed and fixed by the adsorption members 360166 from the liquid crystal display panels.

Figure 103A:
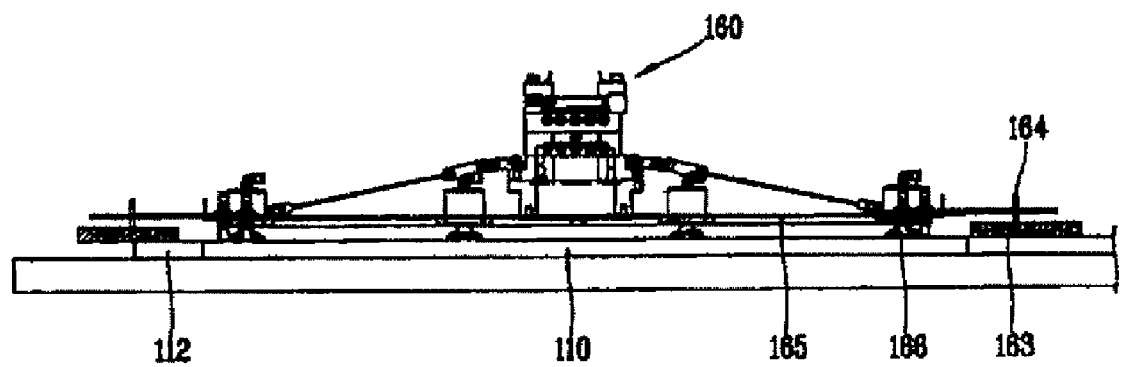
FIGS. 103A to 103C are exemplary view illustrating a process of sequentially taking a liquid crystal display panel from a mother substrate and carrying it using the trans-hand.
Figure 103B:
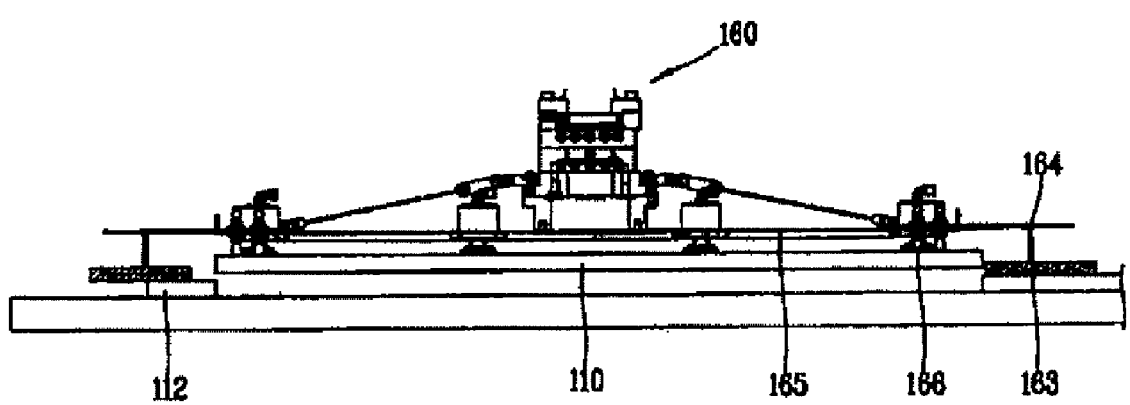
Figure 103C:
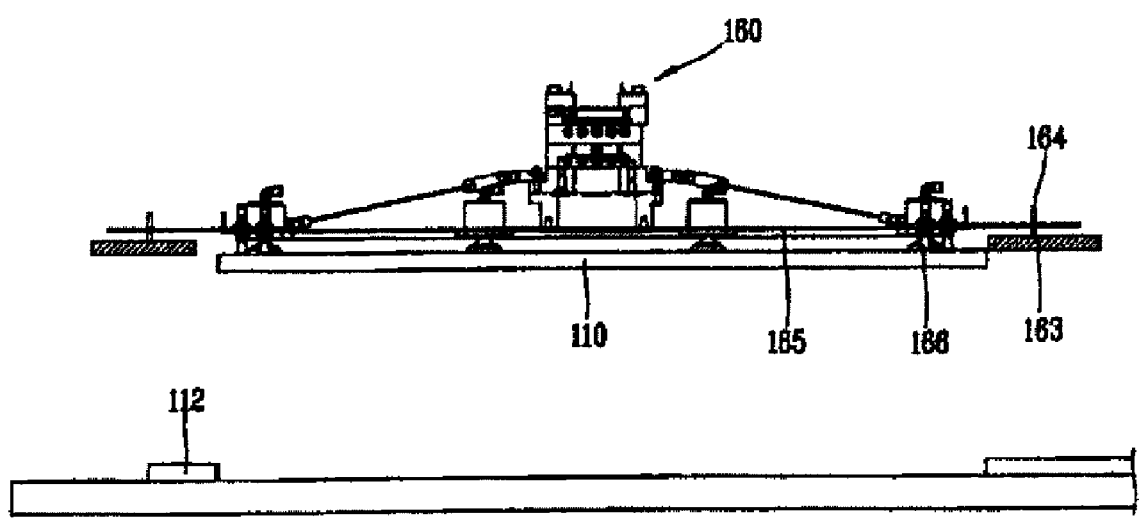

FIGS. 103A to 103C are exemplary view illustrating a process of sequentially taking a liquid crystal display panel from a mother substrate and carrying it using the trans-hand.

First, as illustrated in FIG. 103A, after the scribing process and the breaking process are finished, the mother substrates are transferred to a certain unloading part, and then, the trans-hand 360160 is moved to an upper portion of the mother substrates so as to be positioned on an upper side of a certain liquid crystal display panel 360110.

Thereafter, the trans-hand 360160 is moved downward so as to be adsorbed and fixed on the surface of the liquid crystal display panel 360110 to be extracted through the adsorption members 360166 of the trans-hand 360160.

In this case, because the rectangular plate 360163 is attached at the edge portion of the trans-hand 360160, it separates and fixes a dummy glass 360112 around the liquid crystal display panel 360110. As mentioned above, the plate 360163 is driven up and down separately from the body 360165 of the trans-hand 360160 through the cylinders 360164 installed at the plate 360163, and in this case, the cylinders 360164 are driven down so that the plate 360163 can press and fix the dummy glass 360122 around the liquid crystal display panel 360110 downward.

And then, as illustrated in FIG. 103B, in a state that the plate 360163 and the dummy glass 360112 pressed and fixed by the plate 360163 are maintained at their positions, the body 360165 of the trans-hand 360160 is moved up. Then, the liquid crystal display panel 360110 adsorbed to the adsorption members 360166 of the trans-hand 360160 is completely separated from the dummy glass 360112 fixed by the plate 360163 and moved up.

In this case, the cylinders 360164 connected with the plate 360163 is maintained to be driven downward until the dummy glass 360112 can be completely separated from the liquid crystal display panel 360110.

After the liquid crystal display panel 360110 and the dummy glass 360112 are completely separated, as illustrated in FIG. 103C, the cylinders 360164 are driven upward, so that the separated dummy glass 360112 is left in the uploading part and the liquid crystal display panel 360110 adsorbed onto the adsorption members 360166 are transferred to the reversing unit.

In this manner, by attaching the rectangular plate 360163, instead of a pusher, at the edge of the trans-hand 360160, the dummy glass 360112 can be separated from the liquid crystal display panel 360110 in a state that the dummy glass 360112 is maintained at is position in the unloading part. Accordingly, when the liquid crystal display panel 360110 is extracted, a damage of the liquid crystal display panel 360110 by the dummy glass 360112 can be prevented.

As discussed above, FIG. 24 is a flow chart illustrating the processes of one method for fabricating a liquid crystal display panel in accordance with the present invention, and FIG. 25 is a flow chart illustrating the processes of another method for fabricating a liquid crystal display panel in accordance with the present invention.

Specifically, FIG. 24 illustrates a method for fabricating an LCD in which a liquid crystal layer is formed by a liquid crystal injection method, and FIG. 25 illustrates a method for fabricating an LCD in which a liquid crystal layer is formed by a liquid crystal dropping method.

The process for fabricating the liquid crystal display panel can be divided into a driving device array process for forming a driving device on the lower array substrates, a color filter process for forming a color filter on the upper color filter substrate, and a cell process for attaching the array substrate and the color filter substrate.

To begin with, a plurality of gate lines and a plurality of data lines arranged to define pixel regions on the lower substrate are formed and a TFT switching device is formed to be connected with the gate lines and the data lines at each of the pixel regions through the array process (step 200S101). In addition, a pixel electrode which is connected with the TFT and drives the liquid crystal layer as a signal is applied thereto through the TFT is formed through the array process.

A color filter layer comprising red, green and blue sub-color filters implementing color and a common electrode are formed on the upper substrate through the color filter process (step 200S103).

In this respect, when fabricating an in-plane switching (IPS) mode LCD device, the common electrodes are formed on the lower substrate on which the pixel electrodes have been formed through the array process.

Subsequently, after an alignment film is printed on the upper and lower substrates, it is aligned to provide an anchoring force or a surface fixing force (namely, a pretilt angle and an alignment direction) to liquid crystal molecules of a liquid crystal layer formed between the upper and lower substrates (step 200S102 and 200S104).

After the rubbing process is finished, the upper and lower substrates are inspected as to whether its alignment films are defective or not through an alignment film inspecting device (step 200S105).

The liquid crystal display panel uses electro-optic effects of liquid crystal, and since the electric optical effect is determined by anisotropy of the liquid crystal itself and a state of arrangement of liquid crystal molecules, controlling of the arrangement of liquid crystal molecules has much influence on stabilization of a display quality of the liquid crystal display panel.

Accordingly, the alignment film forming process for effectively aligning liquid crystal molecules is of much importance with respect to characteristics of picture quality in the liquid crystal cell process.

A method for inspecting the rubbing deficiency includes a first inspection process which determines whether the coated alignment film has a blur, a strip or a pin hole on its surface or not, and a second inspection process in which uniformity of the surface of the rubbed alignment film is checked and whether the surface of the rubbed alignment film has a scratch or not.

After the inspecting of the alignment film is finished, as illustrated in FIG. 24, spacers for uniformly maintaining a cell gap are formed on the lower substrate and a sealant is coated on an outer edge of the upper substrate. And then, the lower and upper substrates are attached by applying a pressure thereto (steps 200S106~200S108). In this case, the spacers can be ball spacers according to a spreading method, or can be columnar spacers formed through patterning.

The lower and upper substrates are formed as large-scale glass substrates. In other words, a plurality of panel regions are formed on the large-scale glass substrates, and the TFT, the driving device, and the color filter layer are formed at each panel region. Thus, in order to obtain a unit liquid crystal display panel, the glass substrates are to be cut and processed (step 200S109).

In this case, in order to separate the mother substrates into individual liquid crystal panels, the method for cutting a liquid crystal display panel in accordance with the present invention is used, which will now be described in detail with reference to FIG. 104.

Figure 104:
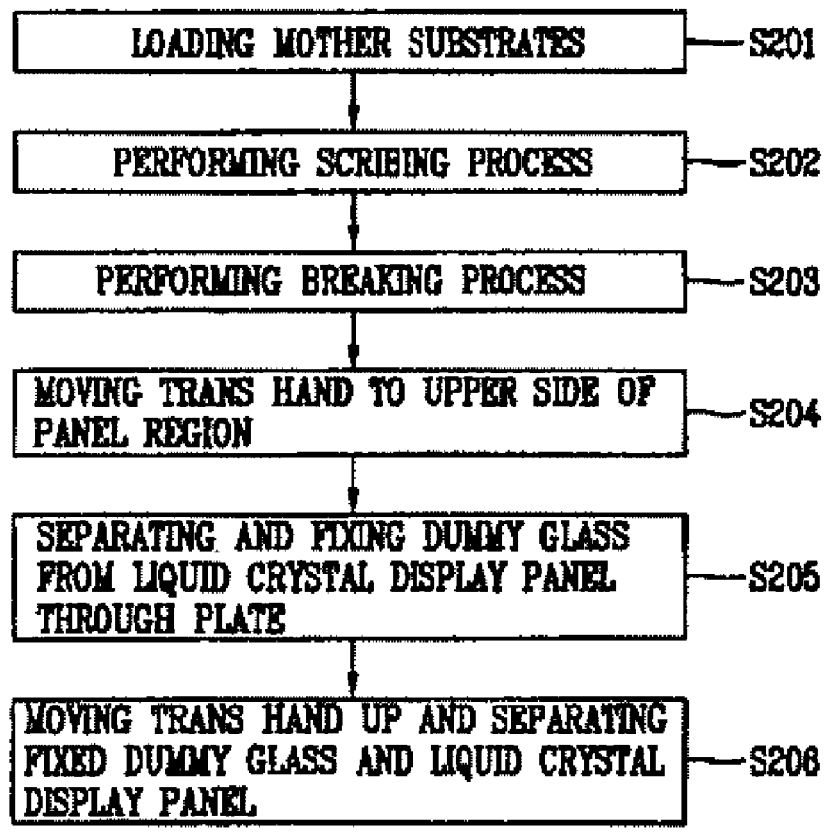
FIG. 104 is a flow chart illustrating the sequential processes of a method for cutting a liquid crystal display panel in accordance with the present invention.

FIG. 104 is a flow chart illustrating the sequential processes of a method for cutting a liquid crystal display panel in accordance with the present invention in FIGS. 24 and 25.

First, the pair of attached mother substrates on which the plurality of panel regions have been formed are loaded and transferred to the first scribing unit through the transfer unit (step 360S201). In this case, the TFTs, driving elements, and the color filter substrates have been formed on the upper and lower panels.

After being transferred to the scribing unit, the first prearranged cut lines are formed to section the panel regions on the front and rear surfaces of the mother substrates through the first scribing unit.

After the first scribing process in the first direction is finished, the head provided at the scribing unit is driven in a Y axis direction to form second prearranged cut lines for sectioning the panel regions on the front and rear surfaces of the mother substrates.

In this manner, according to the method for cutting liquid crystal display panels, after the first prearranged cut lines are simultaneously formed on the front and rear surfaces of the mother substrates, the scribing head is driven in the Y axis direction to simultaneously form the second prearranged cut lines on the front and rear surfaces of the mother substrates. Thus, without having to rotate and reverse the mother substrates several times, the first and second prearranged cut lines can be formed on the front and rear surfaces of the mother substrates (step 360S202).

After the scribing process in the first and second directions is finished, the mother substrates are moved to the breaking part, and steam and dried air are sprayed onto the front and rear surfaces of the mother substrates through a steam break and an air knife. Then, a crack is formed along the prearranged cut lines and each panel region and the dummy glass of the mother substrates are separated and then transferred to the unloading part (step 360S203).

The trans-hand if moved to an upper side of the mother substrates and positioned at an upper side of a certain panel region.

And then, the trans-hand is moved down, and a surfaces of a liquid crystal display panel to be extracted is adsorbed and fixed through the adsorption members (step 360S204).

In this case, since the rectangular plate is attached at the edge of the trans-hand, it can separate and fixes the dummy glass around the liquid crystal display panel from the liquid crystal display panel (step 360S205).

Thereafter, in a state that the plate and the dummy glass pressed and fixed by the plate are maintained at their positions, the body of the trans-hand is moved up. Then, the liquid crystal display panel adsorbed to the adsorption members of the trans-hand is completely separated from the dummy glass fixed by the plate and moved up (step 360S206) In this case, the cylinders connected with the plate is maintained to be driven downward until the dummy glass can be completely separated from the liquid crystal display panel.

After the liquid crystal display panel and the dummy glass are completely separated, the cylinders 360164 are driven upward, so that the separated dummy glass is left in the uploading part and the liquid crystal display panel adsorbed onto the adsorption members 360166 is transferred to the reversing unit.

Thereafter, as illustrated in FIG. 24, liquid crystal is injected through a liquid crystal injection opening in each unit liquid crystal display panel, the liquid crystal injection opening is sealed to form a liquid crystal layer, and then each unit liquid crystal display panel is inspected, thereby completing fabrication of each of the unit liquid crystal display panels (steps 200S110 and 200S111).

As illustrated in FIG. 25, when using the liquid crystal dropping method, after the alignment film is inspected (step 200S105), a seal pattern is formed with a sealant on the color filter substrate and, at the same time, a liquid crystal layer is formed on the array substrate (steps 200S106' and 200S107').

According to the dropping method, after liquid crystal is dropped and dispensed on the large-scale first mother substrate where a plurality of array substrates are disposed or on an image display region of the second mother substrate where the plurality of color filter substrates are disposed, the first and second mother substrates are attached by applying a certain pressure thereto to thereby make the liquid crystal uniformly distributed to the entire image display region and thus form a liquid crystal layer.

Thus, in the case where the liquid crystal layer is formed in the liquid crystal display panel through the dropping method, the seal pattern must be formed as a closed pattern surrounding the outer edge of the pixel part region in order to prevent a leakage of liquid crystal to outside of the image display region.

The dropping method allows dropping of liquid crystal within a relatively short time compared with the vacuum injection method and can quickly form the liquid crystal even when the liquid crystal display panel is large.

In addition, since only the required amount of liquid crystal is dropped on the substrate, an increase in the unit cost of the liquid crystal display panel due to the discarding of the high-priced liquid crystal as in the vacuum injection method can be prevented, and thus, the price competitiveness of the product can be enhanced.

Figure 105:
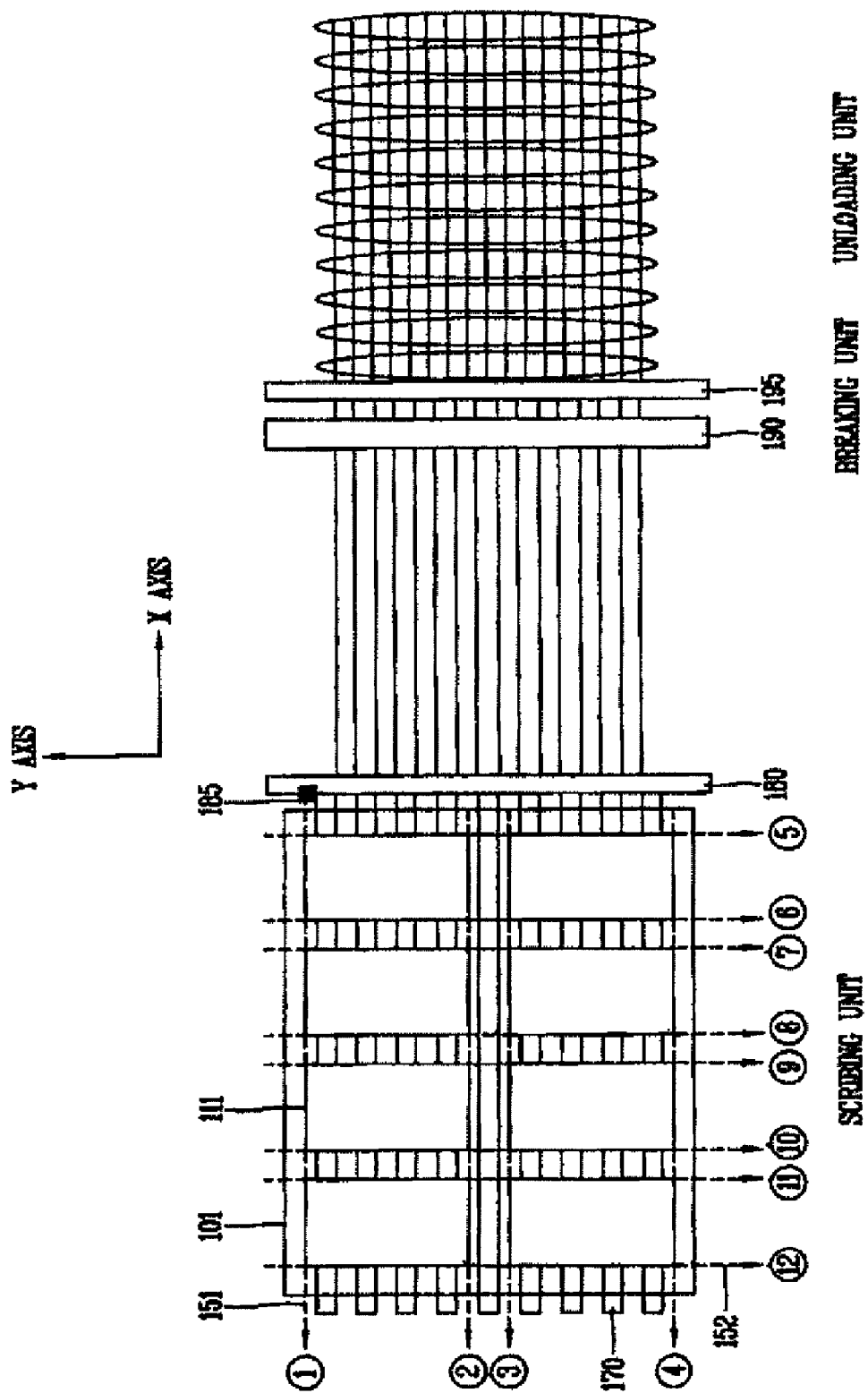
FIG. 105 is an exemplary view illustrating a cutting process of a liquid crystal display panel in accordance with a first embodiment of the present invention.

FIG. 105 is an exemplary view illustrating another cutting process of a liquid crystal display panel in accordance with a further embodiment of the present invention.

As illustrated in FIG. 105, a pair of attached mother substrates 370101 on which a plurality of panel regions 370111 have been arranged are transferred to a scribing part through a transfer unit in order to be divided into individual unit liquid crystal display panels along the panel regions 370111.

The panel regions 370111 can be an array substrate on which thin film transistors (TFTs) have been formed through an array process, and the lower panel regions 370111 can be a color filter substrate on which color filters have been formed through a color filter process. In this embodiment of the present invention, the panel regions have the same size, but the present invention is not limited in this way, and contemplates embodiments in which the panel regions 370111 can be formed with two or more different sizes.

In the drawing, the transfer unit includes a plurality of conveyer belts 370170, but the present invention is not limited thereto and the transfer unit can include a plurality of transfer rollers. In addition, the transfer unit may include a first conveyor part formed as a conveyer belt and a second conveyor part formed as a transfer roller, which are coupled.

After the mother substrates 370101 are transferred to the scribing part, first prearranged cut lines 370151 are formed to section the panel regions 370111 on the front and rear surfaces of the mother substrates 370101 in a first direction through a scribing unit 370180.

In the first embodiment of the present invention, the scribing unit 370180 driven in an X axis direction includes a pair of heads 370185 and repeatedly performs a first scribing process (1-4) four times to form the first prearranged cut lines 370151 in the first direction, namely, in the X axis direction on the mother substrates 370101 through the heads 370185.

After the first scribing process (1-4) in the first direction is finished, the heads 370185 of the scribing unit 370180 are driven in a Y axis direction to form second prearranged cut lines 370152 for sectioning the panel regions 370111 on the front and rear surfaces of the mother substrates 370101 in a second direction. In this case, in order to form the second prearranged cut lines 370152 on the mother substrates 370101 through the heads 370185, the scribing process (5-12) is repeated eight times in the second direction, namely, in the Y axis direction.

The scribing unit 370180 includes the head 370185 at the upper and lower portions thereof to form the first and second prearranged cut lines 370151 and 370152 on the front and rear surfaces of the mother substrates 370101, and a scribing wheel (not illustrated) made of a material having higher hardness compared with glass is mounted at each head 370185.

After the scribing process in the first and second directions is finished, the mother substrate 370101 is moved to the breaking part. In the breaking part, steam is sprayed onto the front and rear surfaces of the mother substrates 370101 through a steam break 370190 disposed to be substantially perpendicular to the proceeding direction of the mother substrates 370101 to make crack along the prearranged cut lines 370151 and 370152 to thereby separate liquid crystal display panels 370110.

Although not illustrated, the steam break 370190 includes a body for receiving water through a water supply pipe, a heating unit provided inside the body and heating water supplied through the water supply pipe to generate steam and a spraying unit for spraying steam generated by the heating unit onto the surface of the mother substrates 370101.

Steam generated from the spraying unit is sprayed onto the front and rear surfaces of the mother substrates 370101 at a temperature of about 100° C.-250° C. thereby expanding the mother substrates 370101 made of the glass material according to heat and pressure. In this case, the first and second prearranged cut lines 370151 and 370152 of the mother substrates 370101 are precisely expanded to be cut along, while the mother substrates 370101 are being transferred to an unloading part.

Furthermore, an air knife 370195 for spraying dried air with a certain pressure is installed at a rear surface of the steam break 370190 in order to remove moisture or glass chips remaining on the surface of the mother substrates 370101 after the steam is sprayed on the mother substrates 370101, and at the same time, proceed with making cracks formed along the first and second prearranged cut lines 370151 and 370152.

As stated above, according to the method for cutting the liquid crystal display panel in the first embodiment of the present invention, the first prearranged cut lines are simultaneously formed on the front and rear surfaces of the mother substrates and then the scribing heads are driven in the Y axis direction to simultaneously form the second prearranged cut lines on the front and rear surfaces of the mother substrates. Thus, without having to rotate or reverse the mother substrates, the first and second prearranged cut lines can be formed on the front and rear surfaces of the mother substrates.

In addition, steam is simultaneously sprayed on the first and second prearranged cut lines formed on the front and rear surfaces of the mother substrates to make cracks along the first and second prearranged cut lines in order to separate the liquid crystal display panels. This shortens the time required to cut the liquid crystal display panels.

In the method for cutting the liquid crystal display panel in accordance with the first embodiment of the present invention, the single scribing unit includes a pair of heads, so a scribing process is performed a total of twelve times to form the first and second prearranged cut lines on the mother substrates. In comparison, in a method for cutting the liquid crystal display panel in accordance with a second embodiment of the present invention, X axis scribing and Y axis scribing are performed simultaneously in different scribing parts and each scribing unit has a multi-head whereby first and second prearranged cut lines can be formed through a scribing processes performed a total of two times. The method for cutting a liquid crystal display panel in accordance with the second embodiment of the present invention will be described in detail with reference to the accompanying drawings.

Figure 106:
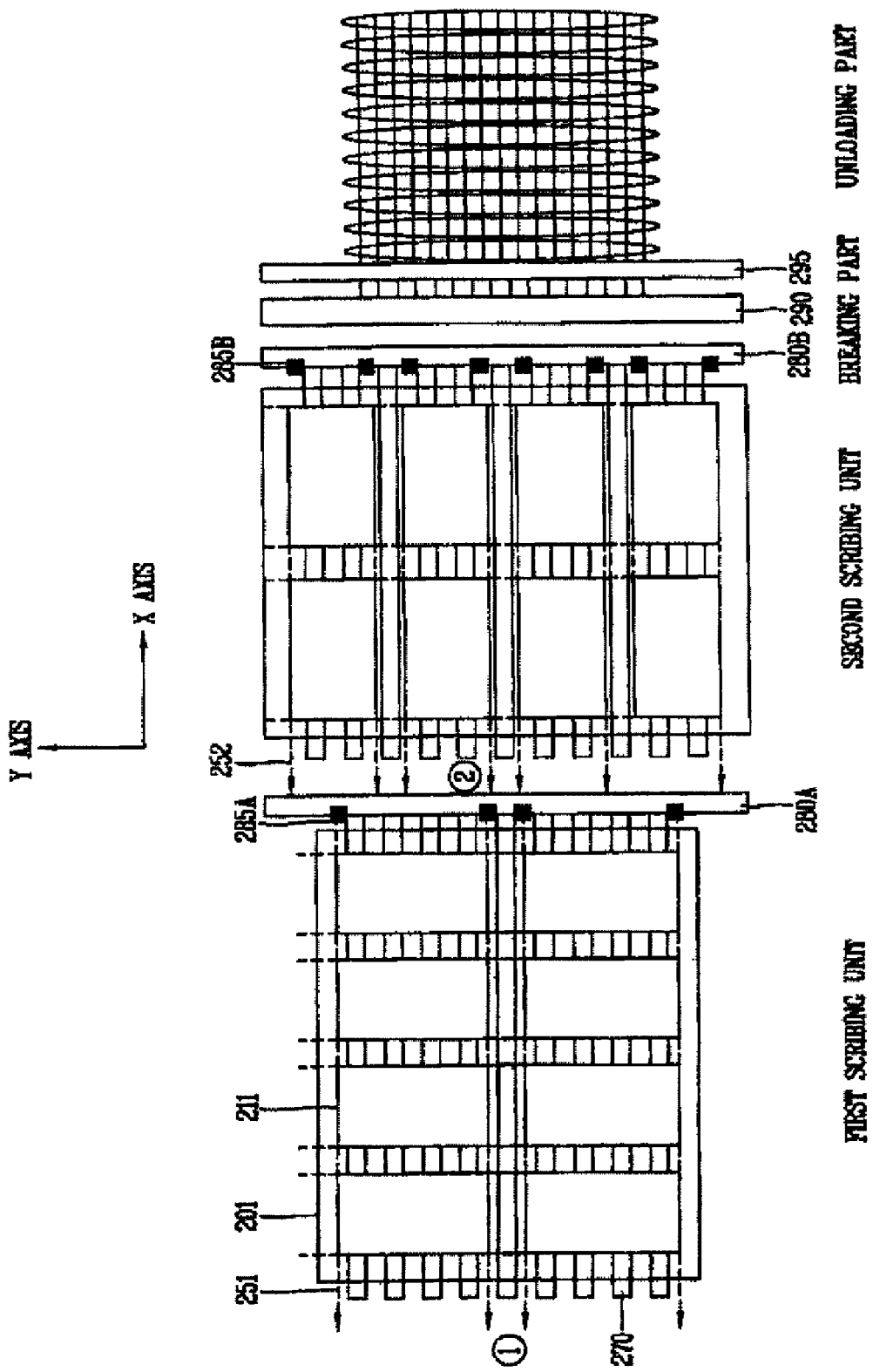
FIG. 106 is an exemplary view illustrating a cutting process of a liquid crystal display panel in accordance with a second embodiment of the present invention.

FIG. 106 is an exemplary view illustrating a cutting process of a liquid crystal display panel in accordance with a second embodiment of the present invention. The process of cutting a liquid crystal display panel in the second embodiment of the present invention is the same as that in the first embodiment of the present invention, except for the scribing parts and a corresponding scribing process.

As illustrated in FIG. 106, the process of cutting a liquid crystal display panel is performed through first and second scribing parts, a breaking part and an unloading part.

First, a pair of attached mother substrates 370201 on which a plurality of panel regions 370211 have been arranged are transferred to a first scribing part through a transfer unit that includes a plurality of conveyer belts 370270 so as to be divided into individual unit liquid crystal display panels along the panel regions 370211.

The panel regions 370211 can be an array substrate on which thin film transistors (TFTs) have been formed through an array process, and the lower panel regions 370211 can be a color filter substrate on which color filters have been formed through a color filter process.

After the mother substrates 370201 are transferred to the first scribing part, first prearranged cut lines 370251 are formed to section the panel regions 370211 on the front and rear surfaces of the mother substrates 370201 in a first direction through a first scribing unit 370280A.

In this embodiment, the first scribing unit 370280A is driven in an X axis direction and includes plurality pairs of heads 370285A. Thus, in a first scribing process (1) performed once, first prearranged cut lines 370251 are formed in the first direction, namely, in the X axis direction on the mother substrates 370201 through the plurality pairs of first heads 370285A. In this case, for example, a first scribing unit 370280A having four pairs of first heads 370285A is illustrated in FIG. 106 for the sake of explanation, but the present invention is not limited thereto.

After the first scribing process in the first direction is finished, the mother substrates 370201 are rotated by 90° and transferred to a second scribing part. In this case, the mother substrates 370201 themselves can be rotated by 90°, or a stage (not illustrated) on which the mother substrates 370201 are loaded can be rotated by 90°.

In the second embodiment of the present invention, in order to perform a second scribing process, the first scribing process (1)—finished mother substrates 370201 are rotated by 90° and then transferred to the second scribing part. This is because the transfer unit provided at the second scribing part includes a plurality of conveyer belts 370270. If the second scribing part includes a transfer unit including a plurality of transfer rollers, the process of rotating the mother substrates 370201 is not required.

Thereafter, second prearranged cut lines 370252 are formed to section the panel regions 370211 on the front and rear surfaces of the mother substrates 370201 in a first direction through the plurality pairs of second heads 370285B provided at a second scribing unit 370280B. In this case, the second scribing unit 370280B is driven in the X axis direction, in the same manner as the first scribing unit 370280A and includes the plurality pairs of second heads 370285B, so the second prearranged cut lines 370252 can be formed in the first direction, namely, in the X axis direction, on the mother substrates 370201 through the plurality pairs of second heads 370285B through a second scribing process (2) carried out once. In this case, the first and second prearranged cut lines 370251 and 370252 cross each other substantially.

As mentioned above, if the second scribing part includes a transfer unit including a plurality of transfer rollers, a plurality pairs of second heads driven in a Y axis direction can be provided in the second scribing unit 370280B and form the second prearranged cut lines 370252 for sectioning the panel regions 370211 on the front and rear surfaces of the mother substrates 370201 in the second direction, namely, in the Y axis direction.

The scribing units 370280A and 370280B include the plurality pairs of heads 370285A and 370285B at upper and lower portions thereof, respectively, to form the first and second prearranged cut lines 370251 and 370252 on the front and rear surfaces of the mother substrate 370201, and a scribing wheel (not illustrated) made of a material with strong hardness compared with glass is mounted in each of the heads 370285A and 370285B.

After the scribing processes (1 and 2) in the first and second directions are finished, the mother substrates 370201 are moved to the breaking part. Steam is sprayed on the front and rear surfaces of the mother substrates 370201 through a steam break 370290 and an air knife 370295 cuts the mother substrates 370201 along the prearranged cut lines 370251 and 370252 to separate the liquid crystal display panels.

As stated above, according to the method for cutting the liquid crystal display panel in the second embodiment of the present invention, the first prearranged cut lines are simultaneously formed on the front and rear surfaces of the mother substrates through the first scribing unit having the plurality pairs of first heads, the mother substrates are rotated by 90°, and then the second prearranged cut lines are simultaneously formed on the front and rear surfaces of the mother substrates through the second scribing unit having the plurality pairs of second heads. Thus, without having to rotate or reverse the mother substrates, the first and second prearranged cut lines can be formed on the front and rear surfaces of the mother substrates.

In addition, steam is simultaneously sprayed on the first and second prearranged cut lines formed on the front and rear surfaces of the mother substrates to crack the substrate along the first and second prearranged cut lines in order to separate the liquid crystal display panels. This shortens the time required for cutting the liquid crystal display panels.

In particular, in the method for cutting the liquid crystal display panel in accordance with the second embodiment of the present invention, the X scribing and Y scribing are performed simultaneously in different scribing parts and each scribing unit has the plurality of heads, whereby the first and second prearranged cut lines can be formed through the total two times of scribing process. Thus, compared with the cutting process in the first embodiment of the present invention, a tag time can be shortened and accuracy of the scribing process can be enhanced.

According to the method for cutting the liquid crystal display panel according to the present invention, because the liquid crystal display panels are cut by spraying steam along the first and second prearranged cut lines formed on the mother substrates, the generation of glass chips can be prevented, and thus, degradation of picture quality of driving deficiency of an LCD device due to adsorption of the glass chips can be prevented. In addition, because the generation of the glass chips is prevented, an operator can be prevented from having respiratory ailments due to the glass chips.

In addition, according to the method for cutting the liquid crystal display panel according to the present invention, because a waiting time of the mother substrates in the scribing unit is shortened, the cracking can be made stably, so that defect that may be generated as a value set according to the mother substrates and each scribe line is changed frequently can be prevented.

In an alternative embodiment, in order to separate the mother substrates into individual liquid crystal panels, the method for cutting a liquid crystal display panel in accordance with a further embodiment of the present invention is used, which will now be described in detail with reference to FIG. 107.

Figure 107:
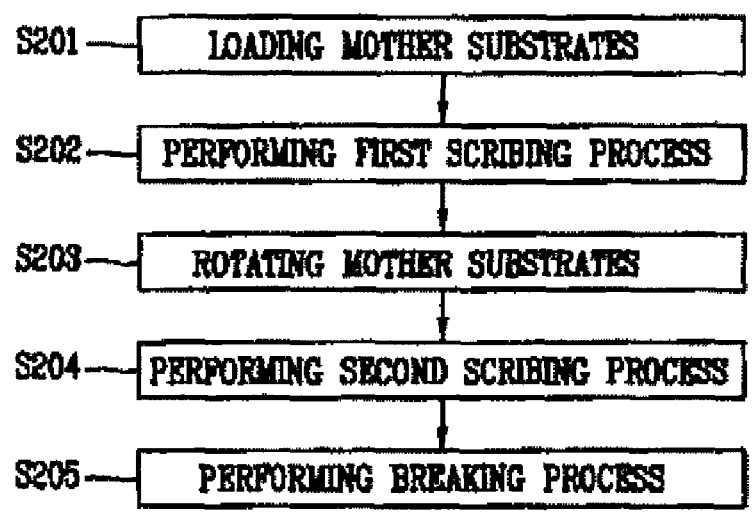
FIG. 107 is a flow chart illustrating the sequential processes of a method for cutting a liquid crystal display panel in accordance with the present invention in FIGS. 24 and 25.

FIG. 107 is a flow chart illustrating the sequential processes of a method for cutting a liquid crystal display panel in accordance with the present invention in FIGS. 24 and 25.

First, the pair of attached mother substrates on which the pluralities of panel regions have been formed are loaded and transferred to the first scribing part through the transfer unit (step 370S201). In this case, the TFTs, driving elements, and the color filter substrates have been formed on the upper and lower panels.

After being transferred to the first scribing part, the first prearranged cut lines are formed to section the panel regions on the front and rear surfaces of the mother substrates through a first scribing unit having the plurality pairs of first heads.

In this manner, the first prearranged cut lines are formed in the first direction on the mother substrates through the plurality of first heads by performing the first scribing process one time (step 370S202).

After the first scribing process in the first direction is finished, the mother substrates are rotated by 90° and then transferred to the second scribing part. In this case, the mother substrates themselves can be rotated by 90° or the stage on which the mother substrates have been loaded can be rotated by 90° (step 370S203).

Thereafter, the second prearranged cut lines are formed to section the panel regions on the front and rear substrates of the mother substrates in the first direction through the plurality pairs of second heads provided in a second scribing unit. In this manner, the second prearranged second cut lines are formed in the first direction on the mother substrates through the plurality pairs of second heads by performing the second scribing process one time (step 370S204).

After the scribing process is finished in the first and second directions, the mother substrates are moved to the breaking part, in which steam is sprayed on the mother substrates through the steam break and the air knife is disposed on the front and rear substrates of the mother substrates to thereby cut the mother substrates along the prearranged cut lines to individually separate them (step 370S205).

Thereafter, as illustrated in FIG. 24, liquid crystal is injected through a liquid crystal injection opening of each unit liquid crystal display panel, the liquid crystal injection opening is sealed to form a liquid crystal layer, and then, each unit liquid crystal display panel is inspected, thereby finishing fabrication of each of the unit liquid crystal display panels (steps 200S110 and 200S111).

In this embodiment, a laser outputs a beam having a uniform intensity allowing the uniform application of uniform heat to a substrate on demand. The laser beam may be adjusted to illuminate a spot having desired sizes. Accordingly, heat can be applied to the desired portions of the substrate to thus cut the substrate.

The cutting apparatus may be used not only to cut a driving device array substrate with a driving device array or a color filter substrate with a color filter but also to cut an LCD panel formed by bonding the driving device array substrate and the color filter substrate. Hereinafter, regarding the explanation for the cutting apparatus using the laser, an object to be cut denotes a substrate. However, the substrate may refer to an LCD panel as well as a driving device array substrate or a color filter substrate.

An apparatus and method for cutting an LCD device using a laser in accordance with further embodiments of the present invention will be described with reference to the attached drawings.

Figure 108A:
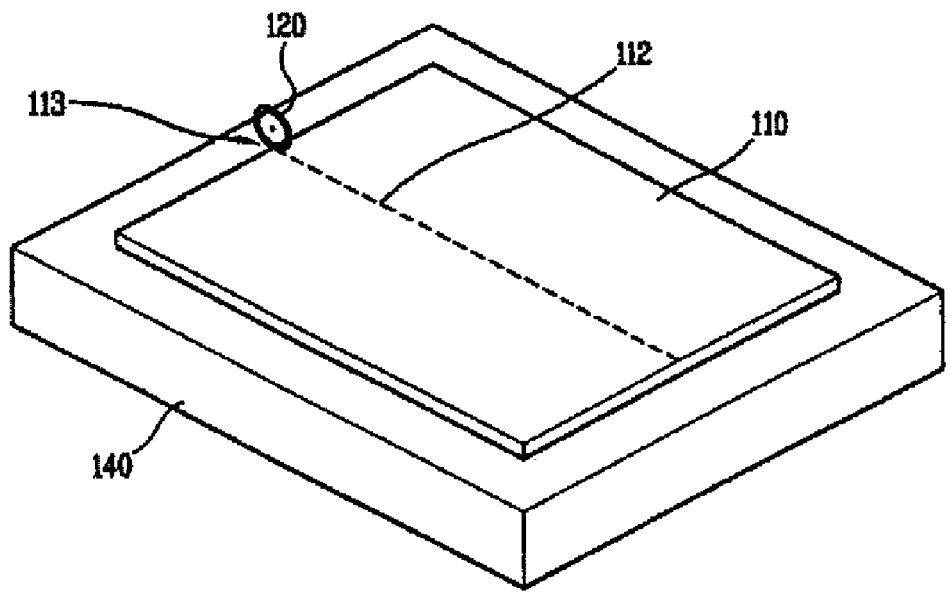
FIGS. 108A through 108C are views illustrating a substrate cut by use of a substrate cutting apparatus in accordance with a first embodiment of the present invention.
Figure 108B:
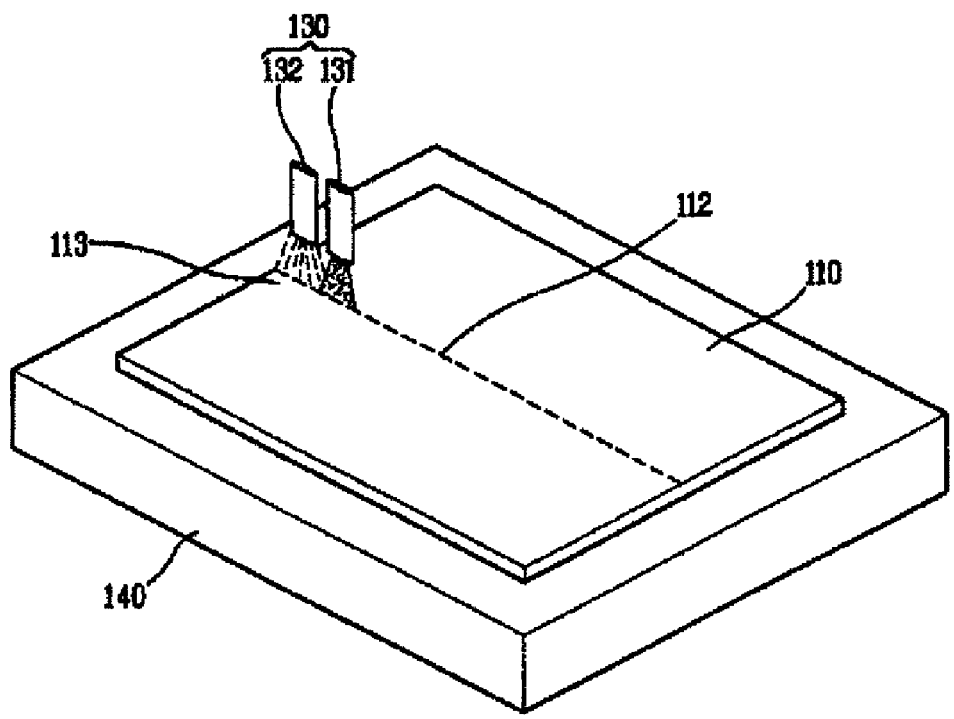
Figure 108C:
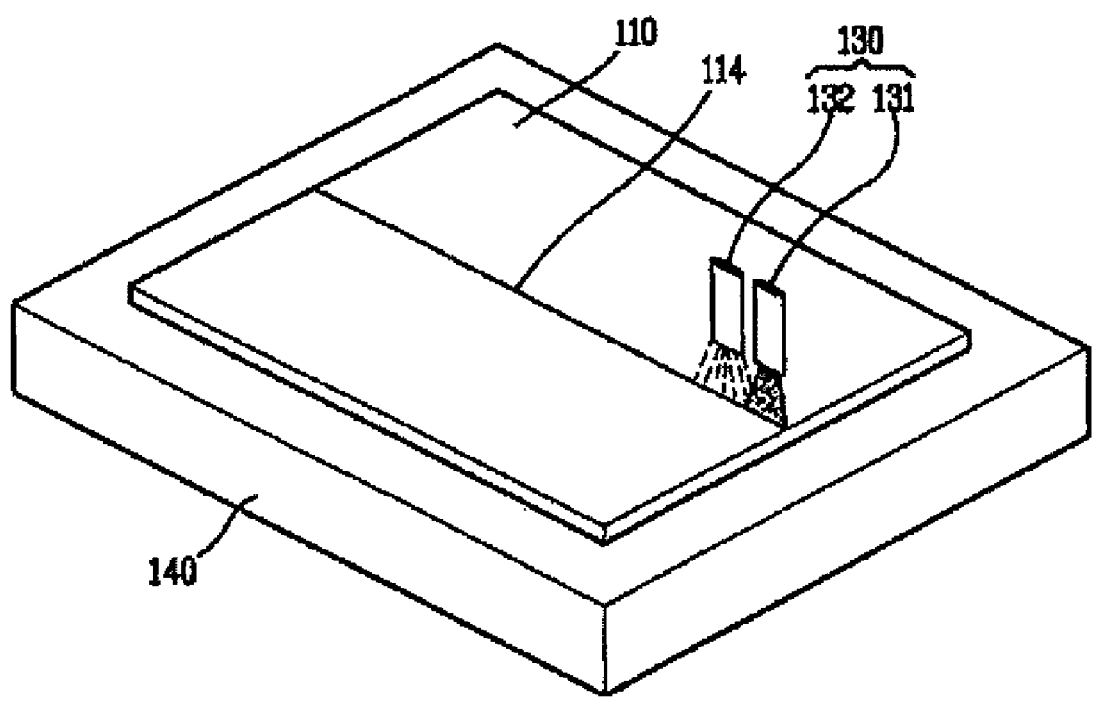

FIGS. 108A through 108C are views of cutting an LCD device using a cutting apparatus by use of a laser in accordance with a first embodiment of the present invention.

First, as illustrated in FIG. 108A, upon loading a substrate 380110 on a table 380140, a cutting wheel 380120 rotates while in contact with an end portion of the substrate 380110 to form a crack 380113 at the end portion of the substrate 380110. The reason for forming the crack 380113 at the end portion of the substrate 380110 will be understood as follows.

Upon irradiating of the substrate 380110 with a laser beam, the substrate 380110 begins to expand from heat generated by the laser beam. The end portion of the substrate 380110, however, may fail to be heat-expanded by the irradiation of the laser beam, resulting in not forming a scribing line by the irradiation of the laser beam at the end portion of the substrate 380110. When separating (cutting) the substrate 380110 after irradiation by the laser, the end portion may be irregularly cut because of the failure to form a scribing line in the end portion. As a result, the end portion of the substrate 380110 may be damaged or irregularly cut. In order to prevent such damage, a crack is formed at the end portion of the substrate 380110 before irradiating the laser beam onto the substrate 380110.

In the drawings, a cutting wheel 380120 is used to form the crack 380113 at the end portion of the substrate 380110, but a yttrium aluminum garnet (YAG) laser may be used to melt the end portion of the substrate to form the crack 380113.

As illustrated in FIG. 108B, the laser cutter 380130 is brought above a virtual scribing line 380112 identifying a position for a scribing line on the substrate 380110 and then irradiates a laser beam on the substrate 380110 at the position of the virtual scribing line. The laser cutter 380130 includes a laser 380131 for irradiating the laser beam onto the substrate 380110 to heat-expand the substrate 380110, and a cooling unit 380132 for cooling the heat-expanded substrate 380110 to contract the substrate. Various types of lasers may be used as the laser 380131, including a carbon dioxide (CO2) laser.

The cooling unit 380132 spreads cold air or liquid onto the substrate 380110 to thus cool and contract the substrate 380110 that has been heat-expanded by the laser 380131. Alternatively, a cold foam-type fluid can be spread onto the substrate 380110 in lieu of the cold air or liquid to improve cooling efficiency.

Then, as illustrated in FIG. 108C, while the laser cutter 380130 is moved along the virtual scribing line 380112, the substrate 380110 is repeatedly heat-expanded and contracted. A scribing line 380114 cutting into the substrate 380110 is accordingly formed on the substrate 380110 along the movement path of the laser cutter 380130.

As described above, the substrate 380110 cut by the cutting apparatus may be the driving device array substrate with the driving device array such as the thin film transistor or the color filter substrate with the color filter. Therefore, cut surfaces of each cut (separated) substrate 380110 may be polished in a polishing process. Each of the separated substrates 380110 is sent to a cell process to be bonded and a liquid crystal layer is formed between the bonded substrates 380110, thereby obtaining an LCD device.

As a method for forming the liquid crystal layer either a dispensing method a vacuum injecting method or a more recently developed dispensing method may be used, In the vacuum injecting method liquid crystal is injected into the bonded LCD panels using a pressure difference generated in a vacuum. In the dispensing method, liquid crystal is dispensed onto a driving device array substrate or color filter substrate and then the two substrates are bonded to each other to distribute the liquid crystal on the entire substrate. In the dispensing method, the liquid crystal is dispensed onto mother substrates having a plurality of LCD panels thereon to be then bonded to each other, and thus the cutting operation using the laser cutting apparatus is applied to the bonded substrate, namely, the LCD panel. The laser cutting apparatus can be used not only to cut individual driving device array substrates or color filter substrates but can be applied to cut the LCD panels. For cutting the LCD panel, the cutting is performed by reversing the driving device array substrate and the color filter substrate, respectively, the two substrates having been bonded to each other. Thus, for cutting the LCD panel, the LCD device is completely formed by polishing the cut surfaces of the cut substrate in the polishing process and then performing an examination process.

Figure 109A:
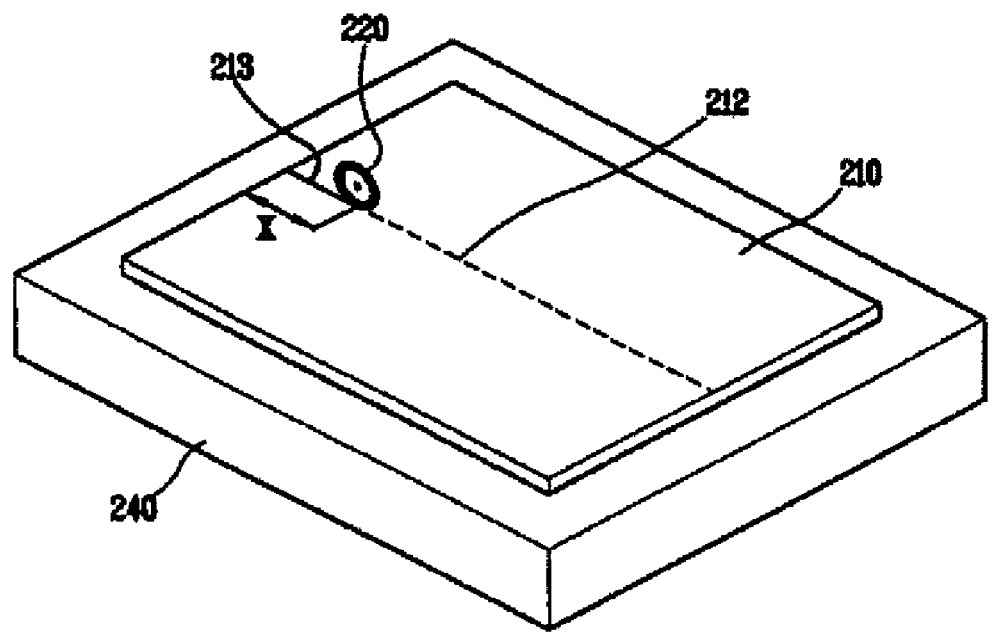
FIGS. 109A through 109C are views illustrating a substrate cut by use of a substrate cutting apparatus in accordance with a first embodiment of the present invention.
Figure 109B:
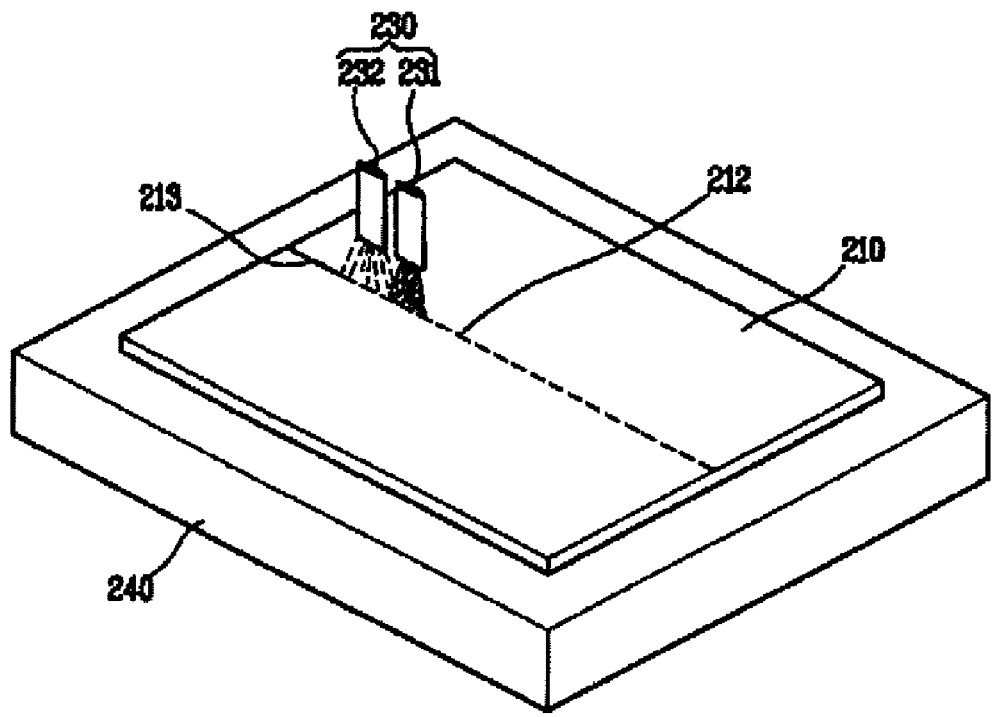
Figure 109C:
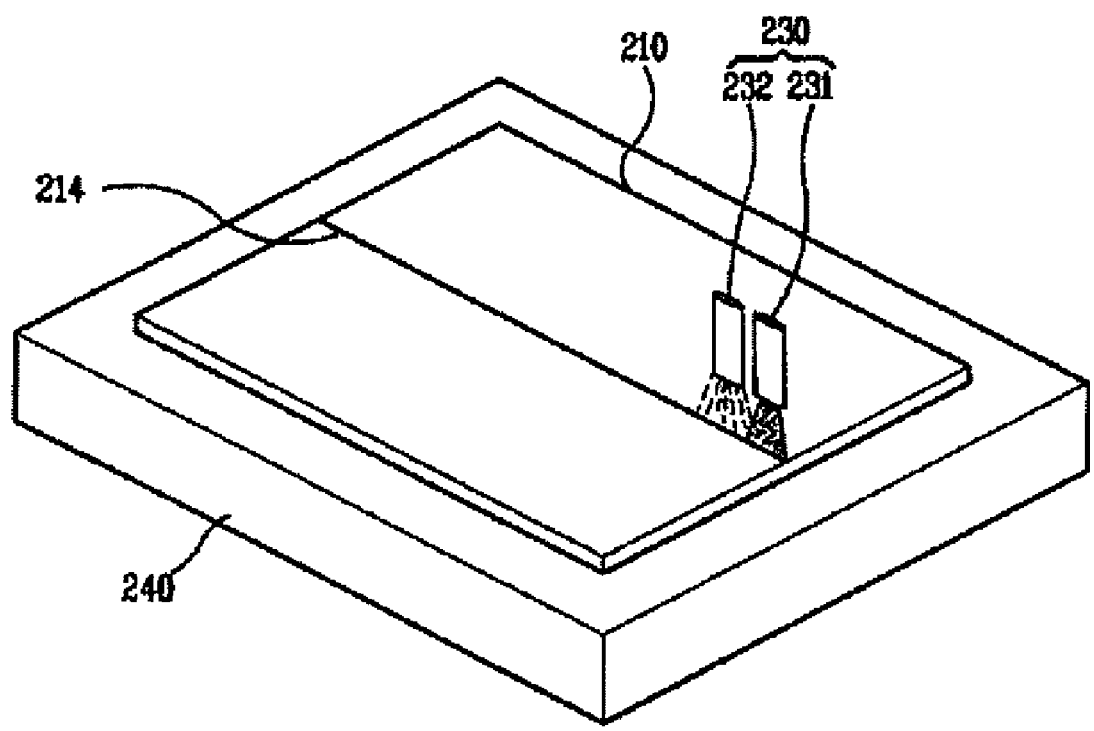

FIGS. 109A through 109C are views illustrating a substrate cutting method using a laser cutting apparatus in accordance with a second embodiment of the present invention.

First, as illustrated in FIG. 109A, upon loading a substrate 380210 on a table 380240, a cutting wheel 380220 rotates while in contact with an end portion of the substrate 380210 to thus form a preliminary scribing line 380213 extending a certain distance from the end portion of the substrate 380210. Compared to the embodiment of FIG. 108A in which a crack is formed only at the end portion of the substrate, the preliminary scribing line 380213 extending a certain distance x from the end portion is formed in this embodiment for reasons explained as follows.

When heat-expanding the substrate 380210 by irradiating the laser beam onto the substrate 380210, the non-heat-expanded regions may include not only the end portion of the substrate 380210 but also a region corresponding to a certain interval (distance x) extending from the end portion of the substrate 380210 toward the center of the substrate 380210). FIG. 110 illustrates the heat-expansion of the substrate 380210 resulting from heating by irradiating the laser beam. As illustrated in FIG. 110, an expansion region 380215 formed along the scribing line 380214 ends at a distance x from the end portion of the substrate 380210. That is at distance x from the end of the substrate 380110 is a region not heat-expanded by the irradiation of the laser beam. Hence, forming a crack by processing only the end portion of the substrate 380210 using a cutting wheel or the like, may result in the destroying the substrate 380210 or cut it irregularly into the substrate at regions which are not heat-expanded.

In order to prevent the above-described problem, in the embodiment of the present invention illustrated in FIG. 109A, a preliminary scribing line 380213 extending from an edge of the substrate 380210 is formed having a length at least as long as distance x using the cutting wheel 380220. Here, a YAG laser may be used instead of the cutting wheel 380220 to melt the substrate for the corresponding distance x.

Afterwards, as illustrated in FIG. 109B, a laser cutter 380230 including the laser 380231 and a cooling unit 380232 is positioned above a virtual scribing line 380212 which is spaced from the end portion of the substrate 380210 by the distance x. A laser beam is irradiated along the virtual scribing line 380212 to heat-expand the corresponding region. A foam-type fluid or other cooling medium is spread onto the heat-expanded region by the cooling unit 380232 to thusly contract the region.

As illustrated in FIG. 109C, as the laser cutter 380230 is moved along the virtual scribing line 380212, the substrate 380210 is repeatedly heat-expanded and contracted. A scribing line 380214 is accordingly formed on the substrate 380210 along the movement path of the laser cutter 380230, and the substrate 380210 is cut into and separated along the scribing line.

As aforementioned, the cut (separated) substrates 380210 are transferred to the polishing process to polish cut surfaces thereof. The cut surfaces polished substrates 380210 are transferred to the cell process to be bonded (when cutting the driving device array substrate or the color filter substrate), or an examination process is further performed (when cutting the LCD panel), thereby obtaining the LCD device.

As described above, the present invention advantageously provides effects by cutting the substrate using the laser as follows.

First, the substrate is cut uniformly, resulting in non-generation of defect. The laser beam irradiated onto the substrate always has constant energy, and thus the substrate can be uniformly cut, thereby preventing the generation of the defective substrate.

Second, foreign materials such as glass chips may not be generated when cutting the substrate. The cutting of the substrate using the laser is implemented by the heat-expansion and contraction of the substrate, and thus the generation of glass chips by a mechanical friction or the like may be avoided.

Third, the substrate can be prevented from being damaged or cut into irregularly. The present invention can be implemented such that the end portion of the substrate is partially cut by the cutting wheel or the laser and then a laser beam is irradiated onto the substrate so as to completely cut the substrate using the heat-expansion and contraction of the substrate, whereby it is possible to prevent the end portion of the substrate from being damaged or cut into irregularly.

The illustrated embodiments include an apparatus and method for cutting a substrate by applying heat onto a substrate using a laser. Other means of applying heat for cutting the substrate by virtue of the heat-expansion and the cooling contraction of the substrate using heat sources other than a laser may alternatively be used.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

Figure 111:
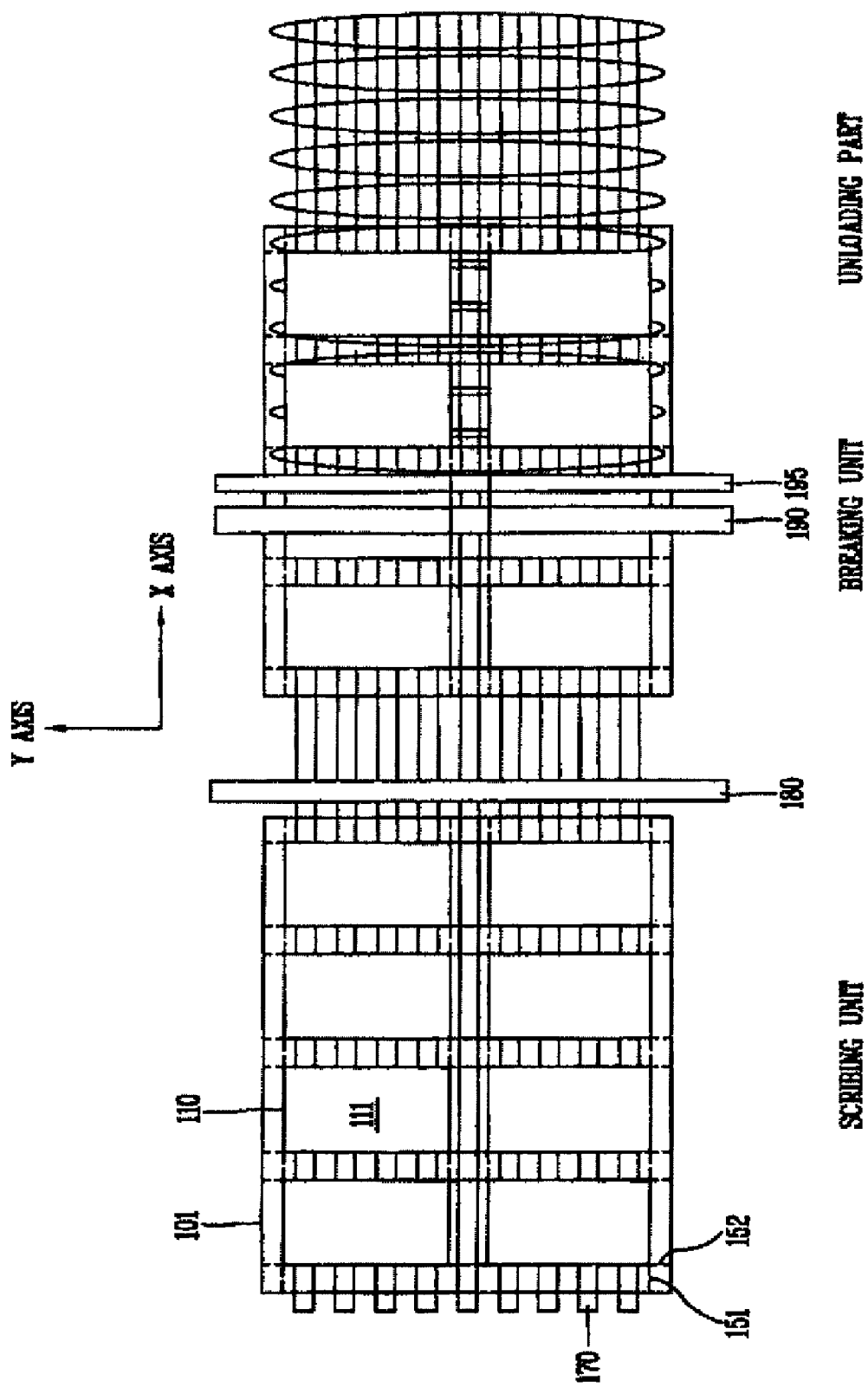

FIG. 111 is a plan view illustrating a cutting process of a liquid crystal display panel in accordance with a first embodiment of the present invention.

As illustrated in FIG. 111, a pair of bonded mother substrates 390101 on which a plurality of panel regions 390111 have been arranged are transferred to a scribing component through a conveying unit to be divided into individual unit liquid crystal display panels 390110 along the panel regions 390111.

The panel regions 390111 may comprise upper panel regions and lower panel regions. The upper panel regions 390111 can be array substrate on which thin film transistors (TFTs) have been formed through an array process, and the lower panel region 390111 can be a color filter substrate on which color filters have been formed through a color filter process. In the illustrated embodiment of the present invention, the panel regions 390111 have the same size, but the present invention is not limited thereto and the panel regions 390111 can be formed to have at least two different sizes with the upper array substrate and the lower color filter substrate bonded together to form a unit liquid crystal display panel 390110.

In the FIG. 111, the conveying unit is illustrated as including a plurality of conveyer belts 390170, but the present invention is not limited thereto and the conveying unit may alternatively include a plurality of transfer rollers. In addition, the conveying unit may include a first conveying component formed as a conveyer belt coupled to a second conveying component formed as a transfer roller.

After the mother substrates 390101 are transferred to the scribing component, first prearranged cut lines 390151 are formed to section the panel regions 390111 on the front and rear surfaces of the mother substrates 390101 in a first direction using a scribing unit 390180.

The scribing unit 390180 is driven along an X-axis direction. The scribing unit 390180 includes a pair of scribing heads (not illustrated) and repeatedly (e.g. four times) performs a first scribing process to form the first prearranged cut lines 390151 in the first direction, (along the X-axis direction) on the mother substrates 390101 using the scribing heads.

After the first scribing process in the first direction is complete, a second scribing process is initiated. In the second scribing process, the scribing unit 390180 is maintained at a certain position with respect to an X-axis and the heads of the scribing unit 390180 are driven in a Y-axis direction to form second prearranged cut lines 390152 for sectioning the panel regions 390111 on the front and rear surfaces of the mother substrates 390101 in a second direction. To form the second prearranged cut lines 390152 on the mother substrates 390101 through the scribing heads, the scribing along the Y-axis direction is repeated eight times.

In this above described example using the embodiment of the present invention illustrated in FIG. 111, the first scribing process is performed four times in the X-axis direction and the second scribing process is performed eight times in the Y-axis direction to form the total eight sheets of liquid crystal display panels 390110 on the large-scale mother substrates 390101, but the present invention is not limited thereto and the first and second scribing process may include any number of repetitions of scribing in the X and Y axes directions.

The scribing unit 390180 includes scribing heads formed at the upper and lower portions thereof to scribe the first and second prearranged cut lines 390151 and 390152 on the front and rear surfaces of the mother substrates 390101, and a scribing wheel made of a material having a greater hardness than that of glass is mounted at each scribing head.

After the scribing process including scribing in the first and second directions is complete, the mother substrate 390101 is moved to the breaking component where a breaking process is performed. In the breaking component, steam is sprayed onto the front and rear surfaces of the mother substrates 390101 through a steam break 390190 disposed substantially perpendicular to a proceeding direction of the mother substrates 390101 to create an propagate a crack along the prearranged cut lines 390151 and 390152 to thereby separate the liquid crystal display panels 390110.

The steam break 390190 includes a body for receiving water through a water supply pipe; a heating unit provided inside the body to heat water supplied through the water supply pipe to generate steam; and a spraying unit for spraying steam generated by the heating unit onto the surface of the mother substrates 390101.

Steam generated by the spraying unit is sprayed onto the front and rear surfaces of the mother substrates 390101 at a temperature of about 100° C. to about 250° C. to expand the mother substrates 390101 made of the glass material through heat and pressure. The portions where the first and second prearranged cut lines 390151 and 390152 of the mother substrates 390101 are formed are expanded to make and propagate cracks along the first and second prearranged cut lines 390151 and 390152 to separate the liquid crystal display panels.

An air knife 390195 for spraying dried air with a certain pressure is installed at a rear surface of the steam break 390190 to remove moisture or glass chips remaining on the surface of the mother substrates 390101 after the steam is sprayed on the mother substrates 390101 and to further propagate the cracks formed along the first and second prearranged cut lines 390151 and 390152.

As stated above, according to the method for cutting the liquid crystal display panel in the first embodiment of the present invention, the first prearranged cut lines 390151 are formed simultaneously on the front and rear surfaces of the mother substrates 390101 and then the scribing heads are driven in the Y-axis direction to simultaneously form the second prearranged cut lines 390152 on the front and rear surfaces of the mother substrates 390101. Thus, without having to rotate or reverse the mother substrates 390101, the first and second prearranged cut lines 390151 and 390152 can be formed on both the front and rear surfaces of the mother substrates 390101.

In addition, once the first and second prearranged cut lines 390151 and 390152 have been formed, a crack is formed along the first and second prearranged cut lines 390151 and 390152 by using the steam break 390190 and the air knife 390195 to separate the unit liquid crystal display panels 390110. Thus, compared with the breaking process performed by striking using the break bar, the process time can be shortened. Further, the damage to the liquid crystal display panels associated with the striking process of the related art may be prevented.

The unit liquid crystal display panels 390110 once separated from the mother substrates 390101 through the scribing process and the breaking process are extracted through a transfer unit such as a trans-hand 390160 (illustrated in FIG. 112A) and transferred to an apparatus for carrying out a subsequent processing such as a reversing unit.

In addition to performing the role of extracting the liquid crystal display panels 390110 from the mother substrates 390101 and transferring them to the reversing unit, the trans-hand 390160 also serves to further propagate the cracks formed along the first and second prearranged cut lines 390151 and 390152 to completely separate any dummy glass around the liquid crystal panels 390110 from the liquid crystal display panels 390110 through a breaking process.

A stream generator with a certain form is attached at an edge of the trans-hand 390160 to spray stream to the prearranged cut lines 390151 and 390152 before the liquid crystal display panels 390110 are extracted to make and/or further propagate the cracks along the prearranged cut lines 390151 and 390152. The steam generator may have a form corresponding to the shape of a liquid crystal display panel. Alternatively, the steam generator may have a circular or rectangular shape. Damage to the liquid crystal display panel 390110 due to incomplete separation from the dummy area glass can be prevented by removing the dummy glass by using a pusher as described below with reference to FIGS. 112A to 112E.

FIGS. 112A to 112E are exemplary views illustrating a process of sequentially extracting a unit liquid crystal display panel from a mother substrate by using the trans-hand including a second breaking process using the trans-hand.

Figure 112A:
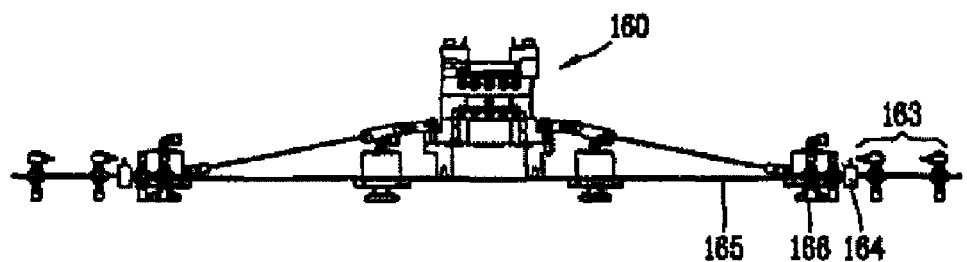

As illustrated in FIG. 112A, after the scribing process and the first breaking process are finished, the trans-hand 390160 is moved to be positioned above the liquid crystal display panel 390110.

A body 390165 of the trans-hand 390160 includes a plurality of suction members 390166, to which each liquid crystal display panel 390110 is affixed to allow separation and extraction from the mother substrate. The suction members may include suction cups.

Steam generators 390164 having a certain form are formed at an edge of the body 390165 of the trans-hand 390160. In this case, a plurality of steam generators 390164 can be formed along the edge of the body 390165 of the trans-hand 390160, and they can be formed as a single connected rectangular form. The steam generator 390164 can be installed at the trans-hand 390160 such that it can be positioned near the prearranged cut line 390150 where the lower liquid crystal display panel 390110 and the dummy glass 390112 contact with each other, or can be controlling its position within the trans-hand 390160.

Pushers 390163 for applying a pushing force to the dummy glass 390112 are installed at an outer side of the steam generator 390164. The push from the pushers removes dummy glass 390112 not previously completely separated from the liquid crystal display panel 390110.

The trans-hand 390160 is moved downward to be close to the surface of the liquid crystal display panel 390110 to be extracted.

Figure 112B:
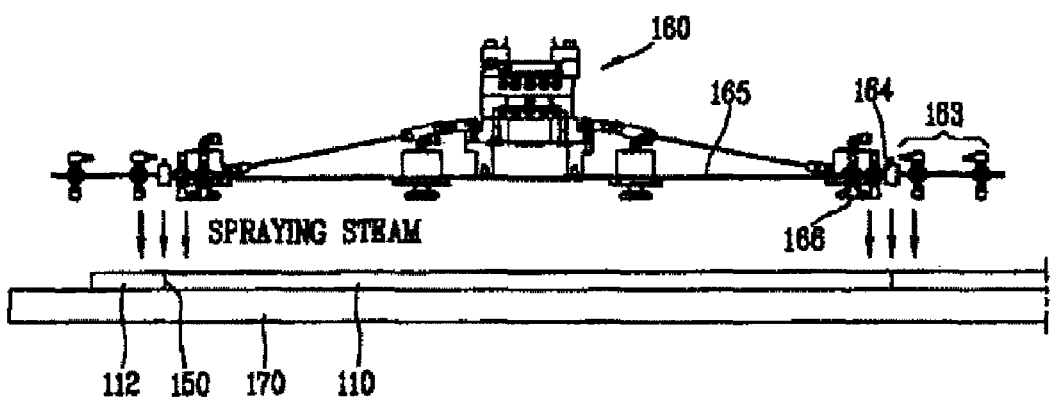

As illustrated in FIG. 112B, while spraying steam toward the prearranged cut line 390150 through the steam generator 390164 of the trans-hand 390160, the trans-hand 390160 nears the surface of the liquid crystal display panel 390110.

Figure 112C:
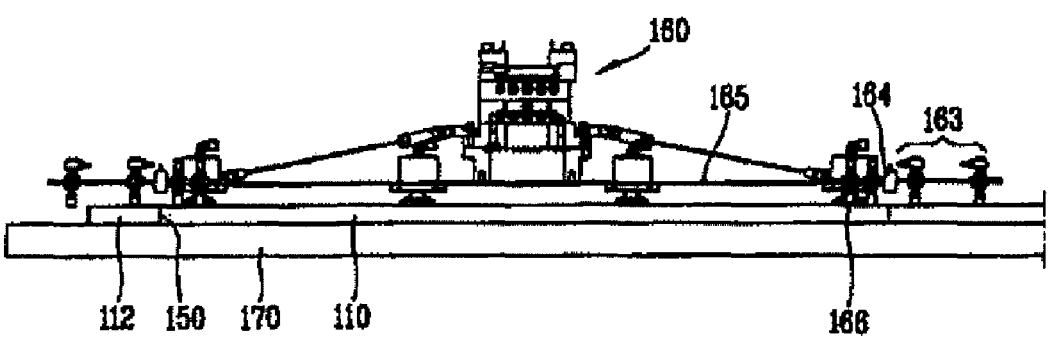

As illustrated in FIG. 112C, with the trans-hand 390160 in contact with the surface of the liquid crystal display panel 390110, the suction members 390166 of the trans-hand 390160 are vacuum affixed onto the surface of the liquid crystal display panel 390110.

The spraying of steam through the steam generator 390164 is maintained for a certain pre-set time to further make and propagate cracks along the prearranged cut lines 390150 to separate the dummy glass 390112 from the liquid crystal display panel 390110.

Figure 112D:
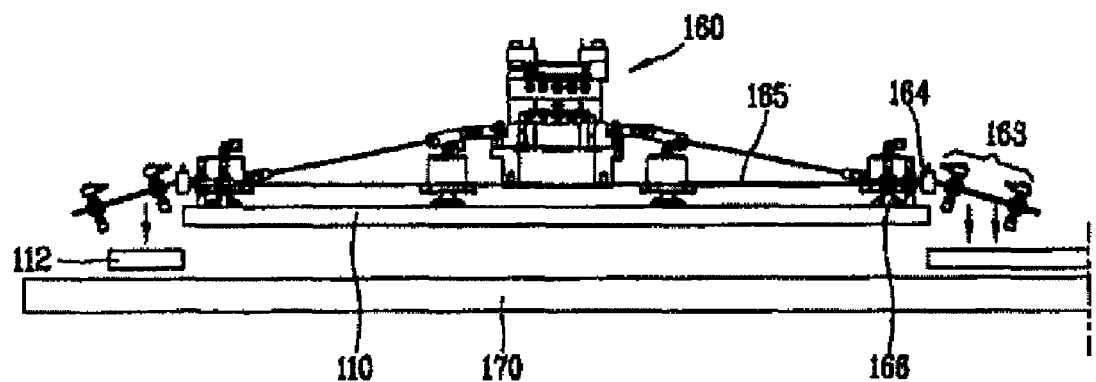

Thereafter, as illustrated in FIG. 112D, the trans-hand 390160 is moved upward and the liquid crystal display panel 390110 affixed on the suction members 390166 of the trans-hand 390160 is separated from the dummy glass 390112 and moved together with the trans-hand 390160. Since the pushers 390163 are installed at the edge of the trans-hand 390160 and substantially at the outer side of the steam generator 390164, although a portion of the dummy glass 390112 around the liquid crystal display panel 390110 may not been separated from the liquid crystal display panel 390110, a portion of the dummy glass 390112 which has not yet been separated can be pushed down by the pushers 390163 to be completely separated from the liquid crystal display panel 390110.

Figure 112E:
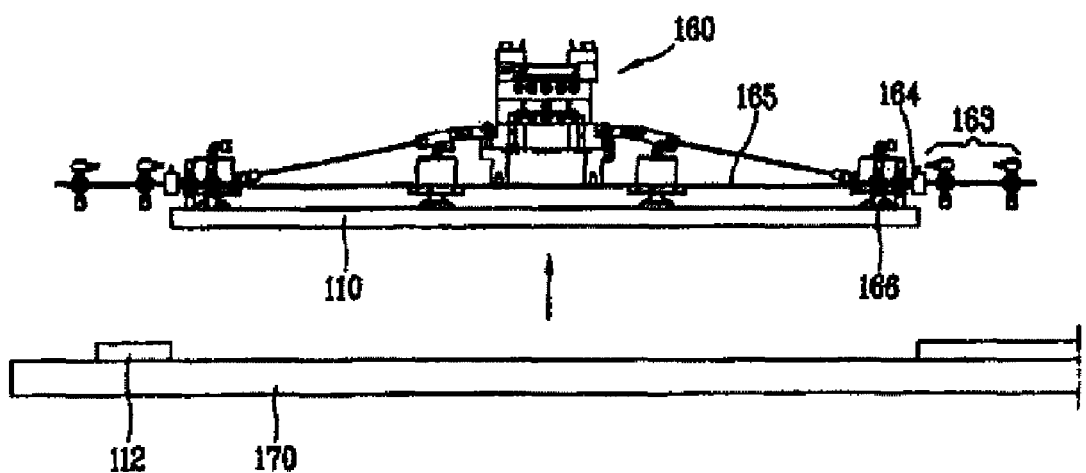

After the liquid crystal display panel 390110 and the dummy glass 390112 are completely separated, as illustrated in FIG. 112E, the trans-hand 390160 is driven upward to transfer the liquid crystal display panel 390110 affixed onto the suction members 390166 to the reversing unit, with the separated dummy glass 390112 remaining on a conveyer belt.

As described above by spraying steam toward the prearranged cut lines 390150, cracks can be formed and/or propagated along the prearranged cut lines 390150 and the dummy glass 390112 can be completely separated from the liquid crystal display panel 390110. As a result, when the liquid crystal display panel 390110 is extracted, damage to and tearing apart of the liquid crystal display panel may be avoided.

In the above-described embodiment of the present invention, a first breaking process is performed by using the steam break 390190 and the air knife 390195, after which a second breaking process is performed by using the steam generator 390164 of the trans-hand 390160. However, the present invention is not to this sequence of operations, and if the cracks are sufficiently formed at the prearranged cut lines 390150 by the steam generator 390164 of the trans-hand 390160, the first breaking process can be omitted and the breaking process by using the steam generator 390164 can be performed without the first breaking process.

Cutting and Transferring

Further and alternative methods for cutting a liquid crystal display panel in accordance with additional embodiments of the present invention to separate the mother substrates into individual liquid crystal panels will now be described in detail with reference to FIGS. 113 and 114.

Figure 113:
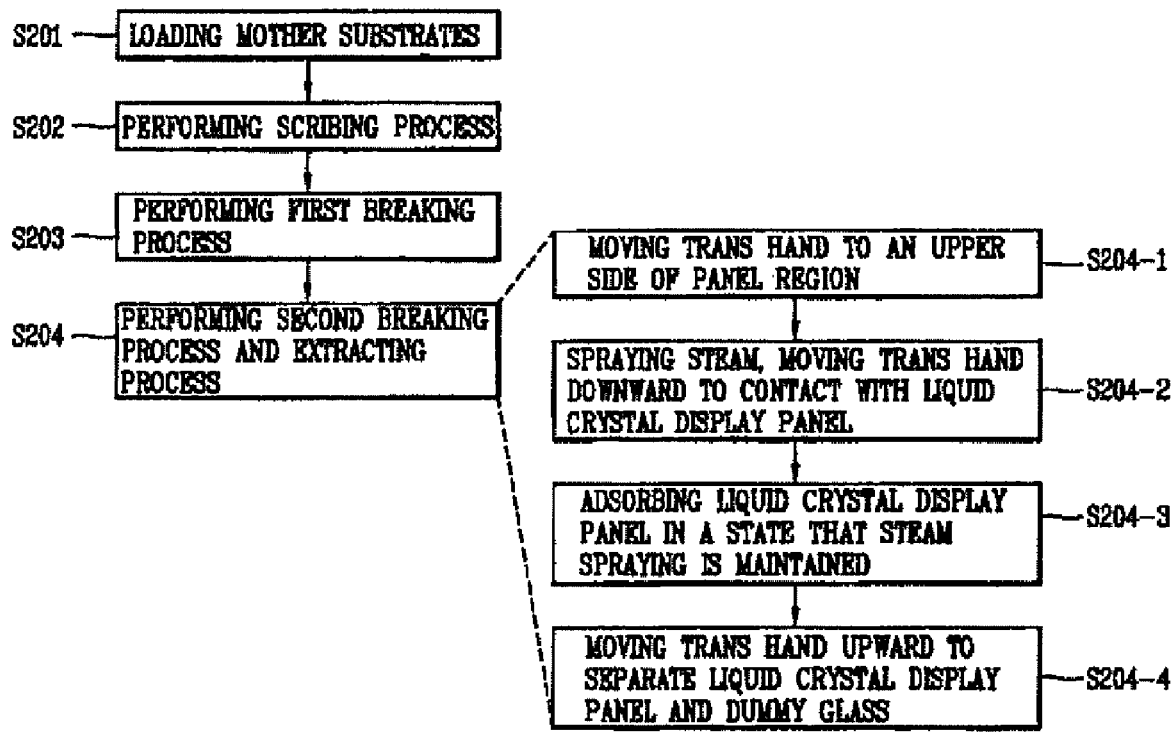
Figure 114:
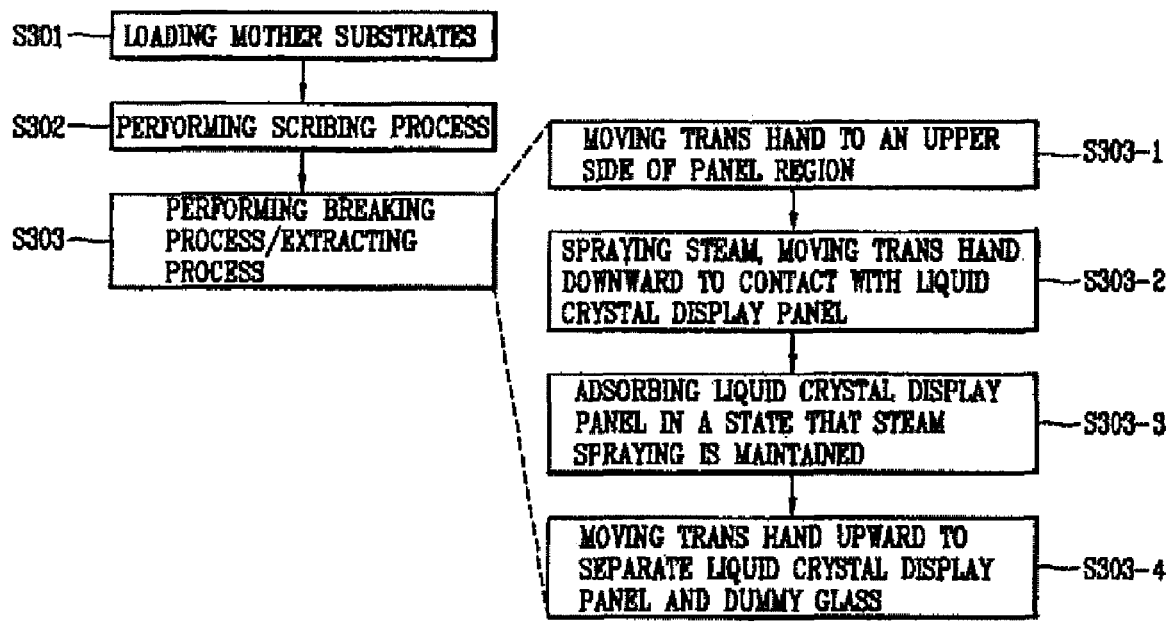

FIG. 113 is a flow chart illustrating a sequence of processes of a method for cutting a liquid crystal display panel in FIGS. 24 and 25 in accordance with a first embodiment of the present invention, and FIG. 114 is a flow chart illustrating a sequence of processes of a method for cutting a liquid crystal display panel in FIGS. 24 and 25 in accordance with a second embodiment of the present invention.

Specifically, FIG. 113 illustrates a method for cutting a liquid crystal display panel in which the first breaking process is performed by using the steam breaker and the air knife and the second breaking process is performed by using the steam generator attached at the trans-hand, and FIG. 114 illustrates an example of a method for cutting the liquid crystal display panel in which the breaking process and the extracting process are performed together by using the steam generator attached at the trans-hand.

First, the pair of bonded mother substrates on which the plurality of panel regions has been formed are loaded and transferred to the first scribing component through the transfer unit (steps 390S201 and 390S301). The TFT switching elements and the color filters have been formed on the upper and lower panel regions. The upper and lower panel regions have been bonded together to form liquid crystal display panels.

After being transferred to the scribing component, the first prearranged cut lines are formed to section the panel regions in the first direction and the second prearranged cut lines are formed to section the panel regions in the second direction on the front and rear surfaces of the mother substrates using the first scribing unit (steps 390S202 and 390S302).

After the scribing process including scribing in the first and second directions is complete, the mother substrates are moved to the breaking component in which steam and dry air are sprayed onto the front and rear surfaces of the mother substrates through the steam break and the air knife (the breaking units) during the first breaking process to form cracks along the prearranged cut lines (step 390S203).

After the scribing process and the first breaking process are completed on the mother substrates, the trans-hand is moved to a position above a liquid crystal display panel to be extracted (steps 390S204-1 and 390S303-1).

Step 390S204 of FIG. 113 illustrates the case in which after the first breaking process is performed by using the steam break and the air knife and the second breaking process is performed by using the trans-hand, while step 390S303 of FIG. 114 illustrates the case in which the first breaking process is omitted and only the second breaking process is performed by using the trans-hand.

Thereafter, the trans-hand is moved downward to approach the surface of the liquid crystal display panel to be extracted. While steam is being sprayed toward the prearranged cut lines through the steam generator of the trans-hand, the trans-hand contacts the liquid crystal display panel (steps 390S204-2 and 390S303-2).

With the trans-hand in contact with the surface of the liquid crystal display panel, the suction members of the trans-hand are affixed onto the surface of the liquid crystal display panel to be extracted.

Steam spraying through the steam generator is maintained for a certain pre-set time to create and propagate cracks formed along the prearranged cut lines to allow the dummy glass to be separated from the liquid crystal display panel (steps 390S204-3 and 390S303-3).

Thereafter the trans-hand is moved upward and the liquid crystal display panel affixed onto the suction members of the trans-hand is separated from the dummy glass and moved upward together with the trans-hand. If a portion of the dummy glass has not been separated from the liquid crystal display panel, the non-separated portion of the dummy glass can be physically removed by using the pusher installed at an outer edge of the trans-hand to completely remove the dummy glass from the liquid crystal display panel (steps 390S204-4 and 390S303-4).

Thereafter, as illustrated in FIG. 24, liquid crystal may be injected through a liquid crystal injection opening of each unit liquid crystal display panel. After the liquid crystal is injected, the liquid crystal injection opening is sealed to form a liquid crystal layer, and each unit liquid crystal display panel is inspected, thereby finishing fabrication of each of the unit liquid crystal display panels (steps 200S110 and 200S111).

The liquid crystal may be injected by using a vacuum injection method using a pressure difference. In the vacuum injection method, the liquid crystal injection opening of the unit liquid crystal display panel is put in a container filled with liquid crystal in a chamber with a certain degree of vacuum. The degree of vacuum is then changed to allow liquid crystal to be injected into the liquid crystal display panel according to a pressure difference between the interior and the exterior of the liquid crystal display panel. When the liquid crystal has filled inside the liquid crystal display panel to form a liquid crystal layer, the liquid crystal injection opening is sealed. As described above, to form the liquid crystal layer of the liquid crystal display panel through the vacuum injection method, a portion of a seal pattern is open for injecting the liquid crystal.

However, the vacuum injection method has the following problems.

First, a relatively long time is used to inject the liquid crystal into the liquid crystal display panel. Typically, the attached liquid crystal display panel has an area of hundreds of $cm^2$ and an opening for injecting liquid crystal of merely a few μm across. Accordingly, the quantity of liquid crystal injected per unit hour using the vacuum injection method is inevitably small. For example, about 8 hours are required for injecting the liquid crystal to fabricate a 15-inch liquid crystal display panel. The time required to inject the liquid crystal into the liquid crystal display panel reduces the overall productivity of the manufacturing process. In addition, as the liquid crystal display panel increases in size, the time taken for injecting liquid crystal increases, and a defective filling of liquid crystal may also occur. For these reasons, the vacuum injection method may have limited use when manufacturing large liquid crystal display panels.

Secondly, the vacuum injection method uses a large amount of liquid crystal. Typically, the amount of liquid crystal actually injected into the liquid crystal display panel is quite small compared with the amount of liquid crystal filled in the container. When liquid crystal is exposed to the air or to certain gases, the liquid crystal reacts with the air or gas and is degraded. Thus, although the liquid crystal filled in the container is used to fill a plurality of unit liquid crystal display panels, a large amount of the liquid crystal remaining in the container after completing the filling is discarded. Accordingly, the unit cost of the liquid crystal panel is increased, reducing the price competitiveness of the LCD panels.

In order to solve the above-described problems associated with the vacuum injection method a dropping method may be employed to form the liquid crystal layer.

As illustrated in FIG. 25, when using the dropping method, after the alignment film is inspected (step 200S105), a certain seal pattern is formed with a sealant on the color filter substrate and a liquid crystal layer is formed on the array substrate (steps 200S106' and 200S107') by dropping the liquid crystal on the large-scale first mother substrate where a plurality of array substrates is disposed. Alternatively, the liquid crystal may be dropped on an image display region of the second mother substrate where the plurality of color filter substrates is disposed.

After liquid crystal is dropped, the first and second mother substrates are bonded by applying a certain pressure thereto to uniformly distribute the liquid crystal to the entire image display region to form a liquid crystal layer.

Thus, in the case where the liquid crystal layer is formed in the liquid crystal display panel through the dropping method, the seal pattern is formed as a closed pattern surrounding the outer edge of the pixel part region to prevent a leakage of liquid crystal to outside of the image display region.

The dropping method allows forming the liquid crystal layer within a relatively short time compared to the time used by the vacuum injection method and can quickly form the liquid crystal layer even when the liquid crystal display panel is large.

In addition, since only the desired amount of liquid crystal is dropped on the substrate, an increase in the unit cost of the liquid crystal display panel due to discarding the high-priced liquid crystal can be prevented enhancing the price competitiveness of the LCD panels.

After the upper and lower substrates on which liquid crystal has been dropped and the sealant has been coated are aligned, a pressure is applied thereto to bond the lower and upper substrate together with the sealant and to spread the dropped liquid crystal uniformly on the entire portion of the panel (step 200S108').

Through the above described processes, the plurality of liquid crystal display panels with the liquid crystal layer formed thereon are formed on the large-scale glass substrates (upper and lower substrates). The glass substrates are processed and cut into a plurality of liquid crystal display panels, which are then inspected to thereby finish fabrication of the liquid crystal display panel (steps 200S109' and 200S110').

Embodiments of the present invention can be implemented such that the substrate can be cut into by employing apparatus other than the cutting wheel or pressing bar of the related art. In particular, embodiments of the present invention include an apparatus that can be used to cut an LCD panel and to transfer the cut LCD panel. The apparatus may be referred to as a transferring apparatus for transferring the cut LCD panel.

The transferring apparatus may not independently completely cut the substrate. Instead, the transferring apparatus may cut the substrate together with the cutting wheel and the steam cutting device. In other words, the substrate may be nearly completely cut by the cutting wheel and the steam cutting device, but not completely separated as a unit panel. Accordingly, an LCD panel that has not been separated is completely separated from the substrate and simultaneously transferred to the later process.

Further embodiments of the present invention provide a transferring apparatus applicable to LCD devices of various models. The LCD devices may be adapted to various electronic equipment such as mobile communication devices, notebook computers, and TV sets. LCD devices for the notebook computers or the TV sets may be fabricated to have various screen sizes. Using the transferring apparatus, a processing line capable of fabricating LCD devices with various models (sizes) at a low fabrication cost may be implemented. The embodiments of the present invention include a transferring apparatus that can accommodate various models by allowing the size of a main body onto which an LCD panel is affixed to be adjustable (variable).

Another embodiment of a transferring apparatus according to the present invention is described in detail hereinafter with reference to the attached drawings.

Figure 115:
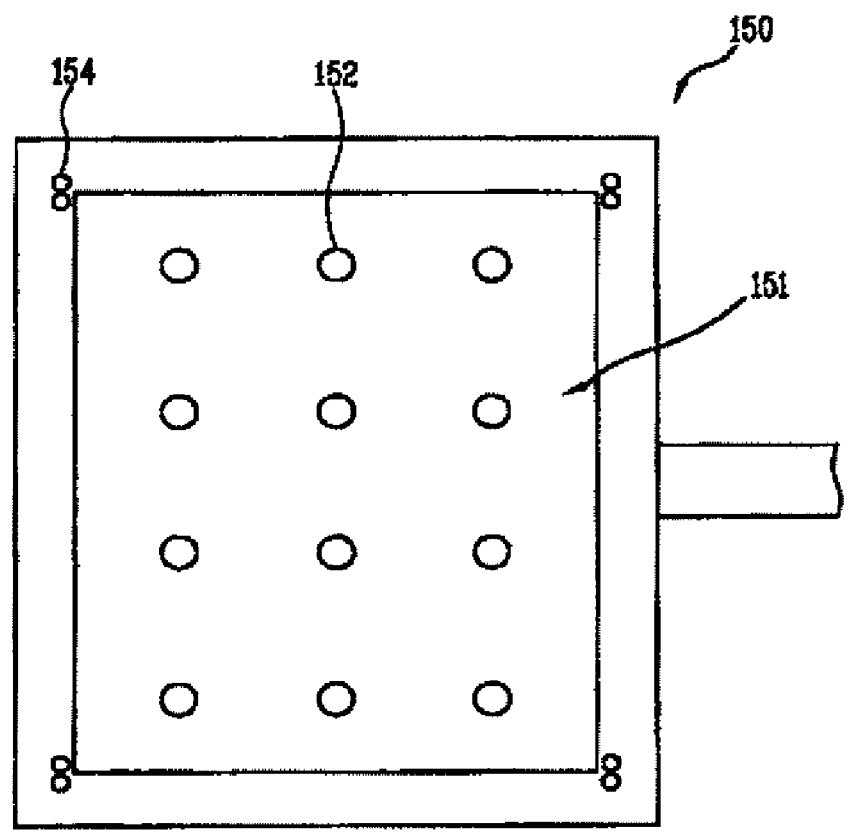

FIG. 115 is a view illustrating a LCD panel transferring apparatus according to an embodiment of the present invention. As illustrated in FIG. 115, a transferring apparatus 400150 may include a main body 400151; a plurality of suction holes 400152 formed on the main body 400151 for affixing the LCD panel 400110; and pins 400154 formed at corners of the main body 400151. The transferring apparatus 400150 is used to separate completely the LCD panel 400110 from the substrate 400140 and simultaneously to transfer the separated LCD panel 400110 to the next process. The pin 400154 presses a dummy region to completely separate the LCD panel 400110 from the substrate 400140 and a suction applied through the suction holes 400152 affixes the separated LCD panel 400110 to transfer it to the next process.

Figure 116:
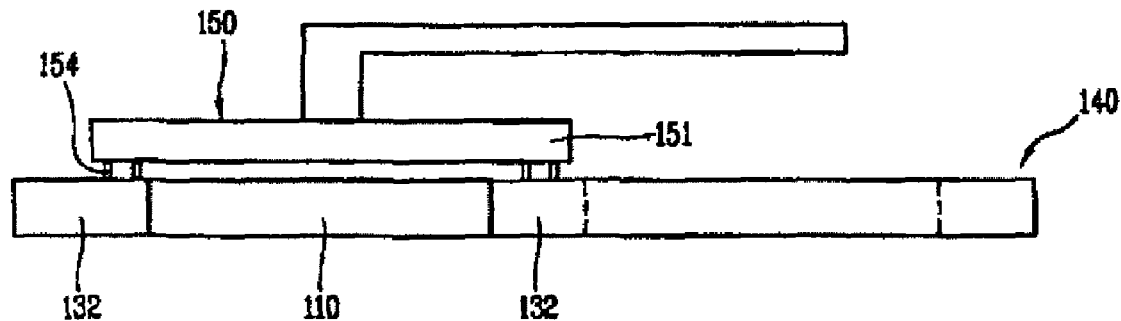

Referring to FIG. 116, after the substrate 400140 has undergone the scribing process and the breaking process the transferring apparatus 400150 is moved to a set position above the substrate 400140 (i.e., a position where the LCD panel 400110 is formed) and is then lowered. The LCD panel 400110 is affixed to the main body 400151 by applying a vacuum through the suction holes 400152 formed at the main body 400151. An alignment mark may be formed in the dummy region 400122 to align the substrate 400140 and the transferring apparatus 400150. With the LCD panel 400110 affixed to the main body 400151 the pins 400154 can be moved downwardly from the main body 400151 to apply pressure to a dummy region 400132 of the substrate 400140 to completely separate the LCD panel 400110 from the substrate 400140. When the transferring apparatus 400150 is then moved upwardly, the separated LCD panel 400110 remains affixed to the main body 400151 and is moved upwardly for transfer to a later process.

Thus, using the apparatus described with reference to FIGS. 115 and 4005, the substrate 400140 may be cut using the cutting wheel, the steam cutting device and using the transferring apparatus 400150, the LCD panel 400110 may be completely separated from the substrate 400140. The transferring apparatus 400150 may be further used to transfer the LCD panel 400110 to the next process. Accordingly, the separated LCD panel 400110 may be quickly transferred and a separate space for collecting the dummy substrate may not be required. In addition, even when the LCD panel 400110 is not completely separated from the substrate 400140 (i.e., even when the substrate is defectively cut), the cutting process can continue without stopping the cutting line itself.

Transferring

Figure 117:
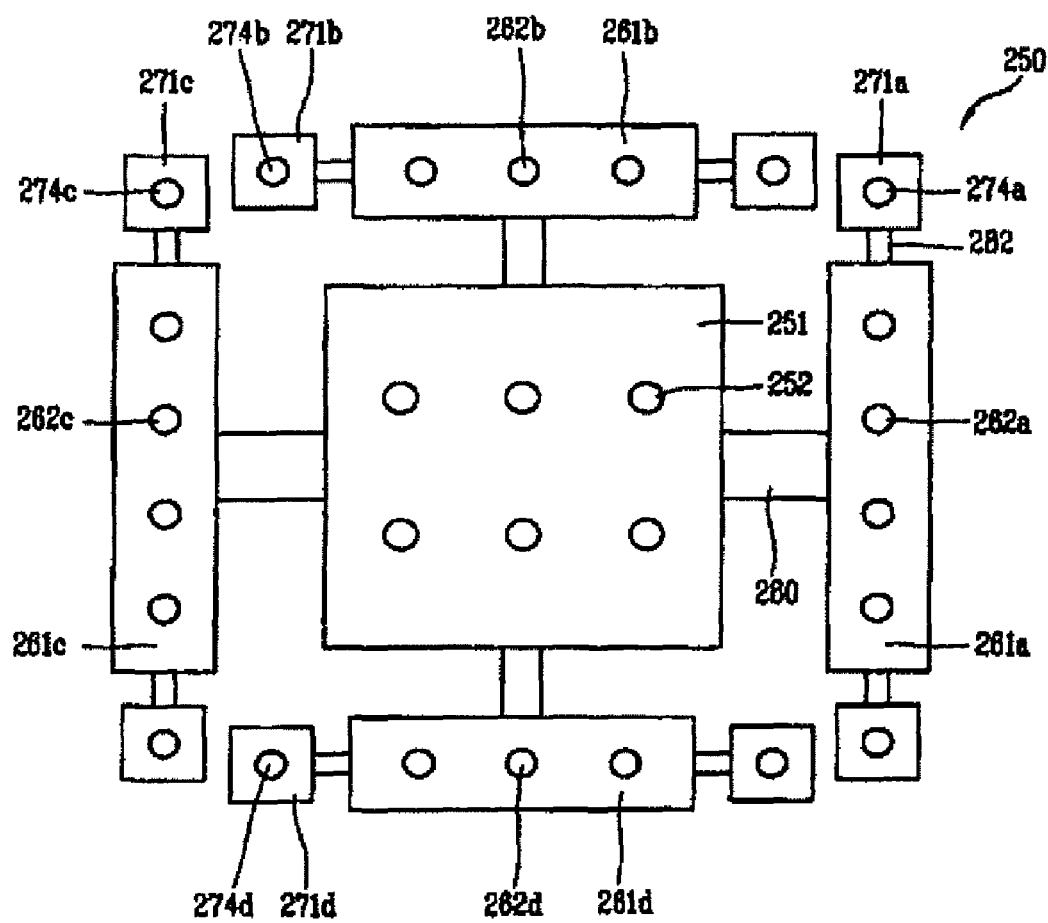

FIG. 117 is a view illustrating an LCD panel transferring apparatus 400250 according to another embodiment of the present invention.

The transferring apparatus 400250 according to the embodiment illustrated in FIG. 117, includes a first main body 400251 for affixing and transferring an LCD panel; a plurality of first suction holes 400252 formed at the first main body 400251 and connected to a vacuum device to thus affix the LCD panel; a plurality of second main bodies 400261*a* through 400261*d* which are separated from the first main body 400251 and then connected to the first main body 400251 via first extension bars 400280.

The second main bodies 400261*a* through 400261*d* having second suction holes 400262*a* through 400262*d* may be extended from the main body along the first extension bars to increase the fixation area of the LCD panel. The second main bodies may further include third main bodies 400271*a* through 400271*d* extendable from the second main bodies 400261*a* through 400261*d* via second extension bars 400282, and pins 400274*a* through 400274*d* formed at the third main bodies 400271*a* through 400271*d*, for completely separating the LCD panel from the substrate by impacting or striking the substrate.

Figure 118A:
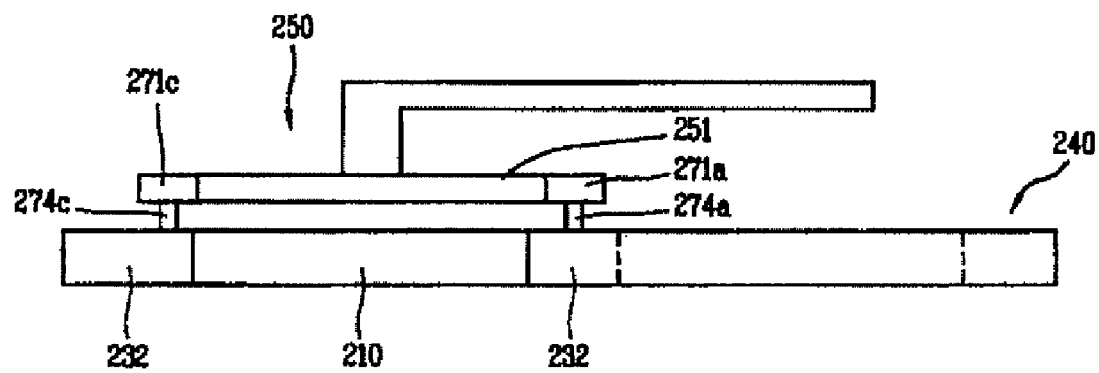
Figure 118B:
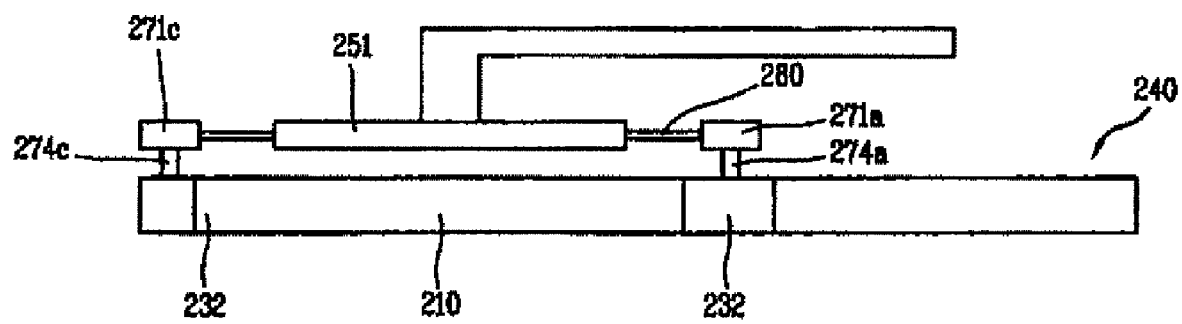

An operation of the LCD panel transferring apparatus 400250 according to the embodiment of the present invention illustrated in FIG. 117 will now be explained with reference to FIGS. 118A and 118B. FIG. 118A is a view illustrating a transfer of an LCD panel with a relatively smaller area, and FIG. 118B is a view illustrating a transfer of an LCD panel with a relatively greater area.

As illustrated in FIG. 118A, when a substrate 400240 including an LCD panel 400210 having a relatively small area is transferred through a conveyer via a scribing process and a breaking process the transferring apparatus 400250 is moved to a region of the LCD panel 400210 above the substrate 400240. The transferring apparatus 400250 descends and a the vacuum device connected to the first suction holes 400252 is operated with the first main body 400251 of the transferring apparatus 400250 contacting the LCD panel 400210. The LCD panel 400210 is affixed to the first main body 400251 by application of suction through the first suction holes 400252 to the substrate 400240.

The first extension bars 400280 and the second extension bars 400282 which respectively extend the second bodies 400261*a* through 400261*d* and the third main bodies 400271*a* through 400271*d* away from the first main body 400251 are in a retracted position and accordingly, the second bodies 400261*a* through 400261*d* and the third main bodies 400271*a* through 400271*d* are in contact with or in close proximity to the first main body 400251.

The LCD panel 400210 is affixed to the first main body 400251 via the first suction hole 400252. The LCD panel may be additional affixed using the second suction holes 400262*a* through 400262*d*. The pins 400274*a* through 400274*d* descend from the third main body 400271*a* through 400271*d* to apply an impact on the dummy regions 400232 of the substrate 400240. The applied impact completely separates the LCD panel 400210 from the substrate 400240. The separated LCD panel 400210 may then be transferred to a later process by the transferring apparatus 400250.

As illustrated in FIG. 118B, when the substrate 400240 including an LCD panel with a relatively great area (i.e., an LCD panel greater than the first main body of the transferring apparatus 400250) is transferred through the conveyer via the scribing process and the breaking process, the transferring apparatus 400250 is moved to the region of the LCD panel 400210 above the substrate 400240.

Since the area of the LCD panel 400210 is greater than that of the first main body 400251 of the transferring apparatus 400250, the second bodies 400261*a* through 400261*d* and the third main bodies 400271*a* through 400271*d* are extended away from first main body 400251 using the first extension bars 400280 and the second extension bars 400282. The center and four edges of the LCD panel 400210 are affixed to the first main body 400251 and the second main bodies 400261*a* through 400261*d* by the first suction holes 400252 and the second suction holes 400262*a* through 400262*d* respectively formed at the first main body 400251 and the second main bodies 400261*a* through 400261*d*.

With the LCD panel affixed to When the pins 400274*a* through 400274*d* of the third main bodies 400271*a* through 400271*d* which are extended from the second main bodies 400261*a* through 400261*d* descent in the state that the LCD panel is affixed to thus apply an impact onto the dummy regions 400232 of the substrate 400240, the LCD panel 400210 is completely separated from the substrate 400240 to then be transferred to the later process.

As described above, regarding the LCD panel transferring apparatus 400250 according to the embodiment of the present invention illustrated in FIG. 117, the second main bodies 400261*a* through 400261*d* and the third main bodies 400271*a* through 400271*d* can be extended from the first main body 400251 to affix the LCD panel with the greater area to transfer it. In particular, the second main bodies 400261*a* through 400261*d* and the third main bodies 400271*a* through 400271*d* are extended by use of the first and second extension bars 400280 and 400282, extended distances of which are adjustable. Accordingly, it is possible to vary the area of the LCD panel to be suction-affixed by the first main body 400251, the second main bodies 400261*a* through 400261*d* and the third main bodies 400271*a* through 400271*d*.

When the suction area of the main body of the transferring apparatus 400250 is fixed (i.e., when the area of the main body is not variable), when changing a model of the LCD panel being processed, the main body is detached from the transferring apparatus and then another main body corresponding to the changed model is attached to the transferring apparatus to thus execute the transferring operation, which causes the processes to be executed with delay and also increases the price of the transferring apparatus. However because the area of the main body is adjustable as in the described embodiments, replacing the main body to accommodate different models of the LCD panels may be avoided allows an increased process performance. In particular, the transferring apparatus in these embodiments can efficiently be used in a processing line for fabricating various models of LCD panels.

As described above, the LCD panel transferring apparatus may be constructed to have a controllable affixing portion. Accordingly, upon changing a model of an LCD device, the suction-affixing area of the transferring apparatus may be adjusted to effectively accommodate LCD devices with various models to allow a fast transfer of the LCD panel.

Testing

Hereinafter, an apparatus for testing an appearance of an LCD panel according to an embodiment of the present invention will now be explained in detail with reference to the attached drawings.

Figure 119A:
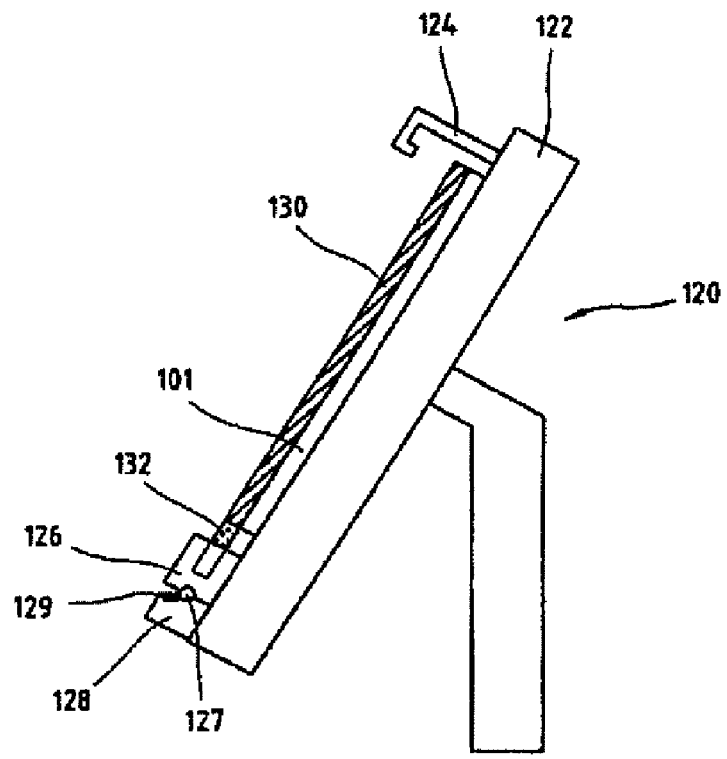
Figure 119B:
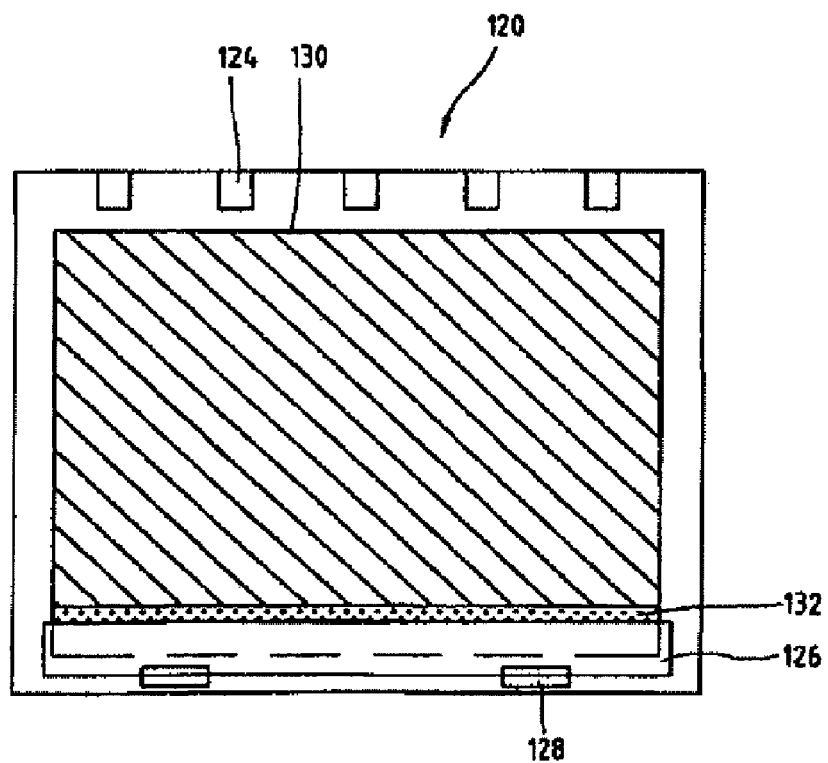

FIGS. 119A and 119B are views illustrating an apparatus for testing an appearance of an LCD panel according to the present invention. As illustrated in FIGS. 119A and 119B, an apparatus 410120 for visual inspection of an LCD panel according to an embodiment of the present invention includes a test board 410122 for transmitting light to an LCD panel 410101 placed thereon by use of a lamp installed therein; a jig 410132 for supporting a polarizer 410130; and a polarizer fixing unit 410126 formed at the test board 410122 and in which the jig 410132 is inserted.

The polarizer fixing unit 410126 is provided such that the jig 410132 for supporting the polarizer 410130 is inserted thereinto. An inserting groove for the polarizer 410130 is formed in the polarizer fixing unit 410126 and accordingly the jig 410132 of the polarizer 410130 is inserted into the inserting groove to fix the polarizer 410130. The polarizer fixing unit 410126 is rotatable about a rotary shaft 410127 to form a certain angle from the test board 410122. For example, the polarizer fixing unit 410126 may be rotatable to be perpendicular to the ground. The polarizer 410130 can easily be inserted into the inserting groove of the polarizer fixing unit 410126 when the polarizing fixing unit is rotated downwardly to a certain angle such as in a perpendicular direction to the ground.

Furthermore, the test board 410122 is provided with a stop 410128 for setting the rotation angle of the polarizer fixing unit 410126. The polarizer fixing unit 410126 may be rotated to a position where the polarizer 410130 can easily be inserted therein. Over-rotation of the polarizer fixing unit 410126 makes it more difficult to insert the polarizer 410130 therein. Accordingly, the stop 410128 is provided to stop the rotation of the polarizer fixing unit 410126 at a position where the polarizer 410130 may be easily inserted therein.

The stop 410128 may include a fixing member 410129 such as a magnet. The fixing member 410129 maintains the polarizing fixing unit 410126 positioned at the insertion position of the polarizer 410130, and accordingly holds the polarizer fixing unit 410126 while the polarizer 410130 is inserted into the polarizer fixing unit 410126. A unit for coupling to the fixing member 410129 may be provided to fix the polarizing fixing unit 410126 to the fixing member 410129. For example, when the fixing member 410129 is the magnet, a ferrous metal plate may be provided on the polarizer fixing unit 410126 to fix the polarizer fixing unit 410126 at the desired position by a magnetic force of the magnet. Alternatively, when the fixing member 410129 is a bolt, the polarizer fixing unit 410126 may have a nut threadable onto the bolt to fix the polarizer fixing unit at the desired position. The fixing member 410129 may be disposed in the polarizer fixing unit 410126 and the unit for coupling to the fixing member 410129 may be disposed in the stop 410128.

Figure 120A:
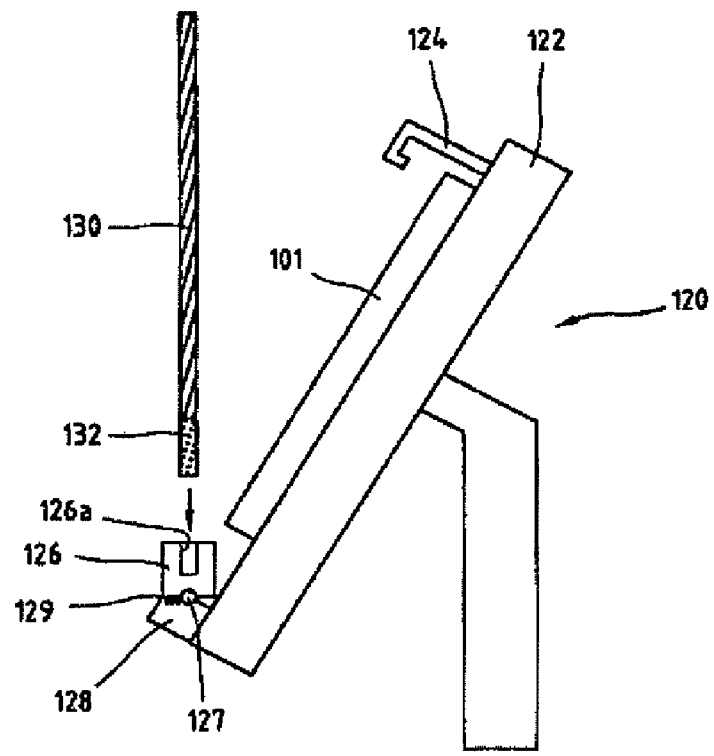
Figure 120B:
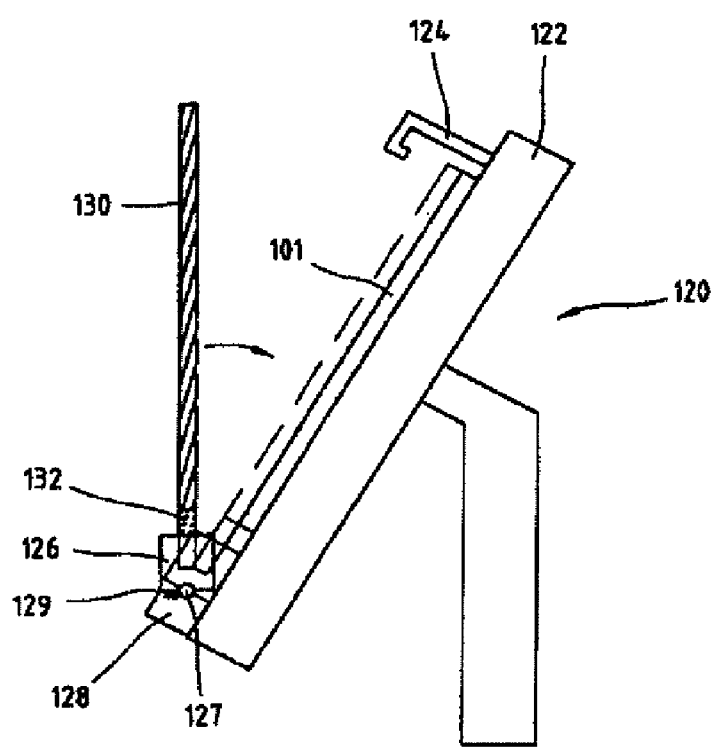

A method for testing an LCD panel using the apparatus for visually inspecting the LCD panel having such construction will now be explained with reference to FIGS. 120A and 120B.

First, a switching device array forming process is performed to form gate lines and data lines, thin film transistors, and a pixel electrode on a first substrate and a color filter forming process is performed to form a color filter layer and a common electrode on a second substrate. A cell forming process is performed to bond the first and second substrates. Various methods such as a vacuum injection method or a liquid crystal dispensing method are adapted to form a liquid crystal layer between the first and second substrates. The LCD panel 410101 that has undergone the switching device array forming process, the color filter forming process and the cell forming process is transferred to a visual inspection appearance testing process by a transferring apparatus such as a conveyer. The transferred LCD panel 410101 is placed on the test board 410122. As illustrated in FIG. 120A, the polarizer fixing unit 410126 is rotated to allow a groove 410126a formed in the polarizer fixing unit 410126 to be positioned upwardly. At this time, the polarizer fixing unit 410126 is fixed to the stop 410128 by the fixing member 410129, to thus maintain the groove 410126a positioned upwardly by being at an angle to the ground such as perpendicular to the ground.

An operator then inserts the polarizer 410130 that is supported by the jig 410132 downwardly into the groove 410126a of the polarizer fixing unit 410126 to fix the polarizer 410130. Then, as illustrated in FIG. 120B, the polarizer fixing unit 410126 is rotated to position the polarizer 410130 on the LCD panel 410101.

With the polarizer 410130 is positioned on the LCD panel 410101, the camera 410124 is used to confirm the aligned state of the LCD panel 410101. A signal is applied to the LCD panel 410101 and the operator then observes light transmitted through the polarizer 410130 to detect whether the LCD panel 410101 has a defect.

As described above, the apparatus for testing an appearance of the LCD panel according to the present invention can be constructed such that the groove in which the jig is inserted is formed in the polarizer fixing unit which is rotatable whereby a polarizer having a large size can easily be positioned on the LCD panel and also a collision of the polarizer with the camera or other component can effectively be prevented.

It will be apparent to those skilled in the art that various modifications and variation can be made in the present invention and embodiments thereof without departing from the spirit or scope of the invention. Thus, it is intended that the present invention cover the modifications and variations of this invention provided they come within the scope of the appended claims and their equivalents.

What is claimed is:

1. A method of manufacturing a liquid crystal display device, comprising:
    providing first and second substrates;
    dispensing sealant on the first substrate in a predetermined pattern after providing the first and second substrates;
    applying suction to a nozzle dispensing the sealant to remove sealant from the nozzle;
    dispensing liquid crystal on the first substrate after dispensing sealant on the first substrate;
    bonding the first and second substrate together;
    providing an inlet in the sealant;
    determining whether the amount of liquid crystal between the two substrates is excessive or insufficient;
    providing liquid crystal between the substrate if the amount determined is insufficient;
    extracting liquid crystal by applying pressure to the substrates if the amount of liquid crystal is excessive;
    cutting the substrate into one or more liquid crystal display panels, said cutting including cutting through a portion of the sealant; and
    inspecting the liquid crystal display panel for optical defects.

* * * * *